(12) United States Patent
Buazza et al.

(10) Patent No.: US 6,729,866 B2
(45) Date of Patent: May 4, 2004

(54) PLASTIC LENS SYSTEMS

(75) Inventors: Omar M. Buazza, Louisville, KY (US); Stephen C. Luetke, Louisville, KY (US); Galen R. Powers, Louisville, KY (US); Matthew C. Lattis, Louisville, KY (US); Larry H. Joel, Louisville, KY (US)

(73) Assignee: Q2100, Inc., Louisville, KY (US)

( * ) Notice: Subject to any disclaimer, the term of this patent is extended or adjusted under 35 U.S.C. 154(b) by 0 days.

(21) Appl. No.: 09/780,076

(22) Filed: Feb. 9, 2001

(65) Prior Publication Data

US 2002/0018824 A1 Feb. 14, 2002

Related U.S. Application Data

(62) Division of application No. 09/272,815, filed on Mar. 19, 1999, now Pat. No. 6,419,873.

(51) Int. Cl.[7] .................................. B29D 11/00
(52) U.S. Cl. ..................... 425/90; 425/135; 425/173; 425/174.4; 425/808
(58) Field of Search ................. 425/135, 174.4, 425/808, 90, 173; 264/1.3, 1.38, 494, 496; 118/52, 64, 320, 620

(56) References Cited

U.S. PATENT DOCUMENTS

| | | |
|---|---|---|
| 2,479,935 A | 8/1949 | Johnson |
| 2,524,386 A | 2/1950 | Beattie |
| 2,524,862 A | 10/1950 | White |
| 2,525,664 A | 10/1950 | Gadsby et al. |
| 3,056,166 A | 10/1962 | Weinberg |
| 3,240,854 A | 3/1966 | Ewers |
| 3,485,765 A | 12/1969 | Newland |
| 3,494,326 A | 2/1970 | Upton |
| 3,555,611 A | 1/1971 | Reiterman |

(List continued on next page.)

FOREIGN PATENT DOCUMENTS

| | | |
|---|---|---|
| DE | 40 10 784 | 10/1991 |
| DE | 196 10 563 | 9/1997 |
| WO | 00/18567 | 4/2000 |
| WO | 2000/18569 | 4/2000 |
| WO | 00/46016 | 8/2000 |

(List continued on next page.)

OTHER PUBLICATIONS

International Search Report for PCT/US 01/10480 dated Oct. 30, 2001.

International Search Report for PCT/US 01/10475 dated Oct. 30, 2001.

International Search Report for PCT/US 01/10403 dated Oct. 29, 2001.

International Search Report for PCT/US 01/10576 dated Apr. 10, 2001.

International Search Report for PCT/US 01/10474 dated Oct. 30, 2001.

*Primary Examiner*—James P. Mackey
*Assistant Examiner*—Donald Heckenberg
(74) *Attorney, Agent, or Firm*—Meyertons, Hood, Kivlin, Kowert & Goetzel, P.C.

(57) ABSTRACT

An apparatus for preparing a plastic eyeglass lens includes a coating unit and a lens curing unit. The apparatus is preferably configured to allow the operation of both the coating unit and the lens curing unit. The apparatus may also include a post-cure unit and a controller. The controller is configured to control the operation of the coating unit, the lens curing unit and the post-cure unit. A lens forming composition may include an aromatic containing polyether polyethylenic functional monomer, a photoinitiator, and a coinitiator. The lens forming composition may be cured by the application of activating light or activating light and heat.

70 Claims, 45 Drawing Sheets

U.S. PATENT DOCUMENTS

| | | |
|---|---|---|
| 3,851,801 A | 12/1974 | Roth |
| 3,871,803 A | 3/1975 | Beattie |
| 3,942,686 A | 3/1976 | Roth |
| 3,968,306 A | 7/1976 | Yoshihara et al. |
| 4,077,858 A | 3/1978 | Costanza et al. |
| 4,095,772 A | 6/1978 | Weber |
| 4,113,224 A | 9/1978 | Clark et al. |
| 4,118,853 A | 10/1978 | Mignen |
| 4,132,518 A | 1/1979 | Rips |
| 4,138,538 A | 2/1979 | Kaetsu et al. |
| 4,166,088 A | 8/1979 | Neefe |
| 4,190,621 A | 2/1980 | Greshes |
| 4,220,708 A | 9/1980 | Heller |
| 4,246,207 A | 1/1981 | Spycher |
| 4,252,753 A | 2/1981 | Rips |
| 4,257,988 A | 3/1981 | Matos et al. |
| 4,273,809 A | 6/1981 | LaLiberte et al. |
| 4,284,399 A | 8/1981 | Newcomb et al. |
| 4,287,337 A | 9/1981 | Guglielmetti et al. |
| 4,297,616 A | 10/1981 | Corona |
| 4,298,005 A | 11/1981 | Mutzhas |
| 4,308,400 A | 12/1981 | Felder et al. |
| 4,329,622 A | 5/1982 | Corona et al. |
| 4,355,135 A | 10/1982 | January |
| 4,369,298 A | 1/1983 | Kida et al. |
| 4,390,482 A | 6/1983 | Feurer |
| 4,396,737 A | 8/1983 | Leatherman |
| 4,440,699 A | 4/1984 | Smid et al. |
| 4,441,795 A | 4/1984 | Lobdell |
| 4,511,209 A | 4/1985 | Skutnik |
| 4,512,340 A | 4/1985 | Buck |
| 4,534,915 A | 8/1985 | Neefe |
| 4,542,201 A | 9/1985 | Kanemura et al. |
| 4,544,572 A | 10/1985 | Sandvig et al. |
| 4,557,980 A | 12/1985 | Hodnett, III |
| 4,561,951 A | 12/1985 | Neckers |
| 4,576,766 A | 3/1986 | Baskerville et al. |
| 4,586,996 A | 5/1986 | Shinohara et al. |
| 4,594,288 A | 6/1986 | Dobigny et al. |
| 4,613,656 A | 9/1986 | Tang |
| 4,622,376 A | 11/1986 | Misura et al. |
| 4,623,497 A | 11/1986 | Waters |
| 4,640,489 A | 2/1987 | Larsen |
| 4,666,952 A | 5/1987 | Henne et al. |
| 4,685,783 A | 8/1987 | Heller et al. |
| 4,687,707 A | 8/1987 | Matsuo et al. |
| 4,693,446 A | 9/1987 | Orlosky |
| 4,707,076 A | 11/1987 | Skutnik et al. |
| 4,711,379 A | 12/1987 | Price |
| 4,720,356 A | 1/1988 | Chu |
| 4,728,469 A | 3/1988 | Danner et al. |
| 4,731,264 A | 3/1988 | Lin et al. |
| 4,746,716 A | 5/1988 | Oates |
| 4,758,448 A | 7/1988 | Sandvig et al. |
| 4,774,035 A | 9/1988 | Carmelite et al. |
| 4,780,393 A | 10/1988 | Frommeld |
| 4,784,467 A | 11/1988 | Akatsuka et al. |
| 4,800,122 A | 1/1989 | Sallavanti et al. |
| 4,842,782 A | 6/1989 | Portney et al. |
| 4,851,530 A | 7/1989 | Rickwood |
| 4,852,974 A | 8/1989 | Melzig et al. |
| 4,879,318 A | 11/1989 | Lipscomb et al. |
| 4,889,664 A | 12/1989 | Kindt-Larsen et al. |
| 4,895,102 A | 1/1990 | Kachal et al. |
| 4,902,725 A | 2/1990 | Moore |
| 4,913,544 A | 4/1990 | Rickwood et al. |
| 4,919,850 A | 4/1990 | Blum et al. |
| 4,929,278 A | 5/1990 | Ashley et al. |
| 4,939,423 A | 7/1990 | Ruby |
| 4,955,804 A | 9/1990 | Martell et al. |
| 4,959,429 A | 9/1990 | Misura et al. |
| 4,965,294 A | 10/1990 | Ohngemach et al. |
| 4,966,812 A | 10/1990 | Ashley et al. |
| 4,968,454 A | 11/1990 | Crano et al. |
| 4,983,335 A | 1/1991 | Matsuo et al. |
| 4,985,186 A | 1/1991 | Nose et al. |
| 4,988,274 A | 1/1991 | Kenmochi |
| 5,015,523 A | 5/1991 | Kawashima et al. |
| 5,028,358 A | 7/1991 | Blum |
| 5,049,321 A | 9/1991 | Galic |
| 5,061,355 A | 10/1991 | Rose, Jr. |
| 5,061,769 A | 10/1991 | Aharoni |
| 5,104,692 A | 4/1992 | Belmares |
| 5,105,126 A | 4/1992 | Whitesel |
| 5,110,514 A | 5/1992 | Soane |
| 5,116,644 A | 5/1992 | Asai et al. |
| 5,118,142 A | 6/1992 | Bish |
| 5,135,686 A | 8/1992 | Masuhara et al. |
| 5,147,585 A | 9/1992 | Blum |
| 5,153,027 A | 10/1992 | Spagnoli |
| 5,154,861 A | 10/1992 | McBrierty et al. |
| 5,158,718 A | 10/1992 | Thakrar et al. |
| 5,173,368 A | 12/1992 | Belmares |
| 5,178,955 A | 1/1993 | Aharoni et al. |
| 5,219,497 A | 6/1993 | Blum |
| 5,224,957 A | 7/1993 | Gasser et al. |
| 5,225,244 A | 7/1993 | Aharoni et al. |
| 5,238,981 A | 8/1993 | Knowles |
| 5,268,196 A | 12/1993 | Boulos |
| 5,274,132 A | 12/1993 | VanGemert |
| 5,316,791 A | 5/1994 | Farber et al. |
| 5,364,256 A | 11/1994 | Lipscomb et al. |
| 5,369,158 A | 11/1994 | Knowles |
| 5,377,032 A | 12/1994 | Fergason et al. |
| 5,384,077 A | 1/1995 | Knowles |
| 5,385,955 A | 1/1995 | Tarshiani et al. |
| 5,391,327 A | 2/1995 | Ligas et al. |
| 5,405,958 A | 4/1995 | VanGemert |
| 5,411,679 A | 5/1995 | Kumar |
| 5,412,016 A | 5/1995 | Sharp |
| 5,415,816 A | 5/1995 | Buazza et al. |
| 5,422,046 A | 6/1995 | Tarshiani et al. |
| 5,424,611 A | 6/1995 | Moriarty, Jr. |
| 5,429,774 A | 7/1995 | Kumar |
| 5,448,136 A | 9/1995 | Fischer |
| 5,451,344 A | 9/1995 | Knowles et al. |
| 5,458,814 A | 10/1995 | Kumar et al. |
| 5,458,815 A | 10/1995 | Knowles |
| 5,464,567 A | 11/1995 | Knowles et al. |
| 5,466,398 A | 11/1995 | Van Gemert et al. |
| 5,470,892 A | 11/1995 | Gupta et al. |
| 5,476,717 A | 12/1995 | Floch |
| 5,514,214 A | 5/1996 | Joel et al. |
| 5,516,468 A | 5/1996 | Lipscomb et al. |
| 5,529,728 A | 6/1996 | Buazza et al. |
| 5,531,940 A | 7/1996 | Gupta et al. |
| 5,580,819 A | 12/1996 | Li et al. |
| 5,585,186 A | 12/1996 | Scholz et al. |
| 5,589,396 A | 12/1996 | Frye et al. |
| 5,597,519 A | 1/1997 | Martin et al. |
| 5,619,288 A | 4/1997 | White, Jr. et al. |
| 5,621,017 A | 4/1997 | Kobayakawa et al. |
| 5,622,784 A | 4/1997 | Okaue et al. |
| 5,623,184 A | 4/1997 | Rector |
| 5,627,434 A | 5/1997 | Sekiya et al. |
| 5,639,517 A | 6/1997 | Floch et al. |
| 5,644,014 A | 7/1997 | Schmidt et al. |
| 5,662,839 A | 9/1997 | Magne |
| 5,681,871 A | 10/1997 | Molock et al. |
| 5,685,098 A | 11/1997 | Brytsche et al. |
| 5,689,324 A | 11/1997 | Lossman et al. |

| | | |
|---|---|---|
| 5,693,366 A | 12/1997 | Mase et al. |
| 5,698,266 A | 12/1997 | Floch et al. |
| 5,699,189 A | 12/1997 | Murphy |
| 5,716,679 A | 2/1998 | Krug et al. |
| 5,719,705 A | 2/1998 | Machol |
| 5,744,243 A | 4/1998 | Li et al. |
| 5,747,102 A | 5/1998 | Smith et al. |
| 5,753,301 A | 5/1998 | Brytsche et al. |
| 5,762,081 A | 6/1998 | Keene et al. |
| 5,766,680 A | 6/1998 | Schmidt et al. |
| 5,789,015 A | 8/1998 | Gupta et al. |
| 5,836,323 A | 11/1998 | Keene et al. |
| 5,849,209 A | 12/1998 | Kindt-Larsen et al. |
| 5,851,328 A | 12/1998 | Kohan |
| 5,861,934 A | 1/1999 | Blum et al. |
| 5,880,171 A | 3/1999 | Lim et al. |
| 5,903,105 A | 5/1999 | Lee et al. |
| 5,910,516 A | 6/1999 | Imura et al. |
| 5,914,074 A | 6/1999 | Martin et al. |
| 5,914,174 A | 6/1999 | Gupta et al. |
| 5,914,193 A | 6/1999 | Ono et al. |
| 5,928,575 A | 7/1999 | Buazza |
| 5,949,518 A | 9/1999 | Belmares et al. |
| 5,976,423 A | 11/1999 | Buazza |
| 5,989,462 A | 11/1999 | Buazza et al. |
| 6,022,498 A | 2/2000 | Buazza et al. |
| 6,042,754 A | 3/2000 | Yang et al. |
| 6,060,125 A | 5/2000 | Fujii |
| 6,074,579 A | 6/2000 | Greshes |
| 6,082,987 A | 7/2000 | Su et al. |
| 6,086,799 A | 7/2000 | Buazza et al. |
| 6,099,283 A | 8/2000 | Soane et al. |
| 6,102,543 A | 8/2000 | Melzig |
| 6,103,148 A | 8/2000 | Su et al. |
| 6,105,925 A | 8/2000 | Lossman et al. |
| 6,171,528 B1 | 1/2001 | Buazza et al. |
| 6,174,155 B1 | 1/2001 | Buazza et al. |
| 6,174,465 B1 | 1/2001 | Buazza et al. |
| 6,200,124 B1 | 3/2001 | Buazza et al. |
| 6,201,037 B1 | 3/2001 | Lipscomb et al. |
| 6,206,673 B1 | 3/2001 | Lipscomb et al. |
| 6,218,494 B1 | 4/2001 | White, Jr. et al. |
| 6,228,289 B1 * | 5/2001 | Powers et al. ............ 264/1.36 |
| 6,241,505 B1 | 6/2001 | Buazza et al. |
| 6,245,428 B1 | 6/2001 | Port et al. |
| 6,253,957 B1 | 7/2001 | Messerly et al. |
| 6,280,171 B1 | 8/2001 | Buazza |
| 6,284,159 B1 | 9/2001 | Lossman et al. |
| 6,328,445 B1 | 12/2001 | Buazza |
| 6,331,058 B1 | 12/2001 | Lipscomb et al. |
| 6,367,928 B1 | 4/2002 | Buazza et al. |
| 6,368,523 B1 | 4/2002 | Buazza et al. |
| 6,416,307 B1 | 7/2002 | Buazza et al. |
| 6,419,873 B1 | 7/2002 | Buazza et al. |
| 6,439,870 B1 | 8/2002 | Marceau et al. |
| 6,451,226 B1 | 9/2002 | Buazza |
| 6,464,484 B1 | 10/2002 | Powers et al. |
| 6,478,990 B1 | 11/2002 | Powers et al. |
| 2001/0035929 A1 | 11/2001 | Nakamura et al. |

FOREIGN PATENT DOCUMENTS

| | | |
|---|---|---|
| EP | 0 226 123 | 6/1987 |
| EP | 0 227 337 | 7/1987 |
| EP | 0 245 020 | 11/1987 |
| EP | 0 245 022 | 11/1987 |
| EP | 0 274 595 | 7/1988 |
| EP | 0 297 871 | 1/1989 |
| EP | 0 314 417 | 5/1989 |
| EP | 0318 164 | 5/1989 |
| EP | 0 322 353 | 6/1989 |
| EP | 0 341 534 | 11/1989 |
| EP | 533 030 | 3/1993 |
| EP | 0 658 072 | 7/1995 |
| EP | 0 941 829 | 9/1999 |
| FR | 1334376 | 12/1993 |
| GB | 872421 | 7/1961 |
| GB | 1029335 | 5/1966 |
| GB | 1086114 | 10/1967 |
| GB | 2 184 734 | 7/1987 |
| JP | 49-31768 | 3/1974 |
| JP | 55-132221 | 10/1980 |
| JP | 57-85002 | 5/1982 |
| JP | 56-135032 | 10/1982 |
| JP | 58-45445 | 10/1983 |
| JP | 59-86603 | 5/1984 |
| JP | 59-86615 | 5/1984 |
| JP | 59-187819 | 10/1984 |
| JP | 60-213901 | 10/1985 |
| JP | 62-25162 | 6/1987 |
| JP | 93-00478 | 11/1987 |
| JP | 62-288030 | 12/1987 |
| JP | 63-207632 | 8/1988 |
| JP | 01 286808 A | 11/1989 |
| JP | 04-232706 | 8/1992 |
| JP | 05 147110 | 6/1993 |
| JP | 08 157546 | 6/1996 |
| JP | 09 005501 | 1/1997 |
| WO | 97/39880 | 10/1987 |
| WO | 90/05629 | 5/1990 |
| WO | 92/12851 | 8/1992 |
| WO | 92/17536 | 10/1992 |
| WO | 94/04345 | 3/1994 |
| WO | 95/13567 | 5/1995 |
| WO | 97/09170 | 3/1997 |
| WO | 98/11998 | 3/1998 |

* cited by examiner

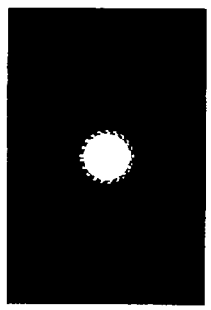
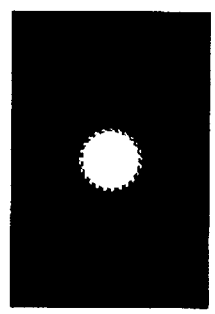
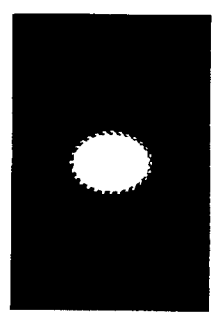
A        B        C
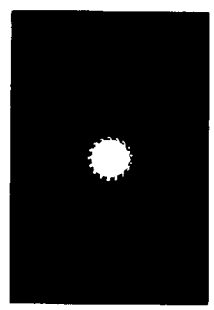
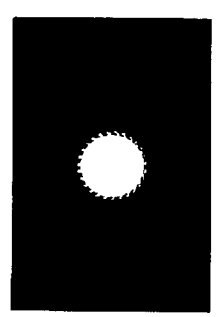
D        E        F
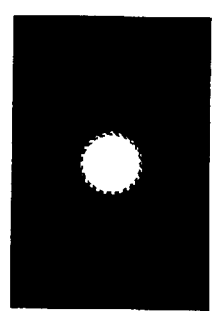
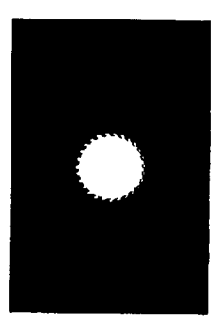
G        H        I
FIG. 7

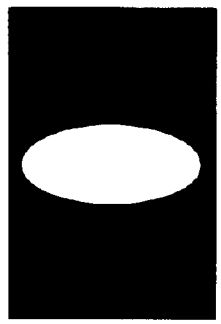
A
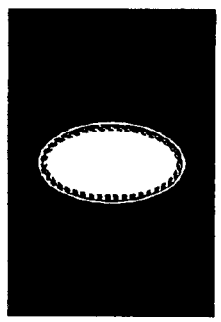
B
C
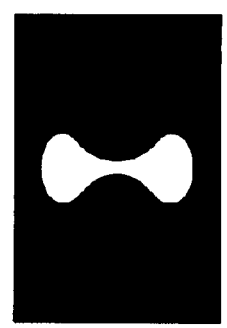
D
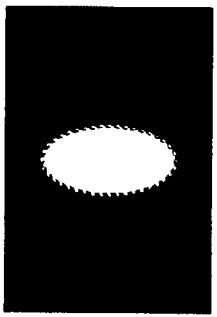
E
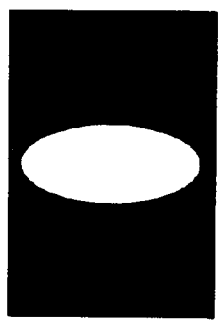
F
G H I
FIG. 8

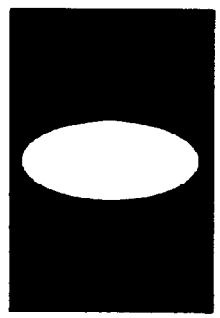
A
B
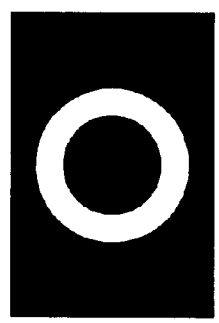
C
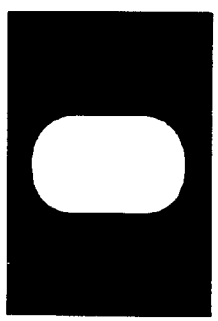
D
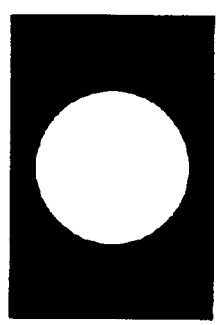
E
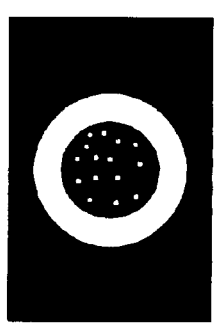
F
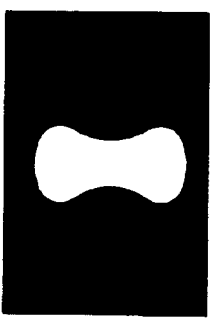
G
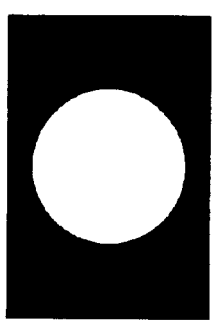
H
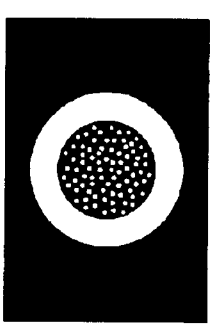
I
FIG. 9

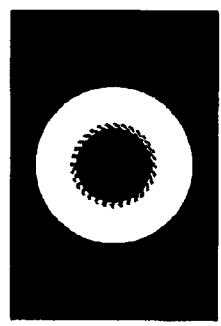
A
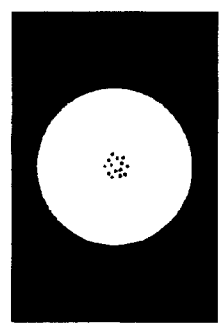
B
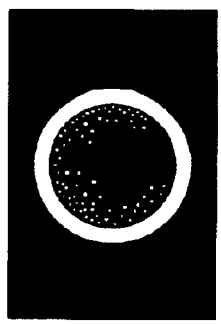
D
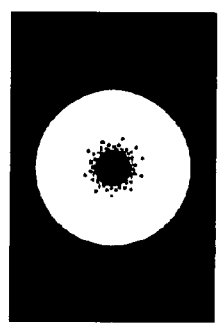
E
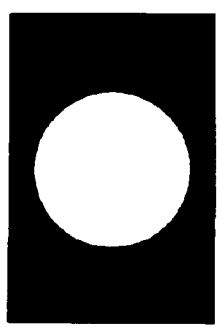
F
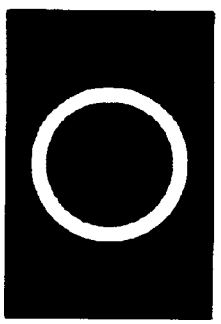
G
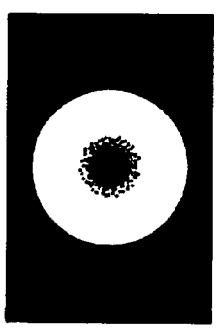
H
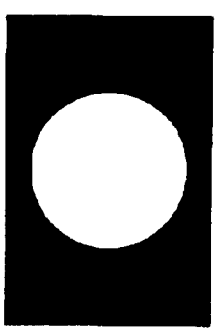
I
FIG. 10

Interaction of Pulsed Method Variables

The effect that this variable will tend to have:

| On this cycle variable in: | MASS OF SAMPLE | LIGHT INTENSITY | RATE OF COOLING | IDENTITY OF MONOMER |
|---|---|---|---|---|
| OPTIMAL INITIAL EXPOSURE TIME | As sample mass increases, initial exposure time may be increased. The mass of the sample interacts with light intensity to determine a preferred initial exposure time. | As light intensity increases, initial exposure time may tend to decrease. The light intensity level may be controlled for a fixed curing cycle and initial exposure time. It is believed, however, that changes in light intensities may have little impact above a certain light "saturation" point for the sample. | The rate of cooling tends to have a small impact upon the preferred initial exposure period. | Differences in inhibitor & initiator levels between batches of otherwise identical monomers may significantly affect induction periods. Various radiation curable compounds may also vary widely in their preferred initial exposure times due to inherent differences in their reactivity. |
| TOTAL CYCLE TIME | Increased sample mass may require increased total cycle time to dissipate the additional heat generated. | Increased light intensity may cause a decrease in the initial exposure period. It is believed, however that changes in light intensities may have little impact above a certain light "saturation" point for the sample. | Increased rates of heat removal may allow for a reduction in the time between pulses and thus total cycle time. | A significant effect that various monomers may have upon total cycle time will come from their different preferred initial exposure times. |
| TIMING BETWEEN PULSES | Increased sample mass may require longer periods of cooling between pulses of light. More heat tends to be generated from each pulse for larger samples, thus requiring longer time periods to remove heat. | For a given light intensity level, the duration of the pulses may be adjusted to create the desired amount of reaction. The timing between the pulses may also be so adjusted. | Increased rates of heat removal tend to allow for a reduction in the time between pulses. | The duration of the pulses may be adjusted to create the desired amount of reaction and heat generation for the particular lens forming material being cured. Adjusting the cooling period between pulses may also be beneficial. |

FIG. 24

Interaction of Pulsed Method Variables (continued)

The effect that this variable will tend to have:

| On this cycle variable in: | MASS OF SAMPLE | LIGHT INTENSITY | RATE OF COOLING | IDENTITY OF MONOMER |
|---|---|---|---|---|
| TOTAL EXPOSURE TIME | Increased sample mass tends to require both increased initial exposure time and a greater number of pulse/cooling cycles. | Increased light intensity will tend to result in decreased total exposure time and decreased light intensity will tend to require increased exposure time. It is believed, however, that changes in light intensities may have little impact above a certain light "saturation" point for the sample. | There is only a small relationship between the total dosage of light a particular mass sample requires to polymerize and the rate at which it is being cooled. | A significant effect that monomer identify may have on total cycle time may be contributed by differences in the preferred initial exposure period. Various lens forming materials may also require longer/shorter duration pulses depending upon their reactivity. |
| DURATION OF PULSES | The length of the pulses during each phase of the curing cycle may be adjusted for different mass samples. The time between pulses may be increased/decreased according to mass. | The duration of the pulses may be varied in inverse proportion with the light intensity selected. It is believed, however that changes in light intensities may have little impact above a certain light "saturation" point for the sample. | A pulse will tend to generate a certain amount of heat to be dissipated. Since the pulse duration tends to be small relative to the time between pulses when the heat is being removed, changes in the rate of heat removal should not significantly affect the ideal pulse duration. | Various lens forming materials require different pulse duration depending upon their reactivity. For a selected material, slight differences in initiator & initiator levels will not tend to affect pulse duration. |

FIG. 24
(continued)

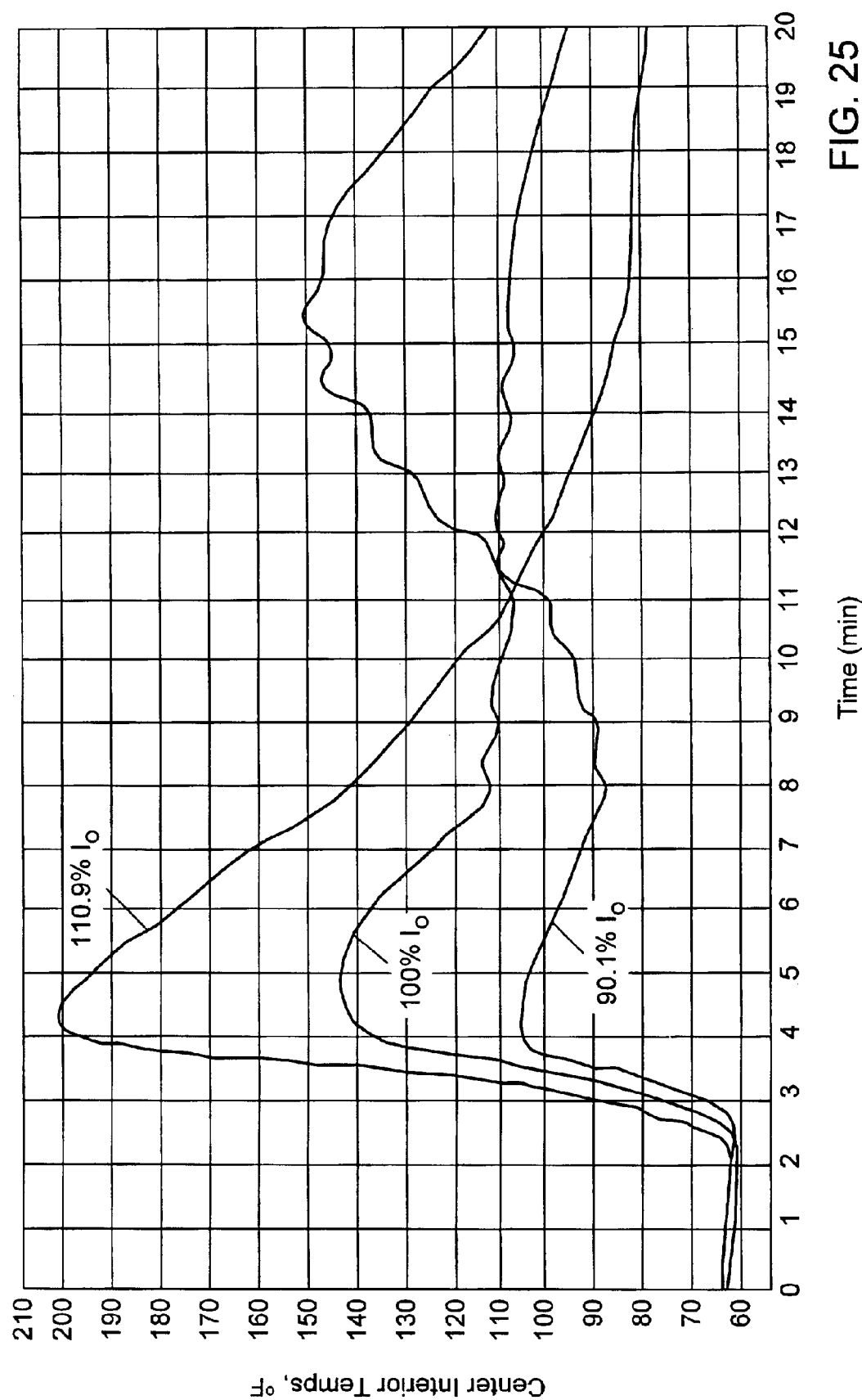

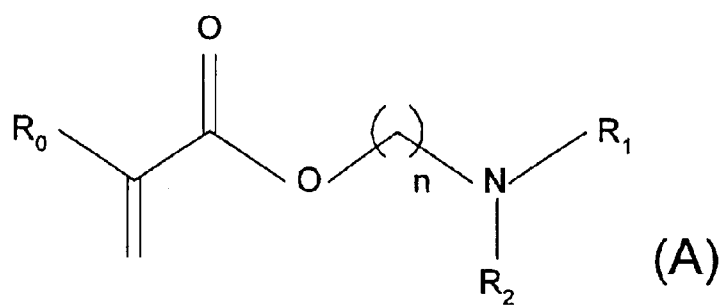
(A)
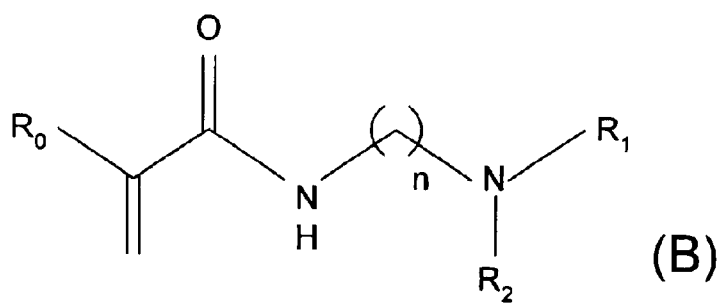
(B)
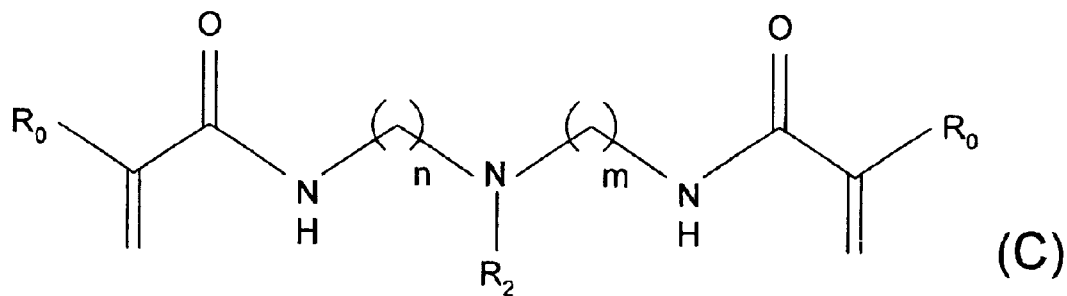
(C)
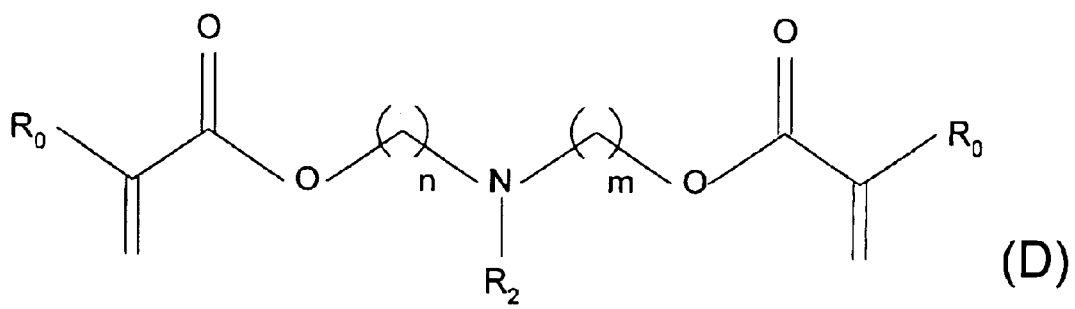
(D)
FIG. 39

PLASTIC LENS SYSTEMS

This application is a divisional of U.S. patent application Ser. No. 09/272,815 filed on Mar. 19, 1999, and now U.S. Pat. No. 6,419,873.

BACKGROUND OF THE INVENTION

1. Field of the Invention

The present invention relates generally to eyeglass lenses. More particularly, the invention relates to a lens forming composition, system and method for making photochromic, ultraviolet/visible light absorbing, and colored plastic lenses by curing the lens forming composition using activating light

2. Description of the Relevant Art

It is conventional in the art to produce optical lenses by thermal curing techniques from the polymer of diethylene glycol bis(allyl)-carbonate (DEG-BAC). In addition, optical lenses may also be made using ultraviolet ("UV") light curing techniques. See, for example, U.S. Pat. No. 4,728,469 to Lipscomb et al., U.S. Pat. No. 4,879,318 to Lipscomb et al., U.S. Pat. No. 5,364,256 to Lipscomb et al., U.S. Pat. No. 5,415,816 to Buazza et al., U.S. Pat. No. 5,529,728 to Buazza et al., U.S. Pat. No. 5,514,214 to Joel et al., U.S. Pat. No. 5,516,468 to Lipscomb, et al., U.S. Pat. No. 5,529,728 to Buazza et al., U.S. Pat. No. 5,689,324 to Lossman et al., and U.S. patent application Ser. No. 07/425,371 filed Oct. 26, 1989, Ser. No. 08/439,691 filed May 12, 1995, Ser. No. 08/454,523 filed May 30, 1995, Ser. No. 08/453,770 filed May 30, 1995, Ser. No. 08/636,510 filed Apr. 19, 1996, 08/663,703 filed Jun. 14, 1996, Ser. No. 08/666,062 filed Jun. 14, 1996, 08/853,134 filed May 8, 1997, Ser. No. 08/844,557 filed Apr. 18, 1997, Ser. No. 08/904,289 filed Jul. 31, 1997, and Ser. No. 08/959,973 filed Oct. 29, 1997, all of which are hereby specifically incorporated by reference.

Curing of a lens by ultraviolet light tends to present certain problems that must be overcome to produce a viable lens. Such problems include yellowing of the lens, cracking of the lens or mold, optical distortions in the lens, and premature release of the lens from the mold. In addition, many of the useful ultraviolet light-curable lens forming compositions exhibit certain characteristics that increase the difficulty of a lens curing process. For example, due to the relatively rapid nature of ultraviolet light initiated reactions, it is a challenge to provide a composition that is ultraviolet light curable to form an eyeglass lens. Excessive exothermic heat tends to cause defects in the cured lens. To avoid such defects, the level of photoinitiator may be reduced to levels below what is customarily employed in the ultraviolet curing art.

While reducing the level of photoinitiator addresses some problems, it may also cause others. For instance, lowered levels of photoinitiator may cause the material in regions near an edge of the lens and proximate a gasket wall in a mold cavity to incompletely cure due to the presence of oxygen in these regions (oxygen is believed to inhibit curing of many lens forming compositions or materials). Uncured lens forming composition tends to result in lenses with "wet" edges covered by sticky uncured lens forming composition. Furthermore, uncured lens forming composition may migrate to and contaminate the optical surfaces of the lens upon demolding. The contaminated lens is then often unusable.

Uncured lens forming composition has been addressed by a variety of methods (see, e.g., the methods described in U.S. Pat. No. 5,529,728 to Buazza et al). Such methods may include removing the gasket and applying either an oxygen barrier or a photoinitiator enriched liquid to the exposed edge of the lens, and then re-irradiating the lens with a dosage of ultraviolet light sufficient to completely dry the edge of the lens prior to demolding. During such irradiation, however, higher than desirable levels of irradiation, or longer than desirable periods of irradiation, may be required. The additional ultraviolet irradiation may in some circumstances cause defects such as yellowing in the lens.

The low photoinitiator levels utilized in many ultraviolet curable lens forming compositions may produce a lens that, while fully-cured as measured by percentage of remaining double bonds, may not possess sufficient cross-link density on the lens surface to provide desirable dye absorption characteristics during the tinting process.

Various methods of increasing the surface density of such ultraviolet light curable lenses are described in U.S. Pat. No. 5,529,728 to Buazza et al. In one method, the lens is demolded and then the surfaces of the lens are exposed directly to ultraviolet light. The relatively short wavelengths (around 254 nm) provided by some ultraviolet light sources (e.g., a mercury vapor lamp) tend to cause the material to cross-link quite rapidly. An undesirable effect of this method, however, is that the lens tends to yellow as a result of such exposure. Further, any contaminants on the surface of the lens that are exposed to short wavelengths of high intensity ultraviolet light may cause tint defects.

Another method involves exposing the lens to relatively high intensity ultraviolet radiation while it is still within a mold cavity formed between glass molds. The glass molds tend to absorb the more effective short wavelengths, while transmitting wavelengths of about 365 nm. This method generally requires long exposure times and often the infrared radiation absorbed by the lens mold assembly will cause premature release of the lens from a mold member. The lens mold assembly may be heated prior to exposure to high intensity ultraviolet light, thereby reducing the amount of radiation necessary to attain a desired level of cross-link density. This method, however, is also associated with a higher rate of premature release.

It is well known in the art that a lens mold/gasket assembly may be heated to cure the lens forming composition from a liquid monomer to a solid polymer. It is also well known that such a lens may be thermally postcured by applying convective heat to the lens after the molds and gaskets have been removed from the lens.

In this application the terms "lens forming material" and "lens forming compositions" are used interchangeably.

SUMMARY OF THE INVENTION

An embodiment of an apparatus for preparing an eyeglass lens is described. The apparatus includes a coating unit and a lens curing unit. The coating unit may be configured to coat either mold members or lenses. Preferably, the coating unit is a spin coating unit. The lens curing unit may be configured to direct activating light toward mold members. The mold members are part of a mold assembly that may be placed within the lens curing unit. Depending on the type of lens forming composition used, the apparatus may be used to form photochromic and non-photochromic lenses. The apparatus is preferably configured to allow the operation of both the coating unit and the lens curing unit substantially simultaneously.

The coating unit is preferably a spin coating unit. The spin coating unit preferably comprises a holder for holding an eyeglass lens or a mold member. The holder is preferably coupled to a motor that is preferably configured to rotate the holder. An activating light source may be incorporated into a cover. The cover may be drawn over the body of the lens curing unit, covering the coating units. The activating light source is preferably positioned, when the cover is closed, such that activating light may be applied to the mold member or lens positioned within the coating unit. An activating light source may be an ultraviolet light source, an actinic light source (e.g., a light source producing light having a wavelength between about 380 nm to 490 nm), a visible light source and/or an infra-red light source. Preferably, the activating light source is an ultraviolet light source.

The lens curing unit includes at least one, preferably two activating light sources for irradiating a mold assembly. Mold assembly holders may be positionable within the lens forming apparatus such that the activating light may be applied to the mold member during use. A filter is preferably positioned between the mold assemblies and the activating light source. The filter is preferably configured to manipulate the intensity of activating light that is directed toward the mold members. The filter may be a hazy filter that includes a frosted glass member. Alternatively, the filter may be a liquid crystal display ("LCD") panel.

An LCD panel for use as a filter is preferably a monochrome trans-flective panel with the back light and reflector removed. The intensity of the light is preferably reduced as the light passes through the LCD panel. The LCD panel is preferably programmable such that the light transmissibility of the LCD panel may be altered. In use, a predetermined pattern of light and dark regions may be displayed on the LCD panel to alter the intensity of light passing through the panel. One advantage of an LCD panel filter is that a pattern may be altered during a curing cycle. For example, the pattern of light and dark regions may be manipulated such that a lens is initially cured from the center of the lens, then the curing may be gradually expanded to the outer edges of the lens. This type of curing pattern may allow a more uniformly cured lens to be formed.

Another advantage is that the LCD panel may be used as a partial shutter to reduce the intensity of light reaching the mold assembly. By blackening the entire LCD panel the amount of light reaching any portion of the mold assembly may be reduced. In this manner, the LCD may be used to create "pulses" of light by alternating between a transmissive and darkened mode.

In another embodiment, an LCD panel may be used to allow different patterns and/or intensities of light to reach two separate mold assemblies. If the mold assemblies are being used to create lenses having significantly different powers, each mold assembly may require a significantly different light irradiation pattern and/or intensity. The use of an LCD filter may allow the irradiation of each of the mold assemblies to be controlled individually.

When non-LCD type filters are used, it may be necessary to maintain a library of filters for use in the production of different types of prescription lenses. Typically, each individual prescription will need a particular filter pattern to obtain a high quality lens. Since an LCD panel is programmable in a variety of patterns, it is believed that one may use a single LCD panel, rather than a library of filters. The LCD panel may be programmed to fit the needs of the specific type of lens being formed.

The LCD panel filters may be coupled to a programmable logic device that may be used to design and store patterns for use during curing. FIGS. 7–10 show a number of patterns that may be generated on an LCD panel and used to filter activating light. Each of these patterns is preferably used for the production of a lens having a specific prescription power.

The lens forming apparatus may include a post-cure unit. The post-cure unit is preferably configured to apply heat and activating light to mold assemblies or lenses disposed within the post-cure unit.

The lens forming apparatus may also include a programmable controller configured to substantially simultaneously control the operation of the coating unit, the lens curing unit and the post-cure unit. The apparatus may include a number of light probes and temperature probes disposed within the coating unit, lens curing unit, and the post-cure unit. These probes preferably relay information about the operation of the individual units to the controller. The information relayed may be used to control the operation of the individual units. The operation of each of the units may also be controlled based on the prescription of the lens being formed.

The controller may be configured to control various operations of the coating unit. For example, when a spin coating unit is used the controller may control the rotation of the lens or mold member during a coating process (e.g., whether the lens or mold members are rotated or not and/or the speed of rotation) and the operation of the coating unit lamps (e.g., whether the lamps are on or off and/or the time the lamps are on).

The controller may also be configured to control the various operations of the lens curing unit. Some of the operations that may be controlled or measured by the controller include: (i) measuring the ambient room temperature; (ii) determining the dose of light (or initial dose of light in pulsed curing applications) required to cure the lens forming composition, based on the ambient room temperature; (iii) applying the activating light with an intensity and duration sufficient to equal the determined dose; (iv) measuring the composition's temperature response during and subsequent to the application of the dose of light; (v) calculating the dose required for the next application of activating light (in pulsed curing applications); (vi) applying the activating light with an intensity and duration sufficient to equal the determined second dose; (vii) determining when the curing process is complete by monitoring the temperature response of the lens forming is composition during the application of activating light; (viii) turning the upper and lower light sources on and off independently; (ix) monitoring the lamp temperature, and controlling the temperature of the lamps by activating cooling fans proximate the lamps; and (x) turning the fans on/off or controlling the flow rate of an air stream produced by a fan to control the composition temperature;

The controller may also be configured to control the operation of the post-cure unit. Some of the operations that may be controlled include control of the operation of the lamps (e.g., whether the lamps are on or off and the time the lamps are on); and operation of the heating device (e.g., whether the heating unit is turned on or off and/or the amount of heat produced by the heating device).

Additionally, the controller provides system diagnostics and information to the operator of the apparatus. The controller may notify the user when routine maintenance is due or when a system error is detected. The controller may also manage an interlock system for safety and energy conservation purposes. The controller may prevent the lamps from operating when the operator may be exposed to light from the lamps.

The controller may also be configured to interact with the operator. The controller preferably includes an input device and a display screen. A number of operations controlled by the controller, as described above, may be dependent on the input of the operator. The controller may prepare a sequence of instructions based on the type of lens (clear, ultraviolet/visible light absorbing, photochromic, colored, etc.), prescription, and type of coatings (e.g., scratch resistant, adhesion promoting, or tint) inputted by an operator.

A variety of lens forming compositions may be cured to form a plastic eyeglass lens in the above described apparatus. Colored lenses, photochromic lenses, and ultraviolet/visible light absorbing colorless lenses may be formed. The lens forming compositions may be formulated such that the conditions for forming the lens (e.g., curing conditions and post cure conditions) may be similar without regard to the lens being formed. In an embodiment, a clear lens may be formed under similar conditions used to form photochromic lenses by adding a colorless, non photochromic ultraviolet/visible light absorbing compound to the lens forming composition. The curing process for forming a photochromic lens is such that higher doses of activating light than are typically used for the formation of a clear, non-ultraviolet/visible light absorbing lens may be required. In an embodiment, ultraviolet/visible light absorbing compounds may be added to a lens forming composition to produce a substantially clear lens under the more intense dosing requirements used to form photochromic lenses. The ultraviolet/visible light absorbing compounds may take the place of the photochromic compounds, making curing at higher doses possible for clear lenses. An advantage of adding the ultraviolet/visible light absorbers to the lens forming composition is that the clear lens formed may offer better protection against ultraviolet/visible light rays than a clear lens formed without such compounds.

An embodiment relates to an improved gasket for engaging a mold. The gasket is preferably configured to engage a first mold set for forming a first lens of a first power. The gasket preferably includes at least four discrete projections for spacing mold members of a mold set. The projections are preferably arranged on an interior surface of the gasket. The projections are preferably evenly spaced around the interior surface of the gasket; in a preferred embodiment, the spacing between each projection is about 90 degrees.

In another embodiment, an improved gasket includes a fill port for receiving a lens forming composition while fully engaged to a mold set. The fill port preferably extends from an interior surface of the gasket to an exterior surface of the gasket. Consequently, the gasket need not be partially disengaged from a mold member of a mold set in order to receive a lens forming composition.

In another embodiment, a mold/gasket assembly for making plastic prescription lenses preferably includes a first mold set for forming a first lens of a first power and a gasket for engaging the first mold set. The first mold set may contain a front mold member and a back mold member. The back mold member is also known as the convex mold member. The back mold member preferably defines the concave surface of a convex lens. The gasket is preferably characterized by at least four discrete projections for spacing the front mold member from the back mold member. A mold cavity for retaining a lens forming composition is preferably at least partially defined by the front mold member, the back mold member, and the gasket. The back mold member preferably has a steep axis and a flat axis. Each of the projections preferably forms an oblique angle with the steep and the flat axis of the mold members. In a preferred embodiment, these angles may each be about 45 degrees. Since the gasket does not include a continuous lip along its interior surface for spacing mold members, as is conventional in the art, the gasket may be configured to engage a large variety of mold sets. For example, the gasket may be configured to engage a second mold set for forming a second lens of a second power.

In another embodiment, a mold/gasket assembly for making plastic prescription lenses includes a mold set for forming a lens and a gasket configured to engage the mold set. The gasket is preferably characterized by a fill port for receiving a lens forming composition while the gasket is fully engaged to the mold. The fill port preferably extends from an interior surface to an exterior surface of the gasket. The mold set preferably contains at least a front mold member and a back mold member. A mold cavity for retaining a lens forming composition is preferably at least partially defined by the front mold member, the back mold member, and the gasket.

A method for making a plastic eyeglass lens is described. The method preferably includes engaging a gasket with a first mold set for forming a first lens of a first power. The first mold set preferably contains at least a front mold member and a back mold member. A mold cavity for retaining a lens forming composition may be at least partially defined by the front mold member, the back mold member, and the gasket. The gasket is preferably characterized by at least four discrete projections arranged on an interior surface thereof for spacing the front and back mold members. Engaging the gasket with the mold set preferably includes positioning the back mold members such that each of the projections forms an oblique angle with the steep and flat axis of the back mold member. In a preferred embodiment, this angle is about 45 degrees. The method preferably further includes introducing a lens forming composition into the mold cavity and curing the lens forming composition.

An additional embodiment provides a method for making a plastic eyeglass lens. The method preferably includes engaging a gasket with a first mold set for forming a first lens of a first power. The first mold set preferably contains at least a front mold member and a back mold member. A mold cavity for retaining a lens forming composition may be at least partially defined by the front mold member, the back mold member, and the gasket. Preferably, the method further includes introducing a lens forming composition through a fill port, wherein the front and back mold members remain fully engaged with the gasket during the introduction of the lens forming composition. The lens forming composition may then be cured.

In an embodiment, a composition that includes two or more photochromic compounds may further include a light effector composition to produce a lens that exhibits an activated color that differs from an activated color produced by the photochromic compounds without the light effector composition. The activated color is defined as the color a lens achieves when exposed to a photochromic activating light source (e.g., sunlight). A photochromic activating light source is defined as any light source that produces light having a wavelength that causes a photochromic compound to become colored. Photochromic activating light is defined as light that has a wavelength capable of causing a photochromic compound to become colored. The photochromic activating wavelength band is defined as the region of light that has a wavelength that causes coloring of photochromic compounds. The light effector composition may include any compound that exhibits absorbance of at least a portion of the photochromic activating wavelength band. Light effector compositions may include photoinitiators, ultraviolet/visible light absorbers, ultraviolet light stabilizers, and dyes. In this manner, the activated color of a lens may be altered without altering the ratio and or composition of the photochromic compounds. By using a light effector composition, a single lens forming composition may be used as a base solution to which a light effector may be added in order to alter the activated color of the formed lens.

The addition of a light effector composition that absorbs photochromic activating light may cause a change in the activated color of the formed lens. The change in activated color may be dependent on the range of photochromic activating light absorbed by the light effector composition. The use of different light effector compositions may allow an operator to produce photochromic lenses with a wide variety of activated colors (e.g., red, orange, yellow, green, blue, indigo, violet, gray, or brown).

In an embodiment, an ophthalmic eyeglass lens may be made from an activating light curable lens forming composition comprising a monomer composition and a photoinitiator composition. The monomer composition preferably includes a polyethylenic functional monomer. Preferably, the polyethylenic functional monomer composition includes an aromatic containing polyether polyethylenic functional monomer. In one embodiment, the polyethylenic functional monomer is preferably an ethoxylated bisphenol A di(meth)acrylate.

The monomer composition may include additional monomers to modify the properties of the formed eyeglass lens and/or the lens forming composition. Monomers which may be used in the monomer composition include polyethylenic functional monomers containing groups selected from acrylyl or methacrylyl.

In one embodiment, the photoinitiator composition preferably includes phenyl bis(2,4,6-trimethylbenzoyl) phosphine oxide, commercially available from Ciba Additives in Tarrytown, N.Y. under the trade name of Irgacure 819. In another embodiment, the photoinitiator composition may include a mixture of photoinitiators. Preferably, a mixture of Irgacure 819 and 1-hydroxycyclohexylphenyl ketone, commercially available from Ciba Additives under the trade name of Irgacure 184, is used.

In another embodiment, an ophthalmic eyeglass lens may be made from an activating light curable lens forming composition comprising a monomer composition, a photo-initiator composition and a co-initiator composition. An activating light absorbing compound may also be present. An activating light absorbing compound is herein defined as a compound which absorbs at least a portion of the activating light. The monomer composition preferably includes a polyethylenic functional monomer. Preferably, the polyethylenic functional monomer is an aromatic containing polyether polyethylenic functional monomer. In one embodiment, the polyethylenic functional monomer is preferably an ethoxylated bisphenol A di(meth)acrylate.

The co-initiator composition preferably includes amine co-initiators. Preferably, acrylyl amines are included in the co-initiator composition. In one embodiment, the co-initiator composition preferably includes a mixture of CN-384 and CN-386.

Examples of activating light absorbing compounds includes photochromic compounds, UV stabilizers, UV absorbers, and/or dyes.

In another embodiment, the controller is preferably configured to run a computer software program which, upon input of the eyeglass prescription, will supply the identification markings of the appropriate front mold, back mold and gasket. The controller may also be configured to store the prescription data and to use the prescription data to determine curing conditions. The controller may be configured to operate the curing unit to produce the appropriate curing conditions.

In one embodiment, the lens forming composition may be irradiated with continuous activated light to initiate curing of the lens forming composition. Subsequent to initiating the curing, the lens forming composition may be treated with additional activating light and heat to further cure the lens forming composition.

In another embodiment, the lens forming composition may be irradiated with continuous activated light in a heated curing chamber to initiate curing of the lens forming composition. Subsequent to initiating the curing, the lens forming composition may be treated with additional activating light and heat to further cure the lens forming composition.

In another embodiment, an apparatus for preparing an eyeglass lens is described. The apparatus includes a coating unit and a lens curing unit. The coating unit may be configured to coat either mold members or lenses. Preferably, the coating unit is a spin coating unit. The lens curing unit may be configured to substantially simultaneously direct activating light and heat toward mold members. The mold members are part of a mold assembly that may be placed within the lens curing unit. Depending on the type of lens forming composition used, the apparatus may be used to form photochromic and non-photochromic lenses. The apparatus is preferably configured to allow the operation of both the coating unit and the lens curing unit substantially simultaneously. The apparatus is also configured to allow curing, post-cure and anneal processes to be performed in the lens curing unit. The curing or post-cure processes may be performed substantially simultaneously with an anneal process within the lens curing apparatus.

In another embodiment, a system for dispensing a heated polymerizable lens forming composition is described. The dispensing system includes a body configured to hold the lens forming composition, a heating system coupled to the body for heating the monomer solution, a conduit coupled to the body for transferring the lens forming composition out of the body, and an elongated member positioned within the conduit for controlling the flow of the lens forming composition through the conduit. The elongated member is positionable within the conduit in a closed position such that flow of the lens forming composition through the conduit is inhibited. The elongated member may also be positioned within the conduit in an open position such that the lens forming composition flows through the conduit. An elastic member is preferably coupled to the elongated member. The elastic member exerts a force on the elongated member that causes the elongated member moves from the closed position positioned to the open position. A movable member is preferably coupled to the conduit and the elongated member. The movable member is preferably configured to control the, position of the elongated member.

In another embodiment, a procedure for forming flat-top bifocal lenses is described. Flat-top bifocals include a far vision correction zone and a near vision correction region. The far vision correction zone is the portion of the lens which allows the user to see far away objects more clearly. The near vision correction zone is the region that allows the user to see nearby objects clearer. The near vision correction zone is characterized by a semicircular protrusion which extends out from the outer surface of an eyeglass lens. To reduce the incidence of premature release in flat-top bifocal lenses, it is preferred that polymerization of the lens forming composition in the front portion of the near vision correction zone is initiated before the portion of the lens forming composition in the far vision correction zone proximate the back mold member is substantially gelled. Preferably, this may be achieved by irradiating the front mold with activating light prior to irradiating the back mold with activating light. Alternatively, the incidence of premature release may also be reduced if the front portion of the near vision correction zone is gelled before gelation of the lens forming composition extends from the back mold member to the front mold member.

BRIEF DESCRIPTION OF THE DRAWINGS

The above brief description as well as further objects, features and advantages of the methods and apparatus of the present invention will be more fully appreciated by reference to the following detailed description of presently preferred but nonetheless illustrative embodiments in accordance with the present invention when taken in conjunction with the accompanying drawings in which:

FIGS. 7–10 depict various LCD filter patterns.

FIG. 24 depicts a chart illustrating qualitative relationships among curing cycle variables.

FIG. 25 depicts a graph illustrating temperature profiles for one curing cycle for a mold/gasket set having a 6.00D base curve and used with three different light levels.

FIG. 39 depicts chemical structure of acrylated amines.

DETAILED DESCRIPTION OF THE PREFERRED EMBODIMENTS

Apparatus, operating procedures, equipment, systems, methods, and compositions for lens curing using activating light are available from Rapid Cast, Inc., Q2100, Inc., and Fast Cast, Inc. in Louisville, Ky.

Figure 1:
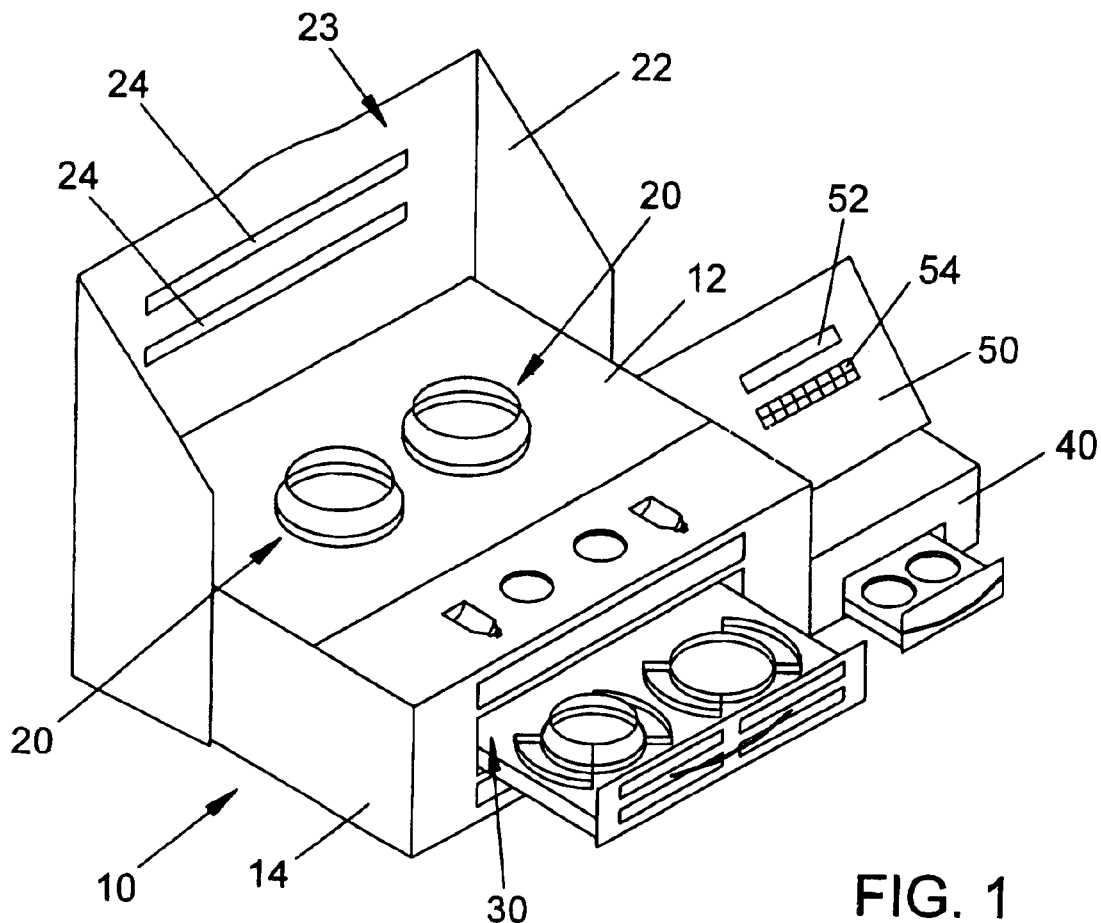
FIG. 1 depicts a perspective view of a plastic lens forming apparatus.

Referring now to FIG. 1, a plastic lens curing apparatus is generally indicated by reference numeral 10. As shown in FIG. 1, lens forming apparatus 10 includes at least one coating unit 20, a lens curing unit 30, a post-cure unit 40, and a controller 50. Preferably, apparatus 10 includes two coating units 20. Coating unit 20 is preferably configured to apply a coating layer to a mold member or a lens. Preferably, coating unit 20 is a spin coating unit. Lens curing unit 30 includes an activating light source for producing activating light. As used herein "activating light" means light that may affect a chemical change. Activating light may include ultraviolet light (e.g., light having a wavelength between about 300 nm to about 400 nm), actinic light, visible light or infrared light. Generally, any wavelength of light capable of affecting a chemical change may be classified as activating. Chemical changes may be manifested in a number of forms. A chemical change may include, but is not limited to, any chemical reaction that causes a polymerization to take place. Preferably the chemical change causes the formation of an initiator species within the lens forming composition, the initiator species being capable of initiating a chemical polymerization reaction. The activating light source is preferably configured to direct light toward a mold assembly. Post-cure unit 40 is preferably configured to complete the polymerization of plastic lenses. Post-cure unit 40 preferably includes an activating light source and a heat source. Controller 50 is preferably a programmable logic controller. Controller 50 is preferably coupled to coating units 20, lens curing unit 30, and post-cure unit 40, such that the controller is capable of substantially simultaneously operating the three units 20, 30, and 40. Controller 50 may be a computer.

A coating unit for applying a coating composition to a lens or a mold member and then curing the coating composition is described in U.S. Pat. No. 4,895,102 to Kachel et al., U.S. Pat. No. 3,494,326 to Upton, and U.S. Pat. No. 5,514,214 to Joel et al. (all of which are incorporated herein by reference). In addition, the apparatus shown in FIGS. 2 and 3 may also be used to apply coatings to lenses or mold members.

Figure 2:
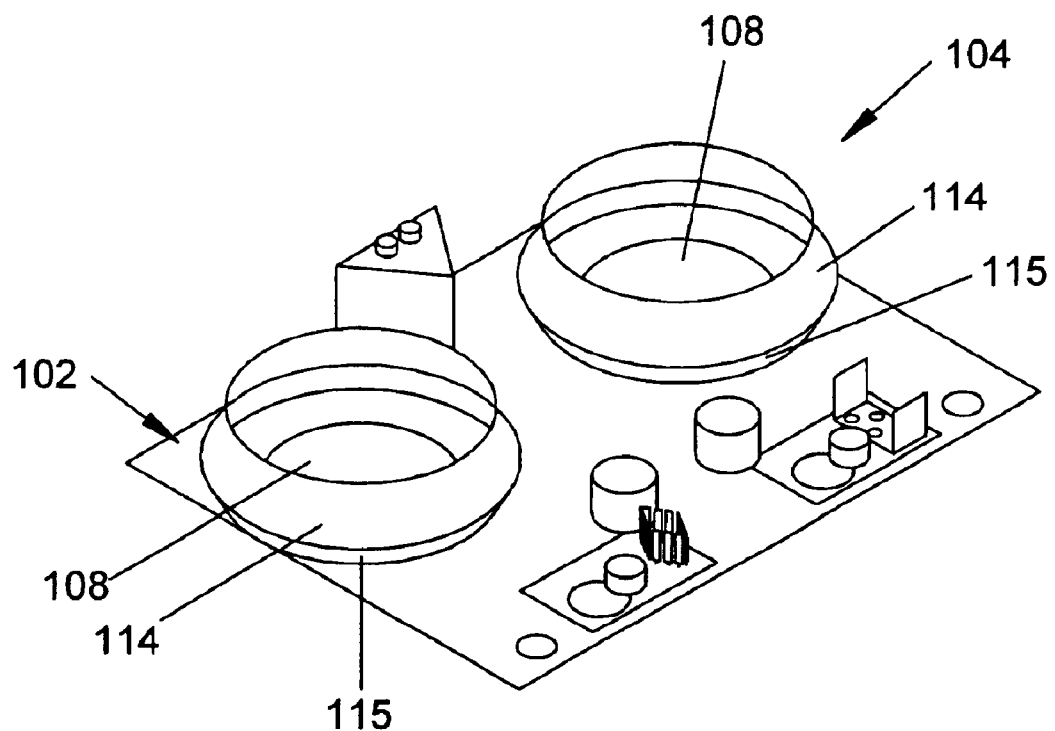
FIG. 2 depicts a perspective view of a spin coating unit.
Figure 3:
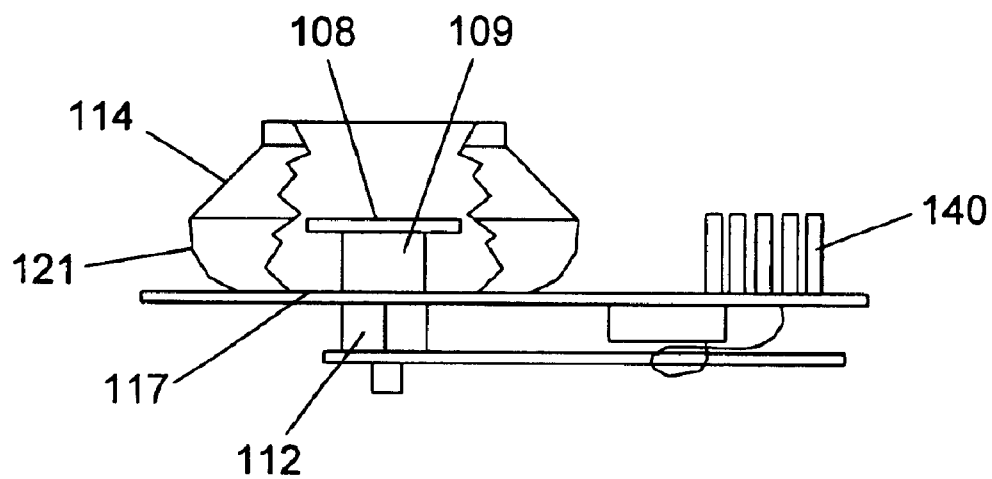
FIG. 3 depicts a cut-away side view of a spin coating unit.

FIG. 2 depicts a pair of spin coating units 102 and 104. These spin coating units may be used to apply a scratch resistant coating or a tint coating to a lens or mold member. Each of the coating units includes an opening through which an operator may apply lenses and lens mold assemblies to a holder 108. Holder 108 is preferably partially surrounded by barrier 114. Barrier 114 is preferably coupled to a dish 115. As shown in FIG. 3, the dish edges may be inclined to form a peripheral sidewall 121 that merges with barrier 114. The bottom 117 of the dish is preferably substantially flat The flat bottom preferably has a circular opening that allows an elongated member 109 coupled to lens holder 108 to extend through the dish 115.

Holder 108 is preferably coupled to a motor 112 via elongated member 109. Motor 112 is preferably configured to cause rotation of holder 108. In such a case, motor 112 is preferably configured to cause rotation of elongated member 109, that in turn causes the rotation of holder 108. The coating unit 102/104, may also include an electronic controller 140. Electronic controller 140 is preferably coupled to motor 112 to control the rate at which holder 108 is rotated by motor 112. Electronic controller 140 may be coupled to a programmable logic controller, such as controller 50, shown in FIG. 1. The programmable logic controller may send signals to the electronic controller to control the rotational speed of holder 108. Preferably, motor 112 is configured to rotate holder 108 at different rates. Motor 112 is preferably capable of rotating the lens or mold member at a rate of up to 1500 revolutions per minute ("RPM").

In one embodiment, barrier 114 has an interior surface that may be made or lined with an absorbent material such as foam rubber. Preferably, this absorbent material is disposable and removable. The absorbent material absorbs any liquids that fall off a lens or mold member during use. Alternatively, the interior surface of barrier 114 may be substantially non-absorbent, allowing any liquids used during the coating process to move down barrier 114 into dish 115.

Coating units 20, are preferably positioned in a top portion 12 of lens forming apparatus 10, as depicted in FIG. 1. A cover 22 is preferably coupled to body 14 of the lens forming apparatus to allow top portion 12 to be covered during use. A light source 23 is preferably positioned on an inner surface of cover 22. The light source includes at least one lamp 24, preferably two or more lamps, positioned on the inner surface of cover 22. Lamps 24 may be positioned such that the lamps are oriented above the coating units 20 when cover 22 is closed. Lamps 24 preferably emit activating light upon the lenses or mold members positioned within coating units 20. Lamps may have a variety of shapes including, but not limited to, linear (as depicted in FIG. 1), square, rectangular, circular, or oval. Activating light sources preferably emit light having a wavelength that will initiate curing of various coating materials. For example, most currently used coating materials are preferably curable by activating light having wavelengths in the ultraviolet region, therefore the light sources should exhibit strong ultraviolet light emission. The light sources should, preferably, produce minimal heat during use. Thus, lamps 24 will preferably have low heat output. Lamps that exhibit strong ultraviolet light emission have a peak output at a wavelength in the ultraviolet light region, between about 200 nm to about 400 nm, preferably the peak output is between about 200 nm to 300 nm, and more preferably at about 254 nm. In one embodiment, lamps 24 may be lamps that have a peak output in the ultraviolet light region, and have relatively low heat output. Such lights are commonly known as "germicidal" lights and any such light may be used. A "germicidal" light emitting light with a peak output in the desired ultraviolet region is commercially available from Voltarc, Inc. of Fairfield, Conn. as model UV-WX G10T5.

An advantage of using a spin coating unit is that lamps of a variety of shapes may be used (e.g., linear lamps) for the curing of the coating materials. In one embodiment, a coating material is preferably cured in a substantially uniform manner to ensure that the coating is formed uniformly on the mold member or lens. With a spin coating unit, the object to be coated may be spun at speeds high enough to ensure that a substantially uniform distribution of light reaches the object during the curing process, regardless of the shape of the light source. The use of a spin coating unit preferably allows the use of commercially available linear light sources for the curing of coating materials.

A switch may be incorporated into cover 22. The switch is preferably electrically coupled to light source 23 such that the switch must be activated prior to turning the light source on. Preferably, the switch is positioned such that closing the cover causes the switch to become activated. In this manner, the lights will preferably remain off until the cover is closed, thus preventing inadvertent exposure of an operator to the light from light source 23.

During use a lens or lens mold assembly may be placed on the lens holder 108. The lens holder 108 may include a suction cup connected to a metal bar. The concave surface of the suction cup may be attachable to a face of a mold or lens, and the convex surface of the suction cup may be attached to a metal bar. The metal bar may be coupled to motor 112. The lens holder may also include movable arms and a spring assembly that may be together operable to hold a lens against the lens holder with spring tension during use.

Figure 4:
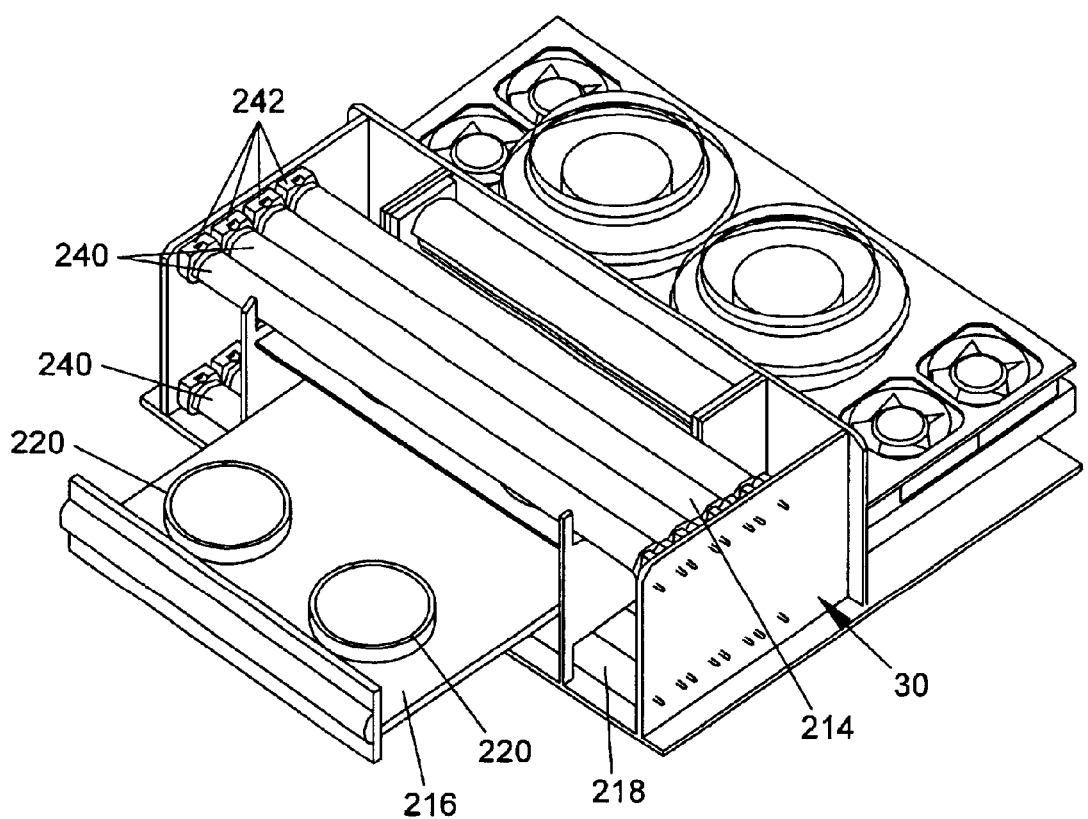
FIG. 4 depicts a perspective view of a plastic lens forming apparatus with a portion of the body removed.

As shown in FIG. 4, the curing unit 30 may include an upper light source 214, a lens drawer assembly 216, and a lower light source 218. Lens drawer assembly 216 preferably includes a mold assembly holder 220, more preferably at least two mold assembly holders 220. Each of the mold assembly holders 220 is preferably configured to hold a pair of mold members that together with a gasket form a mold assembly. The lens drawer assembly 216 is preferably slidingly mounted on a guide. During use, mold assemblies may be placed in the mold assembly holders 220 while the lens drawer assembly is in the open position (i.e., when the door extends from the front of the lens curing unit). After the mold assemblies have been loaded into the mold holder 220 the door may be slid into a closed position, with the mold assemblies directly under the upper light source 214 and above the lower light source 218. Vents (not shown) may be placed in communication with the lens curing unit to allow a stream of air to be directed toward the mold members when the mold members are positioned beneath the upper lamps. An exhaust fan (not shown) may communicate with the vents to improve the circulation of air flowing through the lens curing unit.

Figure 5:
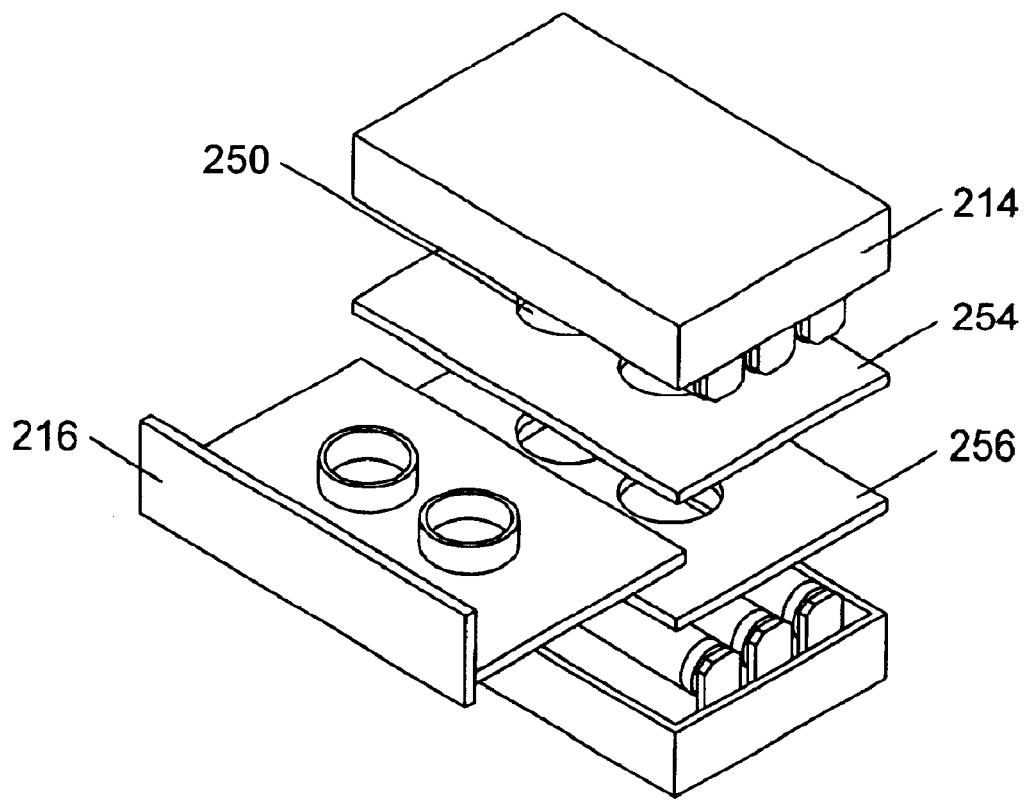
FIG. 5 depicts a perspective view of the components of a lens curing unit.

As shown in FIGS. 4 and 5, it is preferred that the upper light source 214 and lower light source 216 include a plurality of activating light generating devices or lamps 240. Preferably, the lamps are oriented proximate each other to form a row of lights, as depicted in FIG. 4. Preferably, three or four lamps are positioned to provide substantially uniform radiation over the entire surface of the mold assembly to be cured. The lamps 240, preferably generate activating light. Lamps 240 may be supported by and electrically connected to suitable fixtures 242. Lamps 240 may generate either ultraviolet light, actinic light, visible light, and/or infrared light. The choice of lamps is preferably based on the monomers used in the lens forming composition. In one embodiment, the activating light may be generated from a fluorescent lamp. The fluorescent lamp preferably has a strong emission spectra in the 380 to 490 nm region. A fluorescent lamp emitting activating light with the described wavelengths is commercially available from Philips as model TLD-15W/03. In another embodiment, the lamps may be ultraviolet lights.

Figure 6:
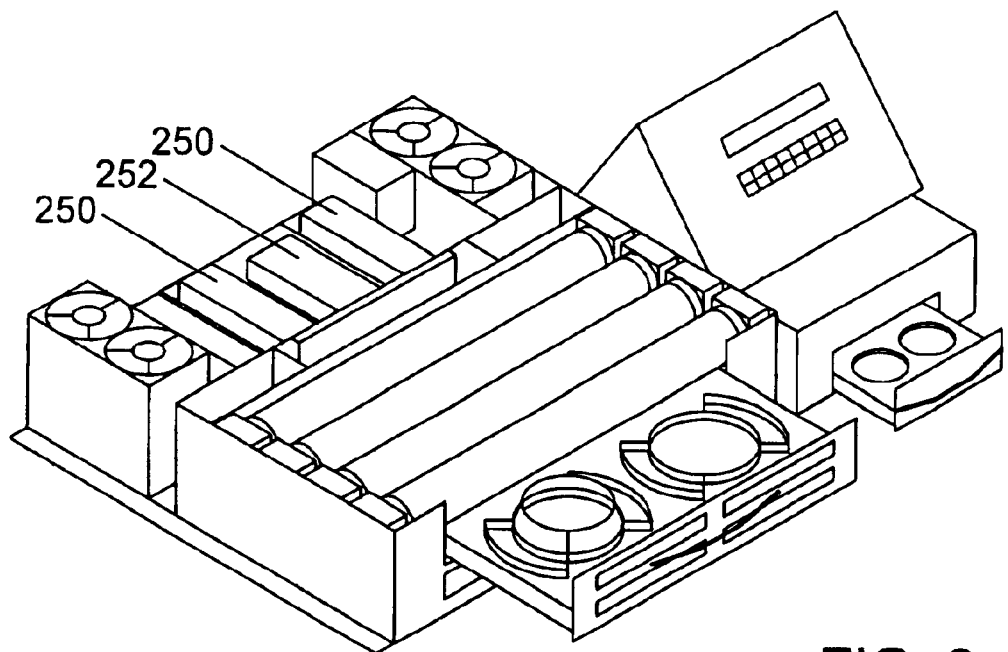
FIG. 6 depicts a perspective view of a plastic lens forming apparatus with a portion of the body removed and the coating units removed.

In one embodiment, the activating light sources may be turned on and off quickly between exposures. Flasher ballasts 250, depicted in FIG. 6, may be used for his function. The flasher ballast may be positioned beneath the coating unit. A flasher ballast 250 may operate in a standby mode wherein a low current is supplied to the lamp filaments to keep the filaments warm and thereby reduce the strike time of the lamp. Such a ballast is commercially available from Magnatek, Inc of Bridgeport, Conn. Power supply 252 may also be located proximate the flasher ballasts, underneath the coating unit.

Figure 18:
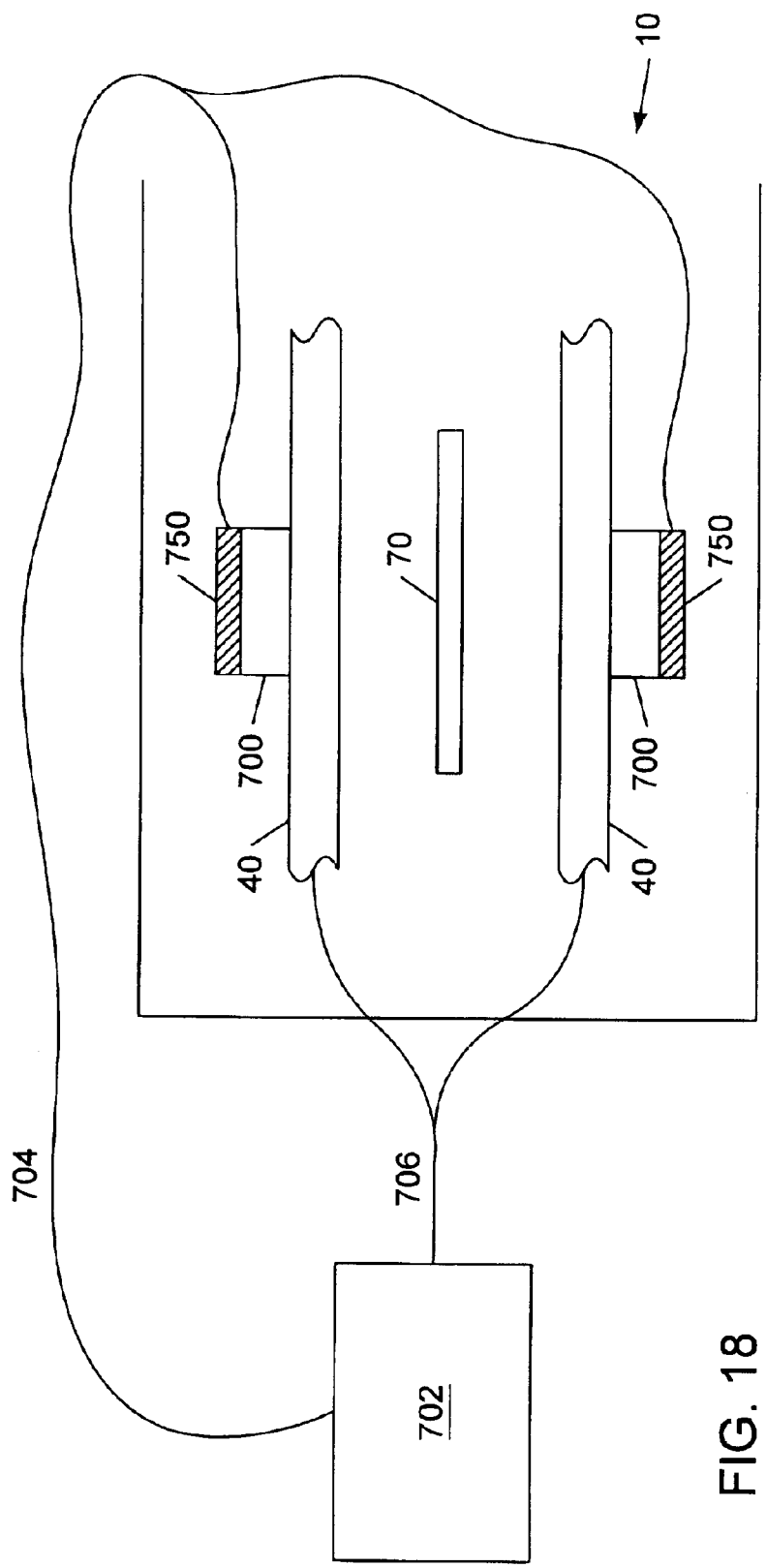
FIG. 18 depicts a schematic diagram of a lens curing apparatus with a light sensor and controller.

FIG. 18 schematically depicts a light control system. The light sources 214 in lens curing unit 30 apply light towards the mold assembly 352. A light sensor 700 may be located adjacent the light sources 214. Preferably, the light sensor 700 is a photoresistor light sensor (photodiodes or other light sensors may also be usable in this application). The light sensor 700 with a filter 750 may be connected to lamp driver 702 via wires 704. Lamp driver 702 sends a current through the light sensor 700 and receives a return signal from the light sensor 700. The return signal may be compared against an adjustable set point, and then the electrical frequency sent to the light sources 214 via wires 706 may be varied depending on the differences between the set point and the signal received from the light sensor 700. Preferably, the light output is maintained within about +/−1.0 percent.

One "lamp driver" or light controller is a Mercron Model FX0696-4 and Model FX06120-6 (Mercron, Inc., Dallas, Tex., U.S.A.). These light controllers are described in U.S. Pat. Nos. 4,717,863 and 4,937,470.

In an embodiment, a flash lamp emits activating light pulses to cure the lens forming material. It is believed that a flash lamp would provide a smaller, cooler, less expensive, and more reliable light source than other sources. The power supply for a flash lamp tends to draw relatively minimal current while charging its capacitor bank. The flash lamp discharges the stored energy on a microsecond scale to produce very high peak intensities from the flash tube itself Thus flash lamps tend to require less power for operation and generate less heat than other light sources used for activating light curing. A flash lamp may also be used to cure a lens coating.

Figure 21:
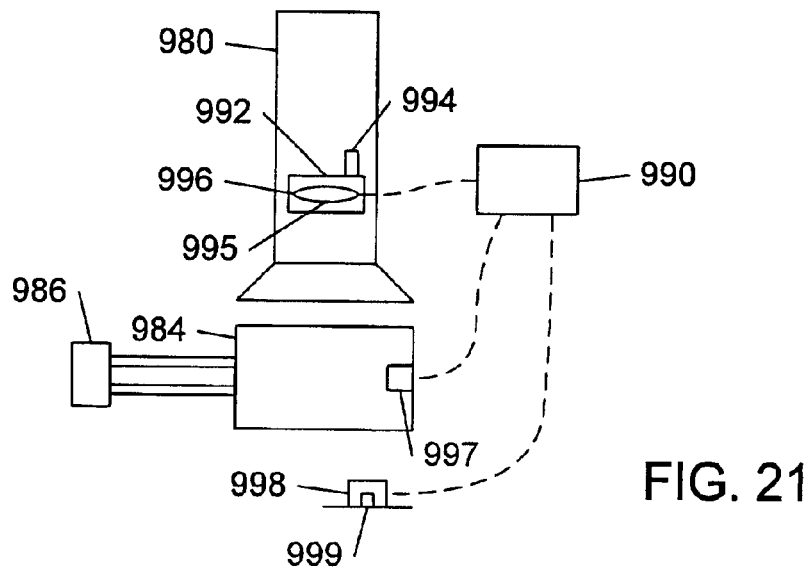
FIG. 21 depicts an embodiment of a system employing an activating light controller.

In an embodiment, the flash lamp used to direct activating light toward at least one of the mold members is a xenon light source. The lens coating may also be cured using a xenon light source. Referring to FIG. 21, xenon light source 980 preferably contains photostrobe 992 having a tube 996 and electrodes to allow the transmission of activating light The tube may include borosilicate glass or quartz. A quartz tube will generally withstand about 3 to 10 times more power than a hard glass tube. The tube may be in the shape of a ring, U, helix, or it may be linear. The tube may include capacitive trigger electrode 995. The capacitive trigger electrode may include a wire, silver strip, or conductive coating located on the exterior of tube 996. The xenon light source is preferably adapted to deliver pulses of light for a duration of less than about 1 second, more preferably between about $\frac{1}{10}$ of a second and about $\frac{1}{1000}$ of a second, and more preferably still between about $\frac{1}{400}$ of a second and $\frac{1}{600}$ of a second. The xenon source may be adapted to deliver light pulses about every 4 seconds or less. The relatively high intensity of the xenon lamp and short pulse duration may allow rapid curing of the lens forming composition without imparting significant radiative heat to the composition.

Figure 19:
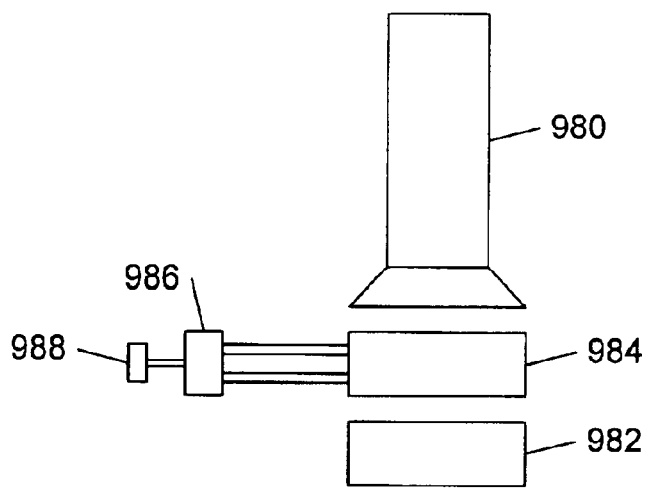
FIG. 19 depicts a view of an embodiment of a system simultaneously employing both a flash light source and a continuous activating (e.g., fluorescent) light source.

In an embodiment, controller 990 (shown in FIG. 21) controls the intensity and duration of activating light pulses delivered from activating light source 980 and the time interval between pulses, shown in FIG. 19. Activating light source 980 may include capacitor 994, that stores the energy required to deliver the pulses of activating light. Capacitor 994 may be adapted to allow pulses of activating light to be delivered as frequently as desired. Temperature monitor 997 may be located at a number of positions within mold chamber 984. The temperature monitor may measure the temperature within the chamber and/or the temperature of air exiting the chamber. The system may be configured to send a signal to cooler 988 and/or distributor 986 (shown in FIG. 19) to vary the amount and/or temperature of the cooling air. The temperature monitor may also determine the temperature at any of a number of locations proximate the mold cavity and send a signal to controller 990 to vary the pulse duration, pulse intensity, or time between pulses as a function of a temperature within mold chamber 984.

In an embodiment, light sensor 999 may be used to determine the intensity of activating light emanating from source 980. The light sensor is preferably configured to send a signal to controller 990, that is preferably configured to maintain the intensity of the activating light at a selected level. Filter 998 may be positioned between activating light source 980 and light sensor 999 and is preferably configured to inhibit non-activating light rays from contacting light sensor 999, while allowing activating rays to contact the sensor. In one embodiment, the filter may include 365 N glass or any other material adapted to filter non-activating light (e.g., visible light) and transmit activating light.

Figure 20:
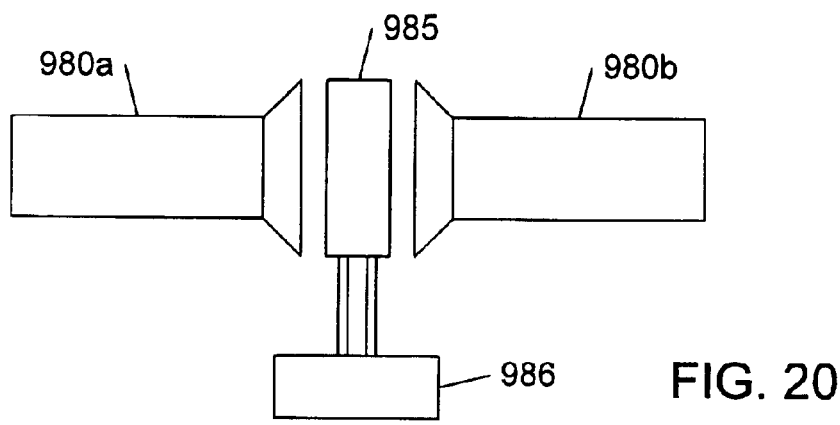
FIG. 20 depicts an embodiment of a system simultaneously employing two flash light sources.

In an embodiment, more than one activating light source may be used to simultaneously apply activating pulses to the lens forming composition. Such an embodiment is shown in FIG. 20. Activating light sources 980a and 980b may be positioned around mold chamber 985 so that pulses may be directed toward the front face of a lens and the back face of a lens substantially simultaneously. Mold chamber 985 is preferably adapted to hold a mold in a vertical position such that pulses from activating light source 980a may be applied to the face of a first mold member, while pulses from activating light source 980b may be applied to the face of a second mold member. In an embodiment, activating light source 980b applies activating light pulses to a back surface of a lens more frequently than xenon source 980a applies activating light pulses to a front surface of a lens. Activating light sources 980a and 980b may be configured such that one source applies light to mold chamber 984 from a position above the chamber while the other activating light source applies light to the mold chamber from a position below the chamber.

In an embodiment, a xenon light source and a relatively low intensity (e.g., fluorescent) light source may be used to simultaneously apply activating light to a mold chamber. As illustrated in FIG. 19, xenon source 980 may apply activating light to one side of mold chamber 984 while low intensity fluorescent source 982 applies activating light to another side of the mold chamber. Fluorescent source 982 may include a compact fluorescent "light bucket" or a diffused fluorescent lamp. The fluorescent light source may deliver continuous or substantially pulsed activating light as the xenon source delivers activating light pulses. The fluorescent source may deliver continuous activating light rays having a relatively low intensity of less than about 100 microwatts/cm$^2$.

In one embodiment, an upper light filter 254 may be positioned between upper light source 214 and lens drawer assembly 216, as depicted in FIG. 5. A lower light filter 256 may be positioned between lower light source 218 and lens drawer assembly 216. The upper light filter 254 and lower light filter 256 are shown in FIG. 5 as being made of a single filter member, however, those of ordinary skill in the art will recognize that each of the filters may include two or more filter members. The components of upper light filter 254 and lower light filter 256 are preferably modified depending upon the characteristics of the lens to be molded. For instance, in an embodiment for making negative lenses, the upper light filter 254 includes a plate of Pyrex glass that may be frosted on both sides resting upon a plate of clear Pyrex glass. The lower light filter 256 includes a plate of Pyrex glass, frosted on one side, resting upon a plate of clear Pyrex glass with a device for reducing the intensity of activating light incident upon the center portion relative to the edge portion of the mold assembly.

Conversely, in a preferred arrangement for producing positive lenses, the upper light filter 254 includes a plate of Pyrex glass frosted on one or both sides and a plate of clear Pyrex glass resting upon the plate of frosted Pyrex glass with a device for reducing the intensity of activating light incident upon the edge portion in relation to the center portion of the mold assembly. The lower light filter 256 includes a plate of clear Pyrex glass frosted on one side resting upon a plate of clear Pyrex glass with a device for reducing the intensity of activating light incident upon the edge portion in relation to the center portion of the mold assembly. In this arrangement, in place of a device for reducing the relative intensity of activating light incident upon the edge portion of the lens, the diameter of the aperture 250 may be reduced to achieve the same result, i.e., to reduce the relative intensity of activating light incident upon the edge portion of the mold assembly.

It should be apparent to those skilled in the art that each filter 254 or 256 could be composed of a plurality of filter members or include any other means or device effective to reduce the light to its desired intensity, to diffuse the light and/or to create a light intensity gradient across the mold assemblies. Alternately, in certain embodiments no filter elements may be used.

In one embodiment, upper light filter 254 or lower light filter 256 each include at least one plate of Pyrex glass having at least one frosted surface. Also, either or both of the filters may include more than one plate of Pyrex glass each frosted on one or both surfaces, and/or one or more sheets of tracing paper. After passing through frosted Pyrex glass, the activating light is believed to have no sharp intensity discontinuities. By removing the sharp intensity distributions a reduction in optical distortions in the finished lens may be achieved. Those of ordinary skill in the art will recognize that other means may be used to diffuse the activating light so that it has no sharp intensity discontinuities.

In another embodiment, upper light filter 254 and lower light filter 256 may be liquid crystal display ("LCD") panels. Preferably, the LCD panel is a monochrome trans-flective panel with the back light and reflector removed. A monochrome trans-flective LCD panel is manufactured by Sharp Corporation and may be purchased from Earth Computer Products. The LCD panels are preferably positioned such that light from the light sources passes through the LCD panels to the lens drawer assembly 216. The intensity of the light is preferably reduced as the light passes through the LCD panel. The LCD panel is preferably programmable such that the light transmissibility of the LCD panel may be altered. In use, a predetermined pattern of light and dark regions may be displayed on the LCD panel. As light from the light sources hits these regions the light may be transmitted through the light regions with a higher intensity than through the darker regions. In this manner, the pattern of light and dark areas on the LCD panel may be manipulated such that light having the optimal curing intensity pattern hits the mold assemblies. Although the LCD panel is not entirely opaque in its blackened out state, it may still reduce the intensity of light reaching the mold assemblies. Typically, the light transmission ratio between the lightest and darkest regions of the LCD panel is about 4 to 1.

The use of an LCD panel as a light filter offers a number of advantages over the conventional filter systems described earlier. One advantage is that the filter pattern may be changed actively during a curing cycle. For example, the pattern of light and dark regions may be manipulated such that a lens is initially cured from the center of the lens then the curing may be gradually expanded to the outer edges of the lens. This type of curing pattern may allow a more uniformly cured lens to be formed. In some instances, curing in this manner may also be used to alter the final power of the formed lens.

Another advantage is that the LCD panel may be used as a partial shutter to reduce the intensity of light reaching the mold assembly. By blackening the entire LCD panel the amount of light reaching any portion of the mold assembly may be reduced. In this manner, the LCD may be used to create "pulses" of light by alternating between a transmissive and darkened mode. By having the LCD panel create these light "pulses" a flash ballast or similar pulse generating equipment may be unnecessary. Thus, the light sources may remain on during the entire curing cycle, with the LCD panel creating the curing light pulses. This may also increase the lifetime of the lamps, since the rapid cycling of lamps tends to reduce the lamps' lifetime.

In another embodiment, an LCD panel may be used to allow different patterns and/or intensities of light to reach two separate mold assemblies. As depicted in FIG. 4, the lens curing unit may be configured to substantially simultaneously irradiate two mold assemblies. If the mold assemblies are being used to create lenses having the same power the light irradiation pattern and/or intensity may be substantially the same for each mold assembly. If the mold assemblies are being used to create lenses having significantly different powers, each mold assembly may require a significantly different light irradiation pattern and/or intensity. The use of an LCD filter may allow the irradiation of each of the mold assemblies to be controlled individually. For example, a first mold assembly may require a pulsed curing scheme, while the other mold assembly may require a continuous irradiation pattern through a patterned filter. The use of an LCD panel may allow such lenses to be formed substantially simultaneously. A first portion of the LCD panel between the light source and the first molding apparatus may be alternatively switched between a darkened and an undarkened state. While a first portion is used to create pulses of activating light, another portion of the LCD panel may be formed into the specific pattern required for the continuous curing of the other lens.

When non-LCD type filters are used it may be necessary to maintain a library of filters for use in the production of different types of prescription lenses. Typically, each individual prescription will need a particular filter pattern to obtain a high quality lens. Since an LCD panel may be programmed into a variety of patterns, it may be possible to rely on a single LCD panel, rather than a library of filters. The LCD panel may be programmed to fit the needs of the specific type of lens being formed. Such a system also minimizes the need for human intervention, since a controller may be programmed for a desired pattern, rather than the operator having to choose among a "library" of filters.

The control of the temperature of an LCD panel filter during a curing cycle may be important for achieving a proper lens. In general as the temperature of a panel is increased the lighter regions of the panel may become darker (i.e., less light transmissive). Thus, it may be necessary to control the temperature of the LCD panel during curing to ensure that light having the appropriate intensity reaches the mold assemblies. A cooling system or heating system may therefore, be coupled to the LCD panel to ensure proper temperature control. In one embodiment, it is preferred that a substantially transparent heater is attached to the LCD panel. By increasing the temperature of the LCD panel the light transmissibility of the panel may be decreased. It is preferred that an LCD panel be maintained above room temperature since at room temperature the panel may be too light to sufficiently inhibit the light from reaching the mold assemblies. In order to obtain a proper pattern of light and dark regions when the LCD panel is heated it may be necessary to adjust the contrast of the panel. This adjustment may be done either manually or electronically.

The LCD panel filters may be coupled to a programmable logic device that may be used to design and store patterns for use during curing. FIGS. 7–10 show a number of patterns which may be generated on an LCD panel and used to filter activating light. Each of these patterns is preferably used for the production of a lens having a specific prescription power.

Figure 11:
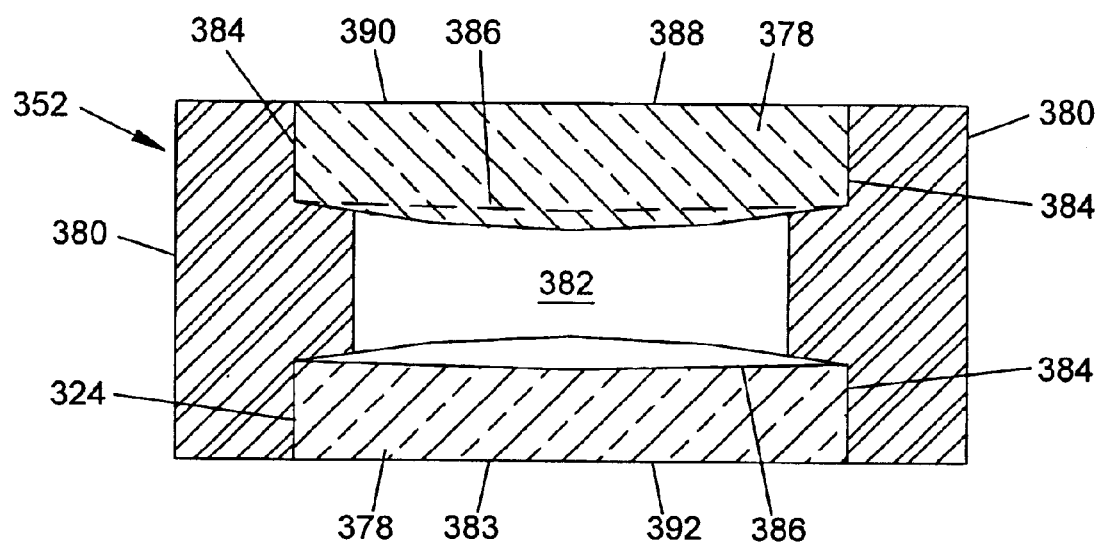
FIG. 11 depicts a mold assembly.

As shown in FIG. 11, the mold assembly 352 may include opposed mold members 378, separated by an annular gasket 380 to define a lens molding cavity 382. The opposed mold members 378 and the annular gasket 380 may be shaped and selected in a manner to produce a lens having a desired diopter.

The mold members 378 may be formed of any suitable material that will permit the passage of activating light. The mold members 378 are preferably formed of glass. Each mold member 378 has an outer peripheral surface 384 and a pair of opposed surfaces 386 and 388 with the surfaces 386 and 388 being precision ground. Preferably the mold members 378 have desirable activating light transmission characteristics and both the casting surface 386 and non casting surface 388 preferably have no surface aberrations, waves, scratches or other defects as these may be reproduced in the finished lens.

As noted above, the mold members 378 are preferably adapted to be held in spaced apart relation to define a lens molding cavity 382 between the facing surfaces 386 thereof. The mold members 378 are preferably held in a spaced apart relation by a T-shaped flexible annular gasket 380 that seals the lens molding cavity 382 from the exterior of the mold members 378. In use, the gasket 380 may be supported on a portion of the mold assembly holder 220 (shown in FIG. 4).

In this manner, the upper or back mold member 390 has a convex inner surface 386 while the lower or front mold member 392 has a concave inner surface 386 so that the resulting lens molding cavity 382 is preferably shaped to form a lens with a desired configuration. Thus, by selecting the mold members 378 with a desired surface 386, lenses with different characteristics, such as focal lengths, may be produced.

Rays of activating light emanating from lamps 240 preferably pass through the mold members 378 and act on a lens forming material disposed in the mold cavity 382 in a manner discussed below so as to form a lens. As noted above, the rays of activating light may pass through a suitable filter 254 or 256 before impinging upon the mold assembly 352.

The mold members 378, preferably, are formed from a material that will not transmit activating light having a wavelength below approximately 300 nm. Suitable materials are Schott Crown, S-1 or S-3 glass manufactured and sold by Schott Optical Glass Inc., of Duryea, Pa. or Corning 8092 glass sold by Corning Glass of Corning, N.Y. A source of flat-top or single vision molds may be Augen Lens Co. in San Diego, Calif.

The annular gasket 380 may be formed of vinyl material that exhibits good lip finish and maintains sufficient flexibility at conditions throughout the lens curing process. In an embodiment, the annular gasket 380 is formed of silicone rubber material such as GE SE6035 which is commercially available from General Electric. In another preferred embodiment, the annular gasket 380 is formed of copolymers of ethylene and vinyl acetate which are commercially available from E. I. DuPont de Nemours & Co. under the trade name ELVAX7. Preferred ELVAX7 resins are ELVAX7 350 having a melt index of 17.3–20.9 dg/min and a vinyl acetate content of 24.3–25.7 wt. %, ELVAX7 250 having a melt index of 22.0–28.0 dg/min and a vinyl acetate content of 27.2–28.8 wt. %, ELVAX7 240 having a melt index of 38.0–48.0 dg/min and a vinyl acetate content of 27.2–28.8 wt. %, and ELVAX7 150 having a melt index of 38.0–48.0 dg/min and a vinyl acetate content of 32.0–34.0 wt. %. In another embodiment, the gasket may be made from polyethylene. Regardless of the particular material, the gaskets 80 may be prepared by conventional injection molding or compression molding techniques which are well-known by those of ordinary skill in the art.

Figure 32:
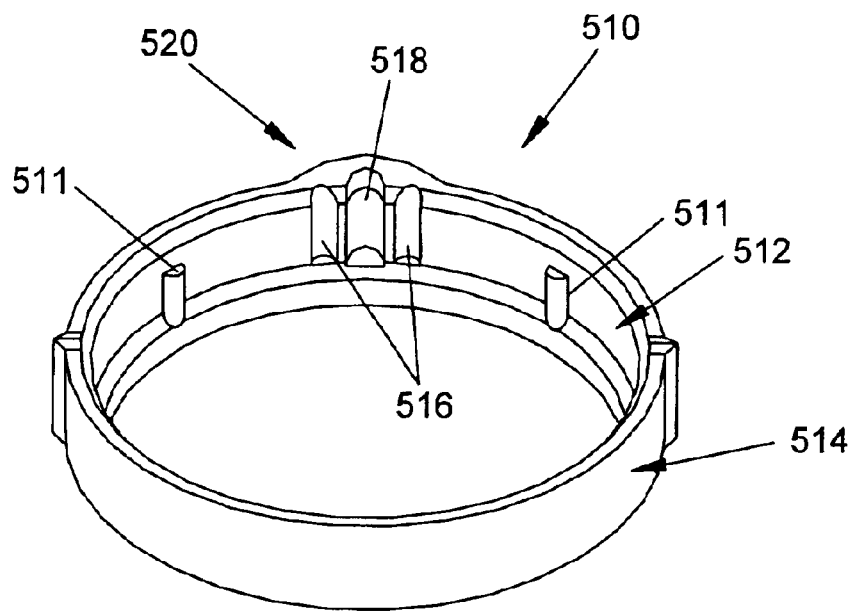
FIG. 32 depicts an isometric view of an embodiment of a gasket.
Figure 33:
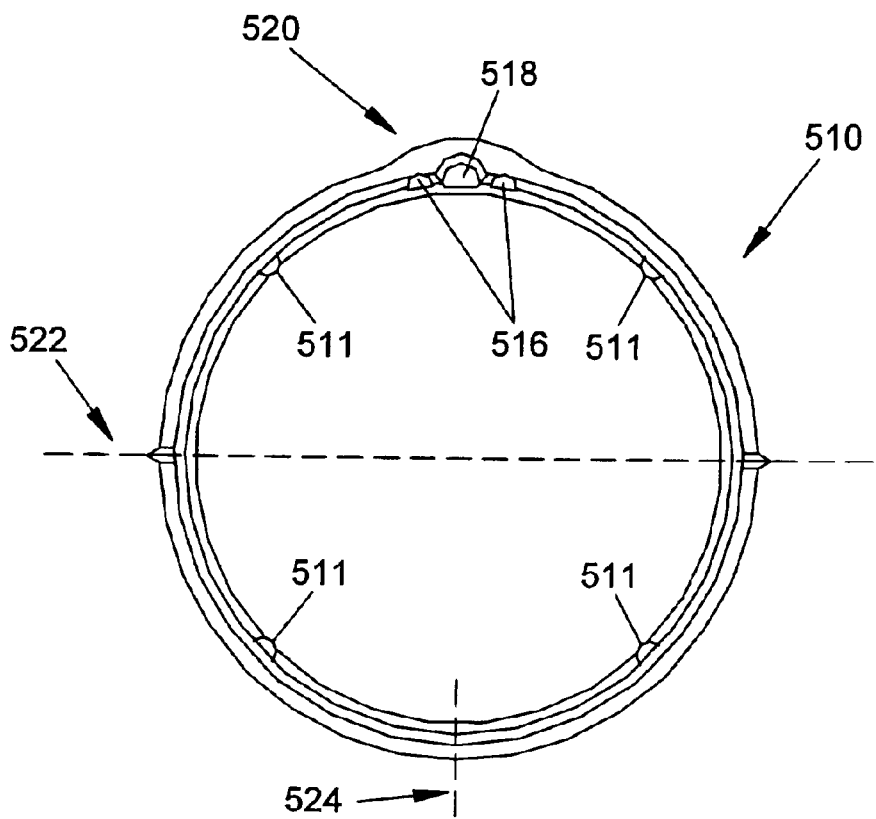
FIG. 33 depicts a top view of the gasket of FIG. 1.

In another embodiment, FIGS. 32 and 33 present an isometric view and a top view, respectively, of a gasket 510. Gasket 510 may be annular, and is preferably configured to engage a mold set for forming a mold assembly. Gasket 510 is preferably characterized by at least four discrete projections 511. Gasket 510 preferably has an exterior surface 514 and an interior surface 512. The projections 511 are preferably arranged upon inner surface 512 such that they are substantially coplanar. The projections are preferably evenly spaced around the interior surface of the gasket Preferably, the spacing along the interior surface of the gasket between each projection is about 90 degrees. Although four projections are preferred, it is envisioned that more than four could be incorporated. The gasket 510 may be formed of a silicone rubber material such as GE SE6035 which is commercially available from General Electric. In another embodiment, the gasket 510 may be formed of copolymers of ethylene and vinyl acetate which are commercially available from E.I. DuPont de Nemours & Co. under the trade name ELVAX7. In another embodiment, the gasket 510 may be formed from polyethylene.

Figure 34:
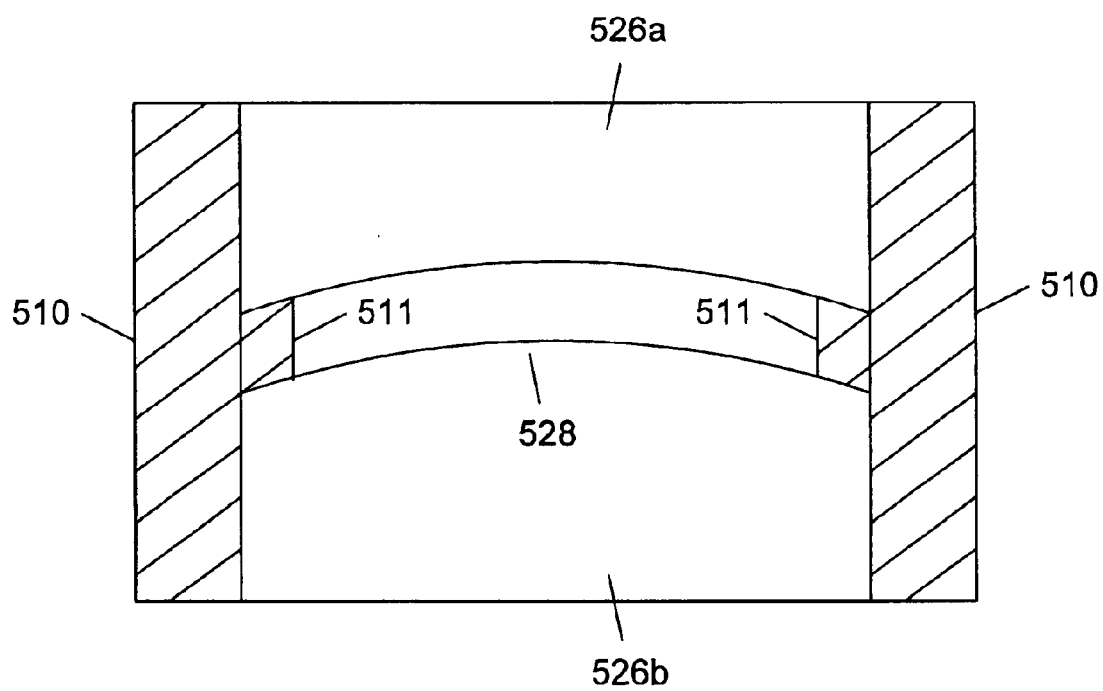
FIG. 34 depicts a cross-sectional view of an embodiment of a mold/gasket. assembly.

As shown in FIG. 34, projections 511 are preferably capable of spacing mold members 526 of a mold set. Mold members 526 may be any of the various types and sizes of mold members that are well known in the art A mold cavity 528 at least partially defined by mold members 526 and gasket 510, is preferably capable of retaining a lens forming composition Preferably, the seal between gasket 510 and mold members 526 is as complete as possible. The height of each projection 511 preferably controls the spacing between mold members 526, and thus the thickness of the finished lens. By selecting proper gaskets and mold sets, lens cavities may be created to produce lenses of various powers.

A mold assembly consists of two mold members. A front mold member 526a and a back mold member 526b, as depicted in FIG. 34. The back mold member is also known as the convex mold member. The back mold member preferably defines the concave surface of a convex lens. Referring back to FIGS. 32 and 33, locations where the steep axis 522 and the flat axis 524 of the back mold member 526b preferably lie in relation to gasket 510 have been indicated. In conventional gaskets, a raised lip may be used to space mold members. The thickness of this lip varies over the circumference of the lip in a manner appropriate with the type of mold set a particular gasket is designed to be used with. In order to have the flexibility to use a certain number of molds, an equivalent amount of conventional gaskets is typically kept in stock.

However, within a class of mold sets there may be points along the outer curvature of a the back mold member where each member of a class of back mold members is shaped similarly. These points may be found at locations along gasket 510, oblique to the steep and flat axes of the mold members. In a preferred embodiment, these points are at about 45 degree angles to the steep and flat axes of the mold members. By using discrete projections 511 to space the mold members at these points, an individual gasket could be used with a variety of mold sets. Therefore, the number of gaskets that would have to be kept in stock may be greatly reduced.

In addition, gasket 510 may include a recession 518 for receiving a lens forming composition. Lip 520 may be pulled back in order to allow a lens forming composition to be introduced into the cavity. Vent ports 516 may be incorporated to facilitate the escape of air from the mold cavity as a lens forming composition is introduced.

A method for making a plastic eyeglass lenses using gasket 510 is presented. The method preferably includes engaging gasket 510 with a first mold set for forming a first lens of a first power. The first mold set preferably contains at least a front mold member 526a and a back mold member 526b. A mold cavity for retaining a lens forming composition may be at least partially defined by mold members 526a and 526b and gasket 510. Gasket 510 is preferably characterized by at least four discrete projections 511 arranged on interior surface 512 for spacing the mold members. Engaging gasket 510 with the mold set preferably includes positioning the mold members such that each of the projections 511 forms an oblique angle with the steep and flat axis of the back mold member 526b. In a preferred embodiment, this angle is about 45 degrees. The method preferably further includes introducing a lens forming composition into mold cavity 528 and curing the lens forming composition. Curing may include exposing the composition to activating light and/or thermal radiation. After the lens is cured, the first mold set may be removed from the gasket and the gasket may then be engaged with a second mold set for forming a second lens of a second power.

Figure 35:
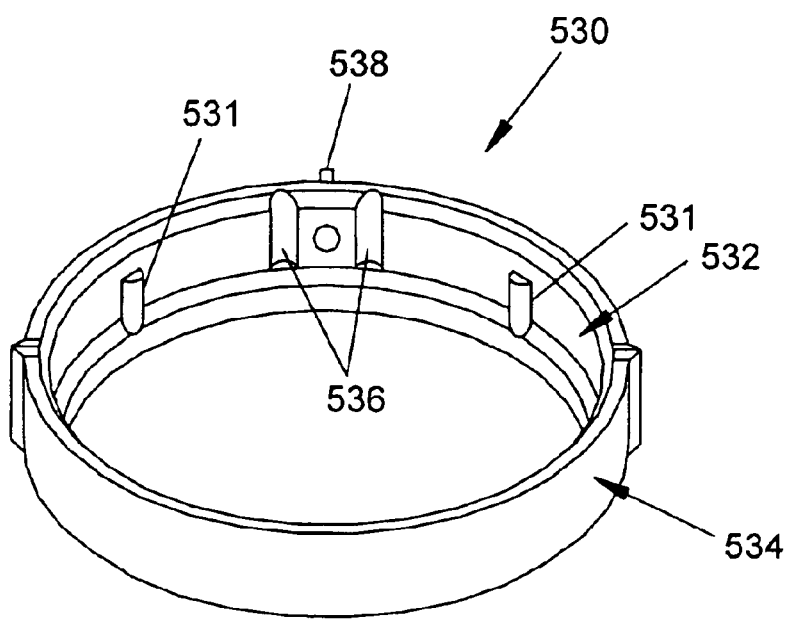
FIG. 35 depicts an isometric view of an embodiment of a gasket.
Figure 36:
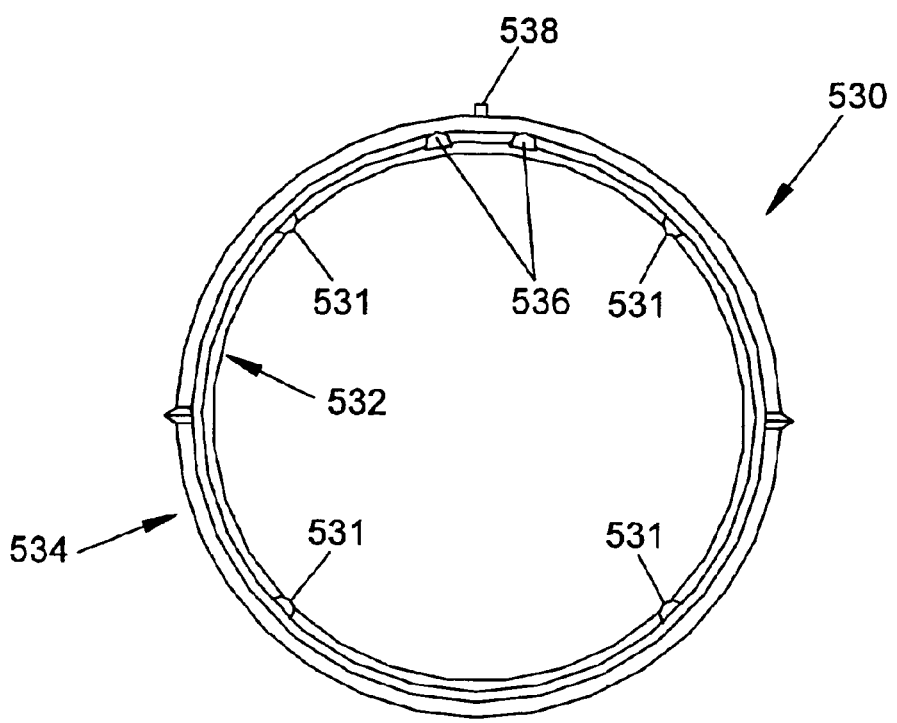
FIG. 36 depicts a top view of the gasket of FIG. 4.

FIGS. 35 and 36 present an isometric view and a top view, respectively, of an improved gasket. Gasket 530 may be composed of similar materials as gasket 510. Like gasket 510, gasket 530 is preferably annular, but may be take a variety of shapes. In addition, gasket 530 may incorporate projections 531 in a manner similar to the projections 511 shown in FIG. 32. Alternatively, gasket 530 may include a raised lip along interior surface 532 or another method of spacing mold members that is conventional in the art.

Gasket 530 preferably includes a fill port 538 for receiving a lens forming composition while gasket 530 is fully engaged to a mold set. Fill port 538 preferably extends from interior surface 532 of gasket 530 to an exterior surface 534 of gasket 530. Consequently, gasket 530 need not be partially disengaged from a mold member of a mold set in order to receive a lens forming composition. In order to introduce a lens forming composition into the mold cavity defined by a conventional mold/gasket assembly the gasket must be at least partially disengaged from the mold members. During the process of filling the mold cavity, lens forming composition may drip onto the backside of a mold member. Lens forming composition on the backside of a mold member may cause activating light used to cure the lens to become locally focused, and may cause optical distortions in the final product. Because fill port 538 allows lens forming composition to be introduced into a mold cavity while gasket 530 is fully engaged to a mold set, gasket 530 preferably avoids this problem. In addition, fill port 538 may be of sufficient size to allow air to escape during the introduction of a lens forming composition into a mold cavity; however, gasket 530 may also incorporate vent ports 536 to facilitate the escape of air.

A method for making a plastic eyeglass lens using gasket 530 preferably includes engaging gasket 530 with a first mold set for forming a first lens of a first power. The first mold set preferably contains at least a front mold member and a back mold member. A mold cavity for retaining a lens forming composition may be at least partially defined by the front mold member, the back mold member, and the gasket. Preferably, the method further includes introducing a lens forming composition through fill port 538, wherein the first and second mold members remain fully engaged with the gasket during the introduction of the lens forming composition. The lens forming composition may then be cured by use of activating light and/or thermal radiation.

In operation, the apparatus may be appropriately configured for the production of positive lenses which are relatively thick at the center or negative lenses which are relatively thick at the edge. To reduce the likelihood of premature release, the relatively thick portions of a lens are preferably polymerized at a faster rate than the relatively thin portions of a lens.

The rate of polymerization taking place at various portions of a lens may be controlled by varying the relative intensity of activating light incident upon particular portions of a lens. The rate of polymerization taking place at various portions of a lens may also be controlled by directing air across the mold members 378 to cool the mold assembly 352.

For positive lenses, the intensity of incident activating light is preferably reduced at the edge portion of the lens so that the thicker center portion of the lens polymerizes faster than the thinner edge portion of the lens. Conversely, for a negative lens, the intensity of incident activating light is preferably reduced at the center portion of the lens so that the thicker edge portion of the lens polymerizes faster than the thinner center portion of the lens. For either a positive lens or a negative lens, air may be directed across the faces of the mold members 378 to cool the mold assembly 352. As the overall intensity of incident activating light is increased, more cooling is needed which may be accomplished by either or both of increasing the velocity of the air and reducing the temperature of the air.

It is well known by those of ordinary skill in the art that lens forming materials tend to shrink as they cure. If the relatively thin portion of a lens is allowed to polymerize before the relatively thick portion, the relatively thin portion will tend to be rigid at the time the relatively thick portion cures and shrinks and the lens will either release prematurely from or crack the mold members. Accordingly, when the relative intensity of activating light incident upon the edge portion of a positive lens is reduced relative to the center portion, the center portion may polymerize faster and shrink before the edge portion is rigid so that the shrinkage is more uniform. Conversely, when the relative intensity of activating light incident upon the center portion of a negative lens is reduced relative to the edge portion, the edge portion may polymerize faster and shrink before the center becomes rigid so that the shrinkage is more uniform.

The variation of the relative intensity of activating light incident upon a lens may be accomplished in a variety of ways. According to one method, in the case of a positive lens, a ring of opaque material may be placed between the lamps and the mold assembly so that the incident activating light falls mainly on the thicker center portion of the lens. Alternatively, when an LCD panel is used as the filter, the panel may be programmed to form a pattern so that the incident activating light falls mainly on the thicker center portion of the lens (See FIG. 7, patterns A, B, C, D, F, H, and I). Conversely, for a negative lens, a disk of opaque material may be placed between the lamps 240 and the mold assembly 352 so that the incident activating light falls mainly on the edge portion of the lens. Alternatively, when an LCD panel is used as the filter, the panel may be programmed to form a pattern so that the incident activating light falls mainly on the thicker edge portion of the lens (See FIG. 9, patterns C, F, I, and FIG. 10, patterns A, B, D, E, G, and H).

According to another method, in the case of a negative lens, a sheet material or an LCD panel having a pattern with a variable degree of opacity ranging from opaque at a central portion to transparent at a radial outer portion may be disposed between the lamps 240 and the mold assembly 352. Conversely, for a positive lens, a sheet material or LCD panel having a pattern with a variable degree of opacity ranging from transparent at a central portion to opaque at a radial outer portion may be disposed between the lamps 240 and the mold assembly 352.

As noted above, the mold assembly 352 may be cooled during curing of the lens forming material as the overall intensity of the incident activating light is increased. Cooling of the mold assembly 352 generally reduces the likelihood of premature release by slowing the reaction and improving adhesion. There may also be improvements in the optical quality, stress characteristics and impact resistance of the lens. Cooling of the mold assembly 352 is preferably accomplished by blowing air across the mold assembly 352. The air preferably has a temperature ranging between 15 and 85° F. (about −9.4° C. to 29.4° C.) to allow for a curing time of between 30 and 10 minutes. The air distribution devices have been found to be particularly advantageous as they may be specifically designed to direct air directly across the surface of the opposed mold members 378. After passing across the surface of the opposed mold members 378, the air emanating from the air distribution devices may be vented out of the system. Alternately the air emanating from the air distribution devices may be recycled back to an air cooler. In another embodiment, the mold assembly 352 may also be cooled by disposing the mold assembly in a liquid cooling bath.

The opposed mold members 378 are preferably thoroughly cleaned between each curing run as any dirt or other impurity on the mold members 378 may cause premature release. The mold members 378 may be cleaned by any conventional means well known to those of ordinary skill in the art such as with a domestic cleaning product, i.e., Mr. Clean™ available from Proctor and Gamble. Those of ordinary skill in the art will recognize, however, that many other techniques may also be used for cleaning the mold members 378.

Figure 12:
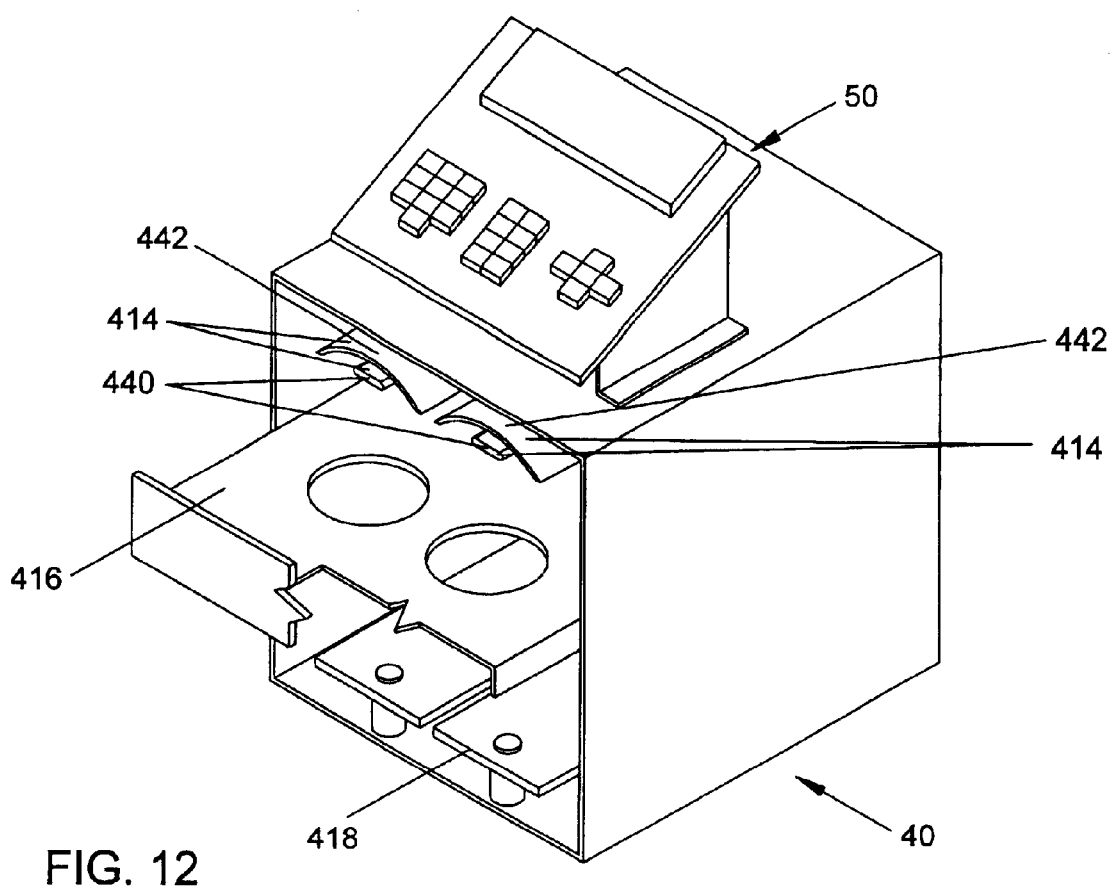
FIG. 12 depicts a post-cure unit

After curing of the lens in lens curing unit 30, the lens may be de-molded and post-cured in the post-cure unit 40. Post-cure unit 40 is preferably configured to apply light, heat or a combination of light and heat to the lens. As shown in FIG. 12, post-cure unit 40 may include a light source 414, a lens drawer assembly 416, and a heat source 418. Lens drawer assembly 416 preferably includes a lens holder 420, more preferably at least two lens holders 420. Lens drawer assembly 416 is preferably slidingly mounted on a guide. Preferably, lens drawer assembly 416 is made from a ceramic material. Cured lenses may be placed in lens holders 420 while the lens drawer assembly 416 is in the open position (i.e., when the door extends from the front of post-cure unit 40). After the lenses have been loaded into lens holders 420 the door may be slid into a closed position, with the lenses directly under light source 414 and above heat source 418.

As shown in FIG. 12, it is preferred that the light source 414 includes a plurality of light generating devices or lamps 440. Preferably, lamps 440 may be oriented above each of the lens holders when the lens drawer assembly is closed. The lamps 440, preferably, generate activating light. The lamps 440 may be supported by and electrically connected to suitable fixtures 442. The fixtures may be at least partially reflective and concave in shape to direct light from the lamps 440 toward the lens holders. The lamps may generate either ultraviolet light, actinic light, visible light, and/or infrared light. The choice of lamps is preferably based on the monomers used in the lens forming composition. In one embodiment, the activating light may be generated from a fluorescent lamp. The fluorescent lamp preferably has a strong emission spectra from about 200 nm to about 800 nm, more preferably between about 200 nm to about 400 nm. A fluorescent lamp emitting activating light with the described wavelengths is commercially available from Voltarc as model SNEUV RPR 4190. In another embodiment, the lamp may generate ultraviolet light.

In one embodiment, the activating light source may be turned on and off quickly between exposures. A flasher ballast may be used for this function. The flasher ballast may be positioned beneath the post-cure unit. A flasher ballast may operate in a standby mode wherein a low current is preferably supplied to the lamp filaments to keep the filaments warm and thereby reduce the strike time of the lamp. Such a ballast is commercially available from Magnatek, Inc of Bridgeport, Conn.

Heat source 418 may be configured to heat the interior of the post-cure unit Preferably, heat source 418 is a resistive heater. Heat source 418 may be made up of one or two resistive heaters. The temperature of heat source 418 may be thermostatically controlled. By heating the interior of the post-cure unit the lenses which are placed in post-cure unit 40 may be heated to complete curing of the lens forming material. Post-cure unit 40 may also include a fan to circulate air within the unit. The circulation of air within the unit may help maintain a relatively uniform temperature within the unit. The fan may also be used to cool the temperature of post-cure unit 40 after completion of the post cure process.

Figure 13:
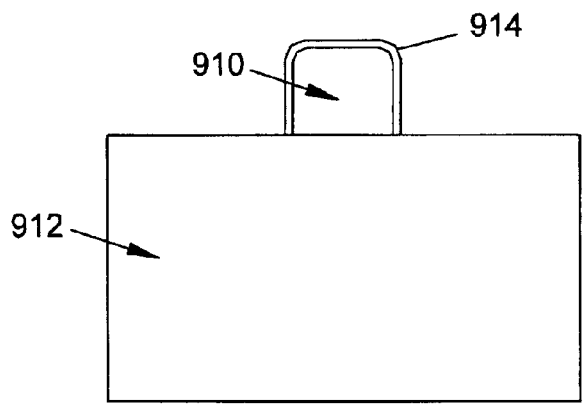
FIG. 13 depicts a view of an embodiment of a heat source and a heat distributor.
Figure 14:
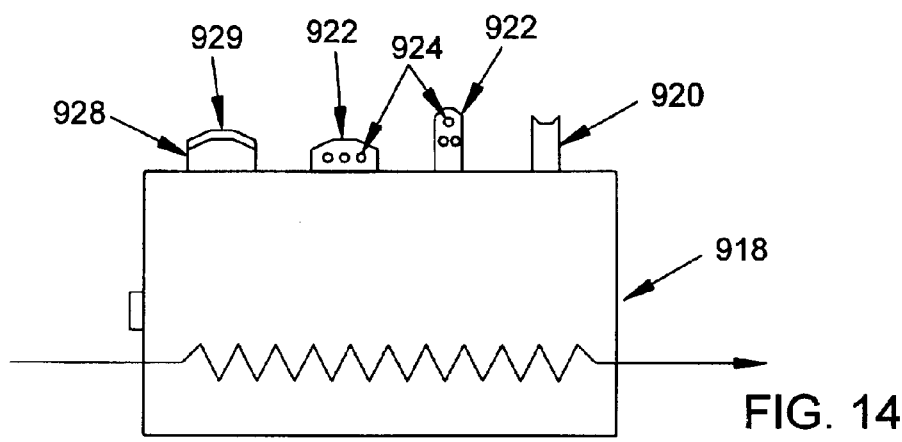
FIG. 14 depicts a view of various embodiments of a heat source and heat distributors.
Figure 15:
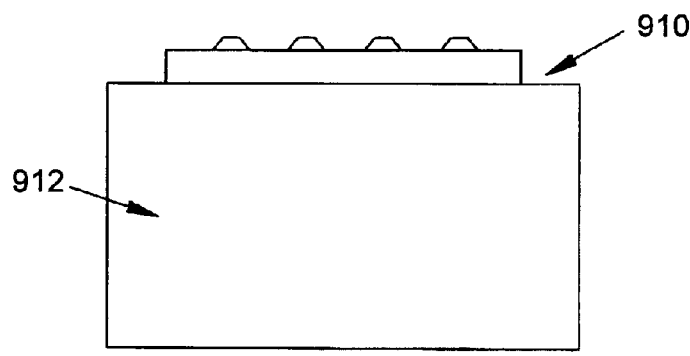
FIG. 15 depicts a view of an embodiment of a heat source and a heat distributor.
Figure 16:
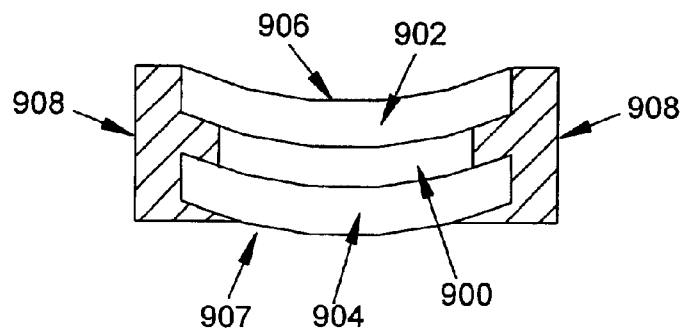
FIG. 16 depicts a view of an embodiment of two mold members and a gasket.

In an embodiment, described as follows, a lens cured by exposure to activating light may be further processed by conductive heating. Such conductive heating tends to enhance the degree of cross-linking in the lens and to increase the tintability of the lens. A lens forming material is preferably placed in mold cavity 900 (illustrated in FIG. 16), which is defined by at least first mold member 902 and second mold member 904. Activating light is directed toward at least one of the mold members, thereby curing the lens forming material to a lens. Heat distributor 910 (shown in FIG. 13) may be adapted to distribute conductive heat from conductive heat source 418 to at least one mold member. Heat distributor 910 is preferably flexible such that at least a portion of it may be shaped to substantially conform to the shape of face 906 or face 907 of first mold member 902 or second mold member 904, respectively. Heat distributor 910 is preferably placed in contact with conductive heat source 418, and mold member 902 is preferably placed on heat distributor 910 such that face 906 of the mold member rests on top of the heat distributor 910. Heat distributor 910 may be coupled to heat source 418. Heat is preferably conductively applied to the heat distributor 910 by the heat source 418. Heat is preferably conducted from the heat distributor 910 through the mold member to a face of the lens. The heat distributor may be shaped to accommodate face 906 of first mold member 902 or face 907 of second mold member 904 such that the heat is applied to front face 916 or back face 915 of the lens. The temperature of heat source 418 may be thermostatically controlled.

In an embodiment, a resistive heater 418 (shown in FIG. 17) may be used as a heat source to provide conductive heat to the lens. A number of other heat sources may be used. In an embodiment, heat distributor 910 may include countershape 920. Countershape 920 may be placed on top of the hot plate to distribute conductive heat from the hot plate. The countershape is preferably flexible such that at least a portion of it may substantially conform to the shape of an outside face of a mold member. The countershape may be hemispherical and either convex or concave depending upon whether the surface of the mold assembly to be placed upon it is convex or concave. For example, when the concave surface of the back mold is utilized to conduct heat into the lens assembly, a convex countershape is preferably provided to rest the assembly on.

Countershape 920 may include a glass mold, a metal optical lap, a pile of hot salt and/or sand, or any of a number of other devices adapted to conduct heat from heat source 912. It should be understood that FIG. 17 includes combinations of a number of embodiments for illustrative purposes. Any number of identical or distinct countershapes may be used in combination on top of a heat source. In an embodiment, a countershape includes a container 922 filled with particles 924. The particles preferably include metal or ceramic material. Countershape 920 may include heat distributor 910. A layer 914 of material may be placed over the countershape 920 or heat distributor 910 to provide slow, smooth, uniform heat conduction into the lens mold assembly. This layer preferably has a relatively low heat conductivity and may be made of rubber, cloth, Nomex™ fabric or any other suitable material that provides slow, smooth, uniform conduction.

In an embodiment, countershape 920 includes layer 914 (e.g., a bag or container) filled with particles 924 such that the countershape may be conveniently shaped to conform to the shape of face 906 or face 907. In an embodiment, the countershape is preferably a "beanbag" that contains particles 924 and may be conformable to the shape of a mold face placed on top of it. Particles 924 may include ceramic material, metal material, glass beads, sand and/or salt The particles preferably facilitate conductive heat to be applied to face 906 or face 907 substantially evenly.

In an embodiment, the countershape 920 is preferably placed on top of heat source 418. Countershape 920 is preferably heated until the temperature of the countershape is substantially near or equal to the temperature of the surface of the heat source. The countershape may then be "flipped over" such that the heated portion of the countershape that has a temperature substantially near or equal to that of the surface of the heat source is exposed. A mold may be placed on top of the heated portion of the countershape, and the countershape is preferably conformed to the shape of the face of the mold. In this manner, the rate of conductive heat transfer to the lens may begin at a maximum. Heat is preferably conductively transferred through the countershape and the mold face to a face of the lens. The temperature of the heated portion of the countershape may tend to decrease after the mold is placed onto the countershape.

In an embodiment, heat distributor 910 may partially insulate a mold member from conductive heat source 418. The heat distributor preferably allows a gradual, uniform transfer of heat to the mold member. The heat distributor is preferably made of rubber and/or another suitable material. The heat distributor may include countershapes of various shapes (e.g., hemispherically concave or convex) and sizes that may be adapted to contact and receive mold members.

In an embodiment, heat may be conductively applied by the heat source to only one outside face of one mold member. This outside face may be face 906 or face 907. Heat may be applied to the back face of the lens to enhance crosslinking and/or tintability of the lens material proximate to the surface of the back face of the lens.

In a preferred embodiment, a thermostatically controlled hot plate 418 is preferably used as a heat source. Glass optical mold 928 is preferably placed convex side up on hot plate 418 to serve as a countershape. The glass optical mold preferably has about an 80 mm diameter and a radius of curvature of about 93 mm Rubber disc 929 may be placed over this mold 928 to provide uniform conductive heat to the lens mold assembly. The rubber disc is preferably made of silicone and preferably has a diameter of approximately 74 mm and a thickness of about 3 mm. The lens mold assembly is preferably placed on mold 928 so that outside face 906 of a mold member of the assembly rests on top of mold 928. It is preferred that the edge of the lens mold assembly not directly contact the hot plate. The lens mold assembly preferably receives heat through the rubber disc and not through its mold edges.

To achieve good yield rates and reduce the incidence of premature release while using the conductive heat method, it may be necessary for the edge of the lens to be completely cured and dry before conductive heat is applied. If the lens edge is incompletely cured (i.e., liquid or gel is still present) while conductive heat is applied, there may be a high incidence of premature release of the lens from the heating unit.

In an embodiment, the edges of a lens may be treated to cure or remove incompletely cured lens forming material (see above description) before conductive heat is applied. The mold cavity may be defined by at least gasket 908, first mold member 902, and second mold member 904. Activating light rays may be directed toward at least one of the mold members, thereby curing the lens forming material to a lens preferably having front face 916, a back face 915, and edges. Upon the formation of the lens, the gasket may be removed from the mold assembly. An oxygen barrier may be used to cure any remaining liquid or gel on the lens edge as described in more detail below. An oxygen barrier treated with photoinitiator is preferably employed. Alternatively, any remaining liquid or gel may be removed manually. Once the edge of the lens is dry, a face of the lens may be conductively heated using any of the methods described herein.

In an embodiment, a lens may be tinted after receiving conductive heat post-cure treatment in a mold cavity. During tinting of the lens, the lens is preferably immersed in a dye solution.

The operation of the lens curing system may be controlled by a microprocessor based controller 50 (FIG. 1). Controller 50 preferably controls the operation of coating unit 20, lens curing unit 30, and post-cure unit 40. Controller 50 may be configured to substantially simultaneously control each of these units. In addition, the controller may include a display 52 and an input device 54. The display and input device may be configured to exchange information with an operator.

Controller 50 preferably controls a number of operations related to the process of forming a plastic lens. Many of the operations used to make a plastic lens (e.g., coating, curing and post-cure operations) are preferably performed under a predetermined set of conditions based on the prescription and type of lens being formed (e.g., ultraviolet/visible light absorbing, photochromic, colored, etc.). Controller 50 is preferably programmed to control a number of these operations, thus relieving the operator from having to continually monitor the apparatus.

In some embodiments, the lens or mold members may be coated with a variety of coatings (e.g., a scratch resistant or tinted coating). The application of these coatings may require specific conditions depending on the type of coating to be applied. Controller 50 is preferably configured to produce these conditions in response to input from the operator.

When a spin coating unit is used, controller 50 may be configured to control the rotation of the lens or mold member during the coating process. Controller 50 is preferably electronically coupled to the motor of the spin coating unit. The controller may send electronic signals to the motor to turn the motor on and/or off. In a typical coating process the rate at which the mold or lens is rotated is preferably controlled to achieve a uniform and defect free coating. The controller is preferably configured to control the rate of rotation of the mold or lens during a curing process. For example, when a coating material is being applied, the mold or lens is preferably spun at relatively high rotational rates (e.g., about 900 to about 950 RPM). When the coating material is being cured, however, a much slower rotational rate is preferably used (e.g., about 200 RPM). The controller is preferably configured to adjust the rotational rate of the lens or mold depending on the process step being performed.

The controller is also preferably configured to control the operation of lamps 24. The lamps are preferably turned on and off at the appropriate times during a coating procedure. For example, during the application of the coating material activating lights are typically not used, thus the controller may be configured to keep the lamps off during this process. During the curing process, activating light may be used to initiate the curing of the coating material. The controller is preferably configured to turn the lamps on and to control the amount of time the lamps remain on during a curing of the coating material. The controller may also be configured to create light pulses to affect curing of the coating material. Both the length and frequency of the light pulses may be controlled by the controller.

The controller is also preferably configured to control operation of the lens-curing unit. The controller may perform some and/or all of a number of functions during the lens curing process, including, but not limited to: (i) measuring the ambient room temperature; (ii) determining the dose of light (or initial dose of light in pulsed curing applications) required to cure the lens forming composition, based on the ambient room temperature; (iii) applying the activating light with an intensity and duration sufficient to equal the determined dose; (iv) measuring the composition's temperature response during and subsequent to the application of the dose of light; (v) calculating the dose required for the next application of activating light (in pulsed curing applications); (vi) applying the activating light with an intensity and duration sufficient to equal the determined second dose; (vii) determining when the curing process is complete by monitoring the temperature response of the lens forming composition during the application of activating light; (viii) turning the upper and lower light sources on and off independently; (ix) monitoring the lamp temperature, and controlling the temperature of the lamps by activating cooling fans proximate the lamps; and (x) turning the fans on/off or controlling the flow rate of an air stream produced by a fan to control the composition temperature. Herein, "dose" refers to the amount of light energy applied to an object, the energy of the incident light being determined by the intensity and duration of the light.

A temperature monitor may be located at a number of positions within the lens curing unit 30. In one embodiment an infra-red temperature sensor may be located such that it may measure the temperature of the mold and/or the lens forming composition in the mold cavity. One infra-red temperature sensor may be the Cole-Parmer Model E39669-00 (Vernon Hills, Ill.).

The temperature monitor may measure the temperature within the chamber and/or the temperature of air exiting the chamber. The controller may be configured to send a signal to a cooler and/or distributor to vary the amount and/or temperature of the cooling air. The temperature monitor may also determine the temperature at any of a number of locations proximate the mold cavity. The temperature monitor preferably sends a signal to the controller such that the temperature of the mold cavity and/or the lens forming composition may be relayed to the controller throughout the curing process.

During the initial set-up of a curing process the temperature of the lens forming composition within the mold cavity may be determined. This initial temperature of the lens forming composition may be about equal to the ambient room temperature. The controller may then determine the initial temperature of the lens forming composition by measuring the ambient room temperature. Alternatively, the initial temperature of the lens forming composition may be measured directly using the aforementioned temperature sensors.

The controller preferably determines the initial dose to be given to the lens forming composition based on the initial temperature of the composition. The controller may use a table to determine the initial dose, the table including a series of values correlating the initial temperature to the initial dose and/or the mass of the lens forming composition. The table may be prepared by routine experimentation. To prepare the table a specific lens forming composition of a specific mass is preferably treated with a known dose of activating light The mold cavity is preferably disassembled and the gelation pattern of the lens forming composition observed. This procedure may be repeated, increasing or decreasing the dosage as dictated by the gelation patterns, until the optimal dosage is determined for the specific lens forming composition.

During this testing procedure the initial temperature of the lens forming composition may be determined, this temperature being herein referred to as the "testing temperature". In this manner, the optimal dose for the lens forming composition at the testing temperature may be determined. When the lens forming material has an initial temperature that is substantially equal to the testing temperature, the initial dosage may be substantially equal to the experimentally determined dosage. When the lens forming material has a temperature that is substantially greater or less than the testing temperature, the initial dose may be calculated based on a function of the experimentally determined initial dose. In single dose applications the initial dose of activating light will be sufficient to substantially cure the plastic lens. For multi-pulse applications, the initial dose will be followed by additional light doses.

In an embodiment, the controller is preferably adapted to control the intensity and duration of activating light pulses delivered from the activating light source and the time interval between the pulses. The activating light source may include a capacitor which stores the energy required to deliver the pulses of activating light. The capacitor may allow pulses of activating light to be delivered as frequently as desired. A light sensor may be used to determine the intensity of activating light emanating from the source. The light sensor is preferably adapted to send a signal to the controller, which is preferably adapted to maintain the intensity of the activating light at a selected level. A filter may be positioned between the activating light source and the light sensor and is preferably adapted to inhibit a portion of the activating light rays from contacting the light sensor. This filter may be necessary to keep the intensity of the activating light upon the light sensor within the detectable range of the light sensor.

In an embodiment, a shutter system may be used to control the application of activating light rays to the lens forming material. The shutter system preferably includes air-actuated shutter plates that may be inserted into the curing chamber to prevent activating light from reaching the lens forming material. The shutter system may be coupled to the controller, which may actuate an air cylinder to cause the shutter plates to be inserted or extracted from the curing chamber. The controller preferably allows the insertion and extraction of the shutter plates at specified time intervals. The controller may receive signals from temperature sensors allowing the time intervals in which the shutters are inserted and/or extracted to be adjusted as a function of a temperature of the lens forming composition and/or the molds. The temperature sensor may be located at numerous positions proximate the mold cavity and/or casting chamber.

Alternatively, the shutter system may include an LCD filter that may be darkened to inhibit the activating light from reaching the lens forming material. The controller is preferably configured to darken the LCD panel at specified time intervals. The controller may receive signals from temperature sensors allowing the time intervals in which the LCD panel is darkened to be adjusted as a function of a temperature of the lens forming composition and/or the molds.

In an embodiment, a single dose of activating light may be used to cure a lens forming composition. The controller may monitor the change in temperature of the lens forming composition during the application of activating light The activating light preferably initiates a polymerization reaction such that the temperature of the lens forming composition begins to rise. By monitoring the change in temperature over a time period the controller may determine the rate of temperature change. The controller preferably controls the polymerization of the lens forming composition based on the rate of temperature change. When the temperature is found to be rising at a faster than desired rate, the desired rate being determined based on previous experiments, the temperature controller may alter the intensity and/or the duration of the pulse such that the rate of temperature change is lowered. The duration of the activating light may be shortened and/or the intensity of the activating light may be diminished to achieve this effect. The controller may also increase the rate of cooling air blowing across the mold to help lower the temperature of the lens forming composition. Alternatively, if the temperature of the reaction is increasing too slowly, the controller may increase the intensity of the activating light and/or increase the duration of the pulse. Additionally, the controller may decrease the rate of cooling air blowing across the mold to allow the temperature of the lens forming composition to rise at a faster rate.

Figure 17:
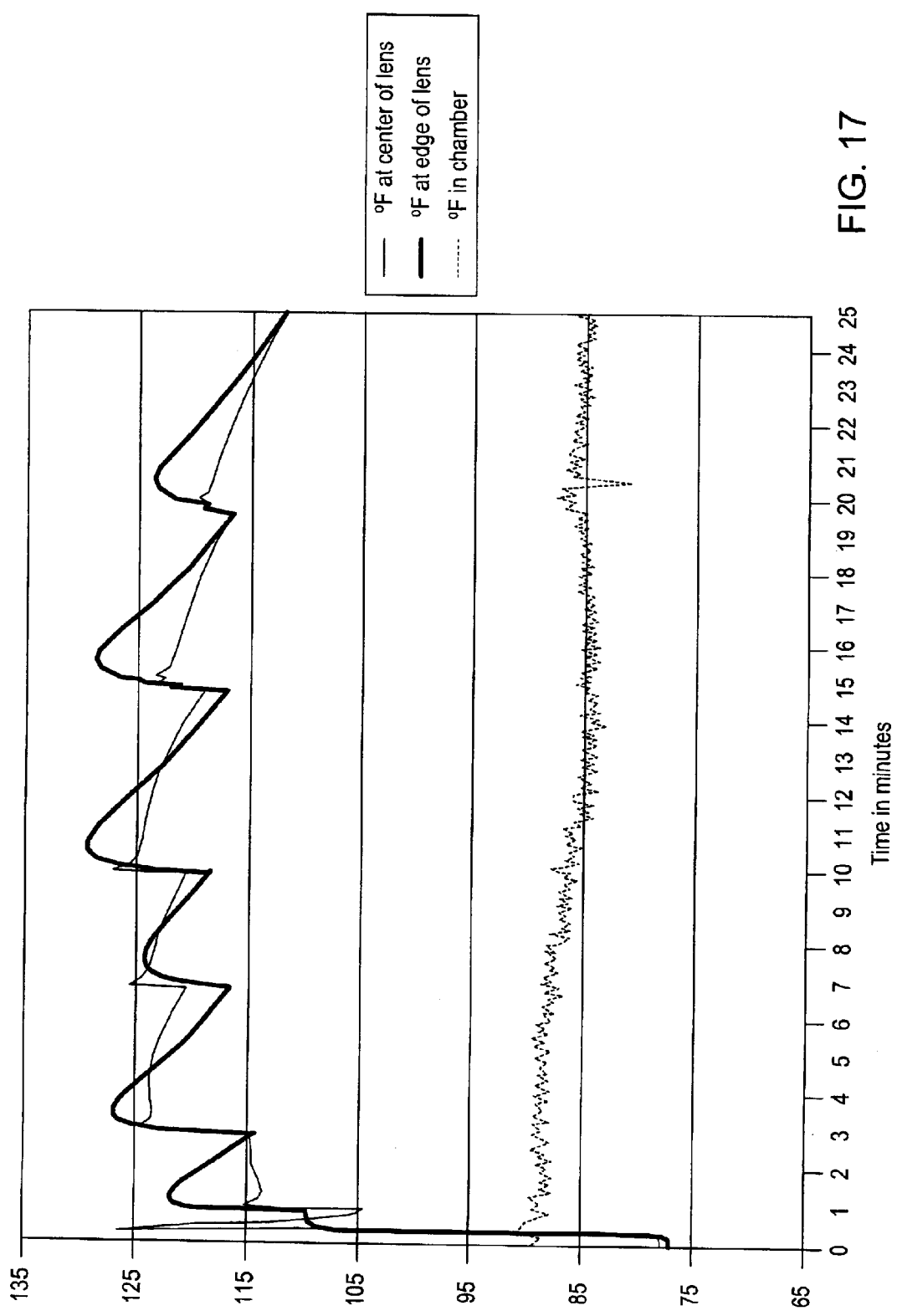
FIG. 17 depicts a plot of the temperature of the lens forming composition versus time during the application of activating light pulses.

One manner in which the temperature may be controlled is by monitoring the temperature during the application of activating light, as described in U.S. Pat. No. 5,422,046 to Tarshiani, et al. During activating light irradiation, the temperature of the lens forming composition tends to rise. When the temperature reaches a predetermined upper set point the activating light source is preferably turned off. Removal of the activating energy may allow the temperature to gradually begin to fall. When the temperature is reduced to a predetermined lower set point the activating light source is preferably turned on. In this manner, the temperature may be controlled within a desired range. This temperature range tends to be very broad due to the nature of the lens forming polymerization reactions. For example, turning the activating light off at a predetermined upper set point may not inure that the temperature of the lens forming composition will stop at that point. In fact, it is more likely that the temperature may continue to rise after the upper set point has been reached. To offset this effect the upper set point may be set at a temperature lower than the upper temperature desired during the lens forming process. Such a method of temperature control may be insufficient to control the temperature. As shown in FIG. 17, increase in the temperature of a lens forming composition during the lens forming process may not be constant. Since the increase in temperature of the composition changes as the process continues, the use of an upper set point for controlling the temperature may not adequately prevent the composition from reaching greater than desired temperatures. Additionally, near the completion of the process the upper set point may be set too low, thereby preventing the lens forming composition from reaching a temperature that is adequate to maintain the polymerization reaction due to insufficient doses of activating light.

In an embodiment the temperature control process may be described as a modified Proportional-Integral-Derivative ("PID") control method. Preferably, the controller is configured to operate the lens-curing system using a PID control method. The controller may use a number of factors to determine the dose of activating light applied for each pulse. The controller preferably measures the temperature as well as the rate of temperature change.

The PID control method involves the combination of proportional, integral and derivative controlling methods. The first, proportional control, may be achieved by mixing two control factors in such a way as to achieve the desired effect. For lens control the two factors which tend to have the most effect on temperature control may be the dosage of activating light and the flow rate of the cooling air. These two factors may be altered to achieve a desired temperature response. If the temperature must be raised as rapidly as possible a full dosage of light may delivered with no cooling air present. Similarly, if the composition must be rapidly cooled the sample may be treated with cooling air only. Preferably the two factors, application of incident light and cooling, are preferably both applied to achieve the desired temperature response. The mixture, or proportions of these factors may allow the temperature of the composition to be controlled.

The use of proportional control tends to ignore other effects that influence the temperature of the lens forming composition. During the lens forming process, the temperature of the lens forming composition may vary due to the rate of polymerization of the reaction. When the composition is undergoing a rapid rate of polymerization, the temperature of the composition may rise beyond that determined by the proportional setting of the activating light and cooling air controls. Toward the end of the process the lens may become too cool due to the a reduction in the rate of polymerization of the composition. The use of proportional control may therefore be inadequate to control this procedure and may lead to greater than desired variations in the temperature of the composition.

These limitations may be overcome by altering the proportions of the two components in response to the temperature of the composition. A single set point may be used to control the temperature of a reaction. As the temperature rises above this set point the proportion of the activating light and cooling may be adjusted such that the temperature begins to lower back toward the set point. If the temperature drops below the set point the proportion of activating light and cooling may be adjusted to raise the temperature back to the set point. Typically, to lower the temperature the dose of activating light may be reduced and/or the flow rate of the cooling air may be increased. To raise the temperature the dose of activating light may be increased and/or the flow rate of the cooling air may be decreased.

The use of proportional control in this manner may not lead to a steady temperature. Depending on the set point and the response time of the lens forming composition to variations in the dosage of light and/or cooling air, the temperature may oscillate over the set point, never attaining a steady value. To better control such a system the rate of change of the temperature over a predetermined time period is preferably monitored. As the temperature rises the rate at which the temperature rises is preferably noted. Based on this rate of change the controller may then alter the dosage of activating light and/or cooling air such that a temperature much closer to the set point may be achieved. Since the rate will change in response to changes in the rate of polymerization, such a system may better control the temperature of the lens forming composition throughout the process.

In an embodiment, the controller may be a modified PID controller or a computer programmed to control the lens curing unit using a PID control scheme. The controller preferably monitors the temperature of the lens forming composition throughout the process. Additionally, the controller may monitor the rate of change of temperature throughout the reaction. When a plurality of pulses are being applied to control the polymerization, the controller preferably controls the duration and intensity of each pulse to control the temperature of the composition. In a typical process the rate of change in temperature is preferably monitored after the application of an activating light pulse. If the temperature is trending in an upward direction, the controller preferably waits for the temperature to crest and start descending, before the application of additional light pulses. This cresting temperature may vary, as depicted in FIG. 17, throughout the lens forming process. After the temperature has passed a predetermined set point, a dose, calculated from the rate of change in temperature caused by the application of the previous pulse, may be applied to the lens forming composition. After the light pulse is delivered the controller may repeat the procedure additional times.

When the reaction nears completion the controller detects the lack of response to the last exposure (i.e. the lens temperature did not increase appreciably). At this point the controller may apply a final dose to assure a substantially complete cure and notify the operator that the mold assembly is ready to be removed form the chamber.

One method of controlling the dose of light reaching the lens may be through the use of filters, as described above. In one embodiment, an LCD filter system may be used to adjust the intensity of incoming light. The LCD system is preferably coupled to the controller such that a pattern displayed by the LCD system may be altered by the controller. The controller preferably configures the pattern of light and dark areas on the LCD panel such that light having the optimal curing intensity pattern hits the mold assemblies. The pattern that is produced is preferably based on the prescription and type of lens being produced.

In another embodiment, the controller may actively change the pattern on the LCD panel during a curing cycle. For example, the pattern of light and dark regions may be manipulated such that the lens is cured from the center of the lens then gradually expanded to the outer edges of the lens. This type of curing pattern may allow a more uniformly cured lens to be formed. In some instances, curing in this manner may also be used to alter the final power of the formed lens.

In another embodiment, the LCD panel may be used as a partial shutter to reduce the intensity of light reaching the lens assembly. By blackening the entire LCD panel the amount of light reaching any portion of the mold assembly may be reduced. The controller may be configured to cause the LCD panel to create "pulses" of light by alternating between a transmissive and darkened mode. By having the LCD panel create these light "pulses" the need for a flash ballast or similar pulse generating equipment may be unnecessary. Thus the use of a controller and an LCD panel may simplify the system.

In some embodiments, the lens may require a post-curing process. The post-cure process may require specific conditions depending on the type of lens being formed. The controller is preferably configured to produce these conditions in response to input from the operator.

The controller is preferably configured to control the operation of lamps 440 (See FIG. 12). The lamps are preferably turned on and off at the appropriate times during the post-cure procedure. For example, in some post-cure operations the lights may not be required, thus the controller would keep the lights off during this process. During other processes, the lights may be used to complete the curing of the lens. The controller is preferably configured to turn the lights on and to control the amount of time the lights remain on during a post-cure procedure. The controller may also be configured to create light pulses during the post-cure procedure. Both the length and frequency of the light pulses may be controlled by the controller.

The controller is preferably configured to control operation of the heating device 418 during the post-cure operation. Heating device 418 is preferably turned on and off to maintain a predetermined temperature within the post-cure unit. Alternatively, when a resistive heater is used, the current flow through the heating element may be altered to control the temperature within the post-cure unit. Preferably both the application of light and heat are controlled by the controller. The operation of fans, coupled to the post-cure unit, is also preferably controlled by the controller. The fans may be operated by the controller to circulate air within or into/out of the post-cure unit.

Additionally, the controller may provide system diagnostics to determine if the system is operating properly. The controller may notify the user when routine maintenance is due or when a system error is detected. For example, the controller may monitor the current passing through lamps of the coating, lens curing, or post-cure unit to determine if the lamps are operating properly. The controller may keep track of the number of hours that the lamps have been used. When a lamp has been used for a predetermined number of hours a message may be transmitted to an operator to inform the operator that the lamps may require changing. The controller may also monitor the intensity of light produced by the lamp. A photodiode may be placed proximate the lamps to determine the intensity of light being produced by the lamp. If the intensity of light falls outside a predetermined range, the current applied to the lamp may be adjusted to alter the intensity of light produced (either increased to increase the intensity; or decreased to decrease the intensity). Alternatively, the controller may transmit a message informing the operator that a lamp needs to be changed when the intensity of light produced by the lamp drops below a predetermined value.

The controller may also manage an interlock system for safety and energy conservation purposes. If the lens drawer assembly from the coating or post-cure units are open the controller is preferably configured to prevent the lamps from turning on. This may prevent the operator from inadvertently becoming exposed to the light from the lamps. Lamps 24 for the coating unit 20 are preferably positioned on cover 22 (See FIG. 1). In order to prevent inadvertent exposure of the operator to light from lamps 24 a switch is preferably built into the cover, as described above. The controller is preferably configured to prevent the lamps 24 from turning on when the cover is open. The controller may also automatically turn lamps 24 off if the cover is opened when the lenses are on. Additionally, the controller may conserve energy by keeping fans and other cooling devices off when the lamps are off.

The controller may also be configured to interact with the operator. The controller preferably includes an input device 54 and a display screen 52. The input device may be a keyboard (e.g., a full computer keyboard or a modified keyboard), a light sensitive pad, a touch sensitive pad, or similar input device. A number the parameters controlled by the controller may be dependent on the input of the operator. In the initial set up of the apparatus, the controller may allow the operator to input the type of lens being formed. This information may include type of lens (clear, ultraviolet absorbing, photochromic, colored, etc.), prescription, and type of coatings (e.g., scratch resistant or tint).

Based on this information the controller is preferably configured to transmit information back to the operator. The operator may be instructed to select mold members for the mold assembly. The mold members may be coded such that the controller may indicate to the operator which molds to select by transmitting the code for each mold member. The controller may also determine the type of gasket required to properly seal the mold members together. Like the mold members, the gaskets may also be coded to make the selection of the appropriate gasket easier.

The lens forming compositions may also be coded. For the production of certain kinds of lenses a specific lens forming composition may be required. The controller may be configured to determine the specific composition required and transmit the code for that composition to the operator. The controller may also signal to the operator when certain operations need to be performed or when a particular operation is completed (e.g., when to place the mold assembly in the lens curing unit, when to remove the mold assembly, when to transfer the mold assembly, etc.).

Figure 38:
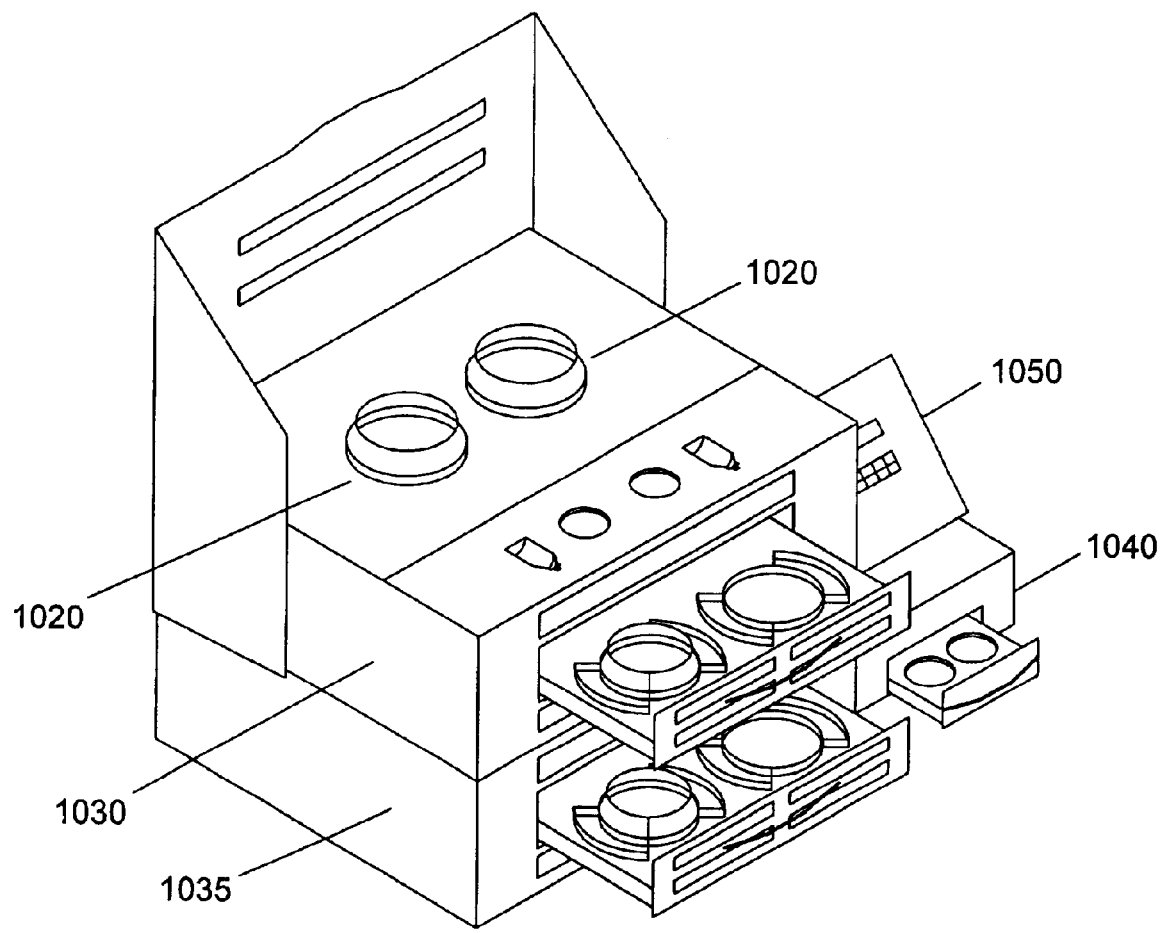
FIG. 38 depicts a plastic lens forming apparatus which includes two lens curing units.

Referring now to FIG. 38, another embodiment of a plastic lens curing apparatus is generally indicated by reference numeral 1000. As shown in FIG. 38, lens forming apparatus 1000 includes at least one coating unit 1020, a pair of stacked lens curing units 1030 and 1035, a post-cure unit 1040, and a controller 1050. Preferably, apparatus 1000 includes two coating units 1020. Coating unit 1020 is preferably configured to apply a coating layer to a mold member or a lens. Preferably, coating unit 1020 is a spin coating unit. Each of the lens curing units, 1030 and 1035, includes an activating light source for producing activating light. The activating light source is preferably configured to direct light toward a mold assembly. Post-cure unit 1040 is preferably configured to complete the polymerization of partially cured plastic lenses. Post-cure unit 1040 preferably includes an activating light source and a heat source. Controller 1050 is preferably a programmable logic controller. Controller 1050 is preferably coupled to coating units 1020, lens curing units 1030 and 1035, and post-cure unit 1040, such that the controller may be capable of substantially simultaneously operating the four units 1020, 1030, 1035 and 1040. Controller 50 may be a computer. During the production of plastic lenses the lens curing step may be the most time consuming part of the process. By adding additional curing units to the system the throughput of the system may be increased, allowing the operator to form more lenses in a given time period.

Lens Forming Compositions

The lens forming material may include any suitable liquid monomer or monomer mixture and any suitable photosensitive initiator. As used herein "monomer" is taken to mean any compound capable of undergoing a polymerization reaction. Monomers may include non-polymerized material or partially polymerized material. When partially polymerized material is used as a monomer, the partially polymerized material preferably contains functional groups capable of undergoing further reaction to form a new polymer. The lens forming material preferably includes a photoinitiator that interacts with activating light. In one embodiment, the photoinitiator absorbs ultraviolet light having a wavelength in the range of 300 to 400 nm. In another embodiment, the photoinitiator absorbs actinic light having a wavelength in the range of about 380 nm to 490 nm. The liquid lens forming material is preferably filtered for quality control and placed in the lens molding cavity 382 by pulling the annular gasket 380 away from one of the opposed mold members 378 and injecting the liquid lens forming material into the lens molding cavity 382 (See FIG. 11). Once the lens molding cavity 382 is filled with such material, the annular gasket 380 is preferably replaced into its sealing relation with the opposed mold members 378.

Those skilled in the art will recognize that once the cured lens is removed from the lens molding cavity 382 by disassembling the opposed mold members 378, the lens may be further processed in a conventional manner, such as by grinding its peripheral edge.

A polymerizable lens forming composition includes an aromatic-containing bis(allyl carbonate)-functional monomer and at least one polyethylenic-functional monomer containing two ethylenically unsaturated groups selected from acrylyl or methacrylyl. In a preferred embodiment, the composition further includes a suitable photoinitiator. In other preferred embodiments, the composition may include one or more polyethylenic-functional monomers containing three ethylenically unsaturated groups selected from acrylyl or methacrylyl, and a dye.

Aromatic-containing bis(allyl carbonate)-functional monomers include bis(allyl carbonates) of dihydroxy aromatic-containing material. The dihydroxy aromatic-containing material from which the monomer is derived may be one or more dihydroxy aromatic-containing compounds. Preferably the hydroxyl groups are attached directly to nuclear aromatic carbon atoms of the dihydroxy aromatic-containing compounds. The monomers are themselves known and may be prepared by procedures well known in the art.

The aromatic-containing bis(allyl carbonate)-functional monomers may be represented by the formula:

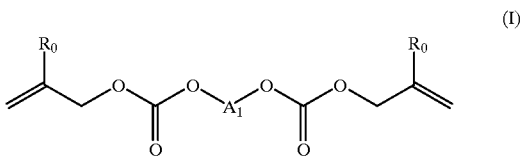

(I)

in which $A_1$ is the divalent radical derived from the dihydroxy aromatic-containing material and each $R_0$ is independently hydrogen, halo, or a $C_1$–$C_4$ alkyl group. The alkyl group is usually methyl or ethyl. Examples of $R_0$ include hydrogen, chloro, bromo, fluoro, methyl, ethyl, n-propyl, isopropyl and n-butyl. Most commonly $R_0$ is hydrogen or methyl; hydrogen is preferred. A subclass of the divalent radical $A_1$ which is of particular usefulness is represented by the formula:

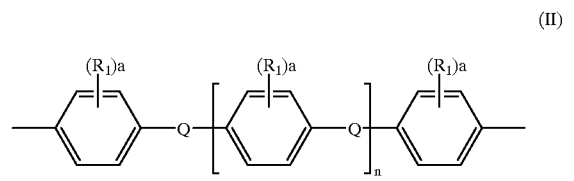

(II)

in which each $R_1$ is independently alkyl containing from 1 to about 4 carbon atoms, phenyl, or halo; the average value of each (a) is independently in the range of from 0 to 4; each Q is independently oxy, sulfonyl, alkanediyl having from 2 to about 4 carbon atoms, or alkylidene having from 1 to about 4 carbon atoms; and the average value of n is in the range of from 0 to about 3. Preferably Q is methylethylidene, viz., isopropylidene.

Preferably the value of n is zero, in which case $A_1$ is represented by the formula:

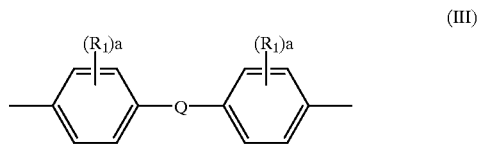

(III)

in which each $R_1$, each a, and Q are as discussed in respect of Formula II. Preferably the two free bonds are both in the ortho or para positions. The para positions are especially preferred.

The dihydroxy aromatic-containing compounds from which $A_1$ is derived may also be polyether-functional chain extended compounds. Examples of such compounds include alkine oxide extended bisphenols. Typically the alkaline oxide employed is ethylene oxide, propylene oxide, or mixtures thereof. By way of exemplification, when para, para-bisphenols are chain extended with ethylene oxide, the bivalent radical $A_1$ may often be resented by the formula:

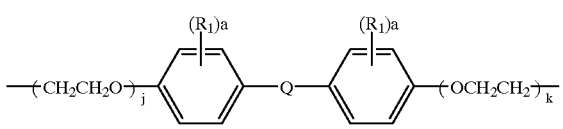

(IV)

where each $R_1$, each a, and Q are as discussed in respect of Formula II, and the average values of j and k are each independently in the range of from about 1 to about 4.

A preferred aromatic-containing bis(allyl carbonate)-functional monomer is represented by the formula:

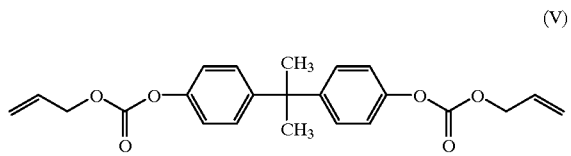

(V)

and is commonly known as bisphenol A bis(allyl carbonate).

A wide variety of compounds may be used as the polyethylenic functional monomer containing two or three ethylenically unsaturated groups. A preferred polyethylenic functional compound containing two or three ethylenically unsaturated groups may be generally described as the acrylic acid esters and the methacrylic acid esters of aliphatic polyhydric alcohols, such as, for example, the di- and triacrylates and the di- and trimethacrylates of ethylene glycol, triethylene glycol, tetraethylene glycol, tetramethylene glycol, glycerol, diethyleneglycol, butyleneglycol, propyleneglycol, pentanediol, hexanediol, trimethylolpropane, and tripropyleneglycol. Examples of specific suitable polyethylenic—functional monomers containing two or three ethylenically unsaturated groups include trimethylolpropanetriacrylate (TMPTA), tetraethylene glycol diacrylate (TTEGDA), tripropylene glycol diacrylate (TRPGDA), 1,6 hexanedioldimethacrylate (HDDMA), and hexanedioldiacrylate (HDDA).

In general, a photoinitiator for initiating the polymerization of the lens forming composition preferably exhibits an absorption spectrum over the 300–400 nm range. High absorptivity of a photoinitiator in this range, however, is not desirable, especially when casting a thick lens. The following are examples of illustrative photoinitiator compounds: methyl benzoylformate, 2-hydroxy-2-methyl-1-phenylpropan-1-one, 1-hydroxycyclohexyl phenyl ketone, 2,2-di-sec-butoxyacetophenone, 2,2-diethoxyacetophenone, 2,2-diethoxy-2-phenyl-acetophenone, 2,2-dimethoxy-2-phenyl-acetophenone, benzoin methyl ether, benzoin isobutyl ether, benzoin, benzil, benzyl disulfide, 2,4-dihydroxybenzophenone, benzylideneacetophenone, benzophenone and acetophenone. Preferred photoinitiator compounds are 1-hydroxycyclohexyl phenyl ketone (which is commercially available from Ciba-Geigy as Irgacure 184), methyl benzoylformate (which is commercially available from Polysciences, Inc.), or mixtures thereof.

Methyl benzoylformate is a generally preferred photoinitiator because it tends to provide a slower rate of polymerization. The slower rate of polymerization tends to prevent excessive heat buildup (and resultant cracking of the lens) during polymerization. In addition, it is relatively easy to mix liquid methyl benzoylformate (which is liquid at ambient temperatures) with many acrylates, diacrylates, and allyl carbonate compounds to form a lens forming composition.

The lenses produced with the methyl benzoylformate photoinitiator tend to exhibit more favorable stress patterns and uniformity.

A strongly absorbing photoinitiator will absorb most of the incident light in the first millimeter of lens thickness, causing rapid polymerization in that region. The remaining light will produce a much lower rate of polymerization below this depth and will result in a lens that has visible distortions. An ideal photoinitiator will exhibit high activity, but will have a lower extinction coefficient in the useful range. A lower extinction coefficient of photoinitiators at longer wavelengths tends to allow the activating light to penetrate deeper into the reaction system. This deeper penetration of the activating light allows photoinitiator radicals to form uniformly throughout the sample and provide excellent overall cure. Since the sample may be irradiated from both top and bottom, a system in which appreciable activating light reaches the center of the thickest portion of the lens is preferred. The photoinitiator solubility and compatibility with the monomer system is also an important requirement.

An additional consideration is the effect of the photoinitiator fragments in the finished polymer. Some photoinitiators generate fragments that impart a yellow color to the finished lens. Although such lenses actually absorb very little visible light, they may be cosmetically undesirable.

Photoinitiators are often very system specific so that photoinitiators that are efficient in one system may function poorly in another. In addition, the initiator concentration, to a large extent, may be dependent on the incident light intensity and the monomer composition. The identity of the initiator and its concentration may be important for any particular formulation. A concentration of initiator that is too high may lead to cracking and yellowing of the lens. Concentrations of initiator that are too low may lead to incomplete polymerization and a soft material.

Dyes and/or pigments are optional materials that may be present when high transmission of light is not necessary.

The listing of optional ingredients discussed above is by no means exhaustive. These and other ingredients may be employed in their customary amounts for their customary purposes so long as they do not seriously interfere with good polymer formulating practice.

1. Activating Light Curable Lens Forming Compositions

According to a preferred embodiment, a lens forming composition that may be cured with activating light includes an aromatic-containing bis(allyl carbonate) functional monomer, preferably bisphenol A bis(allyl carbonate), admixed with one or more faster reacting polyethylenic functional monomers containing two acrylate or methacrylate groups such as 1,6 hexanediol dimethacrylate (HDDMA), 1,6 hexanediol diacrylate (HDDA), tetraethylene glycol diacrylate (TTEGDA), and tripropylene glycol diacrylate (TRPGDA) and optionally a polyethylenic functional monomer containing three acrylate groups such as trimethylolpropane triacrylate (TMPTA). Generally, compounds containing acrylate groups polymerize much faster than those containing allyl groups.

According to one embodiment, the liquid lens forming composition includes bisphenol A bis(allyl carbonate) in place of DEG-BAC. The bisphenol A bis(allyl-carbonate) monomer has a higher refractive index than DEG-BAC making it more suitable for the production of thinner lenses, which may be important with relatively thick positive or negative lenses. The bisphenol A bis(allyl-carbonate) monomer is commercially available from PPG Industries under the trade name HIRII or CR-73. Lenses made from this product sometimes have a very slight, barely detectable, degree of yellowing. A small amount of a blue dye consisting of 9,10-anthracenedione, 1-hydroxy-4-[(4-methylphenyl)amino] available as Thermoplast Blue 684 from BASF Wyandotte Corp. is preferably added to the composition to counteract the yellowing. In addition, the yellowing tends to disappear if the lens is subjected to the above-described post-cure heat treatment. Moreover, if not post-cured the yellowing tends to disappear at ambient temperature after approximately 2 months.

TTEGDA, available from Sartomer and Radcure, is a diacrylate monomer that preferably, is included in the composition because it is a fast polymerizing monomer that reduces yellowing and yields a very clear product. If too much TTEGDA is included in the more preferred composition, i.e., greater than about 25% by weight, however, the finished lens may be prone to cracking and may be too flexible as this material softens at temperatures above 40° C. If TTEGDA is excluded altogether, the finished lens may be too brittle.

HDDMA, available from Sartomer, is a dimethacrylate monomer that has a very stiff backbone between the two methacrylate groups. HDDMA, preferably, is included in the composition because it yields a stiffer polymer and increases the hardness and strength of the finished lens. This material is quite compatible with the bisphenol A bis(allyl carbonate) monomer. HDDMA contributes to high temperature stiffness, polymer clarity and speed of polymerization.

TRPGDA, available from Sartomer and Radcure, is a diacrylate monomer that, preferably, is included in the composition because it provides good strength and hardness without adding brittleness to the finished lens. This material is also stiffer than TTEGDA.

TMPTA, available from Sartomer and Radcure, is a triacrylate monomer that, preferably, is included in the composition because it provides more crosslinking in the finished lens than the difunctional monomers. TMPTA has a shorter backbone than TTEGDA and increases the high temperature stiffness and hardness of the finished lens. Moreover, this material contributes to the prevention of optical distortions in the finished lens. TMPTA also contributes to high shrinkage during polymerization. The inclusion of too much of this material in the more preferred composition may make the finished lens too brittle.

Certain of the monomers that are preferably utilized, such as TTEGDA, TRPGDA and TMPTA, include impurities and have a yellow color in certain of their commercially available forms. The yellow color of these monomers is preferably reduced or removed by passing them through a column of alumina (basic) which includes aluminum oxide powder—basic. After passage through the alumina column differences between monomers obtained from different sources may be substantially eliminated. It is preferred, however, that the monomers be obtained from a source which provides the monomers with the least amount of impurities contained therein. The composition is preferably filtered prior to polymerization thereof to remove suspended particles.

2. Lens Forming Compositions Including Ultraviolet/Visible Light Absorbing Materials Materials that absorb various degrees of ultraviolet/visible light may be used in an eyeglass lens to inhibit ultraviolet/visible light from being transmitted through the eyeglass lens. The phrase "ultraviolet/visible light" is taken to mean light having a wavelength in the ultraviolet light range or both the ultraviolet and visible light ranges. The phrase "ultraviolet/visible light absorbing compounds" refers to compounds which absorb ultraviolet/visible light. An eyeglass lens that includes ultraviolet/visible light absorbing compounds advantageously inhibits ultraviolet/visible light from being transmitted to the eye of a user wearing the lens. Thus, eyeglass lenses containing ultraviolet/visible light absorbing compounds may function to protect the eyes of a person from damaging ultraviolet/visible light. Photochromic pigments are one type of ultraviolet/visible light absorbing compounds. Photochromic inorganic lenses which contain silver halide particles or cuprous halide particles suspended throughout the body of the lens are well known and have been commercially available for decades. Such inorganic lenses, however, suffer the disadvantage of being relatively heavy and less comfortable to the wearer when compared to organic lenses. Consequently, the majority of the eyeglass lenses produced today are typically formed from organic materials rather than inorganic materials. Accordingly, photochromic plastic eyeglass lenses have been the subject of considerable attention in recent years.

Efforts to provide a plastic eyeglass lens which demonstrates photochromic performance have primarily centered around permeating and/or covering the surface(s) of an already formed lens with photochromic pigments. This general technique may be accomplished by a number of specific methods. For example, (a) the lens may be soaked in a heated bath which contains photochromic pigments, (b) photochromic pigments may be transferred into the surface of a plastic lens via a solvent assisted transfer process, or (c) a coating containing photochromic pigments may be applied to the surface of a lens. A problem with such methods may be that the lens often might not absorb enough of the photochromic pigments at low temperatures, resulting in an eyeglass lens which does not exhibit acceptable photochromic performance. Unfortunately, increasing the temperature used during absorption of the photochromic pigments may not be a solution to this problem since at high temperatures degradation of the polymer contained within the lens may occur.

Attempts have also been made to incorporate photochromic pigments into the liquid monomer from which plastic lenses are thermally polymerized. See U.S. Pat. No. 4,913,544 to Rickwood et al., wherein it is disclosed that triethyleneglycol dimethacrylate monomer was combined with 0.2% by weight of various spiro-oxazine compounds and 0.1% benzoyl peroxide and subsequently thermally polymerized to form non-prescription eyeglass lenses. Generally, efforts to incorporate photochromic pigments into the liquid monomer from which the lenses are polymerized have been unsuccessful. It is believed that the organic peroxide catalysts utilized to initiate the thermal polymerization reaction tend to damage the photochromic pigments, impairing their photochromic response.

Curing of an eyeglass lens using activating light to initiate the polymerization of a lens forming composition generally requires that the composition exhibit a high degree of activating light transmissibility so that the activating radiation may penetrate to the deeper regions of the lens cavity. Otherwise the resulting cast lens may possess optical aberrations and distortions. The cast lens may also contain layers of cured material in the regions closest to the transparent mold faces, sandwiching inner layers which are either incompletely cured, gelled, barely gelled, or even liquid Often, when even small amounts of ultraviolet/visible light absorbing compounds of the types well known in the art are added to a normally light curable lens forming composition, substantially the entire amount of lens forming composition contained within the lens cavity may remain liquid in the presence of activating light.

Photochromic pigments which have utility for photochromic eyeglass lenses absorb ultraviolet light strongly and change from an unactivated state to an activated state when exposed to ultraviolet light. The presence of photochromic pigments, as well as other ultraviolet/visible light absorbing compounds within a lens forming composition, generally does not permit enough activating radiation to penetrate into the depths of the lens cavity sufficient to cause photoinitiators to break down and initiate polymerization of the lens forming composition. Thus, it may be difficult to cure a lens forming composition containing ultraviolet/visible light absorbing compounds using activating light (e.g., if the activating light has a wavelength in the ultraviolet or visible region). It is therefore desirable to provide a method for using activating light to initiate polymerization of an eyeglass lens forming monomer which contains ultraviolet/visible light absorbing compounds, in spite of the high activating light absorption characteristics of the ultraviolet/visible light absorbing compounds. Examples of such ultraviolet/visible light absorbing compounds other than photochromic pigments are fixed dyes and colorless additives.

In an embodiment, an ophthalmic eyeglass lens may be made from a lens forming composition comprising a monomer, an ultraviolet/visible light absorbing compound, a photoinitiator, and a co-initiator. Herein, an "ophthalmic eyeglass lens" is taken to mean any plastic eyeglass lens, including a prescription lens, a non-prescription lens, a progressive lens, a sunglass lens, and a bifocal lens. The lens forming composition, in liquid form, is preferably placed in a mold cavity defined by a first mold member and a second mold member. It is believed that activating light which is directed toward the mold members to activate the photoinitiator causes the photoinitiator to form a polymer chain radical. The polymer chain radical preferably reacts with the co-initiator more readily than with the monomer. The co-initiator may react with a fragment or an active species of either the photoinitiator or the polymer chain radical to produce a monomer initiating species in the regions of the lens cavity where the level of activating light may be either relatively low or not present.

Preferably, the monomers selected as components of the lens forming composition are capable of dissolving the ultraviolet/visible light absorbing compounds added to them. Herein, "dissolving" is taken to mean being substantially homogeneously mixed with. For example, monomers may be selected from a group including polyether (allyl carbonate) monomers, multi-functional acrylate monomers, and multi-functional methacrylic monomers for use in an ultraviolet/visible light absorbing lens forming composition.

In an embodiment, the following mixture of monomers, hereinafter referred to as PRO-629, may be blended together before addition of other components required to make the lens forming composition. This blend of monomers is preferably used as the basis for a lens forming composition to which ultraviolet/visible light absorbing compounds are added.

32% Tripropyleneglycol diacrylate (SR-306)

21% Tetraethyleneglycol diacrylate (SR-268)

20% Trimethylolpropane triacrylate (SR-351)

17% Bisphenol A bis allyl carbonate (HiRi)

10% Hexanediol dimethacrylate (SR-239)

The acrylic and methacrylic monomers listed above are commercially available from Sartomer Company in Exton, Pennsylvania The bisphenol A bis allyl carbonate is commercially available from PPG in Pittsburgh, Pa. The hexanediol dimethacrylate is hereinafter referred to as HDDMA.

A polymerization inhibitor may be added to the monomer mixture at relatively low levels to inhibit polymerization of the monomer at inappropriate times (e.g., during storage). Preferably about 0 to 50 ppm of monomethylether hydroquinone (MEHQ) are added to the monomer mixture. It is also preferred that the acidity of the monomer mixture be as low as possible. Preferably less than about 100 ppm residual acrylic acid exists in the mixture. It is also preferred that the water content of the monomer mixture be relatively low, preferably less than about 0.15%.

Photoinitiators include: 1-hydroxycyclohexyiphenyl ketone commercially available from Ciba Additives under the trade name of Irgacure 184; mixtures of bis(2,6-dimethoxybenzoyl)-(2,4,4-trimethylpentyl)phosphine oxide and 2-hydroxy-2-methyl-1 phenyl-propan-1-one commercially available from Ciba Additives under the trade name of Irgacure 1700: mixtures of bis(2,6-dimethoxybenzoyl)-(2, 4,4 trimethylpentyl)phosphine oxide and 1-hydroxycyclohexylphenyl ketone commercially available from Ciba Additives under the trade names of Irgacure 1800 and Irgacure 1850: 2,2-dimethoxy-2-phenyl acetophenone commercially available Cram Ciba Additives under the trade name of Irgacure 651; 2-hydroxy-2-methyl-1-phenyl-propan-1-one commercially available from Ciba Additives under the trade names of Darocur 1173: mixtures of 2,4,6-trimethylbenzoyl-diphenylphoshinc oxide and 2-hydroxy-2-methyl-1-phenyl-propan-1-one commercially available from Ciba Additives under the trade name of Darocur 4265; 2,2-diethoxyacetophenOne (DEAP) commercially available from First Chemical Corporation of Pascagoula, Miss., benzil dimethyl ketal commercially available from Sartomer Company under the trade name of KB-1; alpha hydroxy ketone commercially available from Sartomer company under the trade name of Esacure KIP100F; 2-methyl thioxanthone (MTX), 2-chloro thioxanthone (CTX), thioxanthone (TX), and xanthone, all commercially available from Aldrich Chemical; 2-isopropyl thioxanthone (ITX) commercially available from Aceto Chemical in Flushing, N.Y.; mixtures of triaryl sulfonium hexafluoroantimonate and propylene carbonate commercially available from Sartomcr Company under the trade names of SarCat CD 1010, SarCat 1011, and SarCat K85; diaryl iodonium hexafluoroantimonate commercially available from Sartomer Company under the trade name of SarCat CD-1012; mixtures of benzophenone and 1-hydroxycyclohexylphenyl ketone commercially available from Ciba Additives under the trade name of Irgacure 500; 2-benzyl-2-N,N-dimethylamino-1-(4-morpholinophenyl)-1-butanone commercially available from Ciba Additives under the trade name of Irgacure 369; 2-methyl-1-[14-( methylthio)phenyl]-2-morpholino propan-1-one commercially available from Ciba Additives under the trade name of Irgacure 907: bis($\eta$5-2,4-cyclopentadien-1 yl)-bis-[2,6-difluoro-3-(1H-pyrrol-1-yl) phenyl]titanium commercially available from Ciba Additives under the trade name of Irgacure 784 DC: mixtures of 2,4,6-trimethyl benzophenone and 4-methylbenzophenone commercially available from Sartomer Company under the trade name of EsaCure TZT; and benzoyl peroxide and methyl benzoyl formate both available from Aldrich Chemical in Milwaukee, Wis.

A preferred photoinitiator is bis(2,6-dimethoxybenzoyl) (2,4,4 trimethyl phenyl) phosphine oxide, commercially available from Ciba Additives in Tarrytown, N.Y. under the trade name of CGI-819. The amount of CGI-819 present in a lens forming composition containing photochromic compounds preferably ranges from about 30 ppm by weight to about 2000 ppm by weight.

Co-initiators include reactive amine co-initiators commercially available from Sartomer Company under the trade names of CN-381, CN-383, CN-384, and CN-386, where these co-initiators are monoacrylic amines, diacrylic amines, or mixtures thereof. Other co-initiators include N-methyldiethanolamine (NMDEA), triethanolamine (TEA), ethyl-4-dimethylaminobenzoate (E-4-DMAB), ethyl-2-dimethylaminobenzoate (E-2-DMAB), all commercially available from Aldrich Chemicals. Co-initiators which may also be used include n-butoxyethyl-4-dimethylamino benzoate, p-dimethyl amino benzaldehyde. Other co-initiators include N,N-dimethyl-p-toluidine, octyl-p-(dimethylamino) benzoate commercially available from The First Chemical Group of Pascagoula, Miss.

Preferably, the co-initiator is N-methyldiethanolamine (NMDEA) commercially available from Aldrich Chemical in Milwaukee, Wis., CN-384 commercially available from Sartomer Company, or CN-386 also commercially available from Sartomer Company. The quantity of NMDEA present in a lens forming composition containing photochromic pigments is preferably between about 1 ppm by weight and 7% by weight and more preferably between about 0.3% and 2% by weight. Further, certain fixed pigments which may be added to the lens forming composition to create a background color within the lens (i.e., to tint the lens), may also function as co-initiators. Examples of such fixed pigments include Thermoplast Blue P, Oil Soluble Blue II, Thermoplast Red 454, Thermoplast Yellow 104, Zapon Brown 286, Zapon Brown 287, all commercially available from BASF Corporation in Holland, Mich.

Ultraviolet/visible light absorbing compounds which may be added to a normally ultraviolet/visible light transmissible lens forming composition include 2-(2H benzotriazole-2-yl)-4-(1,1,3,3 tetramethylbutyl)phenol and 2-hydroxy-4-methoxybenzophenone, both commercially available from Aldrich Chemical as well as mixtures of 2-[4-((2-hydroxy-3-dodecyloxypropyl)-oxy)-2-hydroxyphenyl]-4,6-bis(2,4-dimethylphenyl)-1,3,5-triazine and 2-[4-((2-hydroxy-3-tridecyloxypropyl)-oxy)-2-hydroxyphenyl]-4,6-bis(2,4-dimethylphenyl-1,3,5-triazine commercially available from Ciba Additives under the trade name of Tinuvin 400, mixtures of poly(oxy-1,2-ethanediyl), $\alpha$-(3-(3-(2H-benzotriazol-2-yl)-5-(1,1-dimethylethyl)-4-hydroxyphenyl)-1-oxopropyl)-$\omega$-hydroxpoly(oxy-1,2-ethanediyl), $\alpha$-(3-(3-(2H-benzotriazol-2-yl)-5-(1,1-dimethylethyl)-4-hydroxyphenyl)-1-oxopropyl)-$\omega$-(3-(3-(2H-benzotriazol-2-yl)-5-1,1-dimethylethyl)-4-hydroxyphenyl)-1-oxopropoxy)poly(oxy-1,2-ethanediyl) commercially available from Ciba Additives under the trade name of Tinuvin 1130. Other ultraviolet/visible light absorbers may include Tinuvin 328, Tinuvin 900, 2-(2 hydroxy-5-methyl-phenyl) benzotriazole, ethyl-2-cyano 3,3-diphenyl acrylate, and phenyl salicylate.

While any number of families of photochromic pigments may be incorporated into the blend of monomers, either individually or in combination, spiropyrans, spironaphthoxazines, spiropyridobenzoxazines, spirobenzoxazines, napthopyrans, benzopyrans, spirooxazines, spironapthopyrans, indolinospironapthoxazines, indolinospironapthopyrans, diarylnapthopyrans, and organometallic materials are of particular interest. A phenylmercury compound available from Marks Polarized Corporation in Hauppauge, N.Y. under the trade name of A241 may be an appropriate organometallic material. The quantity of photochromic pigments present in the lens forming composition is preferably sufficient to provide observable photochromic effect. The amount of photochromic pigments present in the lens forming composition may widely range from about 1 ppm by weight to 5% by weight. In preferred compositions, the photochromic pigments are present in ranges from about 30 ppm to 2000 ppm. In the more preferred compositions, the photochromic pigments are present in ranges from about 150 ppm to 1000 ppm. The concentration may be adjusted depending upon the thickness of the lens being produced to obtain optimal visible light absorption characteristics.

In an embodiment, hindered amine light stabilizers may be added to the lens forming composition. It is believed that these materials act to reduce the rate of degradation of the cured polymer caused by exposure to ultraviolet light by deactivating harmful polymer radicals. These compounds may be effective in terminating oxygen and carbon free radicals, and thus interfering with the different stages of auto-oxidation and photo-degradation. A useful hindered amine light stabilizer is bis(1,2,2,6,6-pentamethyl-4-piperidinyl)-sebacate commercially available from Ciba Additives under the trade name of Tinuvin 292. Hindered phenolic anti-oxidants and thermal stabilizers may also be added to a lens forming composition. The hindered phenolic compounds hereof include thiodiethylene bis(3,5,-di-tert-butyl-4-hydroxy)hydroxycinnamate commercially available from Ciba Additives under the trade name of Irganox 1035 and octadecyl-3,5-bis(1,1-dimethylethyl)-4-hydroxybenzene-propanoate commercially available from Ciba Additives under the trade name of Irganox 1076.

Preferably, more than one monomer and more than one initiator are used in a lens forming composition to ensure that the initial polymerization of the lens forming composition with activating light does not occur over too short a period of time. The use of such a lens forming composition may allow greater control over the gel formation, resulting in better control of the optical quality of the lens. Further, greater control over the rate of exothermic heat generation may be achieved. Thus, cracking of the lens and premature release of the lens from the mold which are typically caused by the release of heat may be prevented. An example of a poor initiator system was observed when CGI-819 was used alone as a photoinitiator in combination with the PRO-629 monomer blend to which ultraviolet/visible light absorbing compounds had been added. When such an initiator system was used, a fast rate of reaction occurred near the surface of the lens cavity while a very slow rate of reaction occurred in the deeper regions of the cavity. The resultant lens exhibited unwanted waves and distortions.

In another example, a small amount of a co-initiator, i.e., NMDEA was added to the above lens forming composition. During the curing process, two separate waves of heat were generated when the composition was irradiated continuously with activating light at about 600 microwatts/cm$^2$. One possible explanation for this phenomena is that the first wave resulted from reaction of the NMDEA and the second wave resulted from the reaction of the unconsumed portion of the CGI-819. Another possible explanation is that the rate of reaction was faster in the top portion than in the bottom portion of the lens forming composition since activating light was separately directed toward both the bottom and the top mold members. A third wave of heat generation may also occur if the rate of reaction at the middle portion of the lens forming composition is different from the rates at the bottom and top portions. Unfortunately, the resulting lens possessed waves and distortions. It is postulated, however, that as the amounts of both CGI-819 and NMDEA are increased, the two waves of exothermic heat will move closer together in time, causing the optical quality of the lens to improve, the hardness of the lens to increase, and the rate of heat generation to be slow enough to prevent cracking and premature release of the lens from the mold.

It is anticipated that the optimal amount of initiators may be achieved when the total amount of both initiators are minimized subject to the constraint of complete polymerization and production of a rigid, aberration free lens. The relative proportions of the photoinitiator to the co-initiator may be optimized by experimentation. For example, an ultraviolet/visible light absorptive lens forming composition that includes a photoinitiator with no co-initiator may be cured. If waves and distortions are observed in the resulting lens, a co-initiator may then be added to the lens forming composition by increasing amounts until a lens having the best optical properties is formed. It is anticipated that excess co-initiator in the lens forming composition should be avoided to inhibit problems of too rapid polymerization, yellowing of the lens, and migration of residual, unreacted co-initiator to the surface of the finished lens.

The following charts may be used as a guide in the selection of an appropriate photoinitiator/co-initiator system for various ultraviolet/visible light absorbing lens forming compositions.

Co-initiator Guide

| Co-initiator | Lens Forming Composition Type | | |
|---|---|---|---|
| | UV Absorptive Photochromic | UV Absorptive Fixed Pigments | UV Absorptive Colorless |
| CN-383 | | Good | |
| CN-384 | Good | Good | Good |
| CN-386 | Good | Good | Good |
| NMDEA | Good | Good | Good |
| N,NMDEA | Less Preferred | Less Preferred | |
| TEA | Less Preferred | Less Preferred | |
| E-4-DMAB | Good | Less Preferred | Less Preferred |
| E-2-DMAB | | Less Preferred | Less Preferred |

As mentioned above, exothermic reactions occur during the curing process of the lens forming composition. The thicker portions of the lens forming composition may generate more heat than the thinner portions of the composition as a result of the exothermic reactions taking place. It is believed that the speed of reaction in the thicker sections is slower than in the thinner sections. Thus, in a positive lens a "donut effect" may occur in which the relatively thin outer portion of the lens forming composition reaches its fully cured state before the relatively thick inner portion of the lens forming composition. Conversely, in a negative lens the Photoinitiator Guide

| Photoinitiator | Yellowness | Odor | Shelf Life | Lens Forming Composition Type | | |
|---|---|---|---|---|---|---|
| | | | | UV Absorptive Photochromic | UV Absorptive Fixed Pigments | UV Absorptive Colorless |
| CGI 819 | Moderate | Low | Good | Good | Good | Good |
| Irgacure 184 | Low | Low | Good | Good | Good | Good |
| Irgacure 651 | High | Low | Poor | Less Preferred | Good | Less Preferred |
| Irgacure 1700 | High | Low | Fair | Good | Good | Less Preferred |
| Irgacure 1800 | Moderate | Low | Good | Good | Good | Less Preferred |
| Irgacure 1850 | Moderate | Low | Good | Good | Good | Good |
| Darocur 1173 | High | Low | Good | Good | Good | Less Preferred |
| Darocur 4265 | High | Moderate | Fair | Good | Good | Less Preferred |
| DEAP | High | Strong | Poor | Less Preferred | Less Preferred | Less Preferred |
| KB-1 | High | Strong | Poor | Less Preferred | Less Preferred | Less Preferred |
| EsaCure KIP100F | High | Strong | Poor | Less Preferred | Less Preferred | Less Preferred |
| Irgacure 369 | High | Moderate | Poor | Less Preferred | Good | Less Preferred |
| Irgacure 500 | High | Strong | Poor | Less Preferred | Less Preferred | Less Preferred |
| Irgacure 784 DC | High | Low | Poor | Less Preferred | Less Preferred | Less Preferred |
| Irgacure 907 | High | Strong | Poor | Less Preferred | Less Preferred | Less Preferred |
| Benzoyl peroxide | Moderate | Low | Poor | Less Preferred | Less Preferred | Less Preferred |
| Methyl benzoyl formate | Moderate | Low | Fair | Less Preferred | Less Preferred | Less Preferred |
| EsaCure TZT | High | Low | Poor | Less Preferred | Less Preferred | Less Preferred |
| ITX | High | Low | Poor | Less Preferred | Good | Good |
| MTX | High | Low | Poor | Less Preferred | Good | Good |
| CTX | High | Low | Poor | Less Preferred | Less Preferred | Less Preferred |
| TX | High | Low | Poor | Less Preferred | Less Preferred | Less Preferred |
| Xanthone | High | Low | Poor | Less Preferred | Less Preferred | Less Preferred |
| CD-1010 | Low | Low | Poor | Good | Less Preferred | Less Preferred |
| CD-1011 | Low | Low | Poor | Good | Less Preferred | Less Preferred |
| CD1012 | Low | Low | Poor | Good | Good | Good | relatively thin inner portion of the lens forming composition may reach its fully cured state before the relatively thick outer portion of the lens forming composition.

An eyeglass lens formed using the above described lens forming composition may be applicable for use as a prescription lens or for a non-prescription lens. Particularly, such a lens may be used in sunglasses. Advantageously, photochromic sunglass lenses would remain light enough in color to allow a user to see through them clearly while at the same time prohibiting ultraviolet light from passing through the lenses. In one embodiment, a background dye may be added to the photochromic lens to make the lens appear to be a dark shade of color at all times like typical sunglasses.

3. Variable Color Photochromic Lens Forming Compositions

Photochromic compounds tend to absorb certain wavelengths of light strongly and change from a colorless state to a colored state. The "colorless state" of a photochromic compound is defined as the state in which the compound exhibits no color or only a slight amount of color. The "colored state" of a photochromic compound is defined as the state in which the photochromic compound exhibits a visible light color significantly stronger than the colorless state. A "photochromic activating light source" is defined as any light source that produces light having a wavelength which causes a photochromic compound to change from a colorless state to a colored state. "Photochromic activating light" is defined as light having a wavelength capable of causing a photochromic compound to change from a colorless state to a colored state. Photochromic activating light typically includes light having a wavelength from between about 200 nm to about 500 nm. A photochromic activating light source may also produce other wavelengths of light, besides photochromic activating light.

A photochromic compound which is transparent and normally colorless will, upon exposure to a photochromic activating light source (e.g., ultraviolet light), become colored and, therefore, less visible light transmissive. When removed from the photochromic activating light source, the photochromic substance tends to revert back to its colorless state. This may be represented by the following equation:

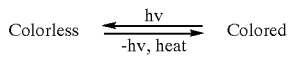

The colorless form is believed to be in equilibrium with the colored form. The equilibrium between the colorless form and the colored form may be controlled by the presence of photochromic activating light (represented by hv). If a photochromic compound is exposed to a photochromic activating light source, the equilibrium tends to shift toward the colored form of the photochromic compound. When the photochromic activating light source is removed, or reduced, or if the photochromic compound is heated, the equilibrium tends to shift back toward the colorless form of the photochromic compound. Photochromic compounds of this type may be particularly useful in eyeglass lenses. In the absence of photochromic activating light (e.g., when indoors) the glasses tend to remain colorless and light transmissive. When exposed to a photochromic activating light source (e.g., sunlight) the photochromic compounds become activated and colored, lowering the light transmittance of the lens. The term "activated color" is defined as the color which an eyeglass attains when photochromic compounds, which are included in the eyeglass lens, become activated and colored when exposed to a photochromic activating light source. In this manner, photochromic compounds may allow a single lens to be used as both an indoor lens and an outdoor lens.

When incorporated into transparent plastic lenses and activated by exposure to a photochromic activating light source, photochromic compounds tend to exhibit variety of colors (e.g., red, orange, yellow, green, blue, indigo, purple, violet, gray, and brown), causing the lens that the photochromic compounds are disposed within to exhibit the color of the photochromic compound. Thus, the activated color of a photochromic eyeglass lens may be controlled by the particular photochromic compounds dispersed within the eyeglass lens.

It is known that the activated color of a photochromic eyeglass lens may take on more neutral colors, such as brown or gray, by forming the eyeglass lens with two or more photochromic compounds present. U.S. Pat. No. 4,968,454 to Crano et. al., describes a composition which includes two photochromic compounds used to form plastic lenses. The formed plastic lenses exhibit a gray or brown color in the presence of a photochromic activating light source. Crano et al., describes the use of two or more organic photochromic compounds within a plastic lens. One of the organic photochromic compounds exhibits an absorption maximum in the range between about 590 nm to about 700 nm in the presence of a photochromic activating light source. The other organic photochromic compound exhibits an absorption maximum in the range between about 400 nm and less than about 500 nm. The ratios of the compounds may be varied to produce lenses which exhibit a variety of activated colors. Typically, either the ratios of the photochromic compounds or the specific photochromic compound used may be varied to effect a change in the activated color of the lens.

In an embodiment, a composition which includes two or more photochromic compounds may further include a light effector composition to produce a lens which exhibits an activated color which differs from an activated color produced by the photochromic compounds without the light effector composition. The light effector composition may include any compound which absorbs photochromic activating light Light effector compositions may include photoinitiators, non-photochromic ultraviolet/visible light absorbers (as defined above), non-photochromic dyes, and ultraviolet light stabilizers. In this manner, the activated color of a lens may be altered without altering the ratio and or composition of the photochromic compounds. This may be particularly important when large batches of lens forming compositions are prepared before use. If photochromic lenses which exhibit a variety of activated colors are to be produced, it is typically necessary to create a separate lens forming composition for each colored lens. By using a light effector composition, a single lens forming composition may be used as a base solution to which a light effector may be added in order to alter the activated color of the formed lens.

Figure 37:
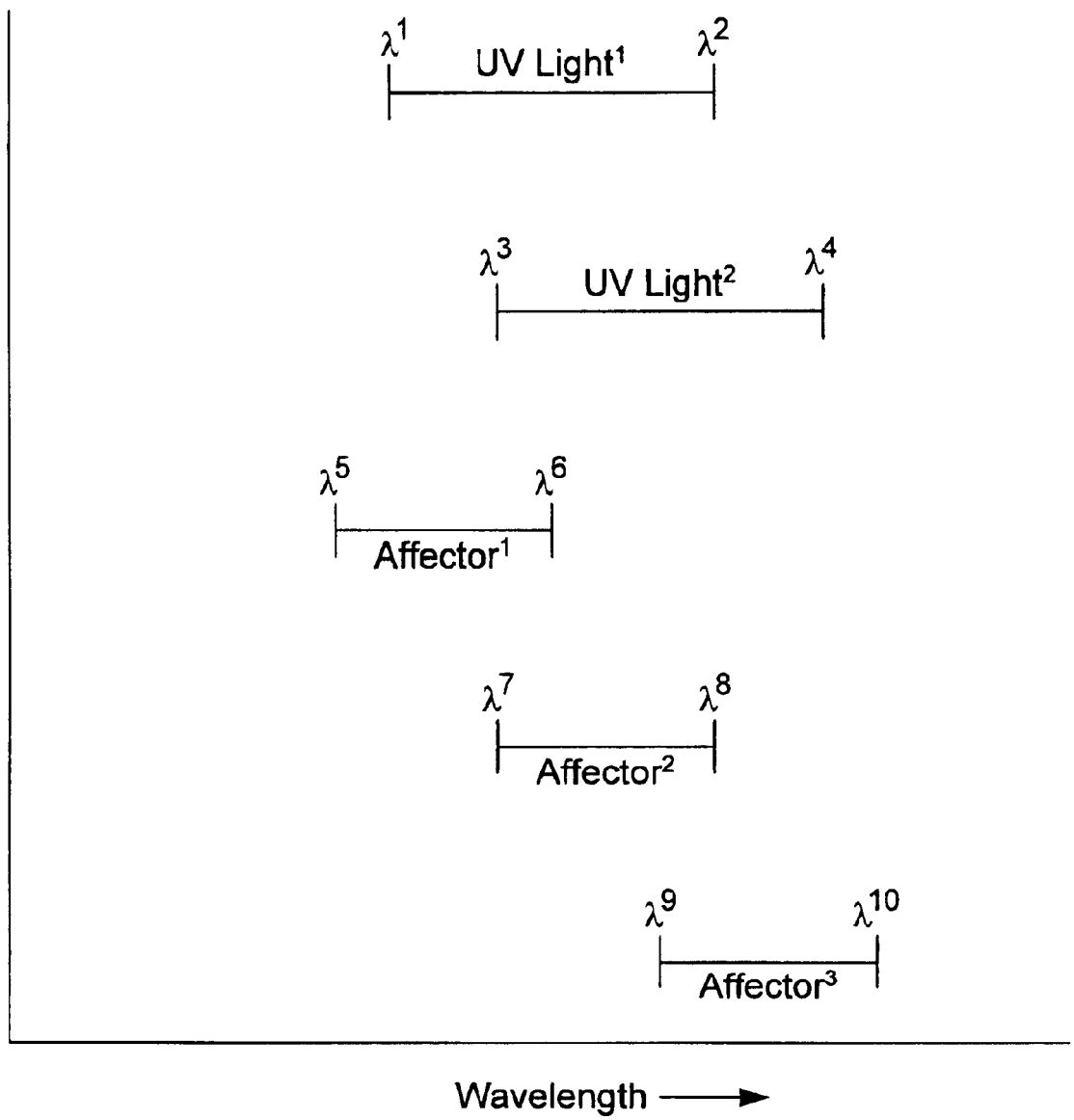
FIG. 37 depicts a graph showing the absorption ranges of a variety of photochromic compounds and light effectors.

The activated color of a photochromic lens may be determined by the visible light absorption of the photochromic compounds in their colored state. When two photochromic compounds are present, the equilibrium between the colored and the colorless forms may be represented by the following equations:

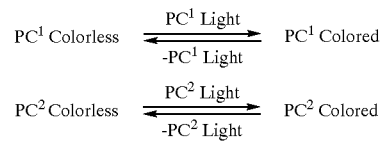

Where $PC^1$ Colorless represents the colorless form of the first photochromic compound; $PC^2$ Colorless represents the colorless form of the second photochromic compound; PC light$^1$ represents the wavelengths of light which cause $PC^1$ Colorless to shift its colored state ($PC^1$ Colored); PC light$^2$ represents the wavelengths of light which cause $PC^1$ Colorless to shift to its colored state ($PC^2$ Colored). As depicted in FIG. 37, the wavelength of light which may activate the photochromic compounds $PC^1$ and $PC^2$ may differ depending on the chemical structure of the photochromic compounds. PC light$^1$, which activates the first photochromic compound $PC^1$, has a wavelength in the range between about $\lambda^1$ and $\lambda^2$ nm. PC light$^2$, which activates the second photochromic compound, has a wavelength in the range between about $\lambda^3$ and $\lambda^4$ nm. These wavelength ranges may differ (as depicted in FIG. 37) or may be substantially the same.

The addition of a light effector composition which absorbs photochromic activating light may cause a change in the activated color of the formed lens. The change in activated color may be dependent on the range of photochromic activating light absorbed by the light effector composition. The addition of light effector compositions may have different effects on the activated color of the lens, depending on the absorbance of the light effector composition. In one embodiment, the light effector composition may interfere with the photochromic activity of the first photochromic compound ($PC^1$). As illustrated in the equations below, the presence of a light effector composition (Effector$^1$) may cause a shift in the equilibrium of $PC^1$ while having little or no effect on $PC^2$.

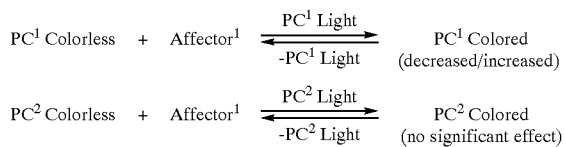

Such an effect may cause an increase or decrease in the concentration of $PC^1$ Colored produced when the lens is exposed to a photochromic activating light source. The equilibrium of the other photochromic compound $PC^2$ may not be significantly altered. Thus, the activated color of the lens may be significantly different than the activated color of a lens that does not include a light effector composition (Effector$^1$). In the above case, if the concentration of $PC^1$ Colored is, for example, decreased, the activated color of the lens may become shifted toward the activated color of $PC^2$. For example, if the activated color of a lens which includes $PC^1$ only is blue-green; with $PC^2$ only is red; and with both $PC^1$ and $PC^2$ is gray; the activated color of the lens may become more red (e.g., shift from gray to green, yellow, orange or red) if the concentration of $PC^1$ Colored is decreased. It is theorized that such an effector may have an absorbance in a region of light similar to the PC Light$^1$ region. The effector may interfere with the absorption of photochromic activating light by $PC^1$ by competing with $PC^1$ for the light $PC^2$ remains relatively unaffected by the light effector composition since its active photochromic activating light range differs significantly from the photochromic activating light range for $PC^1$. This is graphically illustrated in FIG. 37, where Effector$^1$ is depicted as having an absorption within the $PC^1$ Light$^1$ region. By competing with $PC^1$ for the photochromic activating light, Effector$^1$ may cause a decrease in the amount of $PC^1$ Colored being produced.

In another embodiment, a light effector may interact with both photochromic compounds, altering the amount of $PC^1$ colored and $PC^2$ colored produced. The equation below depicts this case:

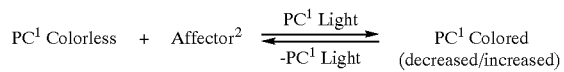

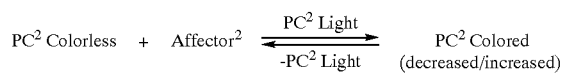

Such an effect may cause an increase or decrease in the concentration of both $PC^1$ Colored and $PC^2$ Colored produced when the lens is exposed to a photochromic activating light source. This change in the equilibrium may cause the activated color of the lens to be significantly different than the activated color of a lens that does not include a light effector composition. In the above case if the concentration of $PC^1$ Colored is, for example, decreased and the concentration of $PC^2$ Colored is, for example, increased, the activated color of the lens may become shifted toward the activated color of $PC^2$ colored. For example, if the activated color of a lens which includes $PC^1$ only is blue-green; with $PC^2$ only is red; and with both $PC^1$ and $PC^2$ is gray; the activated color of the lens may become more red in the presence of the light effector composition. The direction of the shift may depend on which photochromic compound is effected more by the presence of the light effector composition. It is theorized that the light effector composition (Effector$^2$) may have an absorbance in a region that significantly overlaps the PC Light$^1$ and PC Light$^1$ regions. The light effector composition interferes with the absorption of photochromic activating light by both $PC^1$ and $PC^2$ by competing with the compounds for light having the appropriate activating wavelength. If the light effector interferes with the photochromic light absorption of $PC^1$ to a greater extent then $PC^2$ the color may shift toward $PC^2$. Alternatively, the activated color may shift toward $PC^1$ if the light effector absorption interferes with the absorption of photochromic light by $PC^2$ to a greater extent than $PC^1$. In FIG. 37, Effector$^1$ is depicted as having an absorption within both the $PC^1$ and $PC^2$ absorption region.

In another embodiment, a light effector composition may interfere with the photochromic activity of the second photochromic compound ($PC^2$). As illustrated in the equations below, the presence of a light effector composition (Effector$^3$) may cause a shift in the equilibrium of $PC^2$ while having little or no effect on $PC^1$.

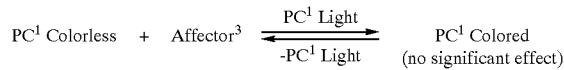

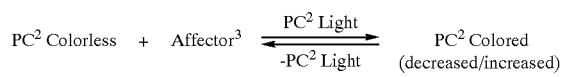

Such an effect may cause an increase or decrease in the concentration of $PC^2$ Colored produced when the lens is exposed to a photochromic activating light source. The equilibrium of the other photochromic compound $PC^1$ may not be significantly altered. In the above case, if the concentration of $PC^2$ Colored is, for example, decreased, the activated color of the lens may become shifted toward the activated color of $PC^1$. For example, if the activated color of a lens which includes $PC^1$ only is blue-green; with $PC^2$ only is red; and with both $PC^1$ and $PC^2$ is gray; the activated color of the lens may become more blue (e.g., shift from gray to green, green-blue, or blue) if the concentration of $PC^1$ Colored is decreased. It is theorized that such an effector may have an absorbance in a region of light similar to the PC $Light^2$ region. The effector may interfere with the absorption of photochromic activating light by $PC^2$ by competing with $PC^2$ for the light $PC^1$ remains relatively unaffected by the light effector composition since its active photochromic activating light range differs significantly from the photochromic activating light range for $PC^2$. This is graphically illustrated in FIG. 37, where $Effector^3$ is depicted as having an absorption within the PC $Light^2$ region. By competing with $PC^2$ for the photochromic activating light, $Effector^3$ may cause a decrease in the amount of $PC^2$ Colored being produced.

While the above examples relate to the use of two photochromic compounds, light effector compositions may be used to effect the activated color of a lens which includes more than two photochromic compounds. The color changes for these systems may be more varied than described above, due to the variety of ranges in which the photochromic compounds absorb the photochromic activating light. For example, if three photochromic compounds are present, with activated colors of red, blue and green, a variety of colors may be produced depending on the interaction of the light effector composition with the photochromic activating light. The light effector may absorb the photochromic activating light such that the concentration of the colored form of two of the three photochromic compounds is reduced. The formed lens would than exhibit a color which is closest to the activated color of the non-effected photochromic compound. In the above example, a lens with an activated color of substantially blue, red, or green may be obtained by the addition of a light effector. Alternatively, the light effector compound may reduce the concentration of the colored form of only one of the photochromic compounds. In the above example, the activated color of the lens may become yellow (from red and green, with reduced amount of blue), green-blue (from green and blue, with reduced amount of red) or purple (from red and blue, with reduced amount of green). A full spectrum of activated colors may be produced by changing the composition of the light effector composition, without having to alter the ratio or chemical composition of the photochromic compounds.

It should also be understood that the light effector composition may include one or more light effector compounds. The use of multiple light effector compounds may allow the activated color of the lens to be further altered.

In another embodiment, a photochromic activating light dye may be added to the lens forming composition to alter the activated color of a lens. The dye preferably exhibits a dye color when exposed to visible light. The dye color, however, is not significantly altered in the presence or absence of photochromic activating light. When mixed with a lens forming composition which includes at least one photochromic compound the dye may alter the activated color of the lens, as well as the color of the lens in the absence of photochromic activating light.

In one embodiment, the dye may interfere with the photochromic activity of a photochromic compound. The activated color of a lens formed without the dye would preferably change when the dye is added to the lens. The activated color of the lens may vary depending on the type of dye chosen. In one embodiment, the dye may interfere with the absorbance of photochromic activating light by the photochromic compound. This interference may lead to a reduced concentration of the colored form of the photochromic compound. The activated color of the lens may be a mixture of the dye color and the photochromic color. For example, if a dye is blue and the photochromic compound is red, the lens may take on a purple color (i.e., a combination of the two colors).

It should be understood that the activated color of the lens may be significantly different the an activated color of a lens in which the photochromic compound is unaffected by the dye. When the absorption of photochromic activating light by the photochromic compound is unaffected by the dye, the intensity of the colored form of the photochromic compound may not be reduced. Thus, the activated color of the lens is formed from a mixture of the dye color and the full intensity of the colored form of the photochromic compound. When the dye interferes with the photochromic activating light absorbance of the photochromic compound, the color of the lens is based on a combination of the dye and the reduced intensity of the colored form of the photochromic compound. The reduced intensity of the colored form of the photochromic compound may cause the lens to have a color that is substantially different from the color produced when the unaffected colored form of the photochromic compound is mixed with the dye.

While described above for one photochromic compound, it should be understood that the dye may have an effect on mixtures of photochromic compounds such that a full spectrum of colors may be achieved. The selection of the appropriate dye based on the photochromic compounds present allows the color of the lenses to be altered without changing the ratio of the photochromic compounds.

In an embodiment, a lens forming composition includes at least two photochromic compounds. The photochromic compounds are preferably chosen to that have an activated color at opposite ends of the visible spectrum (e.g., blue and red). In one embodiment, the photochromic compounds may be Reversacol Berry Red (giving a red activated color) and Reversacol Sea Green (giving a blue-green color). The appropriate mixture of these two photochromic compounds gives the formed lens an activated color of gray. The addition of effectors may cause the formed lens to have a wide variety of activated colors (e.g. red, orange, yellow, yellow green, green, aqua-green, blue, violet, purple, or brown). These changes in color may be accomplished without altering the ratio between the first and second photochromic compounds.

A lens forming composition based on the PRO-629 mixture of monomers may be used to develop photochromic lenses (See the section entitled "Lens Forming Compositions Including Ultraviolet/Visible Light Absorbing Materials"). The remainder of the lens forming composition preferably includes photoinitiators, co-initiators, photochromic compounds. The amount of photochromic pigments present in the lens forming composition may widely range from about 1 ppm by weight to 5% by weight. In preferred compositions, the photochromic pigments are present in ranges from about 30 ppm to 2000 ppm. In the more preferred compositions, the photochromic pigments are present in ranges from about 150 ppm to 1000 ppm. The concentration may be adjusted depending upon the thickness of the lens being produced to obtain optimal visible light absorption characteristics.

To alter the color of the active lens formed from this base composition a light effector composition may be added to the base composition. The light effector composition preferably includes one or more light effectors. The light effector composition may be a pure composition of one or more light effectors. Alternatively, the light effectors may be diluted in a solution which has a composition similar to the base composition. The light effectors preferably include photochromic activating light absorbing compounds. More preferably, non-photochromic photochromic activating light absorbing compounds are added to alter the activated color of the formed lens. Examples of light effectors include polymerization inhibitors (e.g., MEHQ), photoinitiators, co-initiators, fixed pigments and dyes, and hindered amine light stabilizers. All of these classes of compounds are described in greater detail in the previous section. After the light effector composition has been added, the amount of light effectors present in the lens forming composition may widely range from about 1 ppm by weight to 5% by weight. In preferred compositions, the light effectors are present in ranges from about 30 ppm to 2000 ppm. In the more preferred compositions, the light effectors are present in ranges from about 150 ppm to 1000 ppm. The concentration may be adjusted depending upon the thickness of the lens being produced to obtain optimal visible light absorption characteristics.

An advantage of the described composition is that the activated color of a lens may be altered without altering the ratio and or composition of the photochromic compounds. By using a light effector composition, a single lens forming composition may be used as a base composition to which a light effector composition may be added in order to alter the activated color of the formed lens. The base composition may be supplied for use in the production of a variety of photochromic lenses. Along with the base composition, a light effector composition, which includes one or more light effector compounds, may be included with the base composition. The light effector composition may be added to the base composition to alter the activated color of the formed lenses. In this manner, a single stock photochromic lens forming composition may be used to create photochromic lenses having a variety of activated colors.

In another embodiment, the base composition and at least two light effector compositions may be package together as a kit. The addition of the first light effector composition may alter the activated color of the formed lenses to produce a first color. The addition of the second light effector composition may alter the activated color of the formed lenses to produce a second color. Additional light effectors compositions may also be included with the kit. The kit may allow a user to produce lens forming compositions which may be used to produce lens having a variety of activated colors by the addition of the appropriate light effector composition to the base composition.

4. Mid-Index Lens Forming Composition

In an embodiment, an ophthalmic eyeglass lens may be made from a lens forming composition comprising a monomer composition and a photoinitiator composition.

The monomer composition preferably includes an aromatic containing polyethylenic polyether functional monomer. In an embodiment, the polyether employed is an ethylene oxide derived polyether, propylene oxide derived polyether, or mixtures thereof Preferably, the polyether is an ethylene oxide derived polyether. The aromatic polyether polyethylenic functional monomer preferably has the general structure (V), depicted below where each $R_2$ is a polymerizable unsatuated group, m and n are independently 1 or 2, and the average values of j and k are each independently in the range of from about 1 to about 20. Common polymerizable unsaturated groups include vinyl, allyl, allyl carbonate, methacrylyl, acrylyl, methacrylate, and acrylate.

$A_f$ is the divalent radical derived from a dihydroxy aromatic-containing material. A subclass of the divalent radical $A_f$ which is of particular usefulness is represented by formula (II):

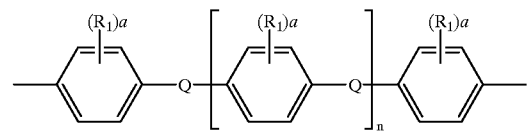

(II)

in which each $R_1$ is independently alkyl containing from 1 to about 4 carbon atoms, phenyl, or halo; the average value of each (a) is independently in the range of from 0 to 4; each Q is independently oxy, sulfonyl, alkanediyl having from 2 to about 4 carbon atoms, or alkylidene having from 1 to about 4 carbon atoms; and the average value of n is in the range of from 0 to about 3. Preferably Q is methylethylidene, viz., isopropylidene.

Preferably the value of n is zero, in which case $A_f$ is represented by formula (III):

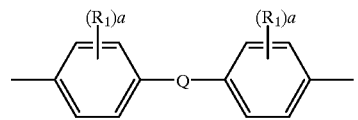

(III)

in which each $R_1$, each a, and Q are as discussed with respect to Formula II. Preferably the two free bonds are both in the ortho or para positions. The para positions are especially preferred.

In an embodiment, when para, para-bisphenols are chain extended with ethylene oxide, the central portion of the aromatic containing polyethylenic polyether functional monomer may be represented by the formula:

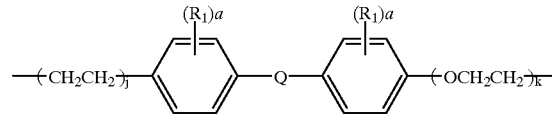

(IV)

where each $R_1$, each a, and Q are as discussed with respect to Formula II, and the average values of j and k are each independently in the range of from about 1 to about 20.

In another embodiment, the polyethylenic functional monomer is an aromatic polyether polyethylenic functional monomer containing at least one group selected from acrylyl or methacrylyl. Preferably the aromatic polyether polyethylenic functional monomer containing at least one group selected from acrylate and methacrylate has the general structure (VI), depicted below where $R_0$ is hydrogen or methyl, where each $R_1$, each a, and Q are as discussed with respect to Formula II, where the values of j and k are each independently in the range of from about 1 to about 20, and where $R_2$ is a polymerizable unsaturated group (e.g., vinyl, allyl, allyl carbonate, methacrylyl, acrylyl, methacrylate, or acrylate).

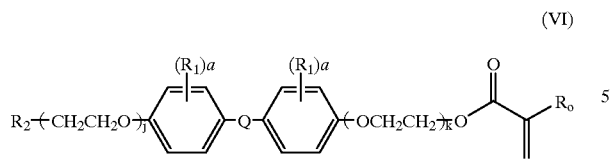

(VI)

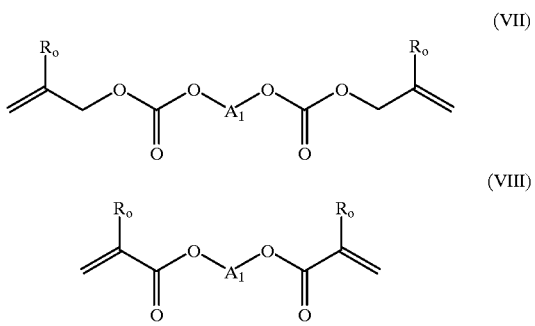

(VII)

(VIII)

In one embodiment, the aromatic containing polyether polyethylenic functional monomer is preferably an ethoxylated bisphenol A di(meth)acrylate. Ethoxylated bisphenol A di(meth)acrylates have the general structure depicted below where each $R_0$ is independently hydrogen or methyl, each $R_1$, each a, and Q are as discussed with respect to Formula II, and the values of j and k are each independently in the range of from about 1 to about 20.

Preferred polyethylenic functional monomers which may be combined with an aromatic containing polyethylenic

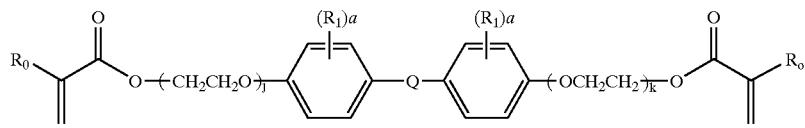

Preferred ethoxylated bisphenol A dimethacrylates include ethoxylated 2 bisphenol A diacrylate (where j+k=2, and $R_0$ is H), ethoxylated 2 bisphenol A dimethacrylate (where j+k=2, and $R_0$ is Me), ethoxylated 3 bisphenol A diacrylate (where j+k=3, and $R_0$ is H), ethoxylated 4 bisphenol A diacrylate (where j+k=4, and $R_0$ is H), ethoxylated 4 bisphenol A dimethacrylate (where j+k=4, and $R_0$ is Me), ethoxylated 6 bisphenol A dimethacrylate (where j+k=6, and $R_0$ is Me), ethoxylated 8 bisphenol A dimethacrylate (where j+k=8, and $R_0$ is Me), ethoxylated 10 bisphenol A diacrylate (where j+k=10, and $R_0$ is H), ethoxylated 10 bisphenol A dimethacrylate (where j+k=10, and $R_0$ is Me), ethoxylated 30 bisphenol A diacrylate (where j+k=30, and $R_0$ is H), ethoxylated 30 bisphenol A dimethacrylate (where j+k=30, and $R_0$ is Me). These compounds are commercially available from Sartomer Company under the trade names PRO-631, SR-348, SR-349, SR-601, CD-540, CD-541, CD-542, SR-602, SR-480, SR-9038, and SR-9036 respectively. Other ethoxylated bisphenol A dimethacrylates include ethoxylated 3 bisphenol A dimethacrylate (where j+k=3, and $R_0$ is Me), ethoxylated 6 bisphenol A diacrylate (where j+k=30, and $R_0$ is H), and ethoxylated 8 bisphenol A diacrylate (where j+k=30, and $R_0$ is H). In all of the above described compounds Q is $C(CH_3)_2$.

The monomer composition preferably may also include a polyethylenic functional monomer. Polyethylenic functional monomers are defined herein as organic molecules which include two or more polymerizable unsaturated groups. Common polymerizable unsaturated groups include vinyl, allyl, allyl carbonate, methacrylyl, acrylyl, methacrylate, and acrylate. Preferably, the polyethylenic functional monomers have the general formula (VII) or (VIII) depicted below, where each $R_0$ is independently hydrogen, halo, or a $C_1$–$C_4$ alkyl group and where $A_1$ is as described above. It should be understood that while general structures (VII) and (VIII) are depicted as having only two polymerizable unsaturated groups, polyethylenic functional monomers having three (e.g., tri(meth)acrylates), four (e.g., tetra(meth)acrylates), five (e.g., penta(meth)acrylates), six (e.g., hexa(meth)acrylates) or more groups may be used.

polyether functional monomer to form the monomer composition include, but are not limited to, ethoxylated 2 bisphenol A dimethacrylate, tris(2-hydroxyethyl) isocyanurate triacrylate, ethoxylated 10 bisphenol A dimethacrylate, ethoxylated 4 bisphenol A dimethacrylate, dipentaerythritol pentaacrylate, 1,6-hexanediol dimethacrylate, isobornyl acrylate, pentaerythritol triacrylate, ethoxylated 6 trimethylolpropane triacrylate, and bisphenol A bis allyl carbonate.

According to one embodiment, the liquid lens forming composition includes ethoxylated 4 bisphenol A dimethacrylate. Ethoxylated 4 bisphenol A dimethacrylate monomer, when cured to form an eyeglass lens, typically produces lenses that have a higher index of refraction than comparable lenses produced using DEG-BAC. Lenses formed from such a mid-index lens forming composition which includes ethoxylated 4 bisphenol A dimethacrylate may have an index of refraction of about 1.56 compared to the PRO-629 compositions (previously described) which tend to have an index of refraction of about 1.51. A lens made from a higher index of refraction polymer may be thinner than a lens made from a lower index of refraction polymer because the differences in the radii of curvature between the front and back surface of the lens do not have to be as great to produce a lens of a desired focal power. Lenses formed from a lens forming composition which includes ethoxylated 4 bisphenol A dimethacrylate may also be more rigid than lenses formed from PRO-629 based compositions.

The monomer composition may include additional monomers, which, when combined with ethoxylated 4 bisphenol A dimethacrylate, may modify the properties of the formed eyeglass lens and/or the lens forming composition. Tris(2-hydroxyethyl)isocyanurate triacrylate, available from Sartomer under the trade name SR-368, is a triacrylate monomer that may be included in the composition to provide improved clarity, high temperature rigidity, and impact resistance properties to the finished lens. Ethoxylated 10 bisphenol A dimethacrylate, available from Sartomer under the trade name SR-480, is a diacrylate monomer that may be included in the composition to provide impact resistance properties to the finished lens. Ethoxylated 2 bisphenol A dimethacrylate, available from Sartomer under the trade name SR-348, is a diacrylate monomer that may be included in the composition to provide tintability properties to the finished lens. Dipentaerythritol pentaacrylate, available from Sartomer under the trade name SR-399, is a pentaacrylate monomer that may be included in the composition to provide abrasion resistance properties to the finished lens. 1,6-hexanediol dimethacrylate, available from Sartomer under the trade name SR-239, is a diacrylate monomer that may be included in the composition to reduce the viscosity of the lens forming composition. Isobornyl acrylate, available from Sartomer under the trade name SR-506, is an acrylate monomer that may be included in the composition to reduce the viscosity of the lens forming composition and enhance tinting characteristics. Bisphenol A bis allyl carbonate may be included in the composition to control the rate of reaction during cure and also improve the shelf life of the lens forming composition. Pentaerythritol triacrylate, available from Sartomer under the trade name SR-444, is a triacrylate monomer that may be included in the composition to promote better adhesion of the lens forming composition to the molds during curing. Ethoxylated 6 trimethylolpropane triacrylate, available from Sartomer under the trade name SR-454, may also be added.

Photoinitiators which may be used in the lens forming composition have been described in previous sections. In one embodiment, the photoinitiator composition preferably includes phenyl bis(2,4,6-trimethylbenzoyl) phosphine oxide (IRG-819) which is commercially available from Ciba Additives under the trade name of Irgacure 819. The amount of Irgacure 819 present in a lens forming composition preferably ranges from about 30 ppm by weight to about 2000 ppm by weight. In another embodiment, the photoinitiator composition may include a mixture of photoinitiator. Preferably, a mixture of Irgacure 819 and 1-hydroxycyclohexylphenyl ketone, commercially available from Ciba Additives under the trade name of Irgacure 184 (IRG-184), is used. Preferably, the total amount of photoinitiators in the lens forming composition ranges from about 50 ppm to about 1000 ppm.

In another embodiment, an ophthalmic eyeglass lens may be made from lens forming composition comprising a monomer composition, a photoinitiator composition, and a co-initiator composition. The lens forming composition, in liquid form, is preferably placed in a mold cavity defined by a first mold member and a second mold member. It is believed that activating light which is directed toward the mold members to activate the photoinitiator composition causes the photoinitiator to form a polymer chain radical. The co-initiator may react with a fragment or an active species of either the photoinitiator or the polymer chain radical to produce a monomer initiating species. The polymer chain radical and the monomer initiating species may react with the monomer to cause polymerization of the lens forming composition.

The monomer composition preferably includes an aromatic containing polyethylenic polyether functional monomer having a structure as shown above. Preferably, the polyethylenic functional monomer is an aromatic polyether polyethylenic functional monomer containing at least one group selected from acrylyl or methacrylyl.

More preferably, the polyethylenic functional monomer is an ethoxylated bisphenol A di(meth)acrylate. The monomer composition may include a mixture of polyethylenic functional monomers, as described above. The photoinitiators which may be present in the lens forming composition have been described above.

The lens forming composition preferably includes a co-initiator composition. The co-initiator composition preferably includes amine co-initiators. Amines are defined herein as compounds of nitrogen formally derived from ammonia ($NH_3$) by replacement of the hydrogens of ammonia with organic substituents. Co-initiators include acrylyl amine co-initiators commercially available from Sartomer Company under the trade names of CN-381, CN-383, CN-384, and CN-386, where these co-initiators are monoacrylyl amines, diacrylyl amines, or mixtures thereof. Other co-initiators include ethanolamines. Examples of ethanolamines include but are not limited to N-methyldiethanolamine (NMDEA) and triethanolamine (TEA) both commercially available from Aldrich Chemicals. Aromatic amines (e.g., aniline derivatives) may also be used as co-initiators. Example of aromatic amines include, but are not limited to, ethyl-4-dimethylaminobenzoate (E-4-DMAB), ethyl-2-dimethylaminobenzoate (E-2-DMAB), n-butoxyethyl-4-dimethylaminobenzoate,p-dimethylaminobenzaldehyde, N,N-dimethyl-p-toluidine, and octyl-p-(dimethylamino)benzoate commercially available from Aldrich Chemicals or The First Chemical Group of Pascagoula, Miss.

Preferably, acrylated amines are included in the co-initiator composition. Acrylyl amines may have the general structures depicted in FIG. 39, where $R_0$ is hydrogen or methyl, n and m are 1 to 20, preferably 1-4, and $R_1$ and $R_2$ are independently alkyl containing from 1 to about 4 carbon atoms or phenyl. Monoacrylyl amines may include at least one acrylyl or methacrylyl group (see compounds (A) and (B) in FIG. 39). Diacrylyl amines may include two acrylyl, two methacrylyl, or a mixture of acrylyl or methacrylyl groups (see compounds (C) and (D) in FIG. 39). Acrylyl amines are commercially available from Sartomer Company under the trade names of CN-381, CN-383, CN-384, and CN-386, where these co-initiators are monoacrylyl amines, diacrylyl amines, or mixtures thereof Other acrylyl amines include dimethylaminoethyl methacrylate and dimethylaminoethyl acrylate both commercially available from Aldrich. In one embodiment, the co-initiator composition preferably includes a mixture of CN-384 and CN-386. Preferably, the total amount of co-initiators in the lens forming composition ranges from about 50 ppm to about 7% by weight.

An advantage to lens forming compositions which include a co-initiator is that less photoinitiator may be used to initiate curing of the lens forming composition. Typically, plastic lenses are formed from a lens forming composition which includes a photoinitiator and a monomer. To improve the hardness of the formed lenses the concentration of photoinitiator may be increased. Increasing the concentration of photoinitiator, however, may cause increased yellowing of the formed lens, as has been described previously. To offset this increase in yellowing, a permanent dye may be added to the lens forming composition. As the amount of yellowing is increased the amount of dye added may also be increased. Increasing the concentration of the dye may cause the light transmissibility of the lens to decrease.

A lens forming composition that includes a co-initiator may be used to reduce the amount of photoinitiator used. To improve the hardness of the formed lenses a mixture of photoinitiator and co-initiator may be used to initiate curing of the monomer. The above-described co-initiators typically do not significantly contribute to the yellowing of the formed lens. By adding co-initiators to the lens forming composition, the amount of photoinitiator may be reduced. Reducing the amount of photoinitiator may decrease the amount of yellowing in the formed lens. This allows the amount of dyes added to the lens forming composition to be reduced and light transmissibility of the formed lens may be improved without sacrificing the rigidity of the lens.

The lens forming composition may also include activating light absorbing compounds. These compounds may absorb at least a portion of the activating light which is directed toward the lens forming composition during curing. One example of activating light absorbing compounds are photochromic compounds. Photochromic compounds which may be added to the lens forming composition have been previously described. Preferably, the total amount of photochromic compounds in the lens forming composition ranges from about 1 ppm to about 1000 ppm. Examples of photochromic compounds which may be used in the lens forming composition include, but are not limited to Corn Yellow, Berry Red, Sea Green, Plum Red, Variacrol Yellow, Palatinate Purple, CH-94, Variacrol Blue D, Oxford Blue and CH-266. Preferably, a mixture of these compounds is used. Variacrol Yellow is a napthopyran material, commercially available from Great Lakes Chemical in West Lafayette, Ind. Corn Yellow and Berry Red are napthopyrans and Sea Green, Plum Red and Palatinate Purple are spironaphthoxazine materials commercially available from Keystone Aniline Corporation in Chicago, Ill. Variacrol Blue D and Oxford Blue are spironaphthoxazine materials, commercially available from Great Lakes Chemical in West Lafayette, Ind. CH-94 and CH-266 are benzopyran materials, commercially available from Chroma Chemicals in Dayton, Ohio. The composition of a Photochromic Dye Mixture which may be added to the lens forming composition is described in Table 1.

TABLE 1

Photochromic Dye Mixture

| | |
|---|---|
| Corn Yellow | 22.3% |
| Berry Red | 19.7% |
| Sea Green | 14.8% |
| Plum Red | 14.0% |
| Variacrol Yellow | 9.7% |
| Palatinate Purple | 7.6% |
| CH-94 | 4.0% |
| Variacrol Blue D | 3.7% |
| Oxford Blue | 2.6% |
| CH-266 | 1.6% |

The lens forming composition may also other activating light absorbing compounds such as UV stabilizers, UV absorbers, and dyes. UV stabilizers, such as Tinuvin 770 may be added to reduce the rate of degradation of the formed lens caused by exposure to ultraviolet light. UV absorbers, such as 2-(2H-benzotriazol-2-yl)-4-(1,1,3,3,-tetramethylbutyl)phenol, may be added to the composition to provide UV blocking characteristics to the formed lens. Small amounts of dyes, such as Thermoplast Blue 684 and Thermoplast Red from BASF may be added to the lens forming composition to counteract yellowing. These classes of compounds have been described in greater detail in previous sections.

In an embodiment, a UV absorbing composition may be added to the lens forming composition. The UV absorbing composition preferably includes a photoinitiator and a UV absorber. Photoinitiators and UV absorbers have been described in greater detail in previous sections. Typically, the concentration of UV absorber in the lens forming composition required to achieve desirable UV blocking characteristics is in the range from about 0.1 to about 0.25% by weight. For example, 2-(2H-benzotriazol-2-yl)-4-(1,1,3,3,-tetramethylbutyl)phenol may be added to the lens forming composition as a UV absorber at a concentration of about 0.17%.

By mixing a photoinitiator with a UV absorbing compound the combined concentration of the photoinitiator and the UV absorber required to achieve the desired UV blocking characteristics in the formed lens may be lower than the concentration of UV absorber required if used alone. For example, 2-(2H-benzotriazol-2-yl)-4-(1,1,3,3,-tetramethylbutyl)phenol may be added to the lens forming composition as a UV absorber at a concentration of about 0.17% to achieve the desired UV blocking characteristics for the formed lens. Alternatively, a UV absorbing composition may be formed by a combination of 2-(2H-benzotriazol-2-yl)-4-(1,1,3,3,-tetramethylbutyl)phenol with the photoinitiator 2-isopropyl-thioxanthone (ITX), commercially available from Aceto Chemical in Flushing, N.Y. To achieve similar UV blocking characteristics in the formed lens, significantly less of the UV absorbing composition may be added to the lens forming composition, compared to the amount of UV absorber used by itself. For example, 2-(2H-benzotriazol-2-yl)-4-(1,1,3,3,-tetramethylbutyl)phenol at a concentration of about 700 ppm, with respect to the lens forming composition, along with 150 ppm of the photoinitiator 2-isopropyl-thioxanthone (2-ITX) may be used to provide UV blocking characteristics. Thus, a significant reduction, (e.g., from 0.15% down to less than about 1000 ppm), in the concentration of UV absorber may be achieved, without a reduction in the UV blocking ability of the subsequently formed lens. An advantage of lowering the amount of UV absorbing compounds present in the lens forming composition is that the solubility of the various components of the composition may be improved.

Tables 2–6 list some examples of mid-index lens forming compositions. The UV absorber is 2-(2H-benzotriazol-2-yl)-4-(1,1,3,3,-tetramethylbutyl)phenol.

TABLE 2

| Ingredient | Formula 1 | Formula 2 | Formula 3 | Formula 4 | Formula 5 | Formula 6 |
|---|---|---|---|---|---|---|
| Irgacure 819 | 694.2 ppm | 486 ppm | 480 ppm | 382 ppm | 375 ppm | 414 ppm |
| Irgacure 184 | | | | | | |
| CN 384 | 0.962% | 0.674% | 0.757% | 0.62% | 0.61% | 0.66% |
| CN 386 | 0.962% | 0.674% | 0.757% | 0.62% | 0.61% | 0.66% |
| SR-348 | 97.98% | 68.65% | 98.2% | 81.2% | 79.6% | 86.4% |
| SR-368 | | | | | | |
| SR-480 | | 29.95% | | | | |
| CD-540 | | | | | | |
| SR-399 | | | | | | |
| SR-239 | | | | | 2.0% | 2.08% |
| SR-506 | | | | | | |
| CR-73 | | | | 17.2% | 16.9% | 10.0% |
| PRO-629 | | | | | | |

TABLE 2-continued

| Ingredient | Formula 1 | Formula 2 | Formula 3 | Formula 4 | Formula 5 | Formula 6 |
|---|---|---|---|---|---|---|
| Tinuvin 770 | | | 290 ppm | | | |
| UV Absorber | | | 0.173% | | | |
| Thermoplast Blue | 0.534 ppm | 0.374 ppm | 0.6 ppm | 0.5 ppm | 4.5 ppm | 4.58 ppm |
| Thermoplast Red | 0.019 ppm | 0.0133 ppm | 0.015 ppm | 0.012 ppm | 0.58 ppm | 0.58 ppm |
| Mineral Oil | | | 136 ppm | | | 65 ppm |
| Photochromic Dye Mixture | | | | | 470 ppm | 507 ppm |

TABLE 3

| Ingredient | Formula 7 | Formula 8 | Formula 9 | Formula 10 | Formula 11 | Formula 12 |
|---|---|---|---|---|---|---|
| Irgacure 819 | 531.2 ppm | 462 ppm | 565.9 ppm | 226 ppm | 443 ppm | 294 ppm |
| Irgacure 184 | 18.7 ppm | | | 144 ppm | | |
| CN 384 | 0.77% | 0.887% | 0.78% | 0.40% | 0.61% | |
| CN 386 | 0.77% | 0.887% | 0.78% | 0.53% | 0.61% | |
| SR-348 | 72.4% | 70.36% | 58.20% | 41.5% | 88.70% | |
| SR-368 | 24.1% | 23.87% | 21.4% | 7.0% | | |
| SR-480 | | | | | | |
| CD-540 | | | 18.7% | 0.74% | | 97.76% |
| SR-399 | | | | 46.8% | | |
| SR-239 | 1.86% | 3.65% | 20.1% | | | 2.00% |
| SR-506 | | | | | 10.0% | |
| CR-73 | | | 20.1% | 2.9% | | |
| PRO-629 | 0.05% | | | | | |
| Tinuvin 770 | | | | | | |
| UV Absorber | | | | | | |
| Thermoplast Blue | 0.567 ppm | 3.62 ppm | 0.70 ppm | 0.255 ppm | 0.6 ppm | 4.3 ppm |
| Thermoplast Red | 0.0147 ppm | 0.576 ppm | 0.014 ppm | 0.006 ppm | 0.028 ppm | 0.24 ppm |
| Photochromic Dye Mixture | | 450 ppm | | | | |

TABLE 4

| Ingredient | Formula 13 | Formula 14 | Formula 15 | Formula 16 | Formula 17 | Formula 18 |
|---|---|---|---|---|---|---|
| Irgacure 819 | 760 ppm | 620 ppm | 289 ppm | | 105 ppm | 343 ppm |
| Irgacure 184 | | | | | | |
| CN 384 | | 0.73% | 0.34% | | | 0.475% |
| CN 386 | | 0.73% | 0.34% | 1.00% | 0.70% | 0.475% |
| 2-ITX | | | | | 188 ppm | 141 ppm |
| SR-348 | | | | 89.00% | 92.00% | 98.90% |
| SR-368 | | | | | | |
| SR-480 | | | | | | |
| CD-540 | 97.57% | 96.20% | 99.28% | | 0.34% | |
| SR-399 | | | | | | |
| SR-239 | 2.30% | 2.30% | 0.01% | | | |
| SR-506 | | | | | | |
| SR-444 | | | | | | |
| SR-454 | | | | 10.00% | 6.9% | |
| CR-73 | | | | | | |
| PRO-629 | | | | | | |
| Tinuvin 770 | | | | | | 785 ppm |
| UV Absorber | | | | | | |
| Thermoplast Blue | 4.9 ppm | 5.1 ppm | 0.508 ppm | | 0.35 ppm | 0.69 ppm |
| Thermoplast Red | 0.276 ppm | 0.285 ppm | 0.022 ppm | | 0.002 ppm | 0.034 ppm |
| Dioctyl-phthalate | | | | | | 125 ppm |
| Butyl stearate | | | | | | |
| Photochromic Dye Mixture | 499 ppm | | | | | |

TABLE 5

| Ingredient | Formula 19 | Formula 20 | Formula 21 | Formula 22 | Formula 23 | Formula 24 |
|---|---|---|---|---|---|---|
| Irgacure 819 | 490 ppm | 635 ppm | 610 ppm | 735 ppm | 320 ppm | 600 ppm |
| Irgacure 184 | | | | | | |
| CN 384 | 0.680% | 0.746% | 0.705% | 0.60% | | |
| CN 386 | 0.680% | 0.746% | 0.705% | 0.60% | | |
| 2-ITX | | | | | | |
| SR-348 | 69.30% | | | | | 68.60% |
| SR-368 | | | | | 74.0% | 22.10% |
| SR-480 | | | | | | |
| CD-540 | | 98.45% | 92.60% | 98.50% | 1.0% | 1.97% |
| SR-399 | | | | | | |
| SR-239 | | 0.01% | 3.86% | 0.16% | | |
| SR-506 | | | | 0.10% | | |
| SR-444 | 29.30% | | | | | |
| SR-454 | | | | | 25.0% | 7.40% |
| CR-73 | | | | | | |
| PRO-629 | | 0.007% | 2.06% | | | |
| Tinuvin 770 | | | | | | |
| UV Absorber | | | | | | |
| Thermoplast Blue | 0.37 ppm | 0.507 ppm | 3.07 ppm | 4.3 ppm | 0.15 ppm | 0.29 ppm |
| Thermoplast Red | 0.013 ppm | 0.0126 ppm | 0.336 ppm | 0.41 ppm | 0.006 ppm | 0.012 ppm |
| Dioctyl-phthalate | | | | | | |
| Butyl stearate | | | | | | |
| Photochromic Dye Mixture | | | 442 ppm | 497 ppm | | |

TABLE 6

| Ingredient | Formula 25 | Formula 26 | Formula 27 | Formula 28 | Formula 29 | Formula 30 | Formula 31 |
|---|---|---|---|---|---|---|---|
| Irgacure 819 | 650 ppm | 464 ppm | 557 ppm | 448 ppm | 460 ppm | | |
| Irgacure 184 | | | | | | | 300 ppm |
| CN 384 | 0.650% | 0.70% | | | | | |
| CN 386 | 0.650% | 0.70% | | | | | |
| 2-ITX | | | | | | 600 ppm | 120 ppm |
| SR-348 | | 39.10% | | | | | |
| SR-368 | | 13.00% | | 19.60% | 20.70% | | |
| SR-480 | | | | | 10.70% | | |
| CD-540 | 88.96% | 41.90% | 1.60% | 1.30% | | 99.94% | 99.96% |
| SR-399 | | | | | | | |
| SR-239 | | | | | | | |
| SR-506 | | | 98.30% | 79.00% | 67.24% | | |
| SR-444 | 9.70% | 4.60% | | | | | |
| SR-454 | | | | | | | |
| CR-73 | | | | | | | |
| PRO-629 | | | | | | | |
| Tinuvin 770 | | | | | | | |
| UV Absorber | | | | | | | |
| Thermoplast Blue | 0.566 ppm | 0.52 ppm | 0.24 ppm | 0.19 ppm | 0.467 ppm | | |
| Thermoplast Red | 0.02 ppm | 0.013 ppm | 0.01 ppm | 0.008 ppm | 0.024 ppm | | |
| Dioctyl-phthalate | | | | | | | |
| Butyl stearate | 75 ppm | 35 ppm | | | | | |
| Photochromic Dye Mixture | | | | | | | |

In one embodiment, plastic lenses may be formed by disposing a mid-index lens forming composition into the mold cavity of a mold assembly and irradiating the mold assembly with activating light. Coating materials may be applied to the mold members prior to filling the mold cavity with the lens forming composition.

After filing the mold cavity of the mold assembly the mold assembly is preferably placed in the lens curing unit and subjected to activating light. Preferably, actinic light is used to irradiate the mold assembly. A clear polycarbonate plate may be placed between the mold assembly and the activating light source. The polycarbonate plate preferably isolates the mold assembly from the lamp chamber, thus preventing airflow from the lamp cooling fans from interacting with the mold assemblies. The activating light source may be configured to deliver from about 0.1 to about 10 milliwatts/cm2 to at least one non-casting face, preferably both non-casting faces, of the mold assembly. Depending on the components of the lens forming composition used the intensity of activating light used may be <1 milliwatt/cm$^2$. The intensity of incident light at the plane of the lens curing unit drawer is measured using an International Light IL-1400 radiometer equipped with an XRL140A detector head. This particular radiometer preferably has a peak detection wavelength at about 400 nm, with a detection range from about 310 nm to about 495 nm. The International Light IL-1400 radiometer and the XRL140A detector head are both commercially available International Light, Incorporated of Newburyport, Mass.

After the mold assembly is placed within the lens curing unit, the mold assemblies are preferably irradiated with activating light continuously for 30 seconds to thirty minutes, more preferably from one minute to five minutes. Preferably, the mold assemblies irradiated in the absence of a cooling air stream. After irradiation, the mold assemblies were removed from the lens curing unit and the formed lens demolded. The lenses may be subjected to a post-cure treatment in the post-cure unit.

In general, it was found that the use of a photoinitiator (e.g., IRG-819 and IRG-184) in the lens forming composition produces lenses with better characteristics than lens formed using a co-initiator only. For example, formula 15, described in the Table 4, includes a monomer composition (a mixture of SR-348 and SR-454) and a co-initiator (CN-386). When this lens forming composition was exposed to activating light for 15 min. there was no significant reaction or gel formation. It is believed that the co-initiator requires an initiating species in order to catalyze curing of the monomer composition. Typically this initiating species is produced from the reaction of the photoinitiator with activating light.

A variety of photoinitiators and photoinitiators combined with co-initiators may be used to initiate polymerization of the monomer composition. One initiator system which may be used includes photoinitiators IRG-819 and 2-ITX and a co-initiator, see Formulas 17–18. Such a system is highly efficient at initiating polymerization reactions. The efficiency of a polymerization catalyst is a measurement of the amount of photoinitiator required to initiate a polymerization reaction. A relatively small amount of an efficient photoinitiator may be required to catalyze a polymerization reaction, whereas a greater amount of a less efficient photoinitiator may be required to catalyze the polymerization reaction. The IRG-819/2-ITX/co-initiator system may be used to cure lenses forming compositions which include a UV absorbing compound. This initiator system may also be used to form colored lenses.

An initiator system that is less efficient than the IRG-819/2-ITX/co-initiator system includes a mixture of the photoinitiators IRG-819 and 2-ITX, see Formula 31. This system is less efficient at initiating polymerization of lens forming compositions than the IRG-819/2-ITX/co-initiator system. The IRG-819/2-ITX system may be used to cure very reactive monomer compositions. An initiator system having a similar efficiency to the IRG-819/2-ITX system includes a mixture of IRG-819 and co-initiator, see Formulas 1–6, 8–9, 11, 14–15, 19–22, and 25–26. The IRG-819/co-initiator system may be used to cure clear lenses which do not include a UV blocking compound and photochromic lens forming compositions.

Another initiator system which may be used includes the photoinitiator 2-ITX and a co-initiator. This initiator system is much less efficient at initiating polymerization reactions than the IRG-819/co-initiator system. The 2-ITX/co-initiator system is preferably used for curing monomer compositions which include highly reactive monomers.

The use of the above described mid-index lens forming compositions may minimize or eliminate a number of problems associated with activating light curing of lenses. One problem typical of curing eyeglass lenses with activating light is pre-release. Pre-release may be caused by a number of factors. If the adhesion between the mold faces and the shrinking lens forming composition is not sufficient, pre-release may occur. The propensity of a lens forming composition to adhere to the mold face, in combination with its shrinkage, determine how the process variables are controlled to avoid pre-release. Adhesion is affected by such factors as geometry of the mold face (e.g., high-add flat-top bifocals tend to release because of the sharp change in cavity height at the segment line), the temperature of the mold assembly, and the characteristics of the in-mold coating material. The process variables which are typically varied to control pre-release include the application of cooling fluid to remove exothermic heat, controlling the rate of heat generation by manipulating the intensities and timing of the activating radiation, providing differential light distribution across the thin or thick sections of the mold cavity manipulating the thickness of the molds, and providing in-mold coatings which enhance adhesion. An advantage of the above described mid-index lens forming compositions is that the composition appears to have enhanced adhesion characteristics. This may allow acceptable lenses to be produced over a greater variety of curing conditions. Another advantage is that higher diopter lenses may be produced at relatively low pre-release rates, broadening the achievable prescription range.

Another advantage of the above described mid-index lens forming compositions is that they tend to minimize problems associated with dripping during low intensity curing of lenses (e.g., in the 1 to 6 milliwatt range). Typically, during the irradiation of the lens forming composition with activating light, small amounts of monomer may be squeezed out of the cavity and run onto the non-casting faces of the molds. Alternatively, during filling of the mold assembly with the lens forming composition, a portion of the lens forming composition may drip onto the non-casting faces of the mold assembly. This "dripping" onto the non-casting faces of the mold assembly tends to cause the activating light to focus more strongly in the regions of the cavity located underneath the drippings. This focusing of the activating light may affect the rate of curing. If the rate of curing underneath the drippings varies significantly from the rate of curing throughout the rest of the lens forming composition, optical distortions may be created in the regions below the drippings.

It is believed that differences in the rate of gelation between the center and the edge regions of the lens forming composition may cause dripping to occur. During the curing of a lens forming composition, the material within the mold cavity tends to swell slightly during the gel phase of the curing process. If there is enough residual monomer around the gasket lip, this liquid will tend to be forced out of the cavity and onto the non-casting faces of the mold. This problem tends to be minimized when the lens forming composition undergoes fast, uniform gelation. Typically, a fast uniform gelation of the lens forming composition may be achieved by manipulating the timing, intensities, and distribution of the activating radiation. The above described mid-index lens forming compositions, however, tend to gel quickly and uniformly under a variety of curing conditions, thus minimizing the problems caused by dripping.

Another advantage of the above described mid-index lens forming compositions is that the compositions tend to undergo uniform curing under a variety of curing conditions. This uniform curing tends to minimize optical aberrations within the formed lens. This is especially evident during the formation of high plus power flat-top lenses which tend to exhibit optical distortions after the lens forming composition is cured. It is believed that the activating radiation may be reflected off of the segment line and create local differences in the rate of gelation in the regions of the lens forming composition that the reflected light reaches. The above described mid-index lens forming compositions tend to show less optical distortions caused by variations of the intensity of activating radiation throughout the composition.

Other advantages include drier edges and increased rigidity of the formed lens. An advantage of drier edges is that the contamination of the optical faces of the lens by uncured or partially cured lens forming composition is minimized.

Methods of Forming Plastic Lenses

Plastic lenses may be formed by disposing a lens forming composition into the mold cavity of a mold assembly and irradiating the mold assembly with activating light. Coating materials may be applied to the mold members prior to filling the mold cavity with the lens forming composition. The lens may be treated in a post-cure unit after the lens-curing process is completed.

The operation of the above described system to provide plastic lenses involves a number of operations. These operations are preferably coordinated by the controller 50, which has been described above. After powering the system, an operator is preferably signaled by the controller to enter the prescription of the lens, the type of lens, and the type of coating materials for the lens. Based on these inputted values the controller will preferably indicate to the operator which molds and gaskets will be required to form the particular lens.

After obtaining the appropriate mold members the mold members are preferably cleaned prior to loading with a lens forming composition. The inner surface (i.e., casting surface) of the mold members may be cleaned on a spin coating unit 20 by spraying the mold members with a cleaning solution while spinning the mold members. Examples of cleaning solutions include methanol, ethanol, isopropyl alcohol, acetone, methyl ethyl ketone, or a water based detergent cleaner. Preferably, a cleaning solution which includes isopropyl alcohol is used to clean the mold members. As the mold member is contacted with the cleaning solution, dust and dirt may be removed and transferred into the underlying dish 115 of the curing unit. After a sufficient amount of cleaning solution has been applied the mold members may be dried by continued spinning without the application of cleaning solution.

In an embodiment, the inner surface, i.e., the casting face, of the front mold member may be coated with one or more hardcoat layers before the lens forming composition is placed within the mold cavity. Preferably, two hardcoat layers are used so that any imperfections, such as pin holes in the first hardcoat layer, are covered by the second hardcoat layer. The resulting double hardcoat layer is preferably scratch resistant and protects the subsequently formed eyeglass lens to which the double hardcoat layer adheres. The hardcoat layers are preferably applied using a spin coating unit 20. The mold member is preferably placed in the spin coating unit and the coating material applied to the mold while spinning at high speeds (e.g., between about 900 to 1000 RPM). After a sufficient amount of coating material has been applied, the coating material may be cured by the activating light source disposed in the cover. The cover is preferably closed and activating light is preferably applied to the mold member while the mold member is spinning at relatively low speeds (e.g., between about 150 to 250 RPM). Preferably control of the spinning and the application of activating light is performed by controller 50. Controller 50 is preferably configured to prompt the operator to place the mold members on the coating unit, apply the coating material to the mold member, and close the cover to initiate curing of the coating material.

In an embodiment, the eyeglass lens that is formed may be coated with a hydrophobic layer, e.g. a hardcoat layer. The hydrophobic layer preferably extends the life of the photochromic pigments near the surfaces of the lens by preventing water and oxygen molecules from degrading the photochromic pigments.

In a preferred embodiment, both mold members may be coated with a cured adhesion-promoting composition prior to placing the lens forming composition into the mold cavity. Providing the mold members with such an adhesion-promoting composition is preferred to increase the adhesion between the casting surface of the mold and the lens forming composition. The adhesion-promoting composition thus reduces the possibility of premature release of the lens from the mold. Further, it is believed that such a coating also provides an oxygen and moisture barrier on the lens which serves to protect the photochromic pigments near the surface of the lens from oxygen and moisture degradation. Yet further, the coating provides abrasion resistance, chemical resistance, and improved cosmetics to the finished lens.

In an embodiment, the casting face of the back mold member may be coated with a material that is capable of being tinted with dye prior to filling the mold cavity with the lens forming composition. This tintable coat preferably adheres to the lens forming composition so that dyes may later be added to the resulting eyeglass lens for tinting the lens. The tintable coat may be applied using the spin coating unit as described above.

The controller may prompt the user to obtain the appropriate lens forming composition. In one embodiment, the controller will inform the user of which chemicals and the amounts of each chemical that is required to prepare the lens forming composition. Alternatively, the lens forming compositions may be preformed. In this case the controller may indicate to the operator which of the preformed lens forming compositions should be used.

In an embodiment, dyes may be added to the lens forming composition. It is believed that certain dyes may be used to attack and encapsulate ambient oxygen so that the oxygen may be inhibited from reacting with free radicals formed during the curing process. Also, dyes may be added to the composition to alter the color of an unactivated photochromic lens. For instance, a yellow color that sometimes results after a lens is formed may be "hidden" if a blue-red or blue-pink dye is present in the lens forming composition. The Inactivated color of a photochromic lens may also be adjusted by the addition of non-photochromic pigments to the lens forming composition.

In a preferred technique for filling the lens molding cavity 382 (see FIG. 11), the annular gasket 380 is placed on a concave or front mold member 392 and a convex or back mold member 390 is moved into place. The annular gasket 380 is preferably pulled away from the edge of the back mold member 390 at the uppermost point and a lens forming composition is preferably injected into the lens molding cavity 382 until a small amount of the lens forming composition is forced out around the edge. The excess is then removed, preferably, by vacuum. Excess liquid that is not removed could spill over the face of the back mold member 390 and cause optical distortion in the finished lens.

The mold assembly, with a lens forming composition disposed within the mold cavity, is preferably placed within the lens curing unit. Curing of the lens forming composition is preferably initiated by the controller after the lens curing unit door is closed. The curing conditions are preferably set by the controller based on the prescription and type of lens being formed.

After the curing cycle has been completed. The controller preferably prompts the user to remove the mold assembly from the lens curing unit. In an embodiment, the cured lens may be removed from the mold apparatus. The cured lens may be complete at this stage and ready for use.

In another embodiment, the cured lens may require a post cure treatment After the lens is removed from the mold apparatus the edges of the lens may be dried and scraped to remove any uncured lens forming composition near the edges. The controller may prompt the user to place the partially cured lens into a post-cure unit After the lens has been placed within the post-cure unit the controller may apply light and/or heat to the lens to complete the curing of the lens. In an embodiment, partially cured lenses may be heated to about 115° C. while being irradiated with activating light This post-treatment may be applied for about 5 minutes.

When casting a lens, particularly a positive lens that is thick in the center, cracking may be a problem. Addition polymerization reactions, including photochemical addition polymerization reactions, may be exothermic. During the process, a large temperature gradient may build up and the resulting stress may cause the lens to crack. Yellowing of the finished lens may also be a problem. Yellowing tends to be related to the monomer composition, the identity of the photoinitiator, and the concentration of the photoinitiator.

The formation of optical distortions usually occurs during the early stages of the polymerization reaction during the transformation of the lens forming composition from the liquid to the gel state. Once patterns leading to optical distortions form they may be difficult to eliminate. When gelation occurs there typically is a rapid temperature rise. The exothermic polymerization step causes a temperature increase, which in turn causes an increase in the rate of polymerization, which causes a further increase in temperature. If the heat exchange with the surroundings is not sufficient to cool the lens, there will be a runaway situation that leads to premature release, the appearance of thermally caused striations and even breakage.

Accordingly, when continuous activating light is applied, it is preferred that the reaction process be smooth and not too fast but not too slow. Heat is preferably not generated by the process so fast that it may not be exchanged with the surroundings. The incident activating light intensity is preferably adjusted to allow the reaction to proceed at a desired rate. It is also preferred that the seal between the annular gasket 380 and the opposed mold members 378 be as complete as possible.

Factors that have been found to lead to the production of lenses that are free from optical distortions may be (1) achieving a good seal between the annular gasket 380 and the opposed mold members 378; (2) using mold members 378 having surfaces that are free from defects; (3) using a formulation having an appropriate type and concentration of photoinitiator that will produce a reasonable rate of temperature rise; and (4) using a homogeneous formulation. Preferably, these conditions are optimized.

Premature release of the lens from the mold will result in an incompletely cured lens and the production of lens defects. Factors that contribute to premature release may be (1) a poorly assembled mold assembly 352; (2) the presence of air bubbles around the sample edges; (3) imperfection in gasket lip or mold edge; (4) inappropriate formulation; (5) uncontrolled temperature rise; and (6) high or non-uniform shrinkage. Preferably, these conditions are minimized.

Premature release may also occur when the opposed mold members 378 are held too rigidly by the annular gasket 3 80. Preferably, there is sufficient flexibility in the annular gasket 380 to permit the opposed mold members 378 to follow the lens as it shrinks. Indeed, the lens must be allowed to shrink in diameter slightly as well as in thickness. The use of an annular gasket 380 that has a reduced degree of stickiness with the lens during and after curing is therefore desirable.

Despite the above problems, the advantages offered by the radiation cured lens molding system clearly outweigh the disadvantages. The advantages of a radiation cured system include a significant reduction in energy requirements, curing time and other problems normally associated with conventional thermal systems.

1. Method of Forming a Plastic Lens by Curing with Activating Light.

In one embodiment, plastic lenses may be formed by disposing a lens forming composition into the mold cavity of a mold assembly and irradiating the mold assembly with activating light. Coating materials may be applied to the mold members prior to filling the mold cavity with the lens forming composition. The lens may be treated in a post-cure unit after the lens-curing process is completed.

The lens forming composition is preferably prepared according to the following protocol. Appropriate amounts of HDDMA, TTEGDA, TMPTA and TRPGDA are mixed and stirred thoroughly, preferably with a glass rod. The acrylate/methacrylate mixture may then be passed through a purification column.

A suitable purification column may be disposed within a glass column having a fitted glass disk above a Teflon stopcock and having a top reservoir with a capacity of approximately 500 ml and a body with a diameter of 22 mm and a length of about 47 cm. The column may be prepared by placing on the fitted glass disk approximately 35 g. of activated alumina (basic), available from ALFA Products, Johnson Matthey, Danvers, Mass. in a 60 mesh form or from Aldrich in a 150 mesh form. Approximately 10 g. of an inhibitor remover (hydroquinone/methylester remover) available as HR-4 from Scientific Polymer Products, Inc., Ontario, N.Y. then may be placed on top of the alumina and, finally, approximately 35 g. of activated alumina (basic) may be placed on top of the inhibitor remover.

Approximately 600 g. of the acrylate/methacrylate mixture may then be added above the column packing. An overpressure of 2–3 psi may then be applied to the top of the column resulting in a flow rate of approximately 30 to 38 grams per hour. Parafilm may be used to cover the junction of the column tip and the receiving bottle to prevent the infiltration of dust and water vapor. The acrylate/methacrylate mixture, preferably, may be received in a container that is opaque to activating light.

An appropriate amount of bisphenol A bis(allyl carbonate) may then be added to the acrylate/methacrylate mixture to prepare the final monomer mixture.

An appropriate amount of a photoinitiator may then be added to the final monomer mixture. The final monomer mixture, with or without photoinitiator, may then be stored in a container that is opaque to activating light.

An appropriate amount of a dye may also be added to the final monomer mixture, with or without photoinitiator.

After filling the mold cavity with the lens forming composition, the mold assembly is preferably irradiated with activating light. In one embodiment the lamps generate an intensity at the lamp surface of approximately 4.0 to 7.0 mW/cm$^2$ of ultraviolet light having wavelengths between 300 and 400 nm, which light is very uniformly distributed without any sharp discontinuities throughout the reaction process. Such bulbs are commercially available from Sylvania under the trade designation Sylvania Fluorescent (F15T8/2052) or Sylvania Fluorescent (F15T8/350BL/18") GTE. Activating light having wavelengths between 300 and 400 nm is preferred because the photoinitiators preferably absorb most efficiently at this wavelength and the mold members 378, preferably, allow maximum transmission at this wavelength. It is preferred that there be no sharp intensity gradients of activating light either horizontally or vertically through the lens composition during the curing process. Sharp intensity gradients through the lens may lead to defects in the finished lens.

If lenses are produced with continuous activating light without any mold cooling, the temperature of the mold-lens assembly may rise to above 50° C. Low diopter lenses may be prepared in this fashion, but higher plus or minus diopter lenses may fail. Certain lenses may be made by controlling (e.g., cooling) the temperature of the lens material during cure with circulating uncooled fluid (i.e., fluid at ambient temperatures). The ambient fluid in these systems is preferably directed towards the mold members in the same manner as described above. Circulating ambient temperature fluid permits manufacture of a wider range of prescriptions than manufacture of the lenses without any mold cooling at all.

Many polymerization factors may be interrelated. The ideal temperature of polymerization is typically related to the diopter and thickness of the lens being cast. Lower temperatures (below about 10° C.) are preferred to cast higher + or − diopter lenses when using continuous activating light. These lower temperatures tend to permit an increase in photoinitiator concentration, which in turn may speed up the reaction and lower curing time.

Preventing premature release when using continuous activating light may also be somewhat dependent upon the flow rates of cooling fluid, as well as its temperature. For instance, if the temperature of the cooling fluid is decreased it may also be possible to decrease the flowrate of cooling fluid. Similarly, the disadvantages of a higher temperature cooling fluid may be somewhat offset by higher flow rates of cooling fluid.

In one embodiment the air flow rates for a dual distributor system (i.e., an air distributor above and below the lens composition) are about 1–30 standard cubic feet ("scf") (about 0.028–0.850 standard cubic meters, "scm") per minute per distributor, more preferably about 4–20 scf (about 0.113–0.566 scm) per minute per distributor, and more preferably still about 9–15 scf (about 0.255–0.423 scm) per minute per distributor. "Standard conditions," as used herein, means 60° F. (about 15.5° C.) and one atmosphere pressure (about 101 kilopascals).

The thickness of the glass molds used to cast polymerized lenses may affect the lenses produced. A thinner mold tends to allow more efficient heat transfer between the polymerizing material and the cooling air, thus reducing the rate of premature release. In addition, a thinner mold tends to exhibit a greater propensity to flex. A thinner mold tends to flex during the relatively rapid differential shrinkage between the thick and thin portions of a polymerized lens, again reducing the incidence of premature release. In one embodiment the first or second mold members have a thickness less than about 5.0 mm, preferably about 1.0–5.0 mm, more preferably about 2.0–4.0 mm, and more still about 2.5–3.5 mm.

"Front" mold or face means the mold or face whose surface ultimately forms the surface of an eyeglass lens that is furthest from the eye of an eyeglass lens wearer. "Back" mold or face means the mold or face whose surface ultimately forms the surface of an eyeglass lens that is closest to the eye of an eyeglass lens wearer.

In one embodiment, the lens forming material is preferably cured to form a solid lens at relatively low temperatures, relatively low continuous activating light intensity, and relatively low photoinitiator concentrations. Lenses produced as such generally have a Shore D hardness of about 60–78 (for preferred compositions) when cured for about 15 minutes as described above. The hardness may be improved to about 80–81 Shore D by post-cure heating the lens in a conventional oven for about 10 minutes, as described above.

The activating light cured lenses may demonstrate excellent organic solvent resistance to acetone, methyl ethyl ketone, and alcohols.

2. Preparing Lenses of Various Powers By Altering the Lens Forming Conditons.

It has been determined that in some embodiments the finished power of an activating light polymerized lens may be controlled by manipulating the curing temperature of the lens forming composition. For instance, for an identical combination of mold members and gasket, the focusing power of the produced lens may be increased or decreased by changing the intensity of activating light across the lens mold cavity or the faces of the opposed mold members.

As the lens forming material begins to cure, it passes through a gel state, the pattern of which, within the mold assembly, leads to the proper distribution of internal stresses generated later in the cure when the lens forming material begins to shrink. As the lens forming material shrinks during the cure, the opposed mold members will preferably flex as a result of the different amounts of shrinkage between the relatively thick and the relatively thin portions of the lens. When a negative lens, for example, is cured, the upper or back mold member will preferably flatten and the lower or front mold member will preferably steepen with most of the flexing occurring in the lower or front mold member. Conversely, with a positive lens, the upper or back mold member will preferably steepen and the lower or front mold member will preferably flatten with most of the flexing occurring in the upper or back mold member.

By varying the intensity of the activating light between the relatively thin and the relatively thick portions of the lens in the lens forming cavity, it is possible to create more or less total flexing. Those light conditions which result in less flexing will tend to minimize the possibility of premature release.

The initial curvature of the opposed mold members and the center thickness of the lens produced may be used to compute the targeted power of the lens. Herein, the "targeted power" of a lens is the power a lens may have if the lens were to have a curvature and thickness substantially identical to the mold cavity formed by the opposed mold members. The activating light conditions may be manipulated to alter the power of the lens to be more or less than the targeted power.

By varying the amount of activating light reaching the lens mold the polymerization rate, and therefore the temperature of the lens forming composition may be controlled. It has been determined that the maximum temperature reached by the lens forming composition during and/or after activation by light may effect the final power of the lens. By allowing the lens forming composition to reach a temperature higher than the typical temperatures described in previous embodiments, but less than the temperature at which the formed lens will crack, the power of the lens may be decreased. Similarly, controlling the polymerization such that the temperature of the lens forming composition remains substantially below the typical temperatures described in previous embodiments, but at a sufficient temperature such that a properly cured lens is formed, the power of the lens may be increased. Similarly, increasing the temperature of the lens forming composition during curing may decrease the power of the resulting lens.

Figure 40:
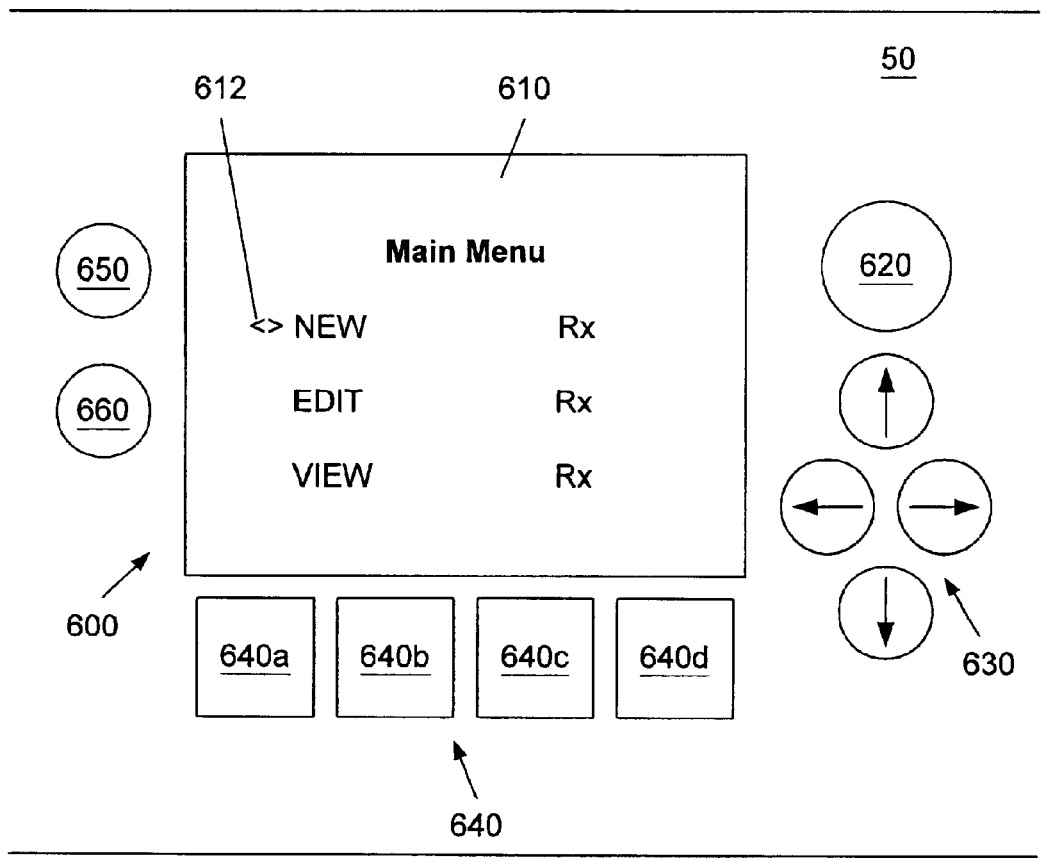
FIGS. 40–42 depict a front panel of a controller with a display screen depicting various display menus.

In an embodiment, an ophthalmic eyeglass lens may be made from a lens forming composition comprising a monomer and a photoinitiator, by irradiation of the lens forming composition with activating light. The composition may optionally include one or more of: an ultraviolet/visible light absorbing compound, a polymerization inhibitor, a co-initiator, a hindered amine light stabilizer, and a dye. The activating light may include ultraviolet, actinic, visible or infrared light The lens forming composition may be treated with activating light such that an eyeglass is formed that has a power substantially equal to the targeted power for a given mold cavity. The peak temperature of the lens forming process may be the maximum temperature attained after the application of each pulse of activating light. As depicted in FIG. 40, each pulse of activating light may cause the lens forming composition to rise to a peak temperature.

After reaching this peak temperature the lens forming composition may begin to cool until the next application of activating light. If the peak temperature of the lens forming composition is controlled such that the formed lens has a power substantially equal to the targeted power, the peak temperature is referred to as the "matching temperature". The matching temperature may be determined by performing a series of experiments using the same mold cavity. In these experiments the peak temperature attained during the process is preferably varied. By measuring the power of the lenses obtained through this experiment the matching temperature range may be determined.

When the temperature of the lens forming composition is allowed to rise above the matching temperature during treatment with activating light, the power of the lens may be substantially less than the targeted power of the lens. Alternatively, when the temperature of the lens forming composition is allowed to remain below the matching temperature, the power of the lens may be substantially greater than the targeted power of the lens. In this manner, a variety of lenses having substantially different lens powers from the targeted power may be produced from the same mold cavity.

When the lenses cured by the activating light are removed from the opposed mold members, they are typically under a stressed condition. It has been determined that the power of the lens may be brought to a final resting power, by subjecting the lenses to a post-curing heat treatment to relieve the internal stresses developed during the cure and cause the curvature of the front and the back of the lens to shift. Typically, the lenses may be cured by the activating light in about 10–30 minutes (preferably about 15 minutes). The post-curing heat treatment is preferably conducted at approximately 85–120° C. for approximately 5–15 minutes. Preferably, the post-curing heat treatment is conducted at 100–110° C. for approximately 10 minutes. Prior to the post-cure, the lenses generally have a lower power than the final resting power. The post-curing heat treatment reduces yellowing of the lens and reduces stress in the lens to alter the power thereof to a final resting power.

In an embodiment, an ophthalmic eyeglass lens may be made from a lens forming composition comprising a monomer and a photoinitiator, by irradiation of the lens forming composition with activating light. The composition may optionally include one or more of: an ultraviolet/visible light absorbing compound, a polymerization inhibitor, a co-initiator, a hindered amine light stabilizer, and a dye. The activating light may include ultraviolet, actinic, visible or infrared light. The lens forming composition may be treated with activating light such that an eyeglass is formed. The lens may be kept within the mold cavity formed by the mold members until the light has completely cured the lens forming composition. The minimum time which a lens must remain in the mold cavity to produce a lens with the targeted power, with respect to the mold cavity, is herein referred to as the "demolding time". The demolding time may be determined by performing a series of experiments using the same mold cavity. In these experiments the time that the lens is released from the mold cavity during the process is preferably varied. By measuring the power of the lenses obtained through these experiments the demolding time range may be determined.

When a formed lens is removed prior to the demolding time, the power of the lens may be substantially greater than the targeted power of the lens. By varying the demolding time a variety of lenses having substantially greater lens powers from the targeted power may be produced from the same mold cavity.

3. Postcure with an Oxygen Barrier Enriched with Photoinitiator

In certain applications, all of the lens forming composition may fail to completely cure by exposure to activating light when forming the lens. In particular, a portion of the lens forming composition proximate the gasket often remains in a liquid state following formation of the lens. It is believed that the gaskets may be often somewhat permeable to air, and, as a result, oxygen permeates them and contacts the portions of the lens forming material that are proximate the gasket. Since oxygen tends to inhibit the polymerization process, portions of the lens forming composition proximate the gasket tend to remain uncured as the lens is formed.

Uncured lens forming composition proximate the gasket may be a problem for several reasons. First, the liquid lens forming composition leaves the edges of the cured lens in a somewhat sticky state, which makes the lenses more difficult to handle. Second, the liquid lens forming composition may be somewhat difficult to completely remove from the surface of the lens. Third, liquid lens forming composition may flow and at least partially coat the surface of lenses when such lenses are removed from the molds. This coating may be difficult to remove and makes application of scratch resistant coatings or tinting dyes more difficult. This coating tends to interfere with the interaction of scratch resistant coatings and tinting dyes with the cured lens surface. Fourth, if droplets of liquid lens forming material form, these droplets may later cure and form a ridge or bump on the surface of the lens, especially if the lens undergoes later postcure or scratch resistant coating processes. As a result of the above problems, often lenses must be tediously cleaned or recast when liquid lens forming composition remains after the lens is formed in an initial cure process.

The problems outlined above may be mitigated if less liquid lens forming composition remains proximate the gasket after the lens is formed. One method of lessening this "wet edge" problem relates to increasing the amount of photoinitiator present in the lens forming composition (i.e., increasing the amount of photoinitiator in the lens forming composition above about 0.15 percent). Doing so, however, tends to create other problems. Specifically, increased photoinitiator levels tend to cause exothermic heat to be released at a relatively high rate during the reaction of the composition. Premature release and/or lens cracking tends to result. Thus it is believed that lower amounts of photoinitiator are preferred.

The wet edge problem has been addressed by a variety of methods described in U.S. Pat. No. 5,529,728 to Buazza et al. Such methods relate to removing the gasket and applying either an oxygen barrier or a photoinitiator enriched liquid to the exposed edge of the lens. The lens is preferably re-irradiated with sufficient activating light to completely dry the edge of the lens prior to demolding.

An embodiment relates to improving the methods described in U.S. Pat. No. 5,529,728 to Buazza et al. This embodiment relates to combining an oxygen barrier with a photoinitiator. Specifically, in one embodiment an oxygen barrier 970 (e.g., a thin strip of polyethylene film or the like as shown in FIG. 12) is preferably embedded or impregnated with a photoinitiator 972. The oxygen barrier is preferably wrapped around the edge of a cured lens which is still encased between two molds (but with the gasket removed). While still "in the mold," the lens is preferably exposed to activating light, thereby drying its edge. An improvement of this method over those previously disclosed is that there may be a significant reduction in the dosage of activating light necessary to bring the lens edge to dryness.

A plastic oxygen barrier film which includes a photoinitiator may be made by: (a) immersing a plastic film in a solution comprising a photoinitiator, (b) removing the plastic film from the solution, and (c) drying the plastic film. The solution may include an etching agent. Preferably a surface of the plastic film is etched prior to or while immersing the plastic film in the solution.

In one example, thin strips (e.g., about 10 mm wide) of high density polyethylene film (approximately 0.013 mm thick) may be soaked in a solution of 97% acetone and 3% Irgacure 184 (a photoinitiator commercially available from Ciba Geigy located in Fanningdale, N.J.) for about five minutes. The polyethylene film may be obtained from Tape Solutions, Inc. (Nashville, Tenn.). In a more preferred embodiment, 0.5% BYK-300 (a flow agent commercially available from BYK Chemie located in Wallingford, Conn.) may be included in the soaking solution. It is believed that xylene in the BYK-300 tends to etch the surface of the film and make the film more receptive to absorption of the Irgacure 184. In a still more preferred embodiment, the treated polyethylene strips may be dipped in acetone for about ten seconds to remove excess Irgacure 184. Excess photoinitiator may be seen as a white powder which coats the strips after drying. In either case, the strips are preferably allowed to air dry before applying them to the edge of the lens as described above.

In one alternate embodiment, a plastic eyeglass lens may be made by the following steps: (1) placing a liquid polymerizable lens forming composition in a mold cavity defined by a gasket, a first mold member, and a second mold member, (2) directing first activating light rays toward at least one of the mold members to cure the lens forming composition so that it forms a lens with a back face, edges, and a front face, and wherein a portion of the lens forming composition proximate the edges of the lens is not fully cured; (3) removing the gasket to expose the edges of the lens; (4) applying an oxygen barrier which includes a photoinitiator around the exposed edges of the lens such that at least a portion of the oxygen barrier photoinitiator is proximate lens forming composition that is not fully cured; and (5) directing second activating light rays towards the lens such that at least a portion of the oxygen barrier photoinitiator initiates reaction of lens forming composition while the oxygen barrier substantially prevents oxygen from outside the oxygen barrier from contacting at least a portion of the lens forming composition. The first and second activating light rays may (a) be at the same or different wavelengths and/or intensities, (b) be continuous or pulsed, and (c) be from the same or different light source.

A purpose of the steps 4–5 is to reduce the amount of uncured liquid lens forming composition that is present when the lens is separated from the molds and/or gasket. It has been found that reducing the amount of liquid lens forming composition may be especially advantageous if such reduction occurs before the molds are separated from the cured lens. Separating the molds from the cured lens may cause uncured liquids to at least partially coat the lens faces. This coating may occur when uncured liquid lens forming composition gets swept over the faces when the molds are separated from the lens. It is believed that curing of the lens tends to create a vacuum between the lens and the mold. Air may sweep over the mold faces to fill this vacuum when the molds are separated from the lens. This air tends to take liquid lens forming composition into the vacuum with it.

In step 4 above, an oxygen barrier which includes a photoinitiator is preferably applied to the edges or sides of the lens after the gasket is removed. Preferably, this oxygen barrier is applied while the lens is still attached to the molds. In an alternate embodiment, this oxygen barrier is preferably applied to the edges or sides of the molds at the same time it is applied to the sides of the lens. In a preferred embodiment, the sides of the lenses are first cleaned or wiped to remove at least a portion of the uncured liquid lens forming composition before the oxygen barrier is applied.

After the oxygen barrier is applied, second activating light rays may be directed towards the lens. After the second activating light rays are directed toward the lens, at least a portion of the liquid lens forming composition that was not cured in the initial cure steps may be cured. It is believed that the photoinitiator embedded in the oxygen barrier facilitates faster and more complete curing of the uncured lens forming composition. As such, less second activating light rays may be employed, thereby lessening the time and energy required in this step. Furthermore, lens quality tends to be enhanced since a lower application of the second activating light rays tends to reduce the potential for lens yellowing.

In a preferred embodiment, substantially all of the remaining liquid lens forming composition is cured after the second activating light rays are directed toward the lens. More preferably, the lens is substantially dry after the second activating light is directed towards the lens.

After the second activating light is directed toward the lens, the lens may then be demolded. The lens may then be tinted After the lens is demolded, a scratch resistant coating may be applied to the lens. In one embodiment, a scratch resistant coating is preferably applied to the demolded lens by applying a liquid scratch resistant coating composition to a face of the lens and then applying activating light rays to this face to cure the liquid scratch resistant coating to a solid.

In an embodiment, the activating light for curing the scratch resistant coating is ultraviolet light. The intensity of the activating light applied to the face of the lens to cure the liquid scratch resistant coating composition to a solid is preferably about 150–300 mW/cm$^2$ at a wavelength range of about 360–370 nm, and about 50–150 mW/cm$^2$ at a wavelength range of about 250–260 nm. The lens may be heated after removal from the molds, or after application of a scratch resistant coating to the lens.

In a preferred embodiment, the above method may further include the additional step of directing third activating light rays towards the lens before the oxygen barrier is applied. These third activating light rays are preferably applied before the gasket is removed. Preferably, the second and third activating light rays are directed toward the back face of the lens (as stated above, the second and third activating light rays are preferably applied while this lens is in the mold cavity). The third activating light rays are preferably about the same range of intensity as the second activating light rays. The same apparatus may be used for both the second and third activating light rays.

In a preferred embodiment, the method described above also includes the step of removing the oxygen barrier from the edges of the lens.

The second and third activating light rays may be repeatedly directed towards the lens. For instance, these activating light rays may be applied via a light assembly whereby the lens passes under a light source on a movable stand. The lens may be repeatedly passed under the lights. Repeated exposure of the lens to the activating light rays may be more beneficial than one prolonged exposure.

Preferably the oxygen barrier includes a film, and more preferably a plastic, flexible, and/or elastic film. In addition, the oxygen barrier is preferably at least partially transparent to activating light so that activating light may penetrate the oxygen barrier to cure any remaining liquid lens forming composition. Preferably, the oxygen barrier is stretchable and self-sealing. These features make the film easier to apply. Preferably, the oxygen barrier is resistant to penetration by liquids, thus keeping any liquid lens forming composition in the mold assembly. Preferably, the oxygen barrier includes a thermoplastic composition. It is anticipated that many different oxygen barriers may be used (e.g., saran wrap, polyethylene, etc.). In one preferred embodiment, the film is "Parafilm M Laboratory Film" which is available from American National Can (Greenwich, Conn., U.S.A.). The oxygen barrier may also include aluminum foil.

Preferably, the oxygen barrier is less than about 1.0 mm thick. More preferably, the oxygen barrier is 0.01 to 0.10 mm thick, and more preferably still, the oxygen barrier is less than 0.025 mm thick. If the oxygen barrier is too thick, then it may not be readily stretchable and/or conformable, and it may not allow a sufficient amount of light to pass through it. If the oxygen barrier is too thin, then it may tend to tear.

In an alternate method, a lens may be cured between two mold members. The gasket may be removed and any remaining liquid lens composition may be removed. At this point a mold member may be applied to a substantially solid conductive heat source. Heat may then be conductively applied to a face of the lens by (a) conductively transferring heat to a face of a mold member from the conductive heat source, and (b) conductively transferring heat through such mold member to the face of the lens. The oxygen barrier enriched with photoinitiator may then be applied, and second activating light rays may be directed towards the lens to cure the remaining lens forming composition.

4. Applying Coating Materials to Lenses

In an embodiment, coating apparatus 20 may be used to apply a pre-coat to a lens before the hardcoat is applied. The pre-coat may serve to increase the "wettability" of the surface to which the hardcoat is to be applied. A surfactant has been conventionally employed for this purpose, however surfactants tend to affect the volatility and flow characteristics of lens coatings in an unfavorable manner. The pre-coat may include acetone and/or BYK-300. Upon even distribution of the hardcoat onto a lens, the coating may be wiped near the edges of the lens to prevent the formation of excessive flakes during curing.

5. Curing by the Application of Pulsed Activating Light

Figure 22:
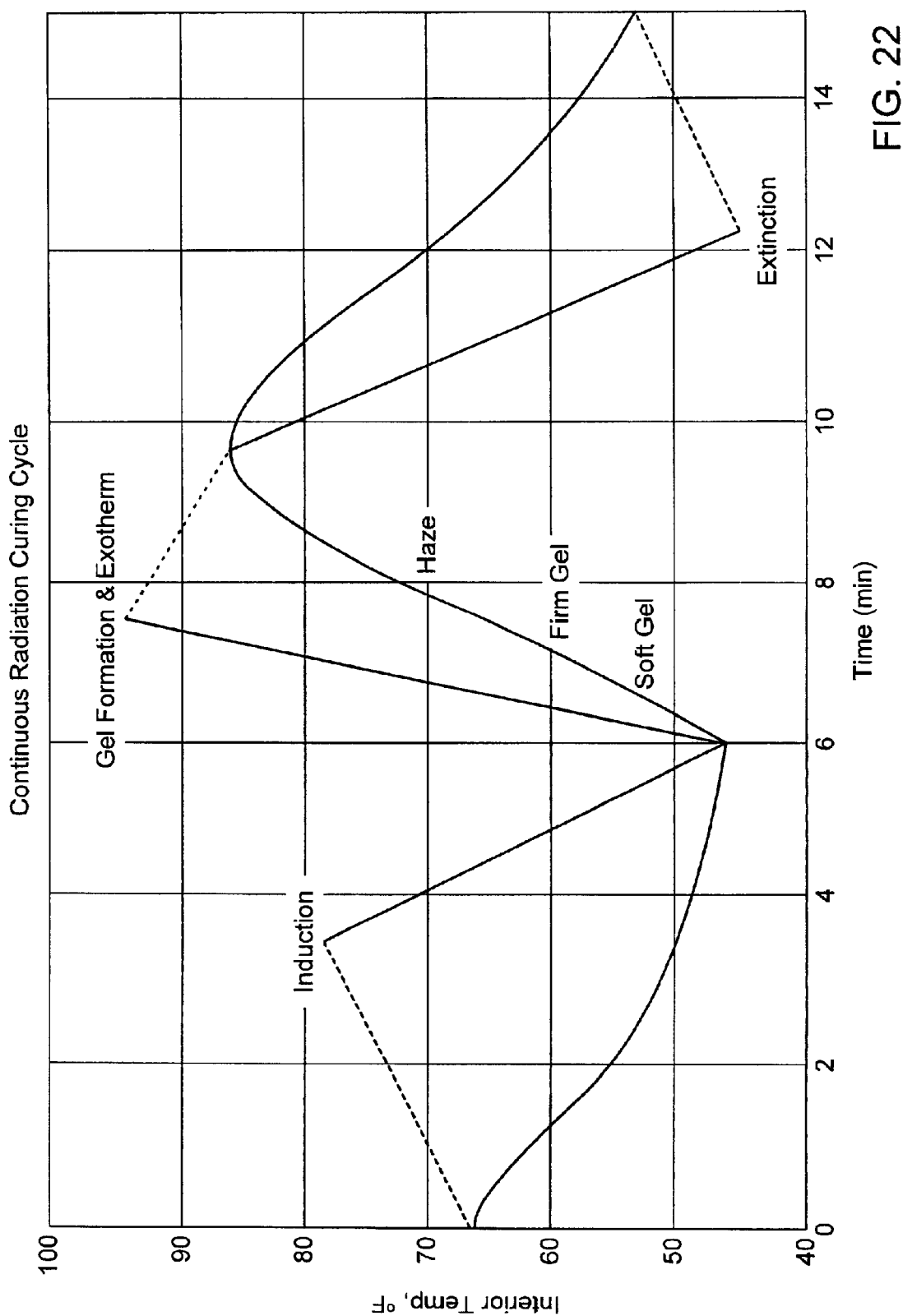
FIG. 22 depicts a graph illustrating a temperature profile of a continuous radiation cycle.

A polymerizable lens forming composition may be placed in a mold/gasket assembly and continuously exposed to appropriate levels of activating light to cure the composition to an optical lens. The progress of the curing reaction may be determined by monitoring the internal temperature of the composition. The lens forming composition may be considered to pass through three stages as it is cured: (1) induction, (2) gel formation & exotherm, and (3) extinction. These stages are illustrated in FIG. 22 for a −0.75–1.00 power lens cured by continuous application of activating light. FIG. 22 shows temperature within the mold cavity as a function of time throughout a continuous radiation curing cycle.

The induction stage occurs at the beginning of the curing cycle and is typically characterized by a substantially steady temperature of the lens forming composition as it is irradiated with activating light (or falling temperature when the curing chamber temperature is below that of the composition). During the induction period, the lens forming composition remains in a liquid state as the photoinitiator breaks down and consumes inhibitor and dissolved oxygen present in the composition. As the inhibitor content and oxygen content of the composition fall, decomposing photoinitiator and the composition begin to form chains to produce a pourable, "syrup-like" material.

As irradiation continues, the "syrup" proceeds to develop into a soft, non-pourable, viscous, gel. A noticeable quantity of heat will begin to be generated during this soft gel stage. The optical quality of the lens may be affected at this point. Should there be any sharp discontinuities in the intensity of the activating light (for example, a drop of composition on the exterior of a mold which focuses light into a portion of the lens forming composition proximate the drop), a local distortion will tend to be created in the gel structure, likely causing an aberration in the final product. The lens forming composition will pass through this very soft gel state and through a firm gel state to become a crystalline structure. When using OMB-91 lens forming composition, a haze tends to form momentarily during the transition between the gel and crystalline stages. As the reaction continues and more double bonds are consumed, the rate of reaction and the rate of heat generated by the reaction will slow, which may cause the internal temperature of the lens forming composition to pass through a maximum at the point where the rate of heat generation exactly matches the heat removal capacity of the system.

By the time the maximum temperature has been reached and the lens forming composition begins to cool, the lens will typically have achieved a crystalline form and will tend to crack rather than crumble if it is broken. The rate of conversion will slow dramatically and the lens may begin to cool even though some reaction still may be occurring. Irradiation may still be applied through this extinction phase. Generally, the curing cycle is assumed to be complete when the temperature of the lens forming composition falls to a temperature near its temperature at the beginning of exotherm (i.e., the point where the temperature of the composition increased due to the heat released by the reaction).

The continuous irradiation method tends to work well for relatively low mass lenses (up to about 20–25 grams, see, e.g., U.S. Pat. Nos. 5,364,256 and 5,415,816). As the amount of material being cured increases, problems may be encountered. The total amount of heat generated during the exothermic phase is substantially proportional to the mass of the lens forming material. During curing of relatively high mass lenses, a greater amount of heat is generated per a given time than during curing of lower mass lenses. The total mold/gasket surface area available for heat transfer (e.g., heat removal from the lens forming composition), however, remains substantially constant. Thus, the internal temperature of a relatively high mass of lens forming material may rise to a higher temperature more rapidly than typically occurs with a lower mass of lens forming material. For example, the internal temperature of a low minus cast-to-finish lens typically will not exceed about 100° F., whereas certain thicker semi-finished lens "blanks" may attain temperatures greater than about 350° F. when continually exposed to radiation. The lens forming material tends to shrink as curing proceeds and the release of excessive heat during curing tends to reduce the adhesion between the mold and the lens forming material. These factors may lead to persistent problems of premature release and/or cracking during the curing of lens forming material having a relatively high mass.

An advantage of the present method is the production of relatively high-mass, semi-finished lens blanks and high power cast-to-finish lenses without the above-mentioned problems of premature release and cracking. The methods described below allow even more control over the process of curing ophthalmic lenses with activating light-initiated polymerization than previous methods. By interrupting or decreasing the activating light at the proper time during the cycle, the rate of heat generation and release may be controlled and the incidence of premature release may be reduced. An embodiment relates to a method of controlling the rate of reaction (and therefore the rate of heat generation) of an activating light-curable, lens forming material by applying selected intermittent doses (e.g., pulses) of radiation followed by selected periods of decreased activating light or "darkness". It is to be understood that in the description that follows, "darkness" refers to the absence of activating radiation, and not necessarily the absence of visible light.

Figure 23:
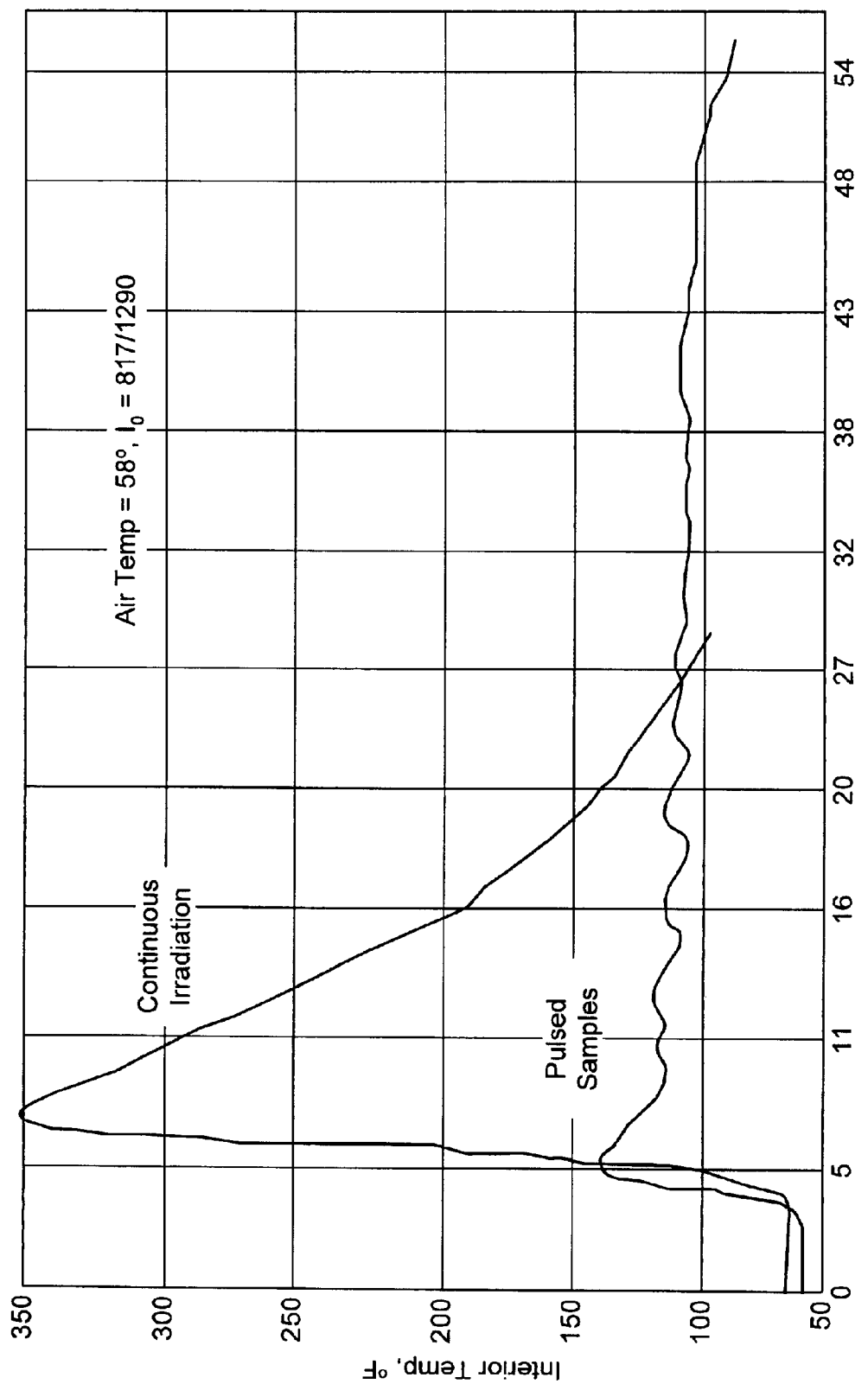
FIG. 23 depicts a graph illustrating temperature profiles for a continuous irradiation cycle and a pulse irradiation cycle employed with a mold/gasket set having a 3.00D base curve, and while applying cooled air at 58° F. to the mold/gasket set.

More particularly, an embodiment relates to: (a) an initial exposure period of the lens forming material to radiation (e.g., continuous or pulsed radiation) extending through the induction period, (b) interrupting or decreasing the irradiation before the material reaches a first temperature (e.g., the maximum temperature the composition could reach if irradiation were continued) and allowing the reaction to proceed to a second temperature lower than the first temperature, and (c) applying a sufficient number of alternating periods of exposure and decreased activating light or darkness to the lens forming material to complete the cure while controlling the rate of heat generation and/or dissipation via manipulation of the timing and duration of the radiation, or the cooling in the curing chamber. FIG. 23 shows the temperature within the mold cavity as a function of time for both (a) continuous activating light exposure and (b) pulsed activating light exposure.

In the context of this application, a "gel" occurs when the liquid lens forming composition is cured to the extent that it becomes substantially non-pourable, yet is still substantially deformable and substantially not crystallized.

In the following description, it is to be understood that the term "first period" refers to the length of time of the initial exposure period where radiation (e.g., in pulses) is applied to the lens forming composition, preferably to form at least a portion of the composition into a gel. "First activating" rays or light refers to the radiation applied to the lens forming composition during the initial exposure period. "Second activating" rays or light refers to the radiation that is applied to the lens forming composition (e.g., in pulses) after the composition has been allowed to cool to the "third temperature" mentioned above. "Second period" refers to the duration of time that second activating rays are directed to the lens forming composition. "Third period" refers to the duration of decreased activating light or darkness that ensues after activating light has been delivered in the second period.

In an embodiment, the lens forming material is preferably placed in a mold cavity defined in part between a first mold member and a second mold member. The first mold member and/or second mold member may or may not be continuously cooled as the formation of the lens is completed during the second period and/or third period. One method of removing heat from the lens forming material is to continuously direct air at a non-casting face of at least one of the mold members. It is preferred that air be directed at both the first and second mold members. A cooler may be used to cool the temperature of the air to a temperature below ambient temperature, more preferably between about 0° C. and about 20° C., and more preferably still between about 3° C. and about 15° C. Air may also be used to cool at least one of the mold members (in any of the manners described previously) during the first period.

In an embodiment, the first period ends when at least a portion of the lens forming composition begins to increase in temperature or form a gel, and the first activating rays are decreased or removed (e.g., blocked) such that they cease to contact the first or second mold members. It is preferred that the first period be sufficient to allow the lens forming material to gel in the mold cavity such that there is substantially no liquid present (except small amounts proximate the edge of the material). The interruption of irradiation prior to complete gelation may in some circumstances produce optical distortions. It is preferred that the length of the first period be selected to inhibit the lens forming composition from reaching a first temperature. The first temperature is preferably the maximum temperature that the lens forming composition could reach if it was irradiated under the system conditions (e.g., flow rate and temperature of any cooling air, wavelength and intensity of radiation) until the "exothermic potential" (i.e., ability to evolve heat through reaction) of the composition was exhausted.

According to an embodiment, the reactions within the composition are preferably allowed to proceed after the first activating rays are removed until the composition reaches a second temperature. The second temperature is preferably less than the first temperature. The first temperature is preferably never reached by the composition. Thus, the composition is preferably prevented from achieving the first temperature and then cooling to the second temperature. The composition is preferably allowed to cool from the second temperature to the third temperature. This cooling may occur "inactively" by allowing heat to transfer to the ambient surroundings, or at least one of the mold members may be cooled by any of the methods described above.

In an embodiment, the curing of the lens forming material may be completed by directing second activating rays (e.g., in pulses) toward at least one of the mold members. The second activating rays may be directed toward the mold member(s) for a second period that may be determined according to the rate of reaction of the lens forming composition. The change in temperature of the composition or a portion of the mold cavity, or the air in or exiting the chamber may be an indicator of the rate of reaction, and the second period may be determined accordingly. The second period may be varied such that subsequent pulses have a longer or shorter duration than previous pulses. The time between pulses (i.e., the third period) may also be varied as a function of the temperature and/or reaction rate of the composition. To achieve a light pulse, (a) the power to a light source may be turned on and then off, (b) a device may be used to alternately transmit and then block the passage of light to the lens forming composition, or (c) the light source and/or mold assembly may be moved to inhibit activating light from contacting the lens forming material. The second and/or third periods are preferably controlled to allow rapid formation of a lens while reducing the incidence of (a) premature release of the lens from the first and/or second mold member and/or (b) cracking of the lens.

In an embodiment, the second period is preferably controlled to inhibit the temperature of the composition from exceeding the second temperature. The temperature of the lens forming composition may continue to increase after radiation is removed from the first and/or second mold members due to the exothermic nature of reactions occurring within the composition. The second period may be sufficiently brief such that the pulse of second activating rays is removed while the temperature of the composition is below the second temperature, and the temperature of the composition increases during the third period to become substantially equal to the second temperature at the point that the temperature of the composition begins to decrease.

In an embodiment, the third period extends until the temperature of the composition becomes substantially equal to the third temperature. Once the temperature of the composition decreases to the third temperature, a pulse of second activating rays may be delivered to the composition. In an embodiment, the second period remains constant, and the third period is preferably controlled to maintain the temperature of the composition below the second temperature. The third period may be used to lower the temperature of the composition to a temperature that is expected to cause the composition to reach but not exceed the second temperature after a pulse is delivered to the composition.

In an embodiment, a shutter system may be used to control the application of first and/or second activating rays to the lens forming material. The shutter system preferably includes air-actuated shutter plates that may be inserted into the curing chamber to prevent activating light from reaching the lens forming material. Alternatively, the shutter system may include an LCD panel. Controller 50 may receive signals from thermocouple(s) located inside the lens-curing chamber, proximate at least a portion the mold cavity, or located to sense the temperature of air in or exiting the chamber, allowing the time intervals in which the shutters are inserted and/or extracted to be adjusted as a function of a temperature within the curing chamber. The thermocouple may be located at numerous positions proximate the mold cavity and/or casting chamber.

The wavelength and intensity of the second activating rays are preferably substantially equal to those of the first activating rays. It may be desirable to vary the intensity and/or wavelength of the radiation (e.g., first or second activating rays). The particular wavelength and intensity of the radiation employed may vary among embodiments according to such factors as the identity of the composition and curing cycle variables.

Numerous curing cycles may be designed and employed. The design of an optimal cycle should include consideration of a number of interacting variables. Significant independent variables include: 1) the mass of the sample of lens forming material, 2) the intensity of the light applied to the material, 3) the physical characteristics of the lens forming material, and 4) the cooling efficiency of the system. Significant curing cycle (dependent) variables include: 1) the optimum initial exposure time for induction and gelling, 2) the total cycle time, 3) the time period between pulses, 4) the duration of the pulses, and 5) the total exposure time.

Most of the experiments involving these methods were conducted using below described OMB-91 monomer. The OMB-91 formulation and properties are listed below.

| OMB-91 FORMULATION: | | | |
|---|---|---|---|
| INGREDIENT | WEIGHT PERCENT | | |
| Sartomer SR 351 (Trimethylolpropane Triacrylate) | 20.0 | +/− | 1.0 |
| Sartomer SR 268 (Tetraethylene Glycol Diacrylate) | 21.0 | +/− | 1.0 |
| Sartomer SR 306 (Tripropylene Glycol Diacrylate) | 32.0 | +/− | 1.0 |
| Sartomer SR 239 (1,6 Hexanediol Dimethacrylate) | 10.0 | +/− | 1.0 |
| (Bisphenol A Bis(Allyl Carbonate)) | 17.0 | +/− | 1.0 |
| Irgacure 184 (1-Hydroxycyclohexyl Phenyl Ketone) | 0.017 | +/− | 0.0002 |
| Methyl Benzoyl Formate | 0.068 | +/− | 0.0007 |
| Methyl Ester of Hydroquinone ("MeHQ") | 35 ppm | +/− | 10 ppm |
| Thermoplast Blue P (9,10 - Anthracenedione, 1-hydroxy-4-((4-methyl phenyl) Amino) | 0.35 ppm | +/− | 0.1 ppm |

| MEASUREMENTS/PROPERTIES: | |
|---|---|
| PROPERTY | PROPOSED SPECIFICATION |
| Appearance | Clear Liquid |
| Color | |
| (APHA) | 50 maximum |
| (Test Tube Test) | Match Standard |
| Acidity (ppm as Acrylic Acid) | 100 maximum |
| Refractive Index | 1.4725 +/− 0.002 |
| Density | 1.08 +/− 0.005 gm/cc. at 23° C. |
| Viscosity @ 22.5 Degrees C. | 27.0 +/− 2 centipoise |
| Solvent Weight (wt %) | 0.1 Maximum |
| Water (wt %) | 0.1 Maximum |
| MeHQ (from HPLC) | 35 ppm +/− 10 ppm |

It should be recognized that methods and systems disclosed could be applied to a large variety of radiation-curable, lens forming materials in addition to those mentioned herein. It should be understood that adjustments to curing cycle variables (particularly the initial exposure time) may be required even among lens forming compositions of the same type due to variations in inhibitor levels among batches of the lens forming compositions. In addition, changes in the heat removal capacity of the system may require adjustments to the curing cycle variables (e.g. duration of the cooling periods between radiation pulses). Changes in the cooling capacity of the system and/or changes in compositions of the lens forming material may require adjustments to curing cycle variables as well.

Significant variables impacting the design of a pulsed curing cycle include (a) the mass of the material to be cured and (b) the intensity of the activating light applied to the material. If a sample is initially overdosed with radiation, the reaction may progress too far and increase the likelihood of premature release and/or cracking. If a sample is underdosed initially in a fixed (i.e., preset) curing cycle, subsequent exposures may cause too great a temperature rise later in the cycle, tending to cause premature release and/or cracking. Additionally, if the light intensity varies more than about +/−10% in a cycle that has been designed for a fixed light intensity level and/or fixed mass of lens forming material, premature release and/or cracking may result.

An embodiment involves a curing cycle having two processes. A first process relates to forming a dry gel by continuously irradiating a lens forming composition for a relatively long period. The material is preferably cooled down to a lower temperature under darkness, after the irradiation is complete. A second process relates to controllably discharging the remaining exothermic potential of the material by alternately exposing the material to relatively short periods of irradiation and longer periods of decreased irradiation (e.g., dark cooling).

The behavior of the lens forming material during the second process will depend upon the degree of reaction of the lens forming material that has occurred during the first process. For a fixed curing cycle, it is preferable that the extent of reaction occurring in the first process consistently fall within a specified range. If the progress of reaction is not controlled well, the incidence of cracking and/or premature release may rise. For a curing cycle involving a composition having a constant level of inhibitor and initiator, the intensity of the radiation employed is the most likely source of variability in the level of cure attained in the first process. Generally, a fluctuation of +/−5% in the intensity tends to cause observable differences in the cure level achieved in the first process. Light intensity variations of +/−10% may significantly reduce yield rates.

The effect of various light intensities on the material being cured depends upon whether the intensity is higher or lower than a preferred intensity for which the curing cycle was designed. FIG. 25 shows temperature profiles for three embodiments in which different light levels were employed. If the light intensity to which the material is exposed is higher than a preferred intensity, the overdosage may cause the reaction to proceed too far. In such a case, excessive heat may be generated, increasing the possibility of cracking and/or premature release during the first process of the curing cycle. If premature release or cracking of the overdosed material does not occur in the first process, then subsequent pulses administered during the second process may create very little additional reaction.

If the light intensity is lower than a preferred intensity and the lens forming material is underdosed, other problems may arise. The material may not be driven to a sufficient level of cure in the first process. Pulses applied during the second process may then cause relatively high amounts of reaction to occur, and the heat generated by reaction may be much greater than the heat removal capacity of the system. Thus the temperature of the lens forming material may tend to excessively increase. Premature release may result. Otherwise, undercured lenses that continue generating heat after the end of the cycle may be produced.

The optimal initial radiation dose to apply to the lens forming material may depend primarily upon its mass. The initial dose may also be a function of the light intensity and exposure time. A method for designing a curing cycle for a given mold/gasket/monomer combination may involve selecting a fixed light intensity.

The methods disclosed may involve a wide range of light intensities. Using a relatively low intensity may allow for the length of each cooling step to be decreased such that shorter and more controllable pulses are applied. Where a fluorescent lamp is employed, the use of a lower intensity may allow the use of lower power settings, thereby reducing the load on the lamp cooling system and extending the life of the lamp. A disadvantage of using a relatively low light intensity is that the initial exposure period may be somewhat longer. Relatively high intensity levels tend to provide shorter initial exposure times while placing more demand upon the lamp drivers and/or lamp cooling system, either of which tends to reduce the life of the lamp.

Once a light intensity is selected, the initial exposure time may be determined. A convenient method of monitoring the reaction during the cycle involves fashioning a fine gauge thermocouple, positioning it inside the mold cavity, and connecting it to an appropriate data acquisition system. A preferred thermocouple is Type J, 0.005 inch diameter, Teflon-insulated wire available from Omega Engineering. The insulation is preferably stripped back about 30 to 50 mm and each wire is passed through the gasket wall via a fine bore hypodermic needle. The needle is preferably removed and the two wires may be twisted together to form a thermocouple junction inside the inner circumference of the gasket. The other ends of the leads may be attached to a miniature connector which may be plugged into a permanent thermocouple extension cord leading to the data acquisition unit after the mold set is filled.

The data acquisition unit may be a Hydra 2625A Data Logger made by John Fluke Mfg. Company. It is preferably connected to an IBM compatible personal computer running Hydra Data Logger software. The computer is preferably configured to display a trend plot as well as numeric temperature readings on a monitor. The scan interval may be set to any convenient time period and a period of five or ten seconds usually provides good resolution.

The position of the thermocouple junction in the mold cavity may affect its reading and behavior through the cycle. When the junction is located between the front and back molds, relatively high temperatures may be observed compared to the temperatures at or near the mold face. The distance from the edge of the cavity to the junction may affect both absolute temperature readings as well as the shape of the curing cycle's temperature plot. The edges of the lens forming material may begin to increase in temperature slightly later than other portions of the material. Later in the cycle, the lens forming material at the center may be somewhat ahead of the material at the edge and will tend to respond little to the radiation pulses, whereas the material near the edge may tend to exhibit significant activity. When performing experiments to develop curing cycles, it is preferred to insert two probes into the mold cavity, one near the center and one near the edge. The center probe should be relied upon early in the cycle and the edge probe should guide the later stages of the cycle.

Differing rates of reaction among various regions of the lens forming material may be achieved by applying a differential light distribution across the mold face(s). Tests have been performed where "minus type" light distributions have caused the edge of the lens forming material to begin reacting before the center of the material. The potential advantages of using light distributing filters to cure high mass semi-finished lenses may be offset by non-uniformity of total light transmission that tends to occur across large numbers of filters.

After the selection and/or configuration of (a) the radiation intensity, (b) the radiation-curable, lens forming material, (c) the mold/gasket set, and (d) the data acquisition system, the optimum initial exposure period may be determined. It is useful to expose a sample of lens forming material to continuous radiation to obtain a temperature profile. This will provide an identifiable range of elapsed time within which the optimal initial exposure time will fall. Two points of interest may be the time where the temperature rise in the sample is first detected ("T initial" or "Ti"), and the time where the maximum temperature of the sample is reached ("Tmax"). Also of interest is the actual maximum temperature, an indication of the "heat potential" of the sample under the system conditions (e.g., in the presence of cooling).

As a general rule, the temperature of high mass lenses (i.e., lenses greater than about 70 grams) should remain under about 200° F. and preferably between about 150° F. and about 180° F. Higher temperatures are typically associated with reduced lens yield rates due to cracking and/or premature release. Generally, the lower mass lenses (i.e., lenses no greater than about 45 grams) should be kept under about 150° F. and preferably between about 110° F. and about 140° F.

The first period may be selected according to the mass of the lens forming material. In an embodiment, the lens forming material has a mass of between about 45 grams and about 70 grams and a selected second temperature between about 150° F. and about 200° F. According to another embodiment, the lens forming material has a mass no greater than about 45 grams and a second temperature less than about 150° F. In yet another embodiment, the lens forming material has a mass of at least about 70 grams, and a second temperature between about 170° F. and about 190° F.

An experiment may be performed in which the radiation is removed from the mold members slightly before one-half of the time between T initial and Tmax. The initial exposure time may be interactively reduced or increased according to the results of the above experiment in subsequent experiments to provide a Tmax in a preferred range. This procedure may allow the determination of the optimal initial exposure time for any given mold/gasket set and light intensity.

A qualitative summary of relationships among system variables related to the above-described methods is shown in FIG. 24.

After the initial exposure period, a series of irradiation pulse/cooling steps may be performed to controllably discharge the remaining exothermic potential of the material and thus complete the cure. There may be at least two approaches to accomplish this second process. The first involves applying a large number of very short pulses and short cooling periods. The second approach involves applying a fewer number of longer pulses with correspondingly longer cooling periods. Either of these two methods may produce a good product and many acceptable cycles may exist between these extremes.

The described method relates to using pulsed application of light to produce a large range (e.g., from −6 to +4 diopter) of lenses without requiring refrigerated cooling fluid (e.g., cooled air). With proper light application, air at ambient may be used as a cooling fluid, thus significantly reducing system costs.

The following general rules for the design of pulse/cooling cycles may be employed to allow rapid curing of a lens while inhibiting premature release and/or cracking of the lens. The duration of the pulses preferably does not result in a temperature that exceeds the maximum temperature attained in the initial exposure period. The length of the cooling period may be determined by the length of time necessary for the internal temperature of the lens forming material to return to near the temperature it had immediately before it received a pulse. Following these general rules during routine experimentation may permit proper curing cycles to be established for a broad range of lens forming materials, light intensity levels, and cooling conditions.

Preferably, light output is measured and controlled by varying the amount of power applied to the lights in response to changes in light output. Specifically, a preferred embodiment includes a light sensor mounted near the lights. This light sensor measures the amount of light, and then a controller increases the power supplied to maintain the first activating light rays as the intensity of the first activating light rays decreases during use, and vice versa. Preferably, the power is varied by varying the electric frequency supplied to the lights.

In an embodiment, a medium pressure mercury vapor lamp is used to cure the lens forming material and the lens coating. This lamp and many conventional light sources used for activating light curing may not be repeatedly turned on and off since a several minute warm-up period is generally required prior to operation. Mercury vapor light sources may be idled at a lower power setting between exposure periods (i.e, second periods), however, the light source will still generate significant heat and consume electricity while at the lower power setting.

In an embodiment, air at ambient temperature may be used to cool the lens forming composition. When a xenon flash lamp is used, the pulses of light generally have a duration of much less than about one second and considerably less radiative heat tends to be transferred to the lens forming composition compared to curing methods employing other activating light sources. Thus, the reduced heat imparted to the lens forming composition may allow for air at ambient temperature to remove sufficient heat of exotherm to substantially inhibit premature release and/or cracking of the lens.

In an embodiment, a xenon source is used to direct first activating light rays toward the first and second mold members to the point that a temperature increase is measured and/or the lens forming composition begins to or forms a gel. It is preferred that the gel is formed with less than 15 pulses of radiation, and more preferably with less than about 5 pulses. It is preferred that the gel is formed before the total time to which the composition has been exposed to the pulses exceeds about 1/10 or 1/100 of a second.

In an embodiment, a reflecting device is preferably employed in conjunction with the xenon light source. The reflecting device is positioned behind the flash source and preferably allows an even distribution of activating light rays from the center of the composition to the edge of the composition.

In an embodiment, a xenon light flash lamp is preferably used to apply a plurality of activating light pulses to the lens forming composition to cure it to an eyeglass lens in a time period of less than 30 minutes, or more preferably, less than 20 or 15 minutes.

The use of a xenon light source also may allow the formation of lenses over a wider range of diopters. Higher power lenses exhibit greatest thinnest to thickest region ratios, meaning that more shrinkage-induced stress may be created, causing greater mold flexure and thus increased tendency for premature release. Higher power lenses also possess thicker regions. Portions of lens forming material within these thicker regions may receive less light than regions closer to the mold surfaces. Continuous irradiation lens forming techniques typically require the use of relatively low light intensities to control the heat generated during curing. The relatively low light intensities used tends to result in a long, slow gelation period. Optical distortions tend to be created when one portion of the lens is cured at a different rate than another portion. Methods characterized by non-uniform curing are typically poorly suited for the production of relatively high power lenses, since the deeper regions (e.g., regions within a thick portion of a lens) tend to gel at a slower rate than regions closer to the mold surfaces.

The relatively high intensity attainable with the xenon source may allow deeper penetration into, and/or saturation of, the lens forming material, thereby allowing uniform curing of thicker lenses than in conventional radiation-initiated curing. More uniform gelation may occur when the lens forming material is dosed with a high intensity pulse of activating light and then subjected to decreased activating light or darkness as the reaction proceeds without activating radiation. Lenses having a diopter of between about +5.0 and about −6.0 and greater may be cured. It is believed that light distribution across the sample is less critical when curing and especially when gelation is induced with relatively high intensity light. The lens forming material may be capable of absorbing an amount of energy per time that is below that delivered during a relatively high intensity pulse. The lens forming material may be "oversaturated" with respect to the light delivered via a high intensity flash source. In an embodiment, the xenon source is preferably used to cure a lens having a diopter between about −4.0 and about −6.0. In an embodiment, the xenon source is preferably used to cure a lens having a diopter between about +2.0 and about +4.0.

The methods disclosed herein allow curing of high-mass semi-finished lens blanks from the same material used to cure cast-to-finish lenses. Both are considered to be "eyeglass lenses" for the purposes of this patent. These methods may also be used to cure a variety of other lens forming materials. These methods have been successfully used to make cast-to-finish lenses in addition to semi-finished lenses.

6. Improved Lens Curing Process

When casting an eyeglass lens with activating light, the gelation pattern of the lens forming composition may affect the resultant optical quality of the lens. If there are localized discontinuities in the light intensities received by the monomer contained in the casting cavity during the early stages of the polymerization process, optical distortions may be seen in the finished product. Higher power lenses are, by definition, thicker in certain regions than relatively lower power lenses of the same diameter. The layers of a lens closest to the mold faces of the casting cavity tend to receive a higher light intensity than the deeper layers because the lens forming composition absorbs some of the incident light. This causes the onset of polymerization to be delayed in the deeper layers relative to the outer layers, which may cause optical distortions in the finished product. It is believed that concurrent with this differential curing rate, there is a difference in the rate of exothermic heat generation, specifically, the deeper regions will begin to generate heat after the outer regions in the cavity have already cured and the effectiveness of the heat removal may be impaired, contributing to optical waves and distortions in the finished product. This phenomena is particularly observable in high powered positive lenses due to the magnification of such defects.

In an embodiment, the lens forming composition contained within the casting cavity is exposed to relatively high intensity activating light for a time period sufficient to initialize the reaction. Irradiation is preferably terminated before the polymerization of the lens forming composition proceeds far enough to generate a substantial amount of heat. This initial relatively high intensity dose preferably substantially uniformly gels the material within the casting cavity such that the difference in the rate of reaction between the inner and outer layers of the lens being cured is preferably reduced, thereby eliminating the waves and distortions often encountered when using continuous low intensity irradiation to initialize the reaction, particularly with high dioptric power positive lenses.

In an embodiment, the relatively high intensity dose of activating light is preferably applied to the lens forming composition in the form of pulses. The pulses preferably have a duration of less than about 10 seconds, preferably less than about 5 seconds, and more preferably less than about 3 seconds. The pulses preferably have an intensity of at least about 10 milliwatts/cm$^2$, more preferably at least about 100 milliwatts/cm$^2$, and more preferably still between about 150 milliwatts/cm$^2$ and about 250 milliwatts/cm$^2$. It is preferred that substantially all of the lens forming composition forms into a gel after the initial application of the relatively high intensity activating light. In an embodiment, no more than an insubstantial amount of heat is generated by exothermic reaction of the lens forming composition during the initial application of the relatively high intensity activating light.

Subsequent to this initial high intensity dose, a second irradiation step may be performed in which the material contained within the casting cell is preferably irradiated for a relatively longer time at a relatively lower intensity while cool fluid is directed at the non-casting surface of at least one of the molds forming the cavity. The cooling fluid preferably removes the exothermic heat generated by the polymerization of the lens forming composition. If the intensity of the activating light is too great during this second irradiation step, the rate of heat generation will tend to be too rapid and the lens may release prematurely from the casting face of the mold and/or crack. Similarly, should the rate of heat removal from the lens forming composition be too slow, the lens may release prematurely and/or crack. It is preferred that the mold/gasket assembly containing the lens forming composition be placed within the cooling environment as shortly after the initial dose of activating light as possible.

In an embodiment, the activating light applied to the lens forming composition during the second irradiation step is preferably less than about 350 microwatts/cm$^2$, more preferably less than about 150 microwatts/cm$^2$, and more preferably still between about 90 microwatts/cm$^2$ and about 100 microwatts/cm$^2$. During the second irradiation step, the activating light may be applied to the lens forming composition continuously or in pulses. A translucent high density polyethylene plate may be positioned between the activating light generator and at least one of the mold members to reduce the intensity of the activating light to within a preferred range.

In an embodiment, relatively high intensity activating light is preferably applied to the lens curing composition in a third irradiation step to post-cure the lens subsequent to the second relatively low intensity irradiation step. In the third irradiation step, pulses of activating light are preferably directed toward the lens forming composition, although the composition may be continuously irradiated instead. The pulses preferably have an intensity of at least about 10 milliwatts/cm$^2$, more preferably at least about 100 milliwatts/cm$^2$, and more preferably still between about 100 milliwatts/cm$^2$ and about 150 milliwatts/cm$^2$.

Each of the above-mentioned irradiation steps is preferably performed by directing the activating light through each of the first and second mold members. The eyeglass lens is preferably cured in a total time of less than 30 minutes and is preferably free of cracks, striations, distortions, haziness, and yellowness.

It is believed that the above-described methods enable the production of whole lenses in prescription ranges beyond those currently attainable with continuous low intensity irradiation. The method may be practiced in the curing of relatively high or low power lenses with a reduced incidence of optical distortions in the finished lens as compared to conventional methods. It is to be understood that the above-described methods may be used independently or combined with the methods and apparatus of preferred embodiments described above in the previous sections.

7. Improved Scratch Resistant Lens Formation Process

Figure 29:
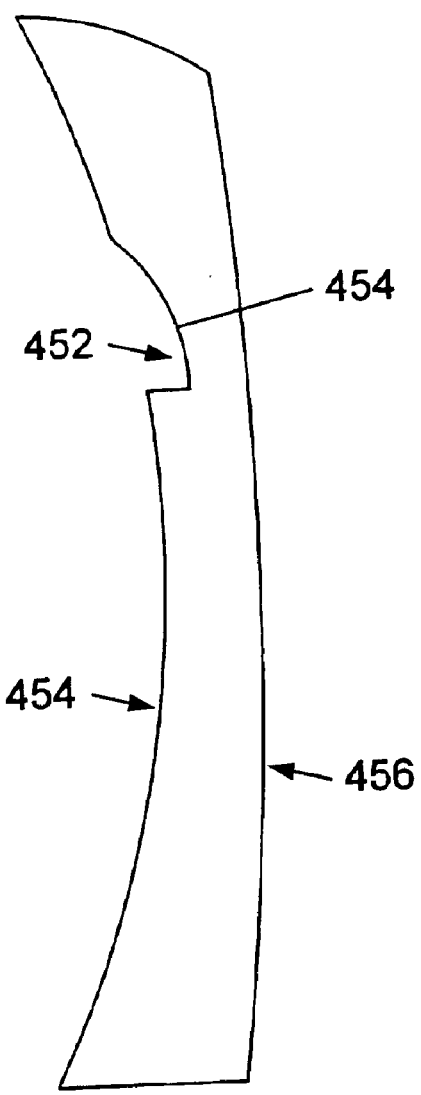
FIG. 29 depicts a cross sectional view of a flat-top bifocal mold.

The "in-mold" method involves forming a scratch resistant coating over an eyeglass lens by placing the liquid coating in a mold and subsequently curing it. The in-mold method may be advantageous to "out-of-mold" methods since the in-mold method exhibits less occurrences of coating defects manifested as irregularities on the anterior surface of the coating. Using the in-mold method produces a scratch resistant coating that replicates the topography and smoothness of the mold casting face. However, a problem encountered when using conventional in-mold scratch resistant coatings is that minute "pinholes" often form in the coating. It is believed that the pinholes may be caused by either contaminants on the mold, airborne particles falling on the coating before it is cured, or bubbles formed during the application of the coating which burst afterwards. The formation of such pinholes is especially prevalent when using a flat-top bifocal mold, such as the one depicted in FIG. 29. As illustrated, the segment line 454 of a bifocal segment 452 below the main surface 456 of the mold reduces the smoothness of the casting face. When a coating is spin-coated over the mold face, this indentation may become an obstacle to the even flow of the casting face. The pinhole defects may be a problem in tinted lenses because the dye used to tint a lens may penetrate through the pinholes, resulting in a tiny speck of dye visible in the lens.

According to an embodiment, a first coating composition (i.e., a polymerizable "primer" material) is preferably passed through a filter and then placed within a mold member having a casting face and a non-casting face. The first coating composition preferably contains a photoinitiator to make it curable upon exposure to activating light. The mold member may then be spun so that the first composition becomes distributed over the casting face. The mold member may be rotated about a substantially vertical axis at a speed between about 750 and about 1500 revolutions per minute, preferably between about 800 and about 1000 revolutions per minute, more preferably at about 900 revolutions per minute. Further, a dispensing device may be used to direct an additional amount of the first composition onto the casting face while the mold member is spinning. The dispensing device preferably moves from the center of the mold member to an edge of the mold member so that the additional amount is preferably directed along a radius of the mold member. Activating light is preferably directed at the mold member to cure at least a portion of the first composition.

A second coating composition may then be placed upon the first composition in the mold member. The second coating is also preferably curable when exposed to activating light because it contains a photoinitiator. The mold member is preferably spun to distribute the second coating composition over the cured portion of the first coating composition. The mold member may also be spun simultaneously while adding the second composition to the mold member. Activating light is then preferably directed at the mold member to simultaneously cure at least a portion of the second coating composition and form a transparent combination coat having both coating compositions. The combination coat is preferably a substantially scratch-resistant coating. The mold member may then be assembled with a second mold member by positioning a gasket between the members to seal them. Therefore, a mold having a cavity shared by the original two mold members is formed. An edge of the gasket may be displaced to insert a lens-forming composition into the cavity. The combination coat and the lens-forming material preferably adhere well to each other. This lens-forming composition preferably comprises a photoinitiator and is preferably cured using activating light. Air which preferably has a temperature below ambient temperature may be directed toward a non-casting face of the second mold member to cool the lens-forming composition while it is being cured.

The primer coat preferably comprises a mixture of high viscosity monomers, a low viscosity, low flashpoint organic solvent, and a suitable photoinitiator system. The solvent may make up more than about 80% of the mixture, preferably about 93% to 96%. This mixture preferably has low viscosity and preferably covers any surface irregularity during the spin application, for example the segment line of a flat-top bifocal mold. The low flashpoint solvent preferably evaporates off relatively quickly, leaving a thin layer of high viscosity monomer, containing photoinitiator, which coats the casting face of the mold. The cured primer coat is preferably soft to allow it to adhere well to the glass mold face. Since the primer coat is soft, it may not possess scratch resistant characteristics. However, applying a high scratch resistance hard coating (i.e., the second coating composition) to the primer coat preferably results in a scratch resistant combination coat. The hard coat preferably contains a solvent which evaporates when the mold member is rotated to distribute the hard coating over the primer coat.

In general, the ideal primer material preferably possesses the following characteristics: exhibits chemical stability at normal storage conditions (e.g., at room temperature and in the absence of activating light); flows well on an irregular surface, especially over a flat-top bifocal segment; when cured with a specified activating light dose, leaves a crack-free coating, with a high double bond conversion (approximately greater than 80%); maintains adhesion with the mold face through the lens forming curing cycle, especially the segment part of the flat-top bifocal mold; and is chemically compatible with the hard coat that is subsequently applied on top of it (e.g., forms an optically clear combination coat). Even though pinhole defects may be present in either the primer coat or the hard coat, it is highly unlikely that defects in one coat would coincide with defects of another coat. Each coat preferably covers the holes of the other coat, resulting in less pinholes in the combination coat. Thus, the filled in-mold coated lens may be tinted using dye without problems created by pinholes. It is also preferably free of cracks, yellowness, haziness, and distortions.

In an embodiment, the gasket between the first mold member and the second mold member may be removed after a portion of the lens-forming material has been cured. The removal of the gasket preferably exposes an edge of the lens. An oxygen barrier having a photoinitiator may be placed around the exposed edge of the lens, wherein the oxygen barrier photoinitiator is preferably near an uncured portion of the lens-forming composition. Additional activating light rays may then be directed towards the lens to cause at least a portion of the oxygen barrier photoinitiator to initiate reaction of the lens-forming material. The oxygen barrier preferably prevents oxygen from contacting at least a portion of the lens forming composition during exposure of the lens to the activating rays.

According to one embodiment, a substantially solid conductive heat source is preferably applied to one of the mold members. Heat may be conductively transferred from the heat source to a face of the mold member. Further, the heat may be conductively transferred through the mold member to the face of the lens.

8. Method for Forming a Plastic Lens Containing Ultraviolet/Visible Light Absorbing Compounds.

Materials (hereinafter referred to as "ultraviolet/visible light absorbing compounds") that absorb various degrees of ultraviolet/visible light may be used in an eyeglass lens to inhibit ultraviolet/visible light from being transmitted through the eyeglass lens. Such an eyeglass lens advantageously inhibits ultraviolet/visible light from being transmitted to the eye of a user wearing the lens. Curing of an eyeglass lens using activating light to initiate the polymerization of a lens forming composition generally requires that the composition exhibit a high degree of activating light transmissibility so that the activating radiation may penetrate to the deeper regions of the lens cavity. Otherwise the resulting cast lens may possess optical aberrations and distortions. The cast lens may also contain layers of cured material in the regions closest to the transparent mold faces, sandwiching inner layers which may be either incompletely cured, gelled, barely gelled, or even liquid. Often, when even small amounts of ultraviolet/visible light absorbing compounds of the types well known in the art are added to a normally activating light curable lens forming composition, substantially the entire amount of lens forming composition contained within the lens cavity may remain liquid in the presence of activating radiation.

Photochromic pigments which have utility for photochromic eyeglass lenses absorb ultraviolet/visible light strongly and change from an unactivated state to an activated state when exposed to ultraviolet/visible light. The presence of photochromic pigments, as well as other ultraviolet/visible light absorbing compounds within a lens forming composition, generally does not permit enough activating radiation to penetrate into the depths of the lens cavity sufficient to cause photoinitiators to break down and initiate polymerization of the lens forming composition. Thus, it may be difficult to cure a lens forming composition containing ultraviolet/visible light absorbing compounds using activating light. It is therefore desirable to provide a method for using activating light to initiate polymerization of an eyeglass lens forming monomer which contains ultraviolet/visible light absorbing compounds, in spite of the high activating light absorption characteristics of the ultraviolet/visible light absorbing compounds. Examples of such ultraviolet/visible light absorbing compounds other than photochromic pigments are fixed dyes and colorless additives.

In an embodiment, an ophthalmic eyeglass lens may be made from a lens forming composition comprising a monomer, an ultraviolet/visible light absorbing compound, an photoinitiator, and a co-initiator. Examples of these compounds are listed in the section "Lens Forming Compositions Including Ultraviolet/Visible Light Absorbing Materials". The lens forming composition, in liquid form, is preferably placed in a mold cavity defined by a first mold member and a second mold member. It is believed that activating light, which is directed toward the mold members to activate the photoinitiator, causes the photoinitiator to form a polymer chain radical. The polymer chain radical preferably reacts with the co-initiator more readily than with the monomer. The co-initiator may react with a fragment or an active species of either the photoinitiator or the polymer chain radical to produce a monomer initiating species in the regions of the lens cavity where the level of activating light is either relatively low or not present.

The co-initiator is preferably activated only in the presence of the photoinitiator. Further, without the co-initiator, the photoinitiator may exclusively be activated near the surface of the lens forming composition but not within the middle portion of the composition. Therefore, using a suitable photoinitiator combined with a co-initiator permits polymerization of the lens forming composition to proceed through the depths of the lens cavity. A cured, clear, aberration free lens is preferably formed in less than about 30 minutes, more preferably in less than about 10 minutes. The lens, when exposed to ultraviolet/visible light preferably inhibits at least a portion of the ultraviolet/visible light from being transmitted through the lens that is preferably formed. A lens that permits no ultraviolet light from passing through the lens (at least with respect to certain ultraviolet wavelengths) is more preferred.

The identity of the major polymerizable components of the lens forming composition tends to affect the optimal curing process. It is anticipated that the identity of the ultraviolet/visible light absorbing compound present in the monomer or blend of monomers may affect the optimal photoinitiator/co-initiator system used as well as the optimal curing process used to initiate polymerization. Also, varying the identities or the proportions of the monomer(s) in the lens forming composition may require adjustments to various production process variables including, but not limited to, exposure times, exposure intensities, cooling times and temperatures, activating light and thermal postcure procedures and the like. For example, compositions comprising relatively slow reacting monomers, such as bisphenol A bis allyl carbonate or hexanediol dimethacrylate, or compositions comprising relatively higher proportions of such monomers may require either longer exposure times, higher intensities, or both. It is postulated that increasing the amount of either fast reacting monomer or the initiator levels present in a system will require reduced exposure times, more rigidly controlled light doses, and more efficient exothermic heat removal.

Exothermic reactions may occur during the curing process of the lens forming composition. The thicker portions of the lens forming composition may generate more heat than the thinner portions of the composition as a result of the exothermic reactions taking place. It is believed that the speed of reaction in the thicker sections is slower than in the thinner sections. Thus, in a positive lens a "donut effect" may occur in which the relatively thin outer portion of the lens forming composition reaches its fully cured state before the relatively thick inner portion of the lens forming composition. Conversely, in a negative lens the relatively thin inner portion of the lens forming composition may reach its fully cured state before the relatively thick outer portion of the lens forming composition.

After the lens forming composition is preferably loaded into a mold assembly, the mold assembly is preferably irradiated with activating light at an appropriate intensity and duration. Typically, the intensity and duration of activating light required to produce a lens containing ultraviolet/visible light absorbers is preferably significantly higher than the intensity and duration of light required for forming non-ultraviolet/visible light absorbing lenses. The mold assembly may also require multiple doses for curing. This may require a different apparatus and/or setup from that used to form non-UV absorbing lenses.

In one embodiment, an apparatus may be capable of forming clear, colored, or photochromic lenses without significantly altering the apparatus. In order to achieve this the lens forming composition will preferably include ultraviolet/visible light absorbers. By placing ultraviolet/visible light absorbers in a clear non-photochromic lens forming composition, a clear lens may be obtained under similar conditions to those used for colored and photochromic lenses. Thus, the addition of ultraviolet/visible light absorbers to a non-photochromic lens forming composition, allows both photochromic and non-photochromic lens forming compositions to be cured using the same apparatus and similar procedures. An added advantage, is that the produced clear lenses provide additional ultraviolet/visible light protection to the user that may not be present in clear lenses formed without ultraviolet/visible light absorbers. In this manner, plastic lenses may be formed which exhibit many of the same properties as glass lenses however, the plastic lenses may be produced more rapidly, at lower cost, and have a weight significantly less than their glass counterparts.

9. Actinic Light Initiated Polymerization Ultraviolet/Visible Light Absorbing Compositions.

Curing of an eyeglass lens using activating light to initiate the polymerization of a lens forming composition generally requires that the composition exhibit a high degree of activating light transmissibility so that the activating light may penetrate to the deeper regions of the lens cavity. Otherwise the resulting cast lens may possess optical aberrations and distortions. The cast lens may also contain layers of cured material in the regions closest to the transparent mold faces, sandwiching inner layers which may be either incompletely cured, gelled, barely gelled, or even liquid Often, when even small amounts of activating light absorbing compounds have been added to a normally curable lens forming composition, substantially the entire amount of lens forming composition contained within the lens cavity may remain liquid in the presence of activating light.

Photochromic pigments that have utility for photochromic eyeglass lenses typically absorb activating light strongly and change from an inactivated state to an activated state when exposed to activating light. The presence of photochromic pigments, as well as other activating light absorbing compounds within a lens forming composition, generally does not permit enough activating radiation to penetrate into the depths of the lens cavity sufficient to cause photoinitiators to break down and initiate polymerization of the lens forming composition. Examples of such activating light absorbing compounds other than photochromic pigments are fixed dyes and colorless additives.

It is therefore difficult to cure a lens forming composition containing activating light absorbing compounds using activating light. One solution to this problem involves the use of a co-initiator. By using a co-initiator, activating light may be used to initiate the polymerization reaction. It is believed that activating light that is directed toward the mold members may cause the photoinitiator to form a polymer chain radical. The polymer chain radical preferably reacts with the co-initiator more readily than with the monomer. The co-initiator may react with a fragment or an active species of either the photoinitiator or the polymer chain radical to produce a monomer initiating species in the regions of the lens cavity where the level of activating light is either relatively low or not present. It is therefore desirable to provide a method for polymerizing an eyeglass lens forming composition that contains light absorbing compounds by using activating light having a wavelength that is not absorbed by the light absorbing compounds, thus avoiding the need for a co-initiator.

In an embodiment, an ophthalmic eyeglass lens may be made from a lens forming composition comprising a monomer, a light absorbing compound, and a photoinitiator, by irradiation of the lens forming composition with activating light. As used herein "activating light" means light that may effect a chemical change. Activating light may include ultraviolet light, actinic light, visible light or infrared light. Generally any wavelength of light capable of effecting a chemical change may be classified as activating. Chemical changes may be manifested in a number of forms. A chemical change may include, but is not limited to, any chemical reaction which causes a polymerization to take place. Preferably the chemical change causes the formation of a initiator species within the lens forming composition, the initiator species being capable of initiating a chemical polymerization reaction.

The lens forming composition, in liquid form, is preferably placed in a mold cavity defined by a first mold member and a second mold member. It is believed that activating light, when directed toward and through the mold members to activate the photoinitiator, causes the photoinitiator to form a polymer chain radical. The polymer chain radical may react with a fragment or an active species of either photoinitiator or the polymer chain radical to produce a monomer initiating species in other regions of the lens cavity.

The use of activating light of the appropriate wavelength preferably prevents the lens from darkening during the curing process. Herein, "darkening" means becoming at least partially non-transparent to the incoming activating light such that the activating light may not significantly penetrate the lens forming composition. Photochromic compounds may cause such darkening. Ultraviolet/visible light absorbing compounds present in the lens forming composition may prevent activating light having a wavelength substantially below about 380 nm from penetrating into the lens forming composition. When treated with activating light containing light with wavelengths in the ultraviolet region, e.g. light with wavelengths below about 380 nm, the ultraviolet/visible light absorbing compounds may darken, preventing further ultraviolet activating light from penetrating the lens forming composition. The darkening of the lens forming composition may also prevent non-ultraviolet activating light from penetrating the composition. This darkening effect may prevent activating light of any wavelength from initiating the polymerization reaction throughout the lens forming composition.

When the ultraviolet/visible light absorbing compounds absorb in the ultraviolet region, activating light having a wavelength above about 380 nm (e.g., actinic light) may be used to prevent the darkening effect. Because the wavelength of the activating light is substantially above the wavelength at which the ultraviolet/visible light absorbing compounds absorb, the darkening effect may be avoided. Additionally, activating light with a wavelength above about 380 nm may be used to initiate the polymerization of the lens forming material. By the use of such activating light an eyeglass lens containing ultraviolet/visible light absorbing compounds may, in some circumstances, be formed without the use of a co-initiator.

In an embodiment, the above-described lens forming composition, where the ultraviolet/visible light absorbing compound absorbs, predominantly, ultraviolet light, may be treated with activating light having a wavelength above about 380 nm to activate the photoinitiator. Preferably, activating light having a wavelength substantially between about 380 nm to 490 nm is used. By using activating light above about 380 nm the darkening effect caused by the ultraviolet/visible light absorbing compounds may be avoided. The activating light may penetrate into the lens forming composition, initiating the polymerization reaction throughout the composition. A filter which blocks light having a wavelength that is substantially below about 380 nm may be used to prevent the ultraviolet/visible light absorbing compounds from darkening.

The use of activating light permits polymerization of the lens forming composition to proceed through the depths of the lens cavity. A cured, clear, aberration free lens is preferably formed in less than about 30–60 minutes, more preferably in less than about 20 minutes. As used herein a "clear lens" means a lens that transmits visible light without scattering so that objects beyond the lens may be seen clearly. As used herein "aberration" means the failure of a lens to produce point-to-point correspondence between an object and its image. The lens, when exposed to ultraviolet/visible light, preferably inhibits at least a portion of the ultraviolet/visible light from being transmitted through the lens. In this manner the eye may be protected from certain light. A lens that permits no ultraviolet/visible light from passing through the lens (at least with respect to certain wavelengths) is more preferred.

In an embodiment, the lens forming composition that contains an ultraviolet/visible light absorbing compound may be cured with an activating light. Preferably, the activating light has a wavelength substantially above about 380 nm. The lens forming composition may be cured by exposing the composition to activating light multiple times. Alternatively, the lens forming composition may be cured by exposing the composition to a plurality of activating light pulses, at least one of the pulses having a duration of less than about one second (more preferably less than about 0.1 seconds, and more preferably between 0.1 and 0.001 seconds). Preferably, all activating light directed toward the mold members is at a wavelength between about 380 nm to 490 nm. The previously described embodiments which describe various methods and compositions for forming eyeglass lenses may also be utilized to form the eyeglass lens hereof, by replacing the ultraviolet light in these examples with activating light having a wavelength substantially greater than about 380 nm.

In an embodiment, the activating light may be generated from a fluorescent lamp. The fluorescent lamp is preferably used to direct activating light rays toward at least one of the mold members. At least one and preferably two fluorescent light sources, with strong emission spectra in the 380 to 490 nm region may be used. When two light sources are used, they are preferably positioned on opposite sides of the mold cavity. A fluorescent lamp emitting activating light with the described wavelengths is commercially available from Philips Electronics as model TLD-15W103.

Preferably, three or four fluorescent lamps may be positioned to provide substantially uniform radiation over the entire surface of the mold assembly to be cured. The activating light source may be turned on and off quickly between exposures. A flasher ballast may be used for this function. A flasher ballast may operate in a standby mode wherein a low current is supplied to the lamp filaments to keep the filaments warm and thereby reduce the strike time of the lamp. Such a ballast is commercially available from Magnatek, Inc of Bridgeport, Conn. Alternately, the light source may employ a shutter system to block the light between doses. This shutter system is preferably controlled by a micro-processor based control system in order to provide the necessary doses of light. A feedback loop may be used to control the light intensity so that intensity fluctuations due to environmental variables (e.g. lamp temperature) and lamp aging may be minimized. A light sensor may be incorporated into the control system to minimize variances in dose for a given exposure time.

The identity of the major polymerizable components of the lens forming composition tends to affect the optimal curing process. It is anticipated that the identity of the light absorbing compound present in the monomer or blend of monomers may affect the optimal photoinitiator system used as well as the optimal curing process used to initiate polymerization. Also, varying the identities or the proportions of the monomer(s) in the lens forming composition may require adjustments to various production process variables including, but not limited to, exposure times, exposure intensities, cooling times and temperatures, postcure procedures and the like. For example, compositions including relatively slow reacting monomers, such as bisphenol A bis allyl carbonate or hexanediol dimethacrylate, or compositions including relatively higher proportions of such monomers may require either longer exposure times, higher intensities, or both. It is postulated that increasing the amount of either fast reacting monomer or the initiator levels present in a system will require reduced exposure times, more rigidly controlled light doses, and more efficient exothermic heat removal.

Preferably, the monomers selected as components of the lens forming composition are capable of dissolving the light absorbing compounds added to them. As used herein "dissolving" means being substantially homogeneously mixed. For example, monomers may be selected from a group including polyether (allyl carbonate) monomers, multi-functional acrylate monomers, and multi-functional methacrylic monomers for use in an ultraviolet/visible light absorbing lens forming composition.

In an embodiment, the mixture of monomers, previously described as PRO-629, may be blended together before addition of other components required to make the lens forming composition. This blend of monomers is preferably used as the basis for a lens forming composition to which ultraviolet/visible light absorbing compounds are added.

A polymerization inhibitor may be added to the monomer mixture at relatively low levels to inhibit polymerization of the monomer at inappropriate times (e.g., during storage). Preferably about 0 to 50 ppm of monomethylether hydroquinone (MEHQ) are added to the monomer mixture. It is also preferred that the acidity of the monomer mixture be as low as possible. Preferably less than about 100 ppm residual acrylic acid exists in the mixture. It is also preferred that the water content of the monomer mixture be relatively low, preferably less than about 0.15 percent.

Photoinitiators which have utility in the present method have been described in previous embodiments. Ultraviolet/visible light absorbing compounds which may be added to a normally ultraviolet/visible light transmissible lens forming composition have also been described in previous embodiments. The quantity of photochromic pigments present in the lens forming composition is preferably sufficient to provide observable photochromic effect. The amount of photochromic pigments present in the lens forming composition may widely range from about 1 ppm by weight to 1–5% by weight. In preferred compositions, the photochromic pigments are present in ranges from about 30 ppm to 2000 ppm. In the more preferred compositions, the photochromic pigments are present in ranges from about 150 ppm to 1000 ppm. The concentration may be adjusted depending upon the thickness of the lens being produced to obtain optimal visible light absorption characteristics.

In another embodiment co-initiators may be added to the lens forming composition. As described previously, such compositions may aid the polymerization of the lens forming composition by interacting with the photoinitiator such that the composition polymerizes in a substantially uniform manner. It is anticipated that the optimal amount of the initiators is where the total amount of both initiators are minimized subject to the constraint of complete polymerization and production of a rigid, aberration free lens. The relative proportions of the photoinitiator to the co-initiator may be optimized by experimentation. For example, an ultraviolet/visible light absorptive lens forming composition that includes a photoinitiator with no co-initiator may be cured. If waves and distortions are observed in the resulting lens, a co-initiator may then be added to the lens forming composition by increasing amounts until a lens having the best optical properties is formed. It is anticipated that excess co-initiator in the lens forming composition should be avoided to inhibit problems of too rapid polymerization, yellowing of the lens, and migration of residual, unreacted co-initiator to the surface of the finished lens.

In an embodiment, hindered amine light stabilizers may be added to the lens forming composition. It is believed that these materials act to reduce the rate of degradation of the cured polymer caused by exposure to ultraviolet light by deactivating harmful polymer radicals. These compounds may be effective in terminating oxygen and carbon free radicals, and thus interfering with the different stages of auto-oxidation and photo-degradation. Preferably, more than one monomer and more than one initiator are used in a lens forming composition to ensure that the initial polymerization of the lens forming composition with activating light does not occur over too short a period of time. The use of such a lens forming composition may allow greater control over the gel formation, resulting in better control of the optical quality of the lens.

An eyeglass lens formed using the lens forming compositions described may be applicable for use as a prescription lens and for a non-prescription lens. Particularly, such a lens may be used in sunglasses. Advantageously, photochromic sunglass lenses would remain light enough in color to allow a user to see through them clearly while at the same time prohibiting ultraviolet/visible light from passing through the lenses. In one embodiment, a background dye may be added to the photochromic lens to make the lens appear to be a dark shade of color at all times like typical sunglasses.

SPECIFIC EXAMPLES

The following examples are included to demonstrate embodiments of the invention. Those of skill in the art, in light of the present disclosure, should appreciate that many changes may be made in the specific examples that are disclosed and still obtain a like or similar result without departing from the spirit and scope of the invention.

Example 1

Formation of a Plastic Lens by Curing with Activating Light

| Formulation: | |
|---|---|
| 17% | Bisphenol A bis(allyl carbonate) |
| 10% | 1,6 Hexanediol dimethacrylate |
| 20% | Trimethylolpropane triacrylate |
| 21% | Tetraethyleneglycol diacrylate |
| 32% | Tripropyleneglycol diacrylate |
| 0.012% | 1 Hydroxycyclohexyl phenyl ketone |
| 0.048 | Methyl benzoylformate |
| <10 ppm | Hydroquinone & Methylethylhydroquinone |

Hydroquinone and Methylethylhydroquinone were stabilizers present in some of the diacrylate and/or triacrylate compounds obtained from Sartomer. Preferably the amount of stabilizers is minimized since the stabilizers affect the rate and amount of curing. If larger amounts of stabilizers are added, then generally larger amounts of photoinitiators must also be added.

Light Condition: mW/cm$^2$ measured at plane of sample with Spectroline DM 365N Meter from Spectronics Corp. (Westbury, N.Y.)

| | Center | Edge |
|---|---|---|
| Top: | 0.233 | 0.299 |
| Bottom: | 0.217 | 0.248 |

Air Flow: 9.6 standard cubic feet per minute ("CFM") per manifold-19.2 CFM total on sample
Air Temperature: 4.4 degrees Centigrade
Molds: 80 mm diameter Corning #8092 glass

| | Radius | Thickness |
|---|---|---|
| Concave: | 170.59 | 2.7 |
| Convex: | 62.17 | 5.4 |

Gasket: General Electric SE6035 silicone rubber with a 3 mm thick lateral lip dimension and a vertical lip dimension sufficient to provide an initial cavity center thickness of 2.2 mm.

Filling: The molds were cleaned and assembled into the gasket. The mold/gasket assembly was then temporarily positioned on a fixture which held the two molds pressed against the gasket lip with about 1 kg. of pressure. The upper edge of the gasket was peeled back to allow about 27.4 grams of the monomer blend to be charged into the cavity. The upper edge of the gasket was then eased back into place and the excess monomer was vacuumed out with a small aspirating device. It is preferable to avoid having monomer drip onto the noncasting surface of the mold because a drop tends to cause the activating light to become locally focused and may cause an optical distortion in the final product.

Curing: The sample was irradiated for fifteen minutes under the above conditions and removed from the lens curing unit. The molds were separated from the cured lens by applying a sharp impact to the junction of the lens and the convex mold. The sample was then postcured at 110° C. in the post-cure unit for an additional ten minutes, removed and allowed to cool to room temperature.

Results: The resulting lens measured 72 mm in diameter, with a central thickness of 2.0 mm, and an edge thickness of 9.2 mm. The focusing power measured ~5.05 diopter. The lens was water clear ("water-white"), showed negligible haze, exhibited total visible light transmission of about 94%, and gave good overall optics. The Shore D hardness was about 80. The sample withstood the impact of a 1 inch steel ball dropped from fifty inches in accordance with ANSI 280.1-1987, 4.6.4 test procedures.

Example 2

Oxygen Barrier Example #1

A liquid lens forming composition was initially cured as in a process and apparatus similar to that specified in Example 1. The composition was substantially the same as specified in Example 1, with the exception that hydroquinone was absent, the concentration of methylethylhydroquinone was about 25–45 ppm, the concentration of 1-hydroxycyclohexyl phenyl ketone was 0.017 percent, and the concentration of methylbenzoylformate was 0.068 percent. The composition underwent the initial 15 minute cure under the "1st activating light." The apparatus was substantially the same as described for the above Example 1, with the following exceptions:

1. The air flowrate on each side of the lens mold assembly was estimated to be about 18–20 cubic feet per minute.
2. The air flowrate in and out of the chamber surrounding the lights was varied in accordance with the surface temperature of the lights. The air flowrate was varied in an effort to keep the temperature on the surface of one of the lights between 104.5° F. and 105° F.
3. The activating light output was controlled to a set point by varying the power sent to the lights as the output of the lights varied.
4. Frosted glass was placed between the lights and the filters used to vary the intensity of the activating light across the face of the molds. Preferably the glass was frosted on both sides. The frosted glass acts as a diffuser between the lights and these filters. This frosted glass tended to yield better results if it was placed at least about 2 mm from the filter, more preferably about 10–15 mm, more preferably still about 12 mm, from the filter. Frosted glass was found to dampen the effect of the filters. For instance, the presence of the frosted glass reduced the systems' ability to produce different lens powers by varying the light (see Example 1 and FIG. 1).

After initial cure, the lens mold assembly was removed from the curing chamber. The lens mold assembly included a lens surrounded by a front mold, a back mold, and a gasket between the front and back molds (see, e.g., the assembly in FIG. 11).

At this point the protocol in Example 1 stated that the lens was demolded (see above). While demolding at this point is possible, as stated above, generally some liquid lens forming composition remained, especially in areas of the lens proximate the gasket Therefore, the lens was not demolded as stated in Example 1. Instead, the gasket was removed, liquid lens forming composition was wiped off the edges of the lens, and a layer of oxygen barrier (Parafilm M) with photoinitiator was wrapped around the edges of the lens while the lens was still between the molds. The Parafilm M was wrapped tightly around the edges of the lens and then stretched so that it would adhere to the lens and molds (i.e., in a manner similar to that of Saran wrap). The lens mold assembly was then placed in the post-cure unit so that the back face of the lens (while between the molds) could then be exposed to additional activating light.

This second activating light was at a substantially higher intensity than the initial cure light, which was directed at an intensity of less than 10 mW/cm$^2$. The mold assembly was irradiated with ultraviolet light for about 22 seconds. The total light energy applied during these 22 seconds was about 4500 millijoules per square centimeter ("mJ/cm$^2$").

It has been found that applying activating light at this point helped to cure some or all of the remaining liquid lens forming composition. The second activating light step may be repeated. In this example, the second activating light step was repeated once. It is also possible to expose the front or both sides of the lens to the second activating light.

After the second activating light was applied, the mold assembly was allowed to cool. The reactions caused by exposure to activating light may be exothermic. The activating lights also tend to emit infra-red light which in turn heats the mold assembly. The lens was then demolded. The demolded lens was substantially drier and harder than lenses that were directly removed from mold assemblies after the initial cure step.

Example 3

Oxygen Barrier Example #2

The protocol of Oxygen Barrier Example #1 was repeated except that prior to removal of the gasket the lens mold assembly was positioned so that the back face of the lens was exposed to third activating light. In this case the third activating light was at the same intensity and for the same time period as one pass of the second activating light. It has been found that applying third activating light at this point helped to cure some or all of the remaining liquid lens forming composition so that when the gasket was removed less liquid lens forming composition was present. All of the remaining steps in Oxygen Barrier Example #1 were applied, and the resultant lens was substantially dry when removed from the molds.

Example 4

Conductive Heating Example

A liquid lens forming composition was initially cured in a process and apparatus similar to that specified in Example 1 except for post-cure treatment, which was conducted as follows:

After the sample was irradiated for 15 minutes, the lens was placed in the post-cure unit to receive a dose of about 1500 mJ/cm$^2$ (+/−100 mJ) of activating light per pass. The gasket was then removed from the mold assembly and the edges of the mold were wiped with an absorbent tissue to remove incompletely cured lens forming material proximate the mold edges. A strip of plastic material impregnated with photoinitiator was wrapped around the edges of the molds that were exposed when the gasket was removed. Next, the mold assembly was passed through the post-cure unit once to expose the front surface of the mold to a dose of about 1500 mJ/cm$^2$. The mold assembly was then passed through the post-cure unit four more times, with the back surface of the mold receiving a dose of about 1500 mJ/cm$^2$ per pass. The heat source of the post-cure unit was operated such that the surface of the hot plate reached a temperature of 340° F. (+/−50° F.). A conformable "beanbag" container having a covering made of NOMEX fabric was placed on the hot plate. The container contained glass beads and was turned over such that the portion of the container that had directly contacted the hot plate (i.e., the hottest portion of the container) faced upward and away from the hot plate. The mold assembly was then placed onto the heated, exposed portion of the container that had been in direct contact with the hot plate. The concave, non casting face of the mold was placed onto the exposed surface of the container, which substantially conformed to the shape of the face. Heat was conducted through the container and the mold member to the lens for 13 minutes. A lens having a Shore D hardness of 84 was formed.

Example 5

Curing Cycles

Some established cycles are detailed in Table 7 below for three semi-finished mold gasket sets: a 6.00D base curve, a 4.50D base curve, and a 3.00 D base curve. These cycles have been performed with cooling air, at a temperature of about 56° F., directed at the front and back surfaces of a mold assembly. Frosted diffusing window glass was positioned between the samples and the lamps, with a layer of PO-4 acrylic material approximately 1 inch below the glass. A top light intensity was adjusted to 760 microwatts/cm² and a bottom light intensity was adjusted to 950 microwatts/cm², as measured at about the plane of the sample. A Spectroline meter DM365N and standard detector stage were used. An in-mold coating as described in U.S. Pat. No. 5,529,728 to Buazza et. al. was used to coat both the front and back molds.

TABLE 7

| | BASE CURVE | | |
|---|---|---|---|
| Mold Sets | 6.00 | 4.50 | 3.00 |
| Front Mold | 5.95 | 4.45 | 2.93 |
| Back Mold | 6.05 | 6.80 | 7.80 |
| Gasket | −5.00 | 13 mm | 16 mm |
| Resulting Semifinished Blank | | | |
| Diameter | 74 mm | 76 mm | 76 mm |
| Center Thickness | 9.0 mm | 7.8 mm | 7.3 mm |
| Edge Thickness | 9.0 mm | 11.0 mm | 15.0 mm |
| Mass | 46 grams | 48 grams | 57 grams |
| Curing Cycle Variables | | | |
| Total Cycle Time | 25:00 | 25:00 | 35:00 |
| Initial Exposure | 4:40 | 4:40 | 4:35 |
| Number of Pulses | 4 | 4 | 4 |
| Timing (in seconds) and Duration of Pulses @ Elapsed Time From Onset of Initial Exposure | | | |
| Pulse 1 | 15 @ 10:00 | 15 @ 10:00 | 15 @ 13:00 |
| Pulse 2 | 15 @ 15:00 | 15 @ 15:00 | 15 @ 21:00 |
| Pulse 3 | 30 @ 19:00 | 30 @ 19:00 | 20 @ 27:00 |
| Pulse 4 | 30 @ 22:00 | 30 @ 22:00 | 30 @ 32:00 |

Figure 26:
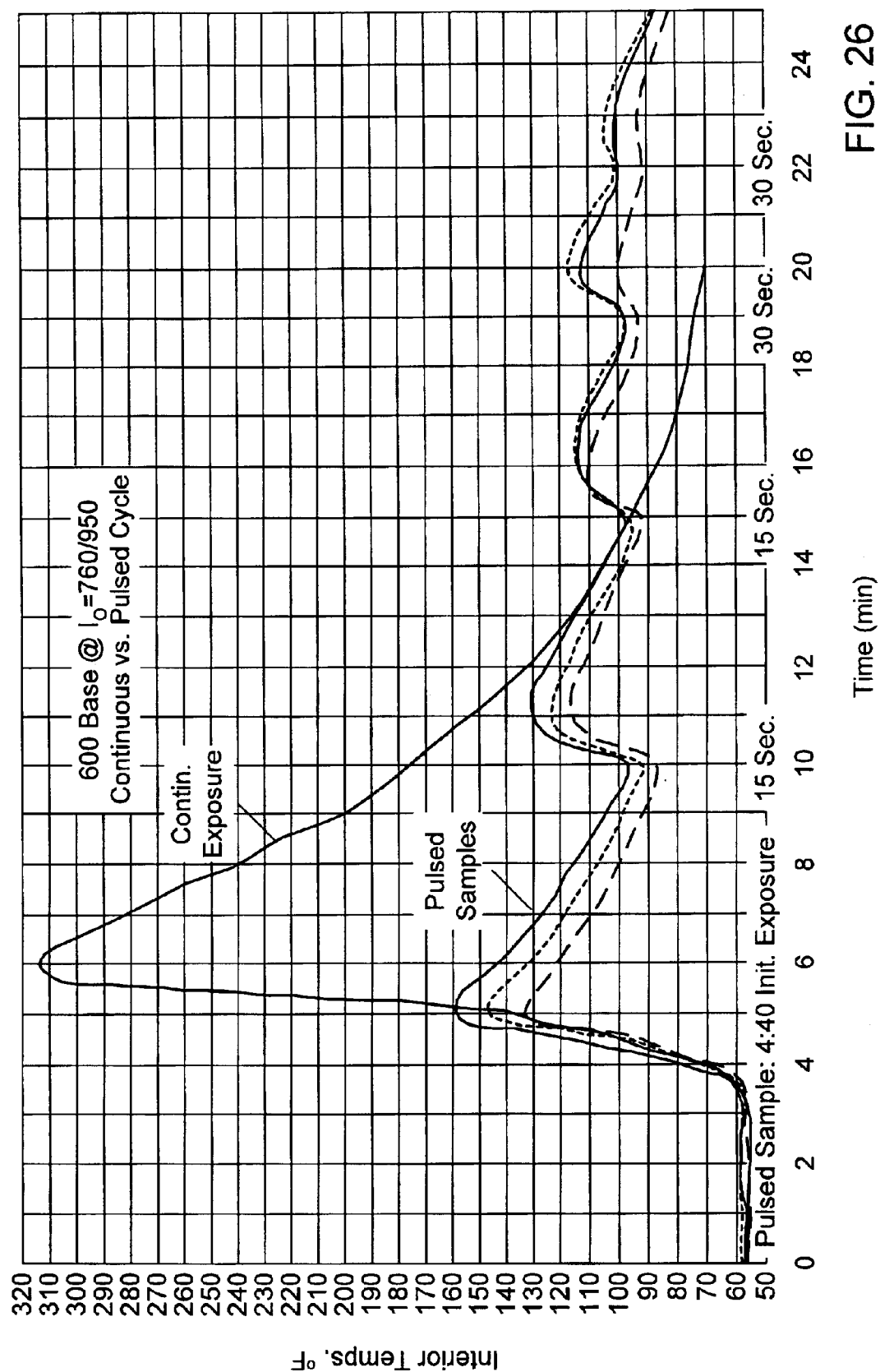
FIG. 26 depicts a graph illustrating continuous and pulsed temperature profiles for a curing cycle employing a mold/gasket set with a 6.00D base curve.
Figure 27:
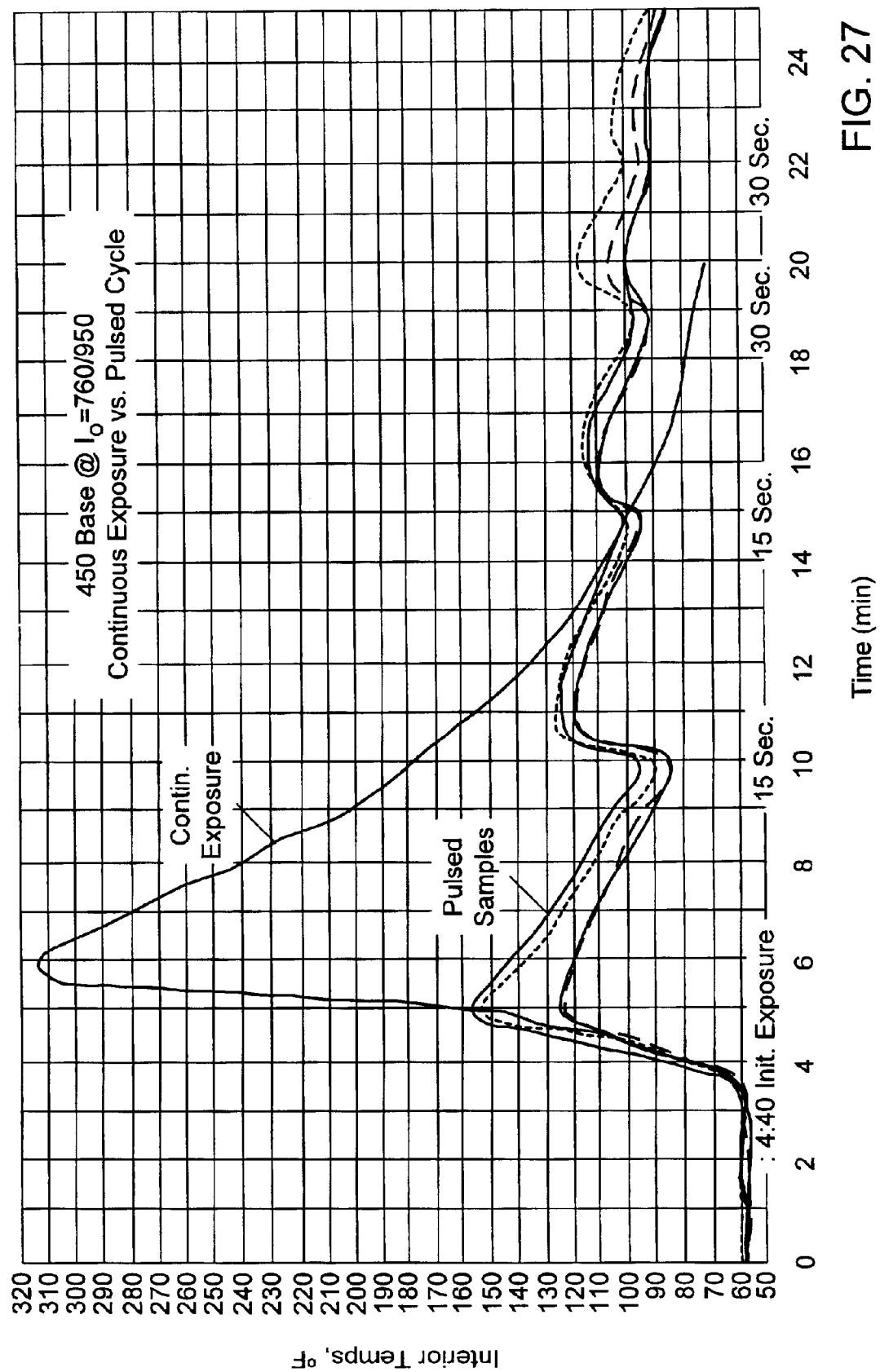
FIG. 27 depicts a graph illustrating continuous and pulsed temperature profiles for a curing cycle employing a mold/gasket set with a 4.50D base curve.
Figure 28:
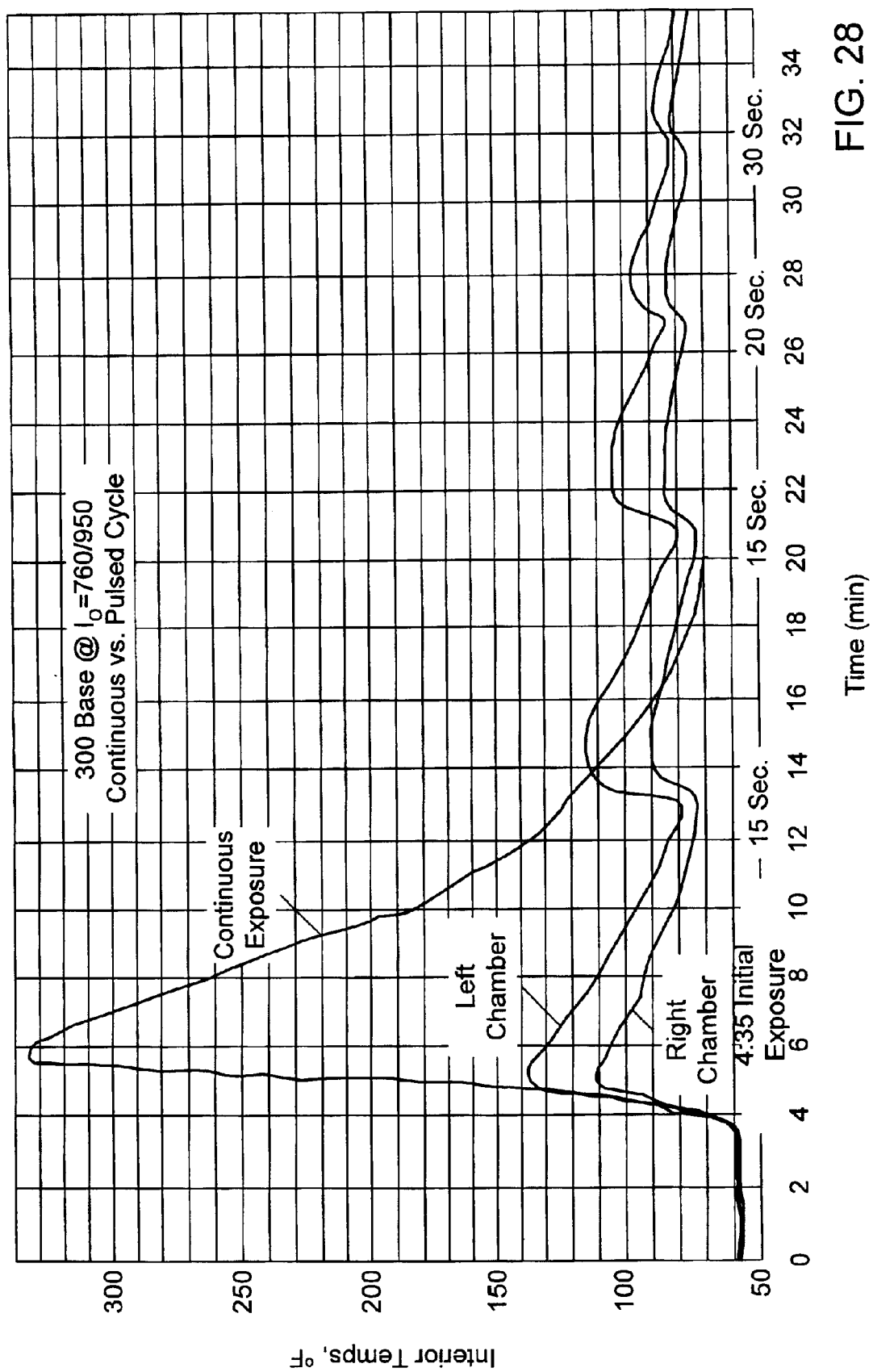
FIG. 28 depicts a graph illustrating continuous and pulsed temperature profiles for a curing cycle employing a mold/gasket set with a 3.00D base curve.

FIGS. 26, 27, and 28 each show temperature profiles of the above-detailed cycles for a case where the activating light exposure is continuous and a case where the activating light delivery is pulsed. In FIGS. 26–28, "Io" denotes the initial intensity of the activating light used in a curing cycle. The phrase "Io=760/950" means that the light intensity was adjusted to initial settings of 760 microwatts/cm² for the top lamps and 950 microwatts/cm² for the bottom lamps. The "interior temperature" of FIGS. 26–28 refers to a temperature of the lens forming material as measured by a thermocouple located within the mold cavity.

Example 6

Pulse Method Using a Medium Pressure Vapor Lamp

An eyeglass lens was successfully cured with activating light utilizing a medium pressure mercury vapor lamp as a source of activating light (i.e., the UVEXS Model 912 previously described herein). The curing chamber included a six inch medium pressure vapor lamp operating at a power level of approximately 250 watts per inch and a defocused dichroic reflector that is highly activating light reflective. A high percentage of infrared radiation was passed through the body of the reflector so that it would not be directed toward the material to be cured. The curing chamber further included a conveyer mechanism for transporting the sample underneath the lamp. With this curing chamber, the transport mechanism was set up so that a carriage would move the sample from the front of the chamber to the rear such that the sample would move completely through an irradiation zone under the lamp. The sample would then be transported through the zone again to the front of the chamber. In this maimer the sample was provided with two distinct exposures per cycle. One pass, as defined hereinafter, consists of two of these distinct exposures. One pass provided a dosage of approximately 275 milliJoules measured at the plane of the sample using an International Light IL 1400 radiometer equipped with a XRL 340 B detector.

A lens cavity was created using the same molds, lens forming composition, and gasket as described in Example 7 below. The reaction cell containing the lens forming material was placed on a supporting stage such that the plane of the edges of the convex mold were at a distance of approximately 75 mm from the plane of the lamp. The lens cavity was then exposed to a series of activating light doses consisting of two passes directed to the back surface of the mold followed immediately by one pass directed to the front surface of the mold. Subsequent to these first exposures, the reaction cell was allowed to cool for 5 minutes in the absence of any activating radiation at an air temperature of 74.6 degrees F. and at an air flow rate of approximately 15 to 25 scf per minute to the back surface and 15 to 25 scf to the front surface of the cell. The lens cavity was then dosed with one pass to the front mold surface and returned to the cooling chamber for 6 minutes. Then the back surface was exposed in one pass and then was cooled for 2 minutes. Next, the front surface was exposed in two passes and then cooled for 3.5 minutes. The front surface and the back surface were then each exposed to two passes, and the gasket was removed to expose the edges of the lens. A strip of polyethylene film impregnated with photoinitiator was then wrapped around the edge of the lens and the front and back surfaces were exposed to another 3 passes each. The back surface of the cell was then placed on the conductive thermal in-mold postcure device using a "bean-bag" container filled with glass beads on a hot plate at about 340° F. described previously (see Example 4) for a time period of 13 minutes, after which the glass molds were removed from the finished lens. The finished lens exhibited a distance focusing power of −6.09 diopters, had excellent optics, was aberration-free, was 74 mm in diameter, and had a center thickness of 1.6 mm. During the cooling steps, a small surface probe thermistor was positioned against the outside of the gasket wall to monitor the reaction. The results are summarized below.

| Activating Light Dose | Approx. Elapsed Time After Activating Light Dose (min) | Gasket Wall Temperature (° F.) |
|---|---|---|
| 2 passes to back surface and 1 pass to front surface | 0 | Not recorded |
| | 1 | 80.5 |
| | 2 | 79.7 |

-continued

| Activating Light Dose | Approx. Elapsed Time After Activating Light Dose (min) | Gasket Wall Temperature (° F.) |
|---|---|---|
|  | 3 | 79.0 |
|  | 4 | 77.1 |
|  | 5 | 76.2 |
| 1 pass to front surface | 0 | Not recorded |
|  | 1 | 83.4 |
|  | 2 | 86.5 |
|  | 3 | 84.6 |
|  | 4 | Not recorded |
|  | 5 | 81.4 |
|  | 6 | 79.5 |
| 1 pass to back surface | 0 | Not recorded |
|  | 1 | 79.3 |
|  | 2 | 79.0 |
| 2 passes to front surface | 0 | Not recorded |
|  | 1 | 78.4 |
|  | 2 | 77.8 |
|  | 3 | 77.0 |
|  | 3.5 | 76.7 |

Example 7

Pulse Method Using a Single Xenon Flash Lamp

An eyeglass lens was successfully cured with activating light utilizing a xenon flash lamp as a source of activating light. The flash lamp used was an Ultra 1800 White Lightning photographic strobe, commercially available from Paul C. Buff Incorporated of Nashville, Tenn. This lamp was modified by replacing the standard borosilicate flash tubes with quartz flash tubes. A quartz flash tube is preferred because some of the activating light generated by the arc inside the tube tends to be absorbed by borosilicate glass. The strobe possessed two semicircular flash tubes that trigger simultaneously and the flash tubes were positioned to form a ring approximately 73 millimeters in diameter. The hole in the reflector behind the lamps, which normally contains a modeling lamp for photographic purposes, was covered with a flat piece of highly-polished activating light reflective material that is commercially available under the trade name of Alzac from Ultra Violet Process Supply of Chicago, Ill. The power selector switch was set to full power. The activating light energy generated from one flash was measured using an International Light IL 1700 Research Radiometer available from International Light, Incorporated of Newburyport, Mass. The detector head was an International Light XRL 340 B, which is sensitive to radiation in the 326 nm to 401 nm region. The window of the detector head was positioned approximately 35 mm from the plane of the flash tubes and was approximately centered within the ring formed by the tubes.

A mold cavity was created by placing two round 80 mm diameter crown glass molds into a silicone rubber ring or gasket that possessed a raised lip around its inner circumference. The edges of the glass molds rested upon the raised lip to form a sealed cavity in the shape of the lens to be created. The inner circumference of the raised lip corresponded to the edge of the finished lens. The concave surface of the first mold corresponded to the front surface of the finished lens and the convex surface of the second mold corresponded to the back surface of the finished lens. The height of the raised lip of the rubber ring into which the two glass molds are inserted controls the spacing between the two glass molds, thereby controlling the thickness of the finished lens. By selecting proper gaskets and first and second molds that possess various radii of curvature, lens cavities may be created to produce lenses of various powers.

A lens cavity was created by placing a concave glass mold with a radius of curvature of 407.20 mm and a convex glass mold with a radius of curvature of 65.26 mm into a gasket which provided spacing between the molds of 1.8 mm measured at the center of the cavity. Approximately 32 grams of a lens forming monomer was charged into the cavity. The lens forming material used for this test was OMB-91 lens monomer. The reaction cell containing the lens forming material was placed horizontally on a supporting stage such that the plane of the edges of the convex mold were at a distance of approximately 30 mm from the plane of the flash tubes and the cell was approximately centered under the light source.

The back surface of the lens cavity was then exposed to a first series of 5 flashes, with an interval of approximately 4 seconds in between each flash. The cell was then turned over and the front surface was exposed to another 4 flashes with intervals of about 4 seconds in between each flash. It is preferable to apply the first set of flashes to the back surface to start to cure the material so that any air bubbles in the liquid monomer will not migrate from the edge of the cavity to the center of the optical zone of the lens. Subsequent to these first nine flashes, the reaction cell was allowed to cool for five minutes in the absence of any activating radiation. To cool the reaction cell, air at a temperature of 71.4 degrees F. and at a flow rate of approximately 15 to 25 scf per minute was applied to the back surface and air at a temperature of 71.4 degrees F. and at a flow rate of approximately 15 to 25 scf per minute was applied to the front surface of the cell. The back surface of the lens cavity was then dosed with one more flash and returned to the cooling chamber for four minutes.

Next, the cell was exposed to one flash on the front surface and cooled in the cooling chamber for seven minutes. Then the cell was exposed to one flash on the front surface and one flash on the back surface and cooled for three minutes. Next, the cell was exposed to two flashes on the front surface and two flashes on the back surface and cooled for four and a half minutes. The cell was then exposed to five flashes each to the back surface and front surface, and the gasket was removed to expose the edges of the lens. A strip of polyethylene film impregnated with photoinitiator (Irgacure 184) was then wrapped around the edge of the lens, and the cell was exposed to another five flashes to the front surface and fifteen flashes to the back surface. The back surface of the cell was then placed on the conductive thermal in-mold postcure device (i.e., "bean bags" filled with glass beads sitting on a hot plate at approx. 340° F.) as described previously (see conductive heating example above) for a time period of 13 minutes, after which the glass molds were removed from the finished lens. The finished lens exhibited a distance focusing power of −6.16 diopters and a +2.55 bifocal add power, had excellent optics, was aberration-free, was 74 mm in diameter, and had a center of thickness of 1.7 mm. During the cooling steps, a small surface probe thermistor was positioned against the outside of the gasket wall to monitor the reaction. The results are summarized below.

| Dose | Elapsed Time From Dose (min) | Gasket Wall Temperature (F.) |
|---|---|---|
| 5 flashes to back surface and 4 flashes to front surface | 0 | Not recorded |
| | 1 | Not recorded |
| | 2 | 78.4 |
| | 3 | 77.9 |
| | 4 | 76.9 |
| | 5 | 75.9 |
| 1 flash to back surface | 0 | Not recorded |
| | 1 | 76.8 |
| | 2 | 77.8 |
| | 3 | 78 |
| | 4 | 77.8 |
| 1 flash to front surface | 0 | Not recorded |
| | 1 | 79.4 |
| | 2 | 81.2 |
| | 3 | 81.1 |
| | 4 | 79.7 |
| | 5 | 78.7 |
| | 6 | 77.5 |
| | 7 | 77.4 |
| 1 flash to front surface and 1 flash to back surface | 0 | Not recorded |
| | 1 | 78.8 |
| | 2 | 78.8 |
| | 3 | 78.0 |
| 2 flashes to front surface and 2 flashes to back surface | 0 | Not recorded |
| | 1 | 80.2 |
| | 2 | 79.8 |
| | 3 | 78.3 |
| | 4 | 76.7 |
| | 4.5 | 76.3 |

Example 8

Improved Curing Example

An 80 mm diameter glass progressive addition mold with a nominal distance radius of curvature of −6.00 diopters and a +2.50 diopter bifocal add power was sprayed with a mixture of isopropyl alcohol and distilled water in equal parts and wiped dry with a lint free paper towel. The progressive mold was lenticularized to provide an optical zone 68 mm in diameter along the 180 degree meridian and 65 mm in diameter along the 90 degree meridian. The non-casting face of the mold was mounted to a suction cup, which was attached to a spindle. The spindle was placed on a spin coat unit. A one inch diameter pool of liquid Primer was dispensed into the center of the horizontally positioned glass mold from a soft polyethylene squeeze bottle equipped with a nozzle with an orifice diameter of approximately 0.040 inches. The composition of the Primer is discussed in detail below (see Scratch Resistant Lens Formation Process Example).

The spin motor was engaged to rotate the mold at a speed of approximately 850 to 900 revolutions per minute, which caused the liquid material to spread out over the face of the mold. Immediately thereafter, a steady stream of an additional 1.5 to 2.0 grams of Primer material was dispensed onto the casting face of the spinning mold with the nozzle tip positioned at a 45 degree angle approximately 12 mm from the mold face such that the stream was flowing with the direction of rotation of the mold. The stream of Primer material was directed first at the center of the mold face and then dispensed along the radius of the mold face in a direction from the center toward the edge of the mold face. The solvent present in the Primer was allowed to evaporate off for 8 to 10 seconds while the mold was rotated. The rotation was stopped and the Primer coat present on the mold was cured via two exposures to the activating light output from the medium pressure mercury vapor lamp, totaling approximately 300 mJ/cm$^2$.

The spin motor was again engaged and approximately 1.5 to 2.0 grams of HC8-H Hard Coat (see description below), commercially available from the FastCast Corporation of Louisville, Ky. was dispensed onto the spinning mold in a similar fashion as the Primer coat. The solvent present in the HC8-H was allowed to evaporate off for 25 seconds while the mold was rotated. The rotation was stopped and the HC8-H coat was cured in the same manner as the Primer coat.

The mold was removed from the FlashCure unit and assembled into a silicone rubber gasket in combination with a cleaned convex mold possessing a radius of curvature of +2.00 diopters. The raised lip present on the inner circumference of the rubber gasket provided a spacing of 6.3 mm between the two molds at the center point. The mold/gasket assembly was positioned on a filling stage and the edge of the gasket was peeled back to permit the cavity to be filled with OMB-91 lens forming composition, commercially available from the FastCast Corporation of Louisville, Ky. The edge of the gasket was returned to its sealing relationship with the edges of the molds and the excess lens forming composition was vacuumed off the non-casting surface of the back mold with a suction device. The filled mold/gasket assembly was placed on a stage in a lens curing unit and subjected to four exposures of the activating light output from the six inch medium pressure mercury vapor lamp, totaling approximately 600 mJ/cm$^2$.

Immediately following this initial dose of high intensity activating light, the assembly was continuously exposed to streams of air having a temperature of 42° F. while being irradiated with very low intensity activating light for eight minutes. The light intensity measured approximately 90 microwatts/cm$^2$ from above plus approximately 95 microwatts/cm$^2$ from below, according to the plus lens light distribution pattern called for by the manufacturer. The lamp racks are typically configured to deliver activating light having an intensity of about 300 microwatt/cm$^2$ for the standard fifteen minute curing cycle. The reduction in activating light intensity was accomplished by inserting a translucent high density polyethylene plate into the light distribution filter plate slot along with the plus lens light distribution plate. A translucent high density polyethylene plate was positioned between the front mold member and one light distribution plate and between the back mold member and the other light distribution plate.

The non-casting surface of the back mold was subsequently exposed to four doses of high intensity activating light totaling approximately 1150 mJ/cm$^2$. The gasket was stripped from the assembly and residual uncured material wiped from the exposed edge of the lens. An oxygen barrier strip (polyethylene) was wrapped around the edge of the lens and the mold was exposed to two more doses of high intensity activating light totaling 575 mJ/cm$^2$ to the non-casting surface of the front mold followed by eight more flashes to the non-casting surface of the back mold totaling 2300 mJ/cm$^2$.

The non-casting surface of the back mold was placed in contact with a thermal transfer pad, commercially available from the FastCast Corporation of Louisville, Ky. at a temperature of approximately 150 to 200° F. for thirteen minutes. The assembly was removed from the thermal transfer pad and the back mold was removed with a slight impact from an appropriately sized wedge. The front mold with the lens attached thereto was placed in a container of room temperature water and the lens separated from the front mold. The now-finished lens was sprayed with a mixture of isopropyl alcohol and water in equal parts and wiped dry. The lens read +3.98 D with an addition power of +2.50, was clear, non-yellow, and exhibited good optics.

Example 9

Scratch Resistant Lens Formation Example

A first coating composition, hereinafter referred to as "Primer", was prepared by mixing the following components by weight:

93.87% acetone;
3.43% SR-399 (dipentaerythritol pentaacrylate), available from Sartomer;
2.14% CN-104 (epoxy acrylate), available from Sartomer,
0.28% Irgacure 184 (1-hydroxycyclohexylphenylketone), available from Ciba-Geigy; and
0.28% Darocur 1173 (2-hydroxy-2-methyl-1-phenyl-propan-1-one) available from Ciba-Geigy.

A second coating composition, hereinafter referred to as "HC8-H" was prepared by mixing the following components by weight:

84.69% 1-methoxy 2-propanol;
9.45% SR-399 (dipentaerythritol pentaacrylate), available from Sartomer,
4.32% SR-601 (ethoxylated bisphenol A diacrylate), available from Sartomer; and
1.54% Irgacure 184 (1-hydroxycyclohexyl phenyl ketone), available from Ciba-Geigy.

Each of these coating compositions was prepared by first dissolving the monomers into the solvent, then adding the photoinitiators, mixing well, and finally passing the composition through a one micron filter prior to use.

An 80 mm diameter glass, 28 mm flattop mold with a distance radius of curvature of −6.00 diopters and a +2.00 diopter bifocal add power were sprayed with a mixture of isopropyl alcohol and distilled water in equal parts. The flattop mold was wiped dry with a lint free paper towel. The non-casting face of the mold was mounted to a suction cup, which was attached to a spindle. The spindle was placed on the spin coating unit.

A one inch diameter pool of liquid Primer was dispensed into the center of the horizontally positioned glass mold. The Primer was dispensed from a soft polyethylene squeeze bottle equipped with a nozzle having an orifice diameter of approximately 0.040 inches. A spin motor of the spinning device was engaged to rotate the mold at a speed of approximately 850 to 900 revolutions per minute, causing the liquid Primer to spread out over the face of the mold. Immediately thereafter, a steady stream of an additional 1.5 to 2.0 grams of Primer material was dispensed onto the casting face of the spinning mold. The stream of Primer material was directed onto the casting face with the nozzle tip positioned at a 45 degree angle approximately 12 mm from the mold face. This positioning of the nozzle tip made the stream to flow with the direction of rotation of the mold. The stream of Primer material was directed first at the center of the mold face and then dispensed along the radius of the mold face in a direction from the center toward the edge of the mold face.

The solvent present in the Primer was allowed to evaporate off for 8 to 10 seconds during rotation of the mold. The rotation was stopped and the Primer coat which remained on the mold was cured via two exposures to the activating output from a medium pressure mercury vapor lamp, totaling approximately 300 mJ/cm$^2$. All light intensity/dosage measurements cited herein were taken with an International Light IL-1400 Radiometer equipped with an XLR-340B Detector Head, both commercially available from International Light, Inc. of Newburyport, Mass.

Upon exposure to the activating light, the spin motor was again engaged and approximately 1.5 to 2.0 grams of HC8-H Hard Coat, commercially available from the Fast-Cast Corporation of Louisville, Ky. was dispensed onto the spinning mold in a similar fashion as the Primer coat. The solvent present in the HC8-H was allowed to evaporate off for 25 seconds while the mold was spinning. The rotation was stopped, and the HC8-H coat was cured in the same manner as the Primer coat.

The mold was removed from the spin coating unit and assembled into a silicone rubber gasket in combination with a cleaned convex mold possessing a radius of curvature of +7.50 diopters. The raised lip present on the inner circumference of the rubber gasket provided a spacing of 1.8 mm between the two molds at the center point. At this point, the mold/gasket assembly was positioned on a filling stage and the edge of the gasket was peeled back to permit the cavity to be filled with OMB-91 lens forming composition, commercially available from the FastCast Corporation of Louisville, Ky. The edge of the gasket was returned to its sealing relationship with the edges of the molds and the excess lens forming composition was vacuumed off the non-casting surface of the back mold with a suction device.

The filled mold/gasket assembly was transferred from the filling stage to a lens curing unit. While in the lens curing unit, the assembly was continuously irradiated with activating light from both sides for a period of 15 minutes at approximately 300 microwatts/cm$^2$ from above and at approximately 350 microwatts/cm$^2$ from below, according to the minus lens light distribution pattern called for by the manufacturer. During the irradiation, the casting cell was continuously exposed to streams of air having a temperature of 42° F.

The non-casting surface of the back mold was exposed to four doses of high intensity activating light totaling approximately 1150 mJ/cm$^2$. The gasket was stripped from the assembly and residual uncured material was wiped from the exposed edge of the lens. An oxygen barrier strip (polyethylene) was wrapped around the edge of the lens. The mold/gasket assembly was exposed to two more doses of high intensity activating light, wherein 575 mJ/cm$^2$ total was directed to the non-casting surface of the front mold. Subsequently, eight more flashes of the activating light were directed to the non-casting surface of the back mold, totaling 2300 mJ/cm$^2$.

The non-casting surface of the back mold was placed in contact with a thermal transfer pad, commercially available from the FastCast Corporation of Louisville, Ky. at a temperature of approximately 150 to 200° F. for thirteen minutes. The mold/gasket assembly was removed from the thermal transfer pad, and the back mold was removed with a slight impact from an appropriately sized wedge. The front mold with the lens attached thereto was placed in a container of room temperature water. While within the water, the lens became separated from the front mold. The now-finished lens was sprayed with a mixture of isopropyl alcohol and water in equal parts and wiped dry.

The lens was positioned in a holder and placed into a heated dye pot for 5 minutes. The dye pot contained a solution of BPI Black, commercially available from Brain Power, Inc. of Miami, Fla., and distilled water at a temperature of approximately 190 degrees F. The lens was removed from the dye pot, rinsed with tap water, and wiped dry. The lens exhibited a total visible light absorbance of approximately 80%. When inspected for cosmetic defects on a light table, no pinhole defects were observed. Further, the tint which had been absorbed by the back surface of the lens was found to be smooth and even.

Example 10

Formation of a Plastic Lens Containing Photochromic Material

A polymerizable mixture of PRO-629 (see above for a description of the components of PRO-629), photochromic pigments, and a photoinitiator/co-initiator system was prepared according to the following procedure. A photochromic stock solution was prepared by dissolving the following pigments into 484 grams of HDDMA.

| Pigment | grams | % by wt. |
|---|---|---|
| Dye #94 | 1.25 | 0.250% |
| Dye #266 | 0.45 | 0.090% |
| Variacrol Red PNO | 2.66 | 0.532% |
| Variacrol Yellow L | 1.64 | 0.328% |
| Reversacol Corn Yellow | 3.58 | 0.716% |
| Reversacol Berry Red | 2.96 | 0.590% |
| Reversacol Sea Green | 2.17 | 0.434% |
| Reversacol Palatinate Purple | 1.29 | 0.258% |
| Total | 16.0 | 3.200% |

Dye #94 and Dye #266 are indilino-spiropyrans commercially available from Chroma Chemicals, Inc. in Dayton, Ohio. Variacrol Red PNO is a spiro-napthoxazine material and Variacrol Yellow L is a napthopyran material, both commercially available from Great Lakes Chemical in West Lafayette, Ind. Reversacol Corn Yellow and Reversacol Berry Red are napthopyrans and Reversacol Sea Green, and Reversacol Palatinate Purple are spiro-napthoxazine materials commercially available from Keystone Analine Corporation in Chicago, Ill.

The powdered pigments were weighed and placed in a beaker. The HDDMA was added to the powdered pigments, and the entire mixture was heated to a temperature in the range from about 50° C. to 60° C. and stirred for two hours. Subsequently, the photochromic stock solution was cooled to room temperature and then gravity fed through a four inch deep bed of aluminum oxide basic in a one inch diameter column. Prior to passing the stock solution through the alumina, the alumina was washed with acetone and dried with air. The remaining HDDMA was forced out of the alumina with pressurized air. It is believed that this filtration step removes any degradation by-products of the photochromic pigments and/or any impurities present in the mixture. After the filtration step, the stock solution was passed through a 1 micron filter to remove any alumina particles which may have passed out of the column with the stock solution.

A photoinitiator stock solution containing a photoinitiator combined with an ultraviolet/visible light absorber was also prepared by mixing 2.56 grams of CGI-819 and 0.2 grams of Tinuvin 400, an ultraviolet/visible light absorber commercially available from Ciba Additives of Tarrytown, N.Y. with 97.24 grams of PRO-629. The stock solution was stirred for two hours at room temperature in the absence of light. The photoinitiator stock solution was then filtered by passing it through a layer of alumina and a one micron filter. The stock solution was placed in an opaque polyethylene container for storage.

A background dye stock solution was prepared by mixing 50 grams of a 422 ppm solution of A241/HDDMA, 50 grams of a 592 ppm solution of Thermoplast Red 454/HDDMA, 50 grams of 490 ppm solution of Zapon Brown 286/HDDMA, 50 grams of 450 ppm solution of Zapon Brown 287/HDDMA, 50 grams of 1110 ppm solution of Oil Soluble Blue II/HDDMA, and 50 grams of a 1110 ppm solution of Thermoplast Blue P/HDDMA, all with 700 grams of PRO-629. The entire mixture was heated to a temperature ranging from about 50° C. to 60° C. and subsequently stirred for two hours.

A lens forming composition was prepared by adding 12.48 grams of the above described photochromic stock solution, 10 grams of the photoinitiator stock solution, 27 grams of the background dye stock solution, and 7.3 grams of the NMDEA co-initiator to 943.22 grams of PRO-629. The components of the lens forming composition were stirred at room temperature for several minutes until well mixed. This composition is hereafter referred to as PC#1. The PC#1 contained the following amounts of components.

| Component | Amount |
|---|---|
| Tripropyleneglycol diacrylate | 31.16% |
| Tetraethyleneglycol diacrylate | 20.45% |
| Trimethylolpropane triacrylate | 19.47% |
| Bisphenol A bis allyl carbonate | 16.55% |
| Hexanediol dimethacrylate | 11.56% |
| Dye #94 | 31.20 ppm |
| Dye #266 | 11.20 ppm |
| Variacrol Red PNO | 66.40 ppm |
| Variacrol Yellow L | 40.90 ppm |
| Reversacol Corn Yellow | 89.30 ppm |
| Reversacol Berry Red | 73.60 ppm |
| Reversacol Sea Green | 54.20 ppm |
| Reversacol Palatinate Purple | 32.20 ppm |
| A241 | 0.57 ppm |
| Thermoplast Red 454 | 0.80 ppm |
| Zapon Brown 286 | 0.66 ppm |
| Zapon Brown 287 | 0.61 ppm |
| Oil Soluble Blue II | 1.50 ppm |
| Thermoplast Blue | 1.50 ppm |
| CGI-819 | 255.90 ppm |
| NMDEA | 0.73% |
| Tinuvin 400 | 20.00 ppm |

An 80 mm diameter concave glass progressive addition mold having a distance radius of curvature of 6.00 diopters and a +1.75 diopter bifocal add power was sprayed with a mixture of isopropyl alcohol and distilled water in equal parts and wiped dry with a lint free paper towel. The mold was then mounted with its casting face upward on the center of a stage. The mold was fixed securely to the stage using three equidistant clip-style contact points to hold the periphery of the mold. The mold stage had a spindle attached to it which was adapted to connect to a spin coating device. The mold stage, with the mold affixed, was placed within the spin coating device. The mold was rotated at approximately 750 to 900 revolutions per minute. A stream of isopropyl alcohol was directed at the casting surface while the casting surface was simultaneously brushed with a soft camel hair brush to clean the surface. After the cleaning step, the mold surface was dried by directing a stream of reagent grade acetone over the surface and allowing it to evaporate off, all while continuing the rotation of the mold.

The rotation of the mold was then terminated and a one inch diameter pool of a liquid coating composition was dispensed into the center of the horizontally positioned glass mold from a soft polyethylene squeeze bottle equipped with a nozzle having an orifice diameter of approximately 0.040 inches. The spin motor was engaged to rotate the mold at a speed of approximately 750 to 900 revolutions per minute, causing the liquid material to spread out over the face of the mold. Immediately thereafter, a steady stream of an additional 1.5 to 2.0 grams of the coating composition was dispensed onto the casting face of the spinning mold. The stream was moved from the center to the edge of the casting face with a nozzle tip positioned at a 45° angle approximately 12 mm from the mold face. Thus, the stream was flowing with the direction of rotation of the mold.

The solvent present in the coating composition was allowed to evaporate while rotating the mold for 10 to 15 seconds. The rotation was stopped, and then the coating composition on the mold was cured via a total exposure of approximately 300 mJ/cm$^2$ of activating light The light was provided from a medium pressure mercury vapor lamp. All light intensity/dosage measurements cited herein were taken with an International Light IL-1400 Radiometer equipped with an XLR-340B Detector Head, both commercially available from International Light, Inc. of Newburyport, Mass. At this point, the spin motor was again engaged and approximately 1.5 to 2.0 grams of additional coating composition was dispensed onto the spinning mold. The solvent of the composition was allowed to evaporate, and the composition was cured in a similar fashion to the first layer of coating composition.

The above described coating composition comprised the following materials:

| Material | % by wt. |
| --- | --- |
| Irgacure 184 | 0.91% |
| Tinuvin 770 | 0.80% |
| CN-104 | 2.00% |
| SR-601 | 1.00% |
| SR-399 | 8.60% |
| Acetone | 26.00% |
| Ethanol | 7.00% |
| 1-Methoxypropanol | 53.69% |

Irgacure 184 is a photoinitiator commercially available from Ciba Additives, Inc. CN-104 is an epoxy acrylate oligomer, SR-601 is an ethoxylated bisphenol A diacrylate, and SR-399 is dipentaerythritol pentaacrylate, all available from Sartomer Company in Exton, Pa. The acetone, the ethanol, and the 1-methoxypropanol were all reagent grade solvents. The Tinuvin 770 improves the impact resistance of the lens and is available from Ciba Additives, Inc.

An 80 mm diameter convex mold with radii of curvature of 6.80/7.80 diopters was cleaned and coated using the same procedure described above except that no pooling of the coating composition occurred in the center of the mold when the composition was dispensed thereto.

The concave and convex molds were then assembled together with a silicone rubber gasket. A raised lip on the inner circumference of the rubber gasket provided a spacing of 2.8 mm between the two molds at the center point. At this point the mold/gasket assembly was positioned on a filling stage. The edge of the gasket was peeled back to permit the cavity to be filled with PC#1 lens forming composition. The edge of the gasket was returned to its sealing relationship with the edges of the molds, and the excess lens forming composition was vacuumed from the non-casting surface of the back mold with a suction device. The filled mold/gasket assembly was then transferred from the filling stage to a lens curing unit. The assembly was placed with the back mold facing upward on a black stage configured to hold the mold/gasket assembly.

An activating light filter was then placed on top of the back mold. The filter was approximately 80 mm in diameter which is the same as the mold diameter. The filter also had a spherical configuration with a center thickness of 6.7 mm and an edge thickness of 5.5 mm. The filter was taken from a group of previously made filters. These filters were formed by using eyeglass lens casting molds and gaskets to create cavities that were thickest in the center (a plus spherical cavity) and cavities that were thinnest in the center (a minus spherical cavity). A toric component was also incorporated with some of these cavities to form compound cavities.

The filter cavities were filled with an activating light curable composition comprising by weight: 99.37% PRO-629 , 0.35% K-Resin, 0.27% NMDEA, 121 ppm CGI-819, and 10 ppm Tinuvin 400. K-resin is a styrene-butadiene copolymer commercially available from Phillips Chemical Company. To form this composition, the K-resin was first dissolved in toluene. An appropriate amount of the K-resin toluene solution was added to the PRO-629, and then the toluene was evaporated off by heat and stirring. The NMDEA, CGI-819, and the Tinuvin 400 were then added to the PRO-629/K-Resin solution. The compositions contained in the cavities were cured by exposure to activating light. When the cured article was removed from the mold cavity, it exhibited a high degree of haze caused by the incompatibility of the PRO-629. and the K-Resin. In the strictest sense of the word, it should be noted that these filters were not "lenses" because their function was not to focus light but rather to scatter and diffuse light.

The mold/gasket assembly and the filter were then irradiated with four consecutive doses of activating light totaling approximately 1150 mJ/cm$^2$, as previously measured at the plane of the mold cavity with no filter or any other intervening media between the light source and the plane. The mold/gasket assembly was then turned over on the stage so that the front mold was facing upward. The mold/gasket assembly was further rotated 90 degrees around the paraxial axis from its original position. The light filter was then placed over the front mold. The entire assembly was then exposed to two more doses of activating light totaling approximately 575 mJ/cm$^2$. The mold/gasket assembly was removed from the curing chamber. The gasket was removed from the molds, and the exposed edge of the lens was wiped to remove any residual liquid. The molds with lens were then placed in a vertical orientation in a rack, and the non-casting faces of both the front and back molds were exposed to ambient room temperature air for a period of approximately ten minutes. Then, without the aforementioned light filter in place, the mold assembly was dosed with four exposures totaling 600 mJ/cm$^2$ directed toward the back mold and two exposures totaling 300 mJ/cm$^2$ directed toward the front mold.

Subsequent to these exposures, the junction of the back mold and the lens was scored with the edge of a brass spatula The back mold was then removed from the lens by positioning an appropriate sized Delrin wedge between the front and back molds and applying a sharp impact to the wedge. The lens, along with the front mold to which it was attached, was held under running tap water and simultaneously brushed with a soft brush to remove any flakes or particles of polymer from the edges and surface of the lens. The front mold was then separated from the lens by breaking the seal between the two with the point of a pin pressed against the junction of the front mold and the lens. The lens was then placed concave side upward on a lens stage of similar design to the mold stage, except that the peripheral clips were configured to secure a smaller diameter workpiece. The lens stage, with the lens affixed, was positioned on the spin coating unit and rotated at about 750 to 900 revolutions per minute. A stream of isopropyl alcohol was directed at the concave surface while simultaneously brushing the surface with a soft, clean brush.

After brushing, a stream of isopropyl alcohol was directed at the surface of the lens, and the rotation was continued for a period of approximately 30 seconds until the lens was dry. The lens was turned over on the stage so that the convex surface of the lens faced upward. Then the cleaning procedure was repeated on the convex surface. With the convex surface facing upward, the lens was dosed with four exposures of activating light totaling approximately 1150 mJ/cm$^2$. The lens was again turned over on the stage such that the concave surface was upward. The lens was subjected to an additional two exposures totaling 300 mJ/cm$^2$. The lens was removed from the stage and placed in a convection oven at 115° C. for five minutes. After annealing the lens, it was removed from the oven and allowed to cool to room temperature. At this point the lens was ready for shaping by conventional means to fit into an eyeglass frame.

Figure 30:
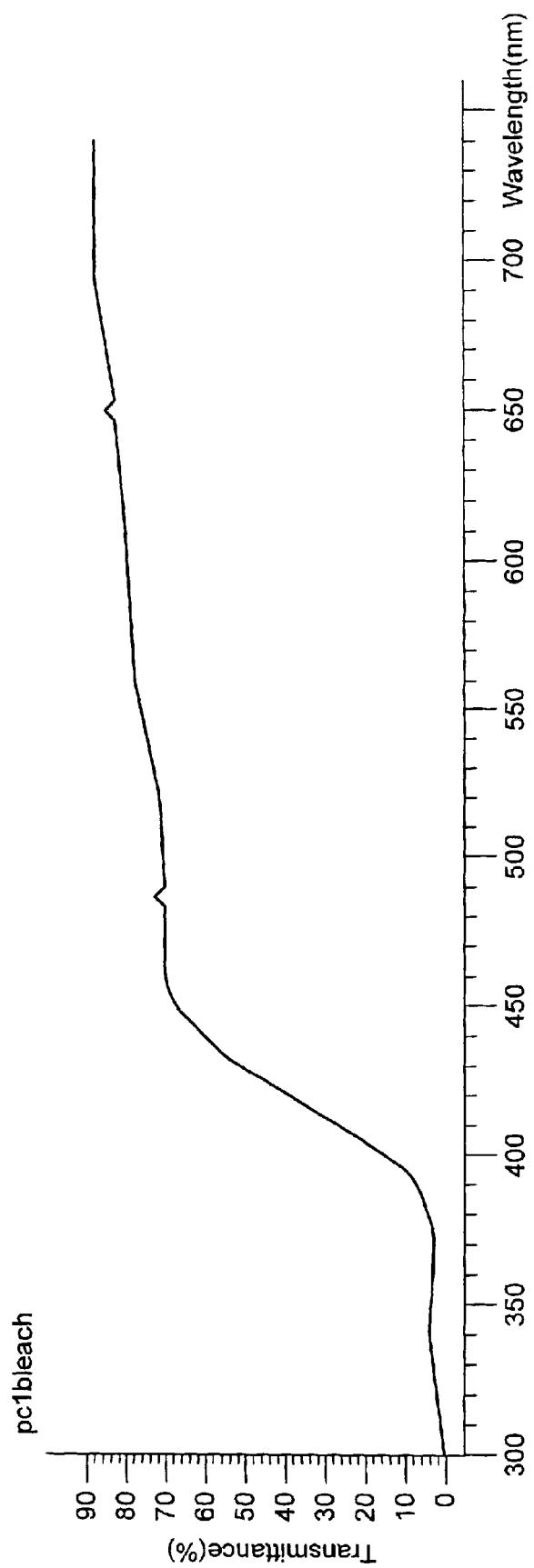
FIG. 30 depicts a plot of % transmittance of light versus wavelength for a photochromic lens.

The resulting lens was approximately 72 mm in diameter. The lens had a center thickness of 2.6 mm, a distance focusing power of −0.71–1.00 diopters, and a bifocal addition strength of 1.74 diopters. The lens appeared to have a bleached color of tan. Also, the lens that was formed exhibited approximately 75% visible transmittance as measured with a Hoya ULT-3000 meter. The lens was exposed to midday sunlight at a temperature of approximately 75° F. for 3 minutes. After being exposed to sunlight, the lens exhibited a gray color and a visible light transmittance of approximately 15%. The optics of the lens appeared to be crisp, without aberrations in either the distance or the bifocal segment regions. The same lens forming composition was cured to form a piano lens so that the lens could be scanned with a Hewlett Packard Model 8453 UV-Vis spectrophotometer. See FIG. 30 for a plot of % transmittance versus wavelength (nm), as exhibited by the piano lens in its lightened state (i.e., without sunlight exposure). The lens exhibited very little transmittance of light at wavelengths below about 370 nm.

The eyeglass lens of this example was formed from a lens forming composition included ultraviolet/visible light absorbing photochromic compounds by using activating light. Since photochromic pigments tend to absorb ultraviolet/visible light strongly, the activating light might not have penetrated to the depths of the lens forming composition. The lens forming composition, however, contained a co-initiator in conjunction with a photoinitiator to help promote the curing of the entire lens forming composition. The present example thus demonstrates that a photochromic lens containing both a photoinitiator and a co-initiator may be cured using activating light to initiate polymerization of the lens forming composition.

Example 11

Casting a Colorless Lens Containing Ultraviolet/ Visible Light Absorbers

According to a preferred embodiment, a polymerizable mixture of PRO-629 (see above for a description of the components of PRO-629), colorless ultraviolet/visible light absorbing compounds, an ultraviolet stabilizer, background dyes, and a photoinitiator/co-initiator package was prepared according to the following procedure. Six separate stock solutions were prepared. One stock solution contained the photoinitiator, two stock solutions contained ultraviolet/ visible light absorbing compounds, one stock solution contained co-initiators, one stock solution contained an ultraviolet light stabilizer, and one stock solution contained a background dye package. Each of these stock solutions were treated by passing them through a one inch diameter column packed with approximately 30 grams of alumina basic. It is believed that this step reduced the impurities and trapped the acidic byproducts present in each of the additives to the PRO-629. The following is a detailed description of the preparation of the polymerizable mixture mentioned above.

About 500 grams of a photoinitiator stock solution was prepared by dissolving 2.5% by weight of phenyl bis(2,4, 6-trimethylbenzoyl) phosphine oxide (CGI-819 commercially available from Ciba Additives) in Pro-629. This mixture was passed through an alumina basic column in the dark.

About 500 grams of the ultraviolet light absorber stock solution was prepared by dissolving 2.5% by weight of 2(2H-benzotriazol-2-yl)-4-(1,1,3,3-tetramethyl)phenol (98% purity) in PRO-629. This mixture was also passed through an alumina basic column.

About 500 grams of a co-initiator stock solution was prepared by mixing 70% by weight of CN-384 (a reactive amine co-initiator commercially available from Sartomer Company) in PRO-629. This mixture was passed through an alumina basic column About 271 grams of an ultraviolet light stabilizer stock solution was prepared by mixing 5.55% by weight of Tinuvin 292 in PRO-629. This mixture was passed through an alumina basic column.

About 250 grams of an ultraviolet/visible light absorber stock solution was prepared by mixing 5.0% Tinuvin 400 (a mixture of 2-[4-((2-hydroxy-3-dodecyloxypropyl)-oxy)-2-hydroxyphenyl]-4,6-bis(2,4-dimethylphenyl)-1,3,5-triazine and 2-[4-((2-hydroxy-3-tridecyloxypropyl)oxy)-2-hydroxyphenyl]-4,6-bis(2,4-dimethylphenyl)-1,3,5-triazine) by weight in PRO-629. This mixture was passed through an alumina basic column.

About 1000 grams of a background dye stock solution was prepared by mixing about 50 grams of a 592 ppm solution of Thermoplast Red 454/HDDMA, 50 grams of 490 ppm solution of Zapon Brown 286/HDDMA, 50 grams of 450 ppm solution of Zapon Brown 287/HDDMA, 50 grams of 1110 ppm solution of Oil Soluble Blue II/HEDMA, and 50 grams of a 1110 ppm solution of Thermoplast Blue P/HDDMA, all with 750 grams of PRO-629. The entire mixture was heated to a temperature between about 50° and 60° C. and stirred for two hours. This mixture was passed through an alumina basic column.

About 250 grams of CN-386 (a reactive amine co-initiator commercially available from Sartomer Company) was passed through an alumina basic column.

A lens forming composition was prepared by mixing 967.75 grams of PRO-629 with 12.84 grams of the 2.5% 2(2H-benzotriazol-2-yl)-4-(1,1,3,3-tetramethyl)phenol ultraviolet/visible light absorber stock solution, 4.3 grams of the 70% CN-384 co-initiator stock solution, 8.16 grams of the 2.5% CGI-819 photoinitiator stock solution, 0.53 grams of the CN-386, 1.54 grams of the Tinuvin 400 ultraviolet/ visible light absorber stock solution, 0.92 grams of the Tinuvin 292 ultraviolet light stabilizer stock solution, and 4.0 grams of the background dye stock solution. The resulting lens forming composition contained the following components:

| Material | % by weight |
|---|---|
| PRO-629 | 99.10% |
| 2(2H-benzotriazol-2-yl)-4-(1,1,3,3-tetramethyl)phenol | 321 ppm |
| Tinuvin 400 | 77 ppm |
| Tinuvin 292 | 51 ppm |
| CN-384 | 0.3% |
| CN-386 | 0.53% |
| CGI-819 | 204 ppm |
| Thermoplast Red | 0.12 ppm |
| Zapon Brown 286 | 0.10 ppm |
| Zapon Brown 287 | 0.10 ppm |
| Oil Soluble Blue II | 0.22 ppm |
| Thermoplast Blue | 0.22 ppm |

An 80 mm diameter flattop concave glass mold with a distance radius of curvature of 2.85 diopters and a +3.00 diopter bifocal add power was cleaned and coated as described in Example 10.

An 80 mm diameter convex mold with radii of curvature of 7.05 diopters was cleaned and coated in the same fashion described above except that no pooling of the coating composition occurred in the center of the mold when the composition was dispensed thereto.

Both the concave and convex molds were then provided with a cured adhesion-promoting coating composition. By providing such a coating, the adhesion between the casting surface of the glass mold and the lens forming composition was increased, thereby reducing the possibility of premature release of the lens from the mold. The coating further provided abrasion resistance, chemical resistance, and improved cosmetics to the finished lens.

The concave and convex molds were then assembled and placed within a lens curing unit as described in Example 10.

An activating light filter was then placed on top of the back mold. The filter was approximately 80 mm in diameter which is the same as the mold diameter. It had a plano configuration with a thickness of 3.1 mm. This filter transmitted approximately 30% of the incident activating light from the source as measured using the IL1400 radiometer with a XRL-340B detector head. The filter was taken from a group of previously made filters. The fabrication of these filters was discussed in Example 10.

The mold/gasket assembly in which the lens forming composition had been placed and which had been covered by the above described filter was then irradiated with four consecutive doses of activating light totaling approximately 600 mJ/cm$^2$, as measured using the IL-1400 Radiometer equipped with the XLR-340B detector. This measurement was taken at the plane of the mold cavity while no filter or any intervening media was present between the light source and the plane. The mold/gasket assembly was then turned over on the stage so that the front mold was facing upward. The mold/gasket assembly was further rotated 90 degrees around the paraxial axis from its original position. The light filter was then replaced over the front mold. The entire assembly was exposed to two more doses of activating light totaling approximately 300 mJ/cm$^2$.

The mold/gasket assembly was then removed from the curing chamber, and the gasket was removed from the assembly. The mold was then returned to the lens curing chamber such that the back mold was facing upward. An opaque rubber disc, approximately 80 mm in diameter was placed over the back mold. This disc had the function of preventing activating light from impinging on the major portion of the material contained within the cavity. With the disc in position, the cell was exposed to two more exposures at 300 mJ/cm$^2$. This subsequent exposure was used to cure the residual liquid around the edges of the lens, particularly around the junction between the front mold and the lens and to help seal the periphery. The mold assembly was removed from the curing chamber and placed in a vertical orientation in a rack. The non-casting faces of both the front and back molds were then exposed to ambient room temperature air for a period of approximately fifteen minutes. At this point, the entire mold assembly was dosed with two exposures totaling 300 mJ/cm$^2$ directed toward the back mold and two exposures totaling 300 mJ/cm$^2$ directed toward the front mold, without the aforementioned light filter or opaque disc in place.

The lens was removed from the mold assembly and post-cured as described in Example 10.

Figure 31:
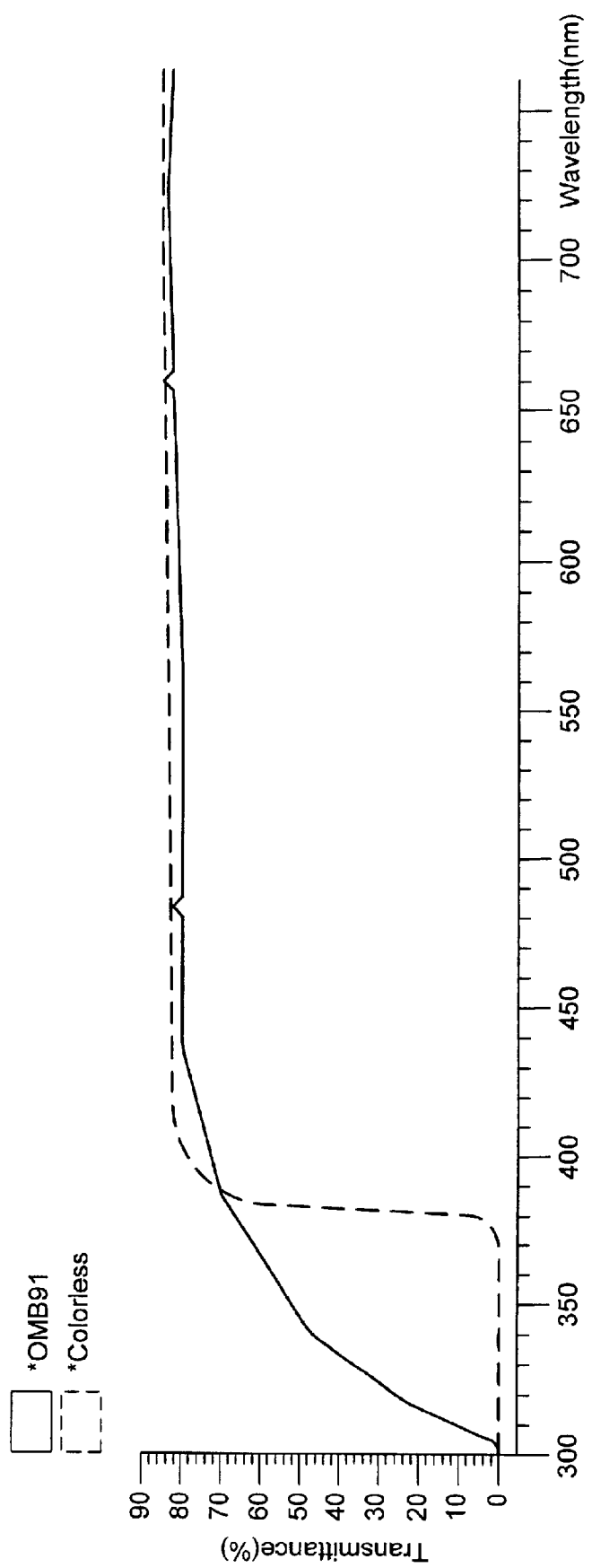
FIG. 31 depicts a plot of % transmittance of light versus wavelength for both a colorless lens containing ultraviolet/visible light absorbers and a lens containing no ultraviolet/visible light absorbers.

The resulting lens was approximately 72 mm in diameter, had a center thickness of 1.5 mm, a distance focusing power of −4.08 diopters, and a bifocal addition strength of 3.00 diopters. The resultant lens was water white. The optics of the lens were crisp, without aberrations in either the distance or the bifocal segment regions. The same lens forming composition was cured to form a piano lens. The piano lens was scanned with a Hewlett Packard Model 8453 UV-Vis spectrophotometer. See FIG. 31 for a plot of % transmittance versus wavelength (nm), as exhibited by the photochromic lens when exposed to sunlight. The lens exhibited virtually no transmittance of light at wavelengths below about 370 nm. Also shown in FIG. 31 are the results of a similar scan made on a plano lens formed using the OMB-91 lens forming composition (see Curing by the Application of Pulsed Activating Light above for components of OMB-91). The OMB-91 lens, which has no ultraviolet/visible light absorbing compounds, appears to transmit light at wavelengths shorter than 370 nm, unlike the colorless lens that contained ultraviolet/visible light absorbing compounds.

The eyeglass lens of this example was cured using activating light even though the lens forming composition included activating light absorbing compounds. Since activating light absorbing compounds tend to absorb activating light strongly, the activating light might not have penetrated to the depths of the lens forming composition. The lens forming composition, however, contained a co-initiator in conjunction with a photoinitiator to help promote the curing of the entire lens forming composition. The present example thus demonstrates that a lens containing ultraviolet/visible light absorbing compounds may be cured using activating light to initiate polymerization of a lens forming composition which contains a photoinitiator/co-initiator system. The lens was also produced using activating light of comparable intensity and duration as was used for the production of photochromic lenses. Thus, the addition of ultraviolet/visible light absorbers to a non-photochromic lens forming composition, allows both photochromic and non-photochromic lens forming compositions to be cured using the same apparatus and similar procedures.

Example 12

Casting a Colored Lens Containing Ultraviolet/Visible Light Absorbers

According to a preferred embodiment, a polymerizable mixture of PRO-629 (see above for a description of the components of PRO-629), fixed pigments, and a photoinitiator/co-initiator package was prepared according to the following procedure. Nine separate stock solutions were prepared. Seven of the stock solutions contained fixed pigments, one of the stock solutions contained an ultraviolet/visible light absorbing compound, and one of the stock solutions contained a photoinitiator. Each of these stock solutions were treated by passing them through a one inch diameter column packed with approximately 30 grams of alumina basic. It is believed that this step reduces the impurities and traps the acidic byproducts present in each of the additives to the PRO-629.

For each of the following fixed pigments, a stock solution was prepared by the following procedure. The pigments used were Thermoplast Red 454, Thermoplast Blue P, Oil Soluble Blue II, Zapon Green 936, Zapon Brown 286, Zapon Brown 287, and Thermoplast Yellow 284. One gram of each pigment was dissolved in 499 grams of HDDMA. Each mixture was heated to a temperature in the range of from about 50° C. to about 60° C. for approximately two hours. This mixture was passed through an alumina basic column. The alumina was then washed with 200 grams of HDDMA at a temperature of about 50° C. to about 60° C. followed by 300 grams of PRO-629 at a temperature of about 50° C. to about 60° C. This washing step ensured that any pigments trapped in the alumina were washed into the stock solution. This resulted in stock solutions which contained a 0.1% concentration of each pigment in 29.97% PRO-629 and 69.93% HDDMA.

About 250 grams of the ultraviolet/visible light absorber stock solution was prepared by dissolving 5.0% Tinuvin 400 by weight in PRO-629. This mixture was passed through an alumina basic column.

About 500 grams of the photoinitiator stock solution was prepared by dissolving 2.5% by weight of phenyl bis(2,4,6-trimethylbenzoyl) phosphine oxide (CGI-819 commercially available from Ciba Additives) in PRO-629. This mixture was passed through an alumina basic column in the dark.

A lens forming composition was prepared by mixing 685.3 grams of PRO-629 with 10.48 grams of the 2.5% CGI-819 photoinitiator stock solution, 5.3 grams of NMDEA (N-methyldiethanolamine is commercially available from Aldrich Chemicals), 0.6 grams of Tinuvin 400 ultraviolet/visible light absorber stock solution, 7 grams of the Thermoplast Red stock solution, 58.3 grams of the Thermoplast Blue stock solution, 55.5 of the Oil Soluble Blue II stock solution, 29.2 grams of the Zapon Green 936 stock solution, 68.1 grams of the Zapon Brown 286 stock solution, 38.9 grams of the Zapon Brown 287 stock solution, and 41.3 grams of the Thermoplast Yellow 104 stock solution. The resulting lens forming composition contained the following components:

| Material | % by weight |
| --- | --- |
| Bisphenol A bis allyl carbonate | 13.35% |
| Tripropyleneglycol diacrylate | 25.13% |
| Tetraethyleneglycol diacrylate | 16.49% |
| Trimethylolpropane triacrylate | 15.71% |
| Hexanediol dimethacrylate | 28.75% |
| Thermoplast Red | 7.0 ppm |
| Zapon Brown 286 | 68.1 ppm |
| Zapon Brown 287 | 38.9 ppm |
| Oil Soluble Blue II | 55.5 ppm |

-continued

| Material | % by weight |
| --- | --- |
| Thermoplast Blue | 58.3 ppm |
| Zapon Green 936 | 29.2 ppm |
| Thermoplast Yellow 104 | 41.3 ppm |
| NMDEA | 0.53% |
| CGI-819 | 262 ppm |
| Tinuvin 400 | 30 ppm |

An 80 mm diameter flattop concave glass mold with a distance radius of curvature of 6.0 diopters was cleaned and coated as described in Example 10.

An 80 mm diameter convex mold with radii of curvature of 6.05 diopters was cleaned and coated in the same fashion except that no pooling of the coating composition occurred in the center of the mold when the composition was dispensed thereto.

The concave and convex molds were then coated with a cured adhesion-promoting coating composition. By providing such a coating, the adhesion between the casting surface of the glass mold and the curing lens forming composition was increased, thereby reducing the possibility of premature release of the lens from the mold. The coating also provided abrasion resistance, chemical resistance, and improved cosmetics to the finished lens.

The concave and convex molds were then assembled and placed within a lens curing unit as described in Example 10.

An activating light filter was then placed on top of the back mold. The filter was approximately 80 mm in diameter, which is the same as the mold diameter. It had a plano configuration with a thickness of 3.1 mm. This filter transmitted approximately 30% of the incident activating light from the source as measured using the IL1400 radiometer with a XRL-340B detector head. The filter was taken from a group of previously made filters. The fabrication of these filters was discussed in Example 10.

The mold/gasket assembly containing the lens forming composition was then irradiated with six consecutive doses of activating light totaling approximately 1725 mJ/cm$^2$, as previously measured using the IL-1400 Radiometer equipped with the XLR-340B detector, at the plane of the mold cavity with no filter or any intervening media between the light source and the plane. The mold/gasket assembly was then turned over on the stage so that the front mold was facing upward. The entire assembly was then exposed to six more doses of activating light totaling approximately 1725 mJ/cm$^2$. The mold/gasket assembly was removed from the curing chamber. The gasket was removed from the molds, and the assembly was placed in a vertical orientation in a rack such that the non-casting faces of both the front and back molds were exposed to ambient room temperature air for a period of approximately ten minutes. At this point, the assembly was returned to the lens curing chamber and was dosed with four exposures totaling 600 mJ/cm$^2$ directed toward the back mold and four exposures totaling 600 mJ/cm$^2$ directed toward the front mold.

The lens was removed from the mold assembly and post-cured as described in Experiment 10.

The resulting lens was approximately 74 mm in diameter, had a center thickness of 2.7 mm, and a distance focusing power of +0.06 diopters. The resultant lens was dark green/grayish in color and could be used as a sunglass lens. The optics of the lens were crisp, without aberrations. The lens exhibited visible light transmission of approximately 10%.

When scanned with a Hewlett Packard Model UV-Vis spectrophotometer, the lens transmitted virtually no light at wavelengths less than 650 nm.

The sunglass lens of this example was cured using activating light even though the lens forming composition included ultraviolet/visible absorbing fixed pigments. Since such fixed pigments tend to absorb a portion of the activating light strongly, the activating light might not have penetrated to the depths of the lens forming composition. The lens forming composition, however, contained a co-initiator in conjunction with a photoinitiator to help promote the curing of the entire lens forming composition. The present example thus demonstrates that a sunglass lens containing ultraviolet/visible light absorbing fixed pigments may be cured using activating light, which includes ultraviolet/visible light, to initiate polymerization of a lens forming composition that contains a photoinitiator/co-initiator system.

Example 13

Altering the Activated Color of a Photochromic Lens

According to a preferred embodiment, a polymerizable mixture of PRO-629 (see above for a description of the components of PRO-629), fixed pigments, a photoinitiator/co-initiator, and two photochromic compounds was prepared in a manner similar to that described in Example 12. The resulting lens forming composition includes PRO-629, and the following components:

| Material | amount |
| --- | --- |
| IRG-184 | 80 ppm |
| IRG 819 | 280 ppm |
| CN-384 | 1.0% |
| CN-386 | 1.0% |
| Thermoplast Blue | 0.67 ppm |
| Thermoplast Red | 0.04 ppm |
| Reversacol Sea Green | 300 ppm |
| Reversacol Berry Red | 600 ppm |

After the lens forming composition was prepared, a variety of light effectors were added to the lens forming composition described above. The modified lens forming composition was then placed within a mold cavity, prepared as described in Example 12.

TABLE 8

| SAMPLE | EFFECTOR | AMOUNT | EFFECTOR UV ABSORBANCE | ACTIVATED COLOR |
| --- | --- | --- | --- | --- |
| S9 | None | — | — | Gray |
| S10 | MEHQ | 350 ppm | 294–317 nm | Brown |
| S11 | Tinuvin 400 | 1130 ppm | 295–390 nm | Aqua-Green |
| S12 | ITX | 500 ppm | 280–415 nm | Yellow-Green |
| S13 | IRG-369 | 300 ppm | 290–390 nm | Green |

Both sides of the mold assembly was irradiated with two doses of actinic light (e.g., light having a wavelength above about 380 nm). The first dose was applied for between 20 to 40 seconds. The final dose was applied for about 5 minutes. The resulting lens was demolded and treated with additional actinic light in a post-cure unit. The formed lens was exposed to sunlight and the activated color of the lens observed. Table 8 summarizes the results when MEHQ, Tinuvin 400, ITX, and IRG-369 are used as light effectors. S9 represents a lens formed without any added light effectors.

The activated color of the formed lens was noted after exposing the formed lens to sunlight. The presence of light effectors can have a significant effect on the color of the lens. It should be noted that this change in color may be obtained without altering the relative ratio of the photochromic compounds (i.e., Berry Red and Sea Green). MEHQ which exhibits absorption in the low ultraviolet light region tends to shift the color of the lens toward red, thus causing the lens to take on a brown color when exposed to sunlight. The absorbers Tinuvin 400, ITX, and IRG-369 all tend to produce lenses having various green shades. Because of the broad photochromic activating light absorbance range of these compounds they may be effecting the photochromic activity of both photochromic compounds.

The above examples represent specific examples of how an activated color of a lens may be altered by the addition of a light effector to a lens forming composition. By running similar studies with other light effectors, the activated color of a lens may be adjusted to a variety of different colors (e.g., red, orange, yellow, green, blue, indigo, or violet) without changing the nature of the photochromic compounds.

Further Improvements

In an embodiment, a lens forming composition may be cured into a variety of different lenses. The lens forming composition includes an aromatic containing polyether polyethylenic functional monomer, a co-initiator composition configured to activate curing of the monomer, and a photoinitiator configured to activate the co-initiator composition in response to being exposed to activating light. The lens forming composition may include other components such as ultraviolet light absorbers and photochromic compounds. Lenses which may be cured using the lens forming composition include, but are not limited to, spheric single vision, aspheric single vision lenses, flattop bifocal lenses, and asymmetrical progressive lenses.

One lens forming composition, herein referred to as OMB-99, includes a mixture of the following monomers. The OMB-99 mixture is commercially available as "OMB-99 Clear Monomer" from Optical Dynamics Corporation, Louisville Ky.

| OMB-99 | |
| --- | --- |
| 98.25% | Ethoxylated$_{(4)}$bisphenol A dimethacrylate (CD-540) |
| 0.75% | Difunctional reactive amine coinitiator (CN-384) |
| 0.75% | Monofunctional reactive amine coinitiator (CN-386) |
| 0.15% | Phenyl bis(2,4,6-trimethylbenzoyl) phosphine oxide (Irgacure-819) |
| 0.10% | 2-(2H-Benzotriazol-2-yl)-4-(1,1,3,3-tetramethylbutyl)phenol |
| 0.87 ppm | Thermoplast Blue 684 |
| 0.05 ppm | Thermoplast Red LB 454 |

Another lens forming composition, herein referred to as Phases II, includes a mixture of the following monomers. The presence of photochromic compounds allows the Phases II composition to be used to form photochromic lenses.

| Phases II | |
| --- | --- |
| 97.09% | Ethoxylated(4)bisphenol A dimethacrylate (CD-540) |
| 1.4% | Difunctional reactive amine coinitiator (CN-384) |
| 1.4% | Monofunctional reactive amine coinitiator (CN-386) |

-continued

| Phases II | |
|---|---|
| 0.09% | Phenyl bis(2,4,6-trimethylbenzoyl) phosphine oxide (Irgacure-819) |
| 0.9 ppm | Thermoplast Red LB 454 |
| 50 ppm | Variacrol Blue D |
| 73.5 ppm | Variacrol Yellow |
| 145 ppm | Berry Red |
| 29 ppm | Palatinate Purple |
| 55.5 ppm | Corn Yellow |
| 62 ppm | Sea Green |
| 85 ppm | Plum Red |

The Phases II mixture is commercially available as "PHASES II Monomer" from Optical Dynamics Corporation, Louisville Ky.

A lens forming composition which includes an aromatic containing polyether polyethylenic functional monomer, a co-initiator composition and a photoinitiator may be used to form a variety of prescription eyeglass lenses, including eyeglass lenses which have a sphere power ranging from about +4.0 diopter to about −6.0 diopter. The lenses formed from this lens forming composition are substantially free of distortions, cracks, patterns and striations, and that have negligible yellowing, in less than thirty minutes by exposing the lens forming composition to activating light and heat. An advantage of the lens forming composition is that it exhibits increased adhesion to the molds. This may reduce the incidence of premature release of the formed lens from the molds. Additionally, the use of adhesion promoting agents, typically applied to the molds to prevent premature release, may no longer be necessary.

The increased adhesion of the lens forming composition to the molds allows curing of the lens forming composition at higher temperatures. Typically, control of the temperature of the lens forming composition may be necessary to prevent premature release of the lens from the molds. Premature release may occur when the lens forming composition shrinks as it is cured. Shrinkage typically occurs when the lens forming composition is rapidly heated during curing. Lens forming compositions which include an aromatic containing polyether polyethylenic functional monomer, a co-initiator composition and a photoinitiator may reduce the incidence of premature release. The increased adhesion of this lens forming composition may allow higher curing temperatures to be used without increasing the incidence of premature release. It is also believed that this lens forming composition may exhibit less shrinkage during curing which may further reduce the chance of premature release.

An advantage of curing at higher temperatures is that an eyeglass lens having a high crosslink density may be formed. The crosslink density of an eyeglass lens is typically related to the curing temperature. Curing a lens forming composition at a relatively low temperature leads to a lower crosslink density than the crosslink density of a lens cured at a higher temperature. Lenses which have a higher crosslink density generally absorb tinting dyes substantially evenly without blotching or streaking. Lenses which have a high crosslink density also may exhibit reduced flexibility.

The formation of lenses involves: 1) Preparing the mold assembly; 2) Filling the mold assembly with the lens forming composition; 3) Curing the lens; 4) Post-curing the lens; and 5) Annealing the lens. Optionally, the lens may be coated before use. The formation of lenses may be accomplished using the plastic lens curing apparatus described above.

The preparation of a mold assembly includes selecting the appropriate front and back molds for a desired prescription and lens type, cleaning the molds, and assembling the molds to form the mold assembly. The prescription of the lens determines which front mold, back mold, and gasket are used to prepare the mold assembly. In one embodiment, a chart which includes all of the possible lens prescriptions may be used to allow a user to determine the appropriate molds and gaskets. Such a chart may include thousands of entries, making the determination of the appropriate molds and gaskets somewhat time consuming.

In a preferred embodiment, the controller 50 of the plastic lens curing apparatus 10 (see FIG. 1) will display the appropriate front mold, back mold, and gasket identification markings when a prescription is submitted to the controller. The controller will prompt the user to enter the 1) the monomer type; 2) the lens type; 3) spherical power; 4) cylindrical power; 5) axis; 6) add power, and 7) the lens location (i.e., right or left lens). Once this information is entered the computer will determine the correct front mold, back mold and gasket to be used. The controller may also allow a user to save and recall prescription data.

FIG. 40 shows an embodiment of a front panel for the controller 50. The controller includes an output device 610 and at least one input device. A variety of input devices may be used. Some input devices include pressure sensitive devices (e.g., buttons), movable data entry devices (e.g., rotatable knobs, a mouse, a trackball, or moving switches), voice data entry devices (e.g., a microphone), light pens, or a computer coupled to the controller. Preferably the input devices include buttons 630, 640, 650 and 660 and a selection knob 620. The display panel preferably displays the controller data requests and responses. The output device may be a cathode ray tube, an LCD panel, or a plasma display screen.

When initially powered, the controller will preferably display a main menu, such as the menu depicted in FIG. 40. If the main menu is not displayed, a user may access the main menu by pressing button 650, which may be labeled Main Menu. In response to activating the Main Menu button 650, the controller will cause the main menu screen to be displayed. As depicted in FIG. 40, a display screen offers a number of initial options on the opening menu. The options may include 1) NEW Rx; 2) EDIT Rx; and 3) VIEW Rx. The main menu may also offer other options which allow the operator to access machine status information and instrument setup menus. The scrolling buttons 630 preferably allow the user to navigate through the options by moving a cursor 612 which appears on the display screen to the appropriate selection. Selection knob 620 is preferably configured to be rotatable to allow selection of options on the display screen. Knob 620 is also configured to allow entry of these items. In one embodiment, selection knob 620 may be depressed to allow data entry. That is, when the appropriate selection is made, the knob may be pushed down to enter the selected data. In the main menu, when the cursor 612 is moved to the appropriate selection, the selection may be made by depressing the selection knob 620.

Figure 41:
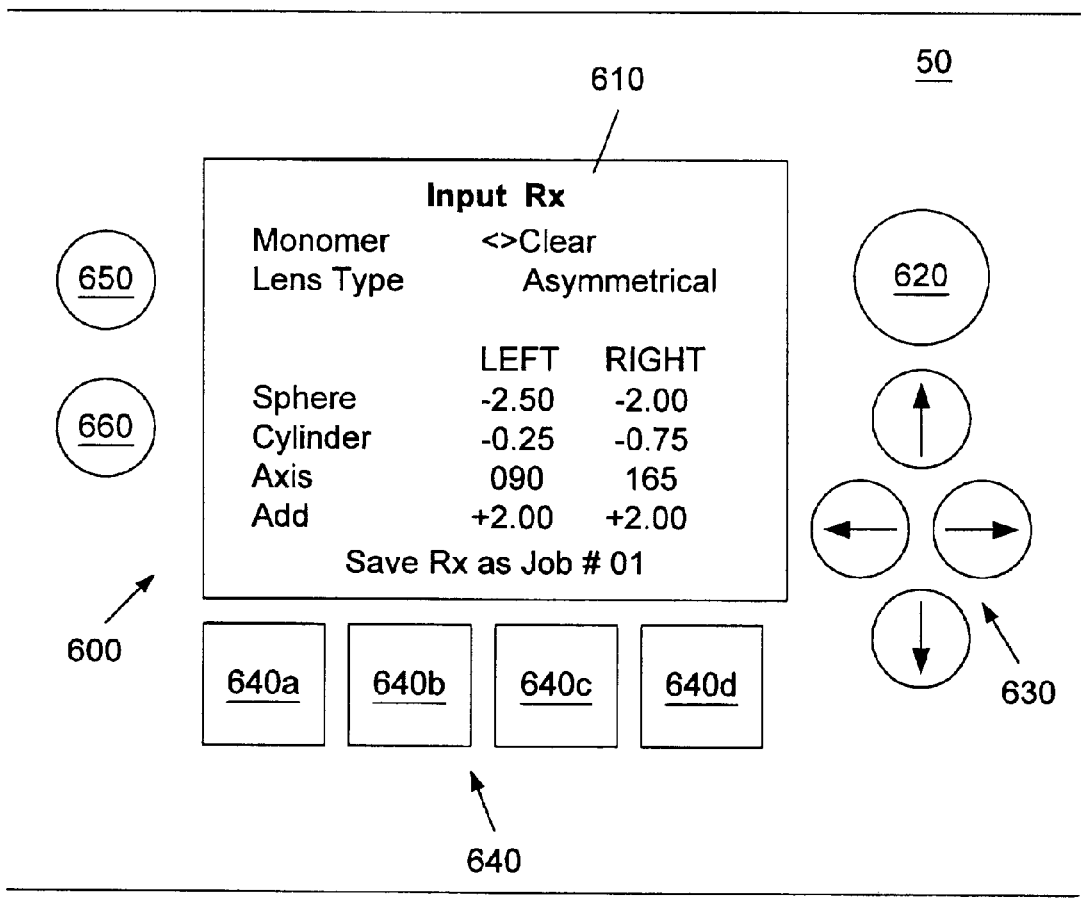

Selection of the NEW Rx menu item will cause the display screen to change to a prescription input menu, depicted in FIG. 41. The prescription input menu will preferably allow the user to enter data pertaining to a new lens type. The default starting position will be the lens monomer selection box. Once the area is highlighted, the selection knob 620 is rotated to make a choice among the predetermined selections. When the proper selection is displayed, the selection knob may be pushed down to enter the selection. Entry of the selection may also cause the cursor to move to the next item on the list Alternatively, a user may select the next item to be entered using the scrolling arrows 630.

Each of the menu items allows entry of a portion of the lens prescription. The lens prescription information includes 1) the monomer type; 2) the lens type; 3) lens location (i.e., left lens or right lens); 4) spherical power; 5) cylindrical power; 6) axis; and 7) add power. The monomer selection may include choices for either clear or photochromic lenses. The lens type item may allow selection between spheric single vision, aspheric single vision lenses, flattop bifocal lenses, and asymmetrical progressive lenses. The sphere item allows the sphere power of the lens to be entered. The cylinder item allows the cylinder power to be entered. The axis item allows the cylinder axis to be entered. The add item allows the add power for multifocal prescriptions to be added. Since the sphere power, cylinder power, cylinder axis, and add power may differ for each eye, and since the molds and gaskets may be specific for the location of the lens (i.e., right lens or left lens), the controller preferably allows separate entries for right and left lenses. If an error is made in any of the entry fields, the scrolling arrows 630 preferably allow the user to move the cursor to the incorrect entry for correction.

After the data relating to the prescription has been added, the controller may prompt the user to enter a job number to save the prescription type. This preferably allows the user to recall a prescription type without having to renter the data. The job number may also be used by the controller to control the curing conditions for the lens. The curing conditions typically vary depending on the type and prescription of the lens. By allowing the controller access to the prescription and type of lens being formed, the controller may automatically set up the curing conditions without further input from the user.

Figure 42:
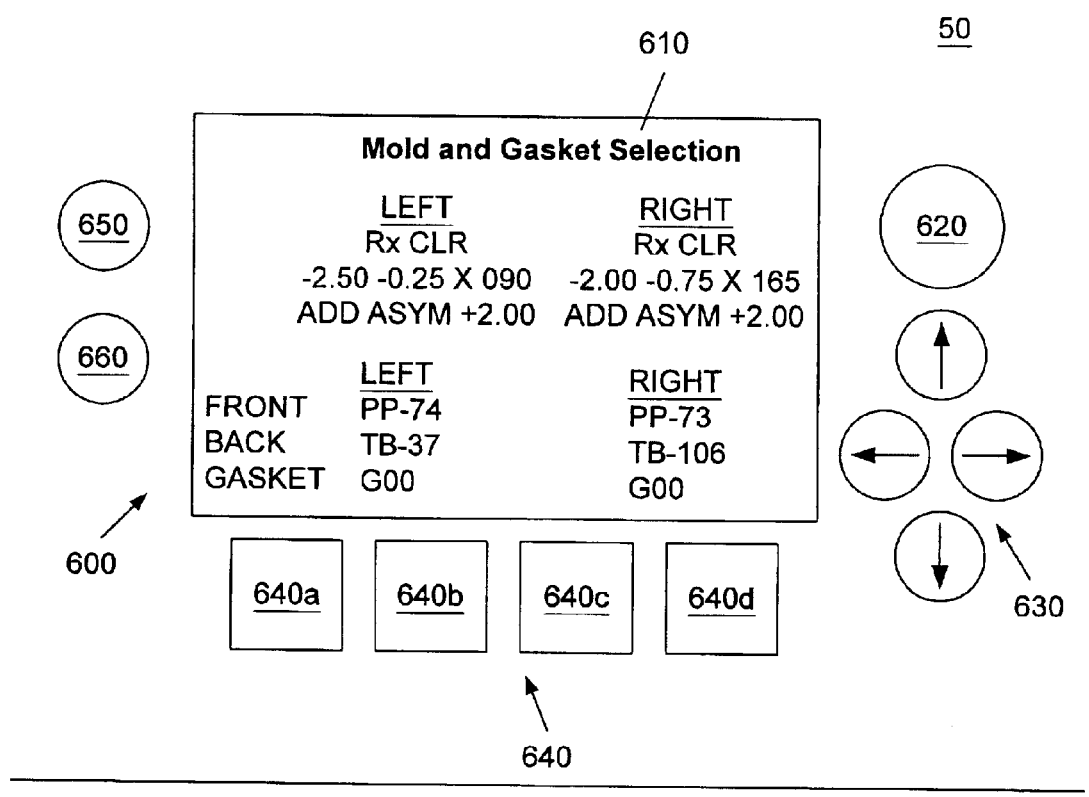

After the job is saved, the display screen will preferably display information which allows the user to select the appropriate front mold, back mold and gasket for preparing the lens, as depicted in FIG. 42. This information is preferably generated by the use of a stored database which correlates the inputted data to the appropriate lenses and gasket. The prescription information is also summarized to allow the user to check that the prescription has been entered correctly. The mold and gasket information may be printed out for the user. A printer may be incorporated into the controller to allow print out of this data. Alternatively, a communication port may be incorporated into the controller to allow the data to be transferred to a printer or personal computer. Each of the molds and gaskets has a predetermined identification marking. Preferably, the identification markings are alphanumeric sequences. The identification markings for the molds and gasket preferably correspond to alphanumeric sequences for a library of mold members. The user, having obtained the mold and gasket identification markings, may then go to the library and select the appropriate molds and gaskets.

The controller is preferably configured to run a computer software program which, upon input of the eyeglass prescription, will supply the identification markings of the appropriate front mold, back mold and gasket. The computer program includes a plurality of instructions configured to allow the controller to collect the prescription information, determine the appropriate front mold, back mold, and gasket required to a form a lens having the inputted prescription, and display the appropriate identification markings for the front mold, back mold and gasket. In one embodiment, the computer program may include an information database. The information database may include a multidimensional array of records. Each records may include data fields corresponding to identification markings for the front mold, the back mold, and the gasket. When the prescription data is entered, the computer program is configured to look up the record corresponding to the entered prescription. The information from this record may be transmitted to the user, allowing the user to select the appropriate molds and gasket.

In one embodiment the information database may be a three dimensional array of records. An example of a portion of a three dimensional array of records is depicted in Table 9. The three dimensional array includes array variables of sphere, cylinder, and add. A record of the three dimensional array includes a list of identification markings. Preferably this list includes identification markings for a front mold (for either a left or right lens), a back mold and a gasket. When a prescription is entered the program includes instructions which take the cylinder, sphere and add information and look up the record which is associated with that information. The program obtains from the record the desired information and transmits the information to the user. For example, if a prescription for left lens having a sphere power of +1.00, a cylinder power of −0.75 and an add power of 2.75 is entered, the front mold identification marking will be FT-34, the back mold identification marking will be TB-101, and the gasket identification marking will be G25. These values will be transmitted to the user via an output device. The output device may include a display screen or a printer. It should be understood that the examples shown in Table 9 represent a small portion of the entire database. The sphere power may range from +4.00 to −4.00 in 0.25 diopter increments, the cylinder power may range from 0.00 diopters to −2.00 diopters in 0.25 diopter increments, and the add power may range from +1.00 to +3.00 in 0.25 diopter increments.

TABLE 9

| ARRAY VARIABLES | | | IDENTIFICATION MARKINGS | | | |
|---|---|---|---|---|---|---|
| Sphere | Cylinder | Add | Front (Right) | Front (Left) | Back | Gasket |
| +1.00 | −0.75 | +1.25 | FT-21 | FT-22 | TB-101 | G25 |
| +1.00 | −0.75 | +1.50 | FT-23 | FT-24 | TB-101 | G25 |
| +1.00 | −0.75 | +1.75 | FT-25 | FT-26 | TB-101 | G25 |
| +1.00 | −0.75 | +2.00 | FT-27 | FT-28 | TB-101 | G25 |
| +1.00 | −0.75 | +2.25 | FT-29 | FT-30 | TB-101 | G25 |
| +1.00 | −0.75 | +2.50 | FT-31 | FT-32 | TB-101 | G25 |
| +1.00 | −0.75 | +2.75 | FT-33 | FT-34 | TB-101 | G25 |
| +1.00 | −0.75 | +3.00 | FT-35 | FT-36 | TB-101 | G25 |
| +0.75 | −0.75 | +1.00 | FT-19 | FT-20 | TB-102 | G25 |
| +0.75 | −0.75 | +1.25 | FT-21 | FT-22 | TB-102 | G25 |
| +0.75 | −0.75 | +1.50 | FT-23 | FT-24 | TB-102 | G25 |
| +0.75 | −0.75 | +1.75 | FT-25 | FT-26 | TB-102 | G25 |
| +0.75 | −0.75 | +2.00 | FT-27 | FT-28 | TB-102 | G25 |
| +0.75 | −0.75 | +2.25 | FT-29 | FT-30 | TB-102 | G25 |
| +0.75 | −0.75 | +2.50 | FT-31 | FT-32 | TB-102 | G25 |
| +0.75 | −0.75 | +2.75 | FT-33 | FT-34 | TB-102 | G25 |
| +0.75 | −0.75 | +3.00 | FT-35 | FT-36 | TB-102 | G25 |
| +0.50 | −0.75 | +1.00 | FT-19 | FT-20 | TB-103 | G25 |
| +0.50 | −0.75 | +1.25 | FT-21 | FT-22 | TB-103 | G25 |

A second information database may include information related to curing the lens forming composition based on the prescription variables. Each record may include information related to curing clear lenses (i.e., non-photochromic lenses) and photochromic lenses. The curing information may include filter information, initial curing dose information, postcure time and conditions, and anneal time. An example of a portion of this database is depicted in Table 10. Curing conditions typically depend on the sphere power of a lens, the type of lens being formed (photochromic or non-photochromic), and whether the lens will be tinted or not. Curing information includes type of filter being used, initial dose conditions, postcure time, and anneal time. A filter with a 50 mm aperture (denoted as "50 mm") or a clear plate filter (denoted as "clear") may be used. Initial dose is typically in seconds, with the irradiation pattern (e.g., top and bottom, bottom only) being also designated. The postcure time represents the amount of time the mold assembly is treated with activating light and heat in the postcure unit The anneal time represents the amount of time the demolded lens is treated with heat after the lens is removed from the mold assembly. While this second database is depicted as a separate database, the database may be incorporated into the mold and gasket database by adding the lens curing information to each of the appropriate records.

The controller may also be used to control the operation of the various components of the plastic lens curing apparatus. A series of input devices 640 may allow the operation of the various components of the system. The input devices may be configured to cause the commencement of the lens coating process (640*a*), the cure process (640*b*), the postcure process (640*c*), and the anneal process (640*d*).

In an embodiment, activating any of the input devices 640 may cause a screen to appear requesting a job number corresponding to the type of lenses being formed. The last job used may appear as a default entry. The user may change the displayed job number by cycling through the saved jobs. When the proper job is displayed the user may enter the job by depressing the selection knob.

TABLE 10

| | LENS INFORMATION | | | CURING INFORMATION | | |
|---|---|---|---|---|---|---|
| Sphere | Lens Type | Tinted | Filter | Initial Dose | Post-cure Time | Anneal Time |
| +2.25 | Clear | No | 50 mm | 90 Sec. Top and Bottom | 13 Min. | 7 Min. |
| +2.25 | Clear | Yes | 50 mm | 90 Sec. Top and Bottom | 15 Min. | 7 Min. |
| +2.25 | Photochromic | No | 50 mm | 90 Sec. Top and Bottom | 13 Min. | 7 Min. |
| +2.00 | Clear | No | Clear | 7 Sec. Bottom | 13 Min. | 7 Min. |
| +2.00 | Clear | Yes | Clear | 7 Sec. Bottom | 15 Min. | 7 Min. |
| +2.00 | Photochromic | No | Clear | 15 Sec. Bottom | 13 Min. | 7 Min. |

After the job has been entered, the system will be ready to commence the selected function. Activating the same input device again (e.g., depressing the button) will cause the system to commence the selected function. For example, pressing the cure button a second time may cause a preprogrammed cure cycle to begin. After the selected function is complete the display screen may display a prompt informing the user that the action is finished.

The main menu may also include selections allowing a saved job to be edited. Returning to the main menu screen, depicted in FIG. 40, selecting the edit menu item will cause an interactive screen to be displayed similar to the input screen. This will allow a user to change the prescription of a preexisting job. The view menu item will allow a user to view the prescription information and mold/gasket selection information from an existing job.

Once the desired mold and gasket information has been obtained, the proper molds and gasket are selected from a collection of molds and gaskets. The molds may be placed into the gasket to create a mold assembly. Prior to placing the molds in the gasket, the molds are preferably cleaned. In one embodiment, the molds may be sprayed with a mixture of isopropyl alcohol and water and wiped dry. Alternatively, they may be spin-cleaned by mounting them on the spin coating unit (e.g., the spin coating units depicted in FIG. 2). The mold may be spun while directing streams of solvents such as isopropyl alcohol, acetone, water, or mixtures thereof onto the mold. After application of the cleaning solvent the molds may be dried by continued spinning in the absence of a cleaning solvent. The molds may also be dried with a lint free cleaning cloth.

The clean molds are placed on the gasket to form a mold assembly. The front mold is preferably placed on the gasket first. For single vision prescriptions, the front mold does not have to be placed in any particular alignment. For flat-top bifocal or progressive front molds, the molds are preferably aligned with alignment marks positioned on the gasket. Once the front mold has been placed into the gasket, the back mold is placed onto the gasket. If the prescription calls for cylinder power, the back mold must be aligned with respect to the front mold. If the prescription is spherical (e.g., the lens has no cylinder power), the back mold may be placed into the gasket without any special alignment. Once assembled the mold assembly will be ready for filling.

The lens forming composition is typically stored at temperatures below about 100° F. At these temperatures, however, the lens forming composition may be relatively viscous. The viscosity of the solution may make it difficult to fill a mold cavity without creating bubbles within the lens forming composition. The presence of bubbles in the lens forming composition may cause defects in the cured eyeglass lens. To reduce the viscosity of the solution, and therefore reduce the incidence of air bubbles during filling of the mold cavity, the lens forming composition may be heated prior to filling the mold cavity. In an embodiment, the lens forming composition may be heated to a temperature of about 70° F. to about 220° F., preferably from about 130° F. to about 170° F. prior to filing the mold cavity. Preferably, the lens forming composition is heated to a temperature of about 150° F. prior to filling the mold cavity.

Figure 43:
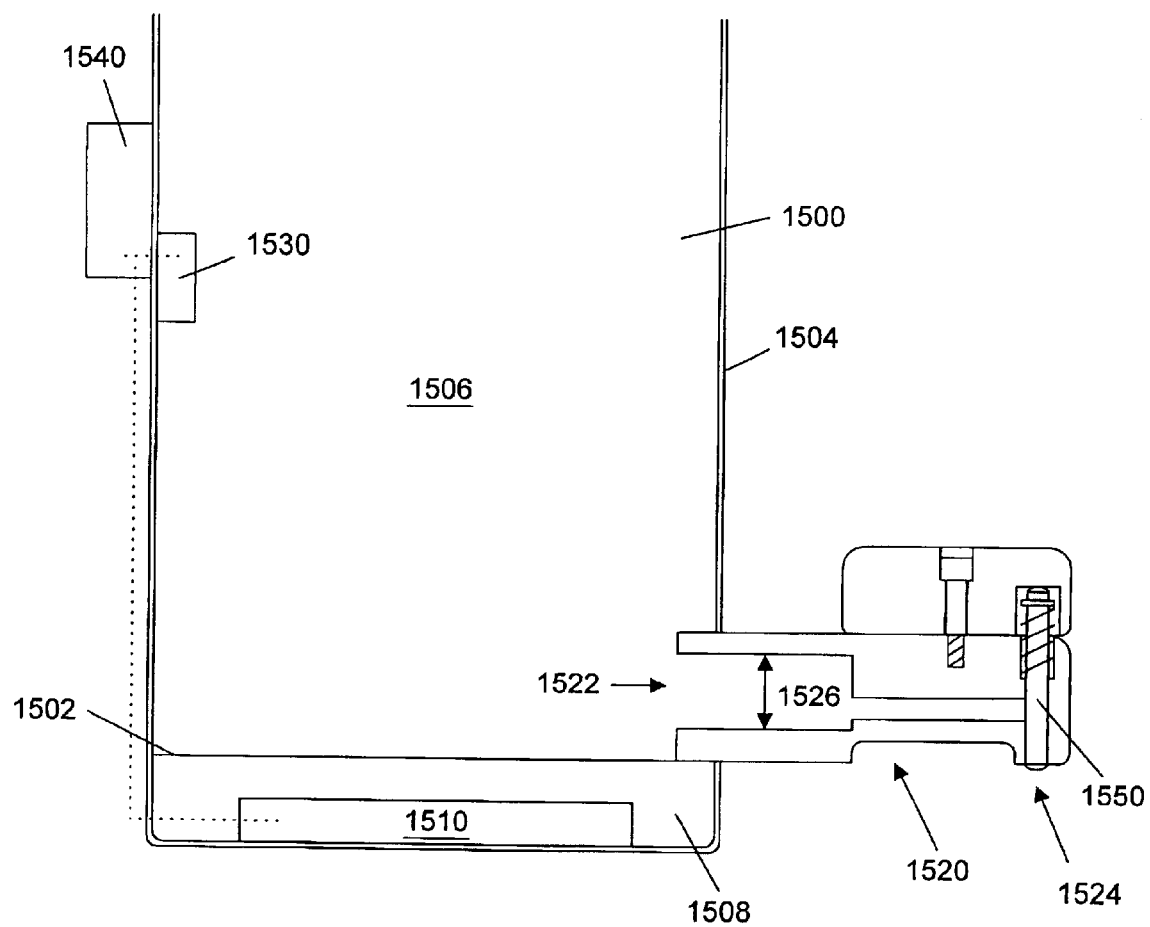
FIG. 43 depicts a cross-sectional side view of a heated polymerizable lens forming composition dispensing system.

The lens forming composition may be heated by using an electric heater, an infrared heating system, a hot air system, a hot water system, or a microwave heating system. Preferably, the lens forming composition is heated in a fill system, such as depicted in FIG. 43. The fill system includes a body 1500 configured to hold the lens forming composition, a heating system 1510 coupled to the body, and a conduit 1520 for transferring the heated lens forming composition from the body to a mold assembly.

The body 1500 is preferably formed from stainless steel. The body preferably includes a bottom 1502 and sidewalls 1504 extending upward from the bottom. The top of the body 1500 is preferably open to allow the lens forming composition to be introduced into the body. The body may include a lid (depicted in FIG. 50) to cover the top of the body after the lens forming composition has been added.

A heating system 1510 is preferably coupled to the body. The heating system 1510 is preferably configured to heat the lens forming composition to a temperature of between about 80° F. to about 220° F. Preferably a resistive heater is used to heat the lens forming composition. Other heating systems such as hot air system, hot water systems, and infrared heating systems may also be used.

The heating system is preferably disposed within the body, as depicted in FIG. 43. In an embodiment, the body may be divided into a main chamber 1506 and a heating system chamber 1508. The lens forming composition is preferably disposed within the main chamber 1506, while the heating system 1510 is preferably disposed within the heating system chamber 1508. The heating system chamber 1508 preferably isolates the heating system 1510 from the main chamber 1506 such that the lens forming composition is inhibited from contacting the heating system. Typically, the heating system 1510 may attain temperatures significantly higher than desired. If the heating system 1510 were to come into contact with the lens forming composition, the higher temperature of the heating system may cause the contacted lens forming composition to become partially polymerized. By isolating the heating system 1510 from the lens forming composition such partial polymerization may be avoided. To further prevent partial polymerization, the heating system is preferably insulated from the bottom surface of the main chamber. An insulating material may be placed between the heating system and the bottom of the main chamber. Alternatively, an air gap may be formed between the heating system and the bottom of the main chamber to prevent overheating of the bottom of the main chamber.

A thermostat 1530 may be placed within the chamber, preferably in contact with the lens forming composition. The thermostat 1530 preferably monitors the temperature of the lens forming composition. A controller 1540 may be coupled to the thermostat 1530 and the heating system 1510. The controller 1540 preferably monitors the temperature of the lens forming composition and controls the heating system 1510 to keep the lens forming composition at a predetermined temperature. For example, as the lens forming composition becomes cooler the controller may activate the heating system 1510 to heat the lens forming composition back to the desired temperature. The controller 1540 may be a computer, programmable logic controller, or any of other known controller systems known in the art. These systems may include a proportional-integral ("PI") controller or a proportional-integral-derivative ("PID") controller.

A conduit 1520 is preferably coupled to the body 1500 for transferring the lens forming composition out of the body. The conduit 1520 preferably includes an inlet 1522 and an outlet 1524. The lens forming composition preferably enters the conduit 1520 from the body via the inlet 1522, passes through the conduit, and exits the conduit via the outlet 1524. The conduit 1520 may be substantially flexible. A flexible conduit may allow the outlet of the conduit to be aligned with a fill port of a mold assembly.

The inner width 1526 of the conduit is herein defined as the width of the internal space defined by the conduit sidewalls. In an embodiment, the inner width 1526 is variable over the length of the conduit. Preferably, the inner width 1526 is substantially wider near the body 1510 and narrows near the outlet 1524. The narrowing of the inner width 1526 allows the lens forming solution disposed within the conduit 1520 to remain warm before dispensing. The portion of the conduit proximate the body 1510 is preferably wider than the portion of the conduit proximate the outlet 1524. This wider portion of the conduit allows better heat exchange with the lens forming composition in the body. The narrower portion of the conduit allows better control of the flow rate of the lens forming composition as it passes through the conduit.

An elongated member 1550 is preferably positioned near the outlet of the conduit. The elongated member 1550 is preferably movable within the conduit. The elongated member 1550 preferably inhibits the flow of lens forming composition through the conduit when the elongated member is in a closed position. The elongated member may be moved into an open position such that the lens forming composition may flow through the conduit. The elongated member 1550 is preferably composed of stainless steel covered with a chemically inert plastic (e.g., a polyacetal plastic such as DELRIN). The use of a plastic coating allows a more leak resistant fit between the elongated member and the conduit.

Figure 44:
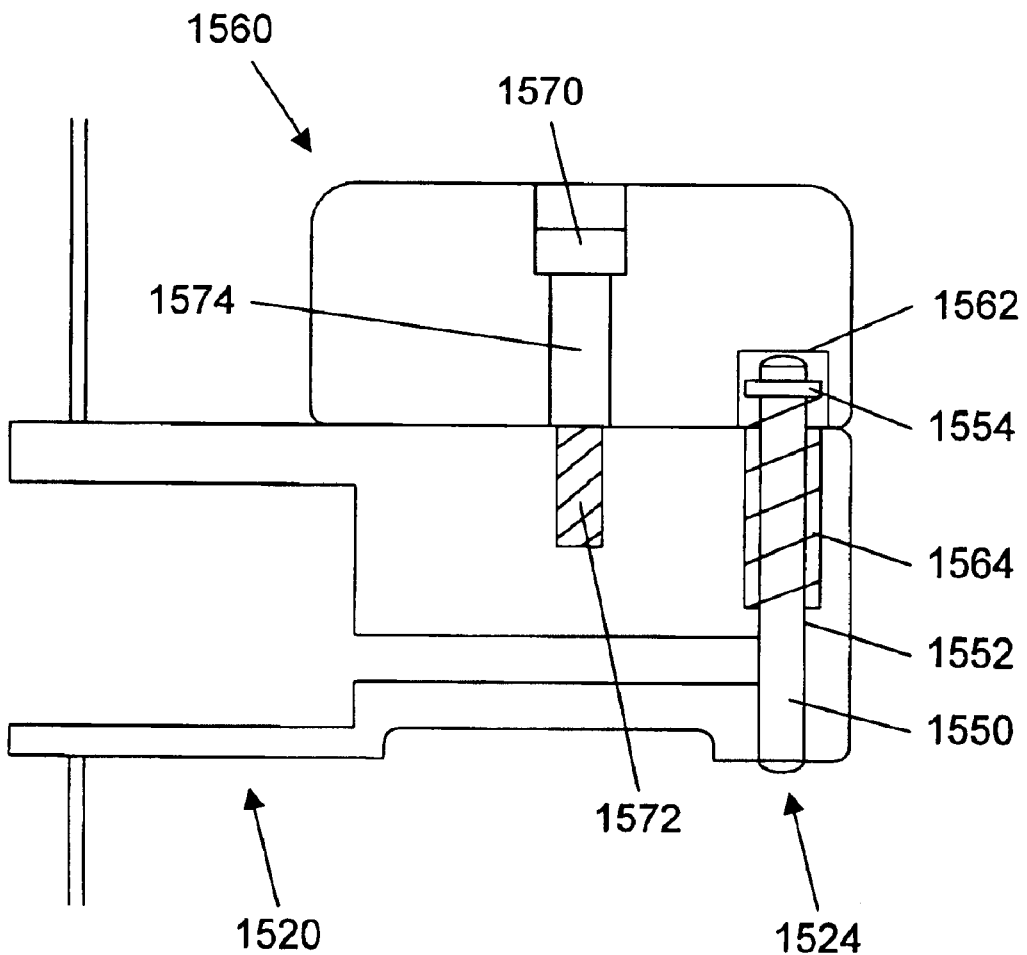
FIGS. 44–46 depict cross-sectional side views of a conduit for a heated polymerizable lens forming composition dispensing system.

As depicted in FIG. 44, the elongated member 1550 is in a closed position. The elongated member 1550 is preferably oriented perpendicular to the longitudinal axis of the conduit, as depicted in FIG. 44. The elongated member 1550 preferably resides in a channel 1552 extending through the conduit. In a closed position, the elongated member 1550 may extend to the outer surface of the conduit near the outlet 1524. Preferably, the elongated member 1550 extends past the outer surface of the conduit 1520 proximate the outlet 1524, when in the closed position. Configuring the elongated member 1550 such that it extends past the outer surface of the conduit may inhibit any residual lens forming composition from building up near the outlet. As the elongated member 1550 is extended toward the outlet any lens forming composition present in the channel 1552 is preferably forced out, leaving the channel substantially clear of lens forming composition. The outlet may be subsequently cleaned by removing the excess lens forming composition from the outer surface of the conduit and the elongated member.

Figure 45:
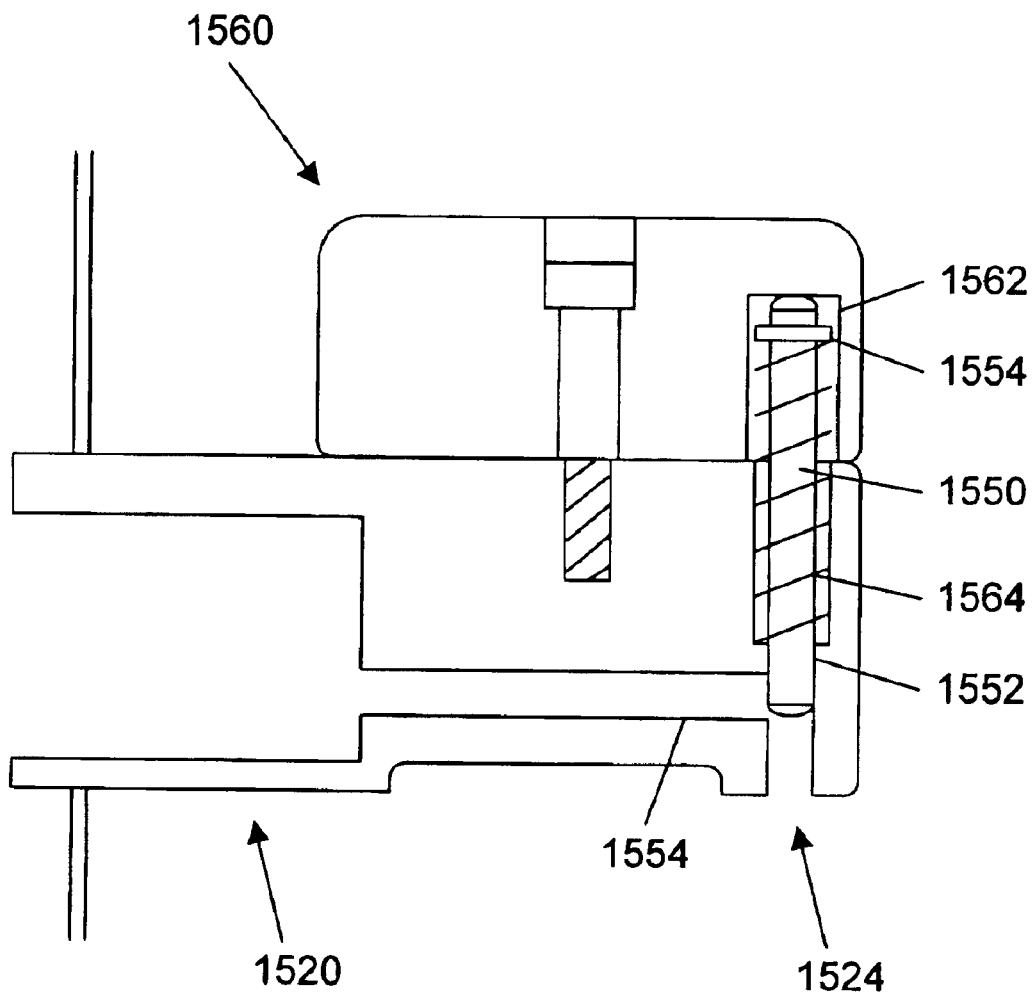
Figure 46:
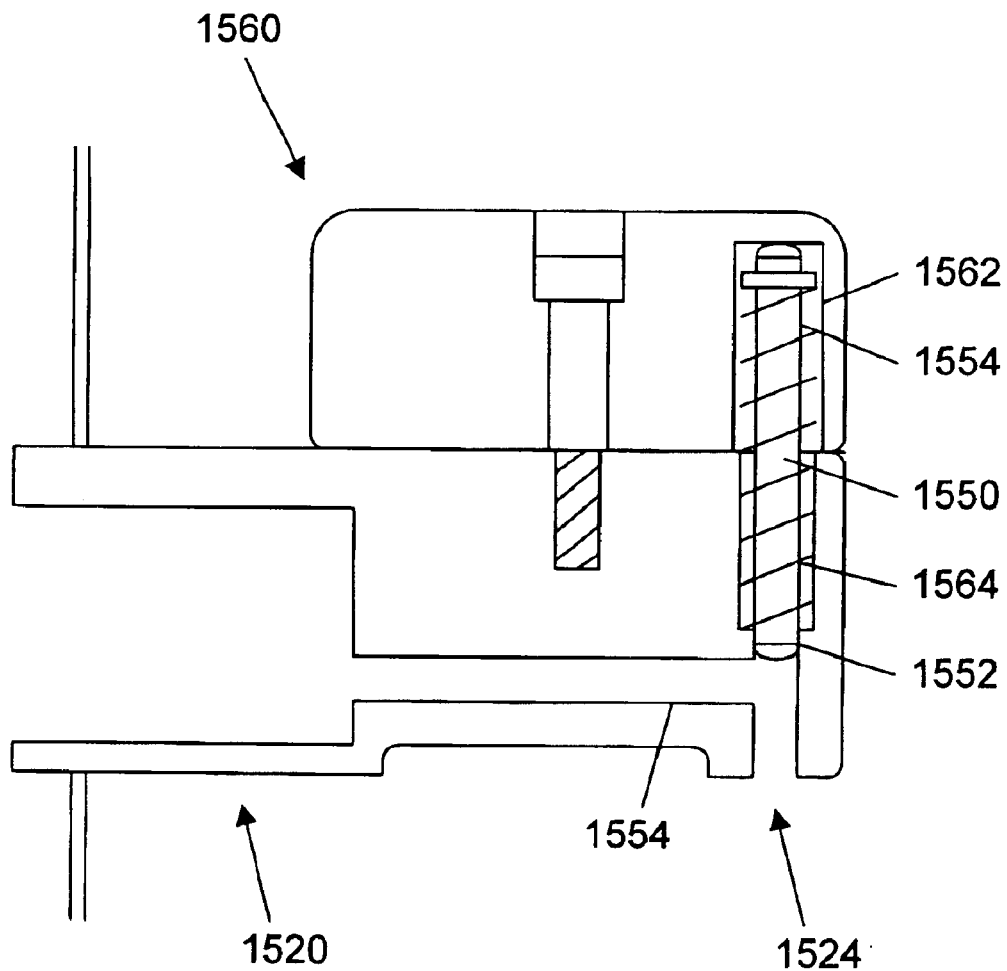

When in the open position, as depicted in FIG. 45 and FIG. 46, the elongated member 1550 is positioned away from the outlet. The end of the elongated member has been moved past a portion of the inner surface 1554 of the conduit such that the lens forming solution may flow through the conduit into the channel 1552. The elongated member may be positioned to control the flow of the lens forming composition through the conduit. For example, as depicted in FIG. 45, the elongated member, although in an open position, still partially blocks the conduit, thus partially inhibiting flow of the lens forming composition through the conduit. As the elongated member is moved further away from the outlet, the flow may of the lens forming composition may increase. The flow rate of the lens forming composition may reach a maximum when the elongated member no longer blocks the conduit, as depicted in FIG. 46.

The interaction of the elongated member 1550 with the movable member 1560 allows the elongated member to be positioned in either a closed or open position. The movable member 1560 preferably includes a groove 1562 formed within the movable member. The groove 1562 preferably extends from a bottom surface of the movable member 1560 toward an upper surface of the movable member. The groove 1562 preferable partially extends through the movable member 1560, stopping before the upper surface of the movable member is reached. The distance from the bottom surface of the movable member 1560 to the top of the groove is herein referred to as the height of the groove. The height of the groove 1562 is preferably varied along the length of the groove. Preferably the height of the groove has a minimum value and a maximum value. The inner surface of the groove is preferably tapered such that the height of the groove gradually increases from a minimum value to a maximum value. The tapered inner surface may be a linear taper or non-linear taper (i.e., curved).

Figure 47:
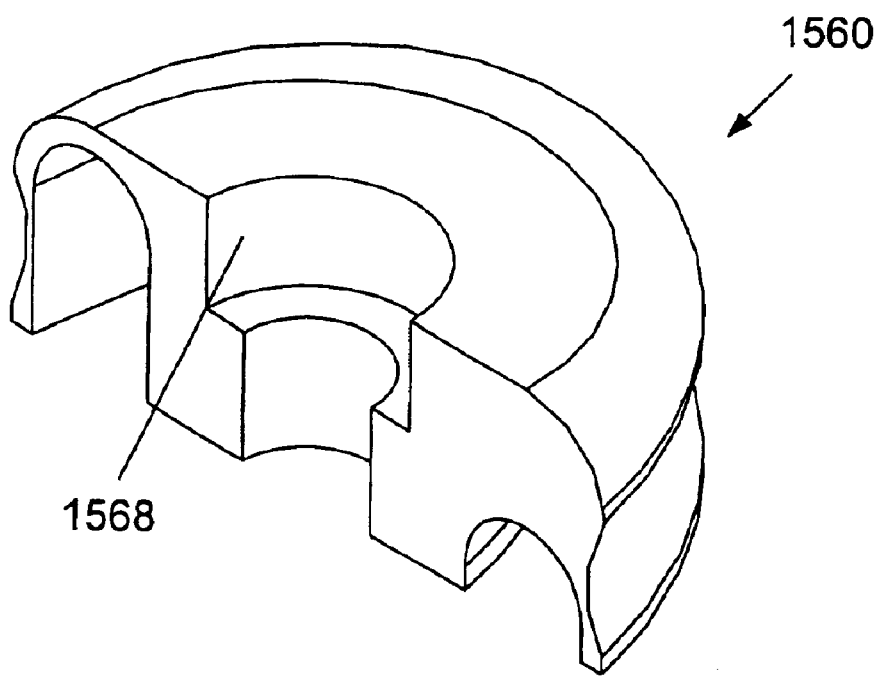
FIG. 47 depicts a cross-sectional perspective view of a movable member for a heated polymerizable lens forming composition dispensing system.
Figure 48:
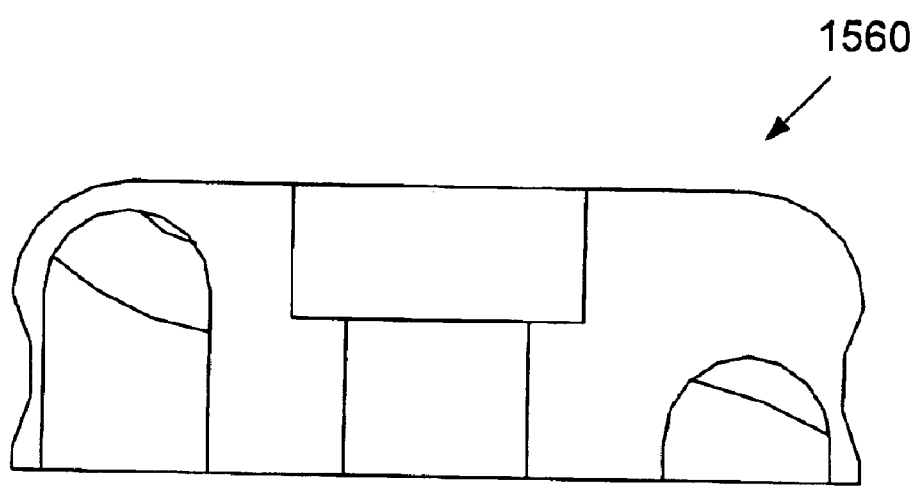
FIG. 48 depicts a cross-sectional side view of a movable member for a heated polymerizable lens forming composition dispensing system.

A movable member 1560 is preferably coupled to the elongated member 1550 to control the positioning of the elongated member within the conduit. The elongated member 1550 preferably extends into the groove 1562 of the movable member 1560, as depicted in FIGS. 44–46. An elastic member 1564 may be coupled to the elongated member 1550 to exert a force against the elongated member. The force from the elastic member 1564 preferably forces the elongated member 1550 into the groove 1562. The elastic member 1564 is preferable positioned within the channel 1552 formed in the conduit. The elastic member is preferably a spring. The elongated member 1550 preferably includes an annular member 1554 positioned proximate a first end of the elongated member, the first end of the elongated member being positioned distal to the outlet 1524. The annular member 1554 is preferably coupled to the elastic member 1564. The elastic member 1564 preferably exerts a force against the annular member 1554. The force against the annular member 1554 preferably causes the annular member, and thus the elongated member 1550, to move out of the channel 1552 away from the conduit outlet 1524 and into the groove 1562 of the movable member. The movable member 1560 prevents the elongated member 1550 from being forced from the conduit In one embodiment, the movable member 1560 is a substantially circular knob, as depicted in FIGS. 47 and 48. FIG. 47 represents a cut-away perspective view of the knob 1560. The knob 1560 is configured to rotate such that rotation of the knob causes the elongated member 1550 to move from a closed position to an open position, or from an open position to a closed position. The knob 1560 includes a circular groove 1562 formed within the knob. The groove 1562 is preferably tapered such that the height of the groove varies along the groove. The groove 1562 may only extend through a portion of the knob 1560. For example, the groove 1562 may be a semi-circular groove, ending at the midpoint of the movable member 1560. The ends of the groove 1562 may be used to prevent overturning of the knob.

The center of the knob 1560 may include an indentation 1568 configured to hold a mounting pin which couples the knob to the conduit Referring back to FIG. 44, the movable member is preferably coupled to the conduit via a pin 1570. The pin includes a lower portion 1572 and an upper portion 1554. The lower portion 1552 may be threaded to couple the pin to the conduit. The upper portion 1554 is substantially non-threaded. The upper section 1554 preferably serves as a center point around which the knob 1560 is rotatable. In one embodiment, the pin 1554 may be a spring washer. A spring washer allows the knob to be easily rotated, while supplying a small amount of tension to the knob.

Referring back to FIGS. 44–46, the movement of the elongated member 1550 from a closed position to an open position is sequentially depicted. FIG. 44 depicts the system in a closed position. The elongated member 1550 is positioned such that it entirely blocks the conduit. To move the elongated member 1550 to an open position, the knob 1560 may be turned. The elongated member 1550, will preferably stay within the groove 1562 as the knob is turned. As the height of the groove 1562 increases the elongated member 1550 will move further away from the outlet 1524. The elastic member 1564 will continue to force the elongated member 1550 against the groove 1562 as the knob 1560 is turned. When the elongated member 1550 reaches an intermediate position, as depicted in FIG. 45, the lens forming composition begins to flow through the conduit 1520 and out of the outlet 1524. If the knob 1560 is turned further, the elongated member 1550 will move further away from the outlet 1524. As depicted in FIG. 46, the elongated member 1550 may be moved completely out of the flow path for the lens forming composition.

Figure 49:
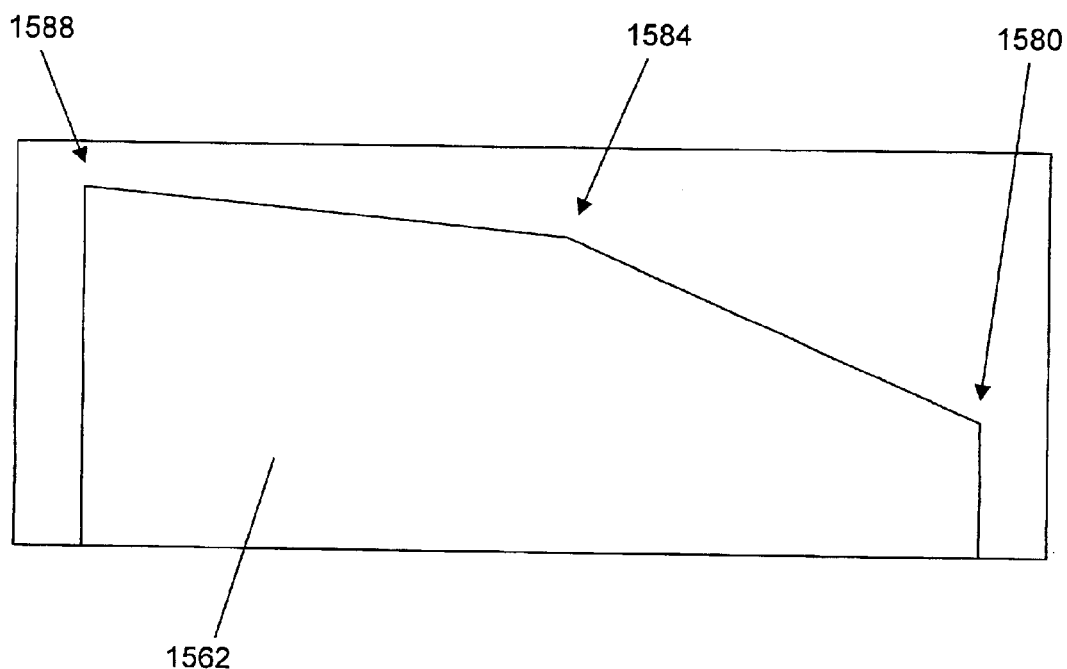
FIG. 49 depicts a topographical view of a groove formed in a movable member for a heated polymerizable lens forming composition dispensing system.

In order to achieve proper control of the flow rate throughout the outlet, the height of the groove may be varied. As depicted in FIG. 49, the groove may be tapered at more than one angle. FIG. 49 depicts a straightened out cross sectional view of a groove. It should be understood that while depicted in a linear manner, the groove is actually semi-circular in shape. At a first position 1580 the elongated member 1550 is forced into a closed position since the height of the groove is at a minimum. Turning the knob will bring the knob to an intermediate position 1584. At this intermediate position 1584, the lens forming composition may begin to flow through the conduit. Further turning of the knob will bring the knob to a second position 1588 in which the elongated member is in a fully open position.

The groove may be divided into two portions. The first portion extends from the first position 1580 to the intermediate position 1584. The second portion extends from the intermediate position 1584 to the second position 1588. It is preferred that the first portion of the groove have a substantially greater slope than the second portion of the groove. The steeply tapered first portion allows the elongated member to be rapidly moved to an open position. After the intermediate position 1584 has been reached, the groove is tapered to a lesser extent. Thus, the position of the elongated member within he conduit may be finely adjusted to achieve the desired flow rate.

Figure 50:
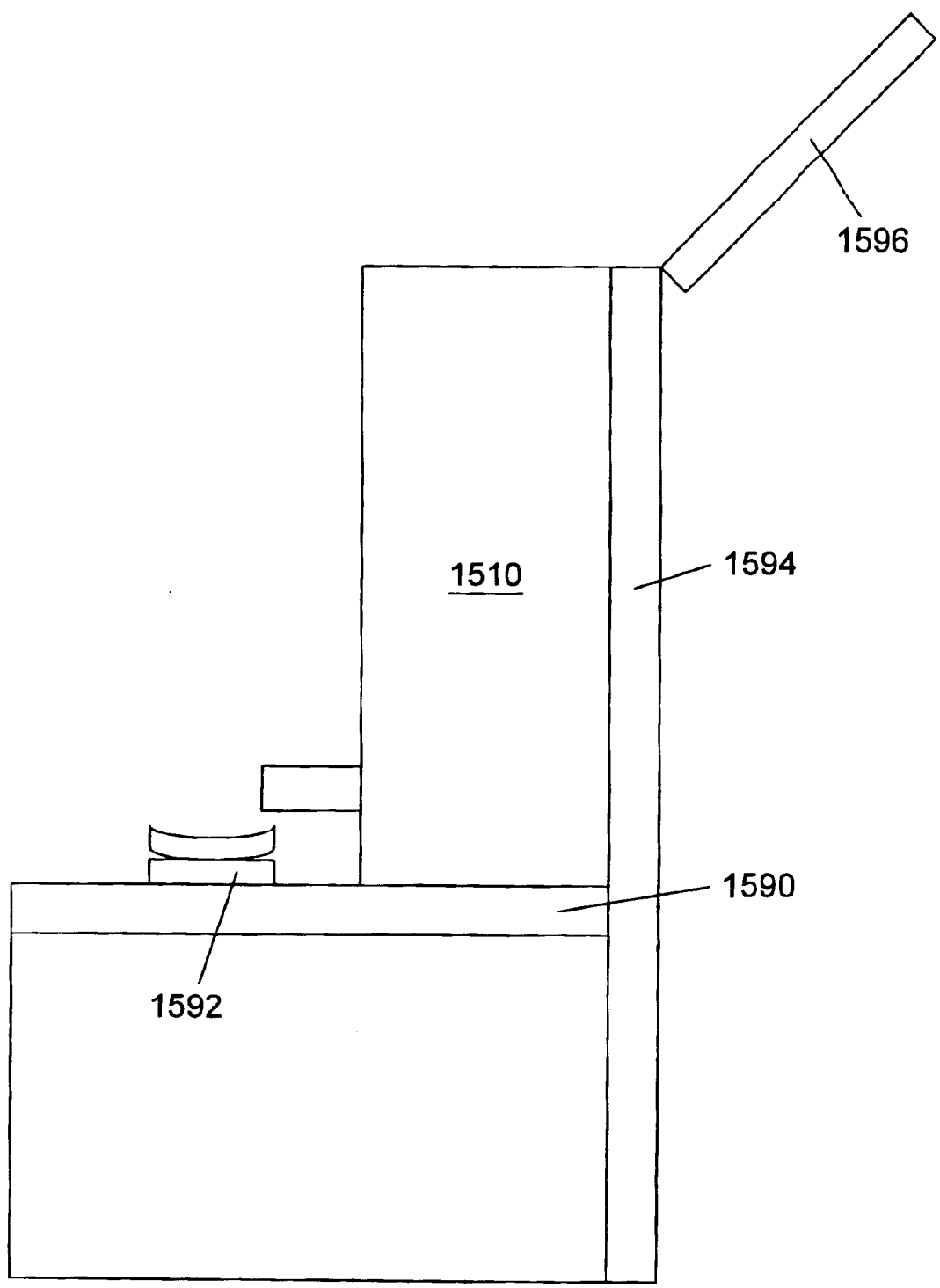
FIG. 50 depicts a side view of a heated polymerizable lens forming composition dispensing system mounted on a platform.

The body of the fill system may be incorporated onto a platform 1590. The platform may include a holder 1592 for the mold assembly, as depicted in FIG. 50. The body 1510 of the fill system may be positioned on the platform 1590. A vertical support 1594 may also be attached to the platform. The body of the fill system may be removable from the platform to allow filling and cleaning of the body. The platform 1590 may also include a lid 1596 for covering the top of the body. A mold assembly 1592 holder is preferably formed on the platform. The mold assembly holder 1592 is configured to hold the mold assembly at a preferred location with respect to the conduit. The mold assembly holder may secure the mold assembly during filling. In one embodiment, the platform may be configured to be mounted on a table or work bench. Preferably the platform is configured to fit on a portion of a plastic lens curing apparatus (e.g., the apparatus of FIG. 1). Preferably, the fill system is mounted onto a portion of the post cure unit 50 of the plastic lens curing apparatus 10.

To fill the mold assembly, the mold assembly is placed on the mold assembly holders and secured in place. The monomer solution is preferably introduced into the body of the fill station and heated to a temperature of about 150° F. It is preferred that the monomer solution is stored in the reservoir for a period of time that will allow air bubbles formed during the filling of the body to dissipate. Typically, the monomer is allowed to settle for about 1 hour to about 16 hours before use.

The mold assembly holder may include a clamping system to secure the mold assembly. After the mold assembly is in place, the conduit of the mold fill station is aligned with a fill port of the mold assembly. The lens forming composition is now flowed through the conduit and into the mold assembly. The movable member 1560, may be adjusted to control the flow rate of the monomer.

After the mold assembly is filled, any monomer which may have spilled on the surface of the molds is removed using a lint free wipe. Excess monomer that may be around the edge of the filling port may be removed by using a micro vacuum unit. The mold assembly may be inspected to insure that the mold cavity is filled with monomer. The mold assembly is also inspected to insure that no air bubbles are present in the mold cavity. Any air bubbles in the mold cavity may be removed by rotating the mold assembly such that the air bubbles rise to the top of the assembly.

After the mold assembly has been filled with the monomer and inspected, the mold assembly is transferred to a lens curing unit. A lens curing unit such as lens curing unit 30 (see FIG. 1) described above may be used. The curing conditions for the lens forming composition may depend on the type of lens being formed and the type of lens forming composition being used. The use of a lens forming composition which includes an aromatic containing polyether polyethylenic functional monomer, a co-initiator composition and a photoinitiator (e.g., the OMB-99 and Phases II compositions) may allow a variety of lenses to be formed using similar lens curing conditions. Table 11 summarizes the lens curing conditions required to cure most types of lenses.

In one embodiment, the curing of the lens forming composition may be accomplished by a procedure involving the application of heat and activating light to the lens forming composition. Initially, activating light is directed toward at least one of the mold members. The activating light is directed for a sufficient time to initiate curing of the lens forming composition. Preferably, the activating light is directed toward at least one of the mold members for a time of less than about 2 minutes. In some embodiments, the activating light is directed toward at least one of the mold members for a time of less than about 25 seconds. In other embodiments, the activating light is directed toward at least one of the mold members for a time of less than about 10 seconds. The activating light is preferably stopped before the lens forming composition is completely cured.

After the curing is initiated, the mold assembly may be transferred to a post cure unit. In the post cure unit the mold assembly is preferably treated with additional activating light and heat to further cure the lens forming composition. The activating light may be applied from the top, bottom, or from both the top and bottom of the curing chamber during the post cure process. The lens forming composition may exhibit a yellow color after the curing is initiated. It is believed that the yellow color is produced by the photoinitiator. As the lens forming composition cures, the yellow color may gradually disappear as the photoinitiator is used up. Preferably, the mold assembly is treated in the post cure unit for a time sufficient to substantially remove the yellow color from the formed eyeglass lens. The mold assembly may be treated in the post cure unit for a time of up to about 15 minutes, preferably for a time of between about 10 minutes to 15 minutes. After the lens is treated in the post cure unit, the formed eyeglass lens may be demolded and placed back into the post cure unit.

TABLE 11

| LENS INFORMATION | | | | CURING INFORMATION | | |
|---|---|---|---|---|---|---|
| Sphere | Lens Type | Tinted | Filter | Initial Dose | Post-cure Time | Anneal Time |
| +4.00 to +2.25 | Clear | No | 50 mm | 90 Sec. Back and Front | 13 Min. | 7 Min. |
| +4.00 to +2.25 | Clear | Yes | 50 mm | 90 Sec. Back and Front | 15 Min. | 7 Min. |
| +4.00 to +2.25 | Photo | | 50 mm | 90 Sec. Back and Front | 13 Min. | 7 Min. |
| +2.00 to −4.00 | Clear | No | Clear Plate | 7 Sec. Front | 13 Min. | 7 Min. |
| +2.00 to −4.00 | Clear | Yes | Clear Plate | 7 Sec. Front | 15 Min. | 7 Min. |
| +2.00 to plano | Photo | | Clear Plate | 15 Sec. Front | 13 Min. | 7 Min. |
| −0.25 to −4.00 | Photo | | Clear Plate | 20 Sec. Back, w/7 Sec. Front starting @ 13 Sec. elapsed time. | 13 Min. | 7 Min. |

In some instances, it may be desirable to subject the lens to an anneal process. When a lens, cured by the activating light, is removed from a mold assembly, the lens may be under a stressed condition. It is believed that the power of the lens can be more rapidly brought to a final resting power by subjecting the lens to an anneal treatment to relieve the internal stresses developed during the cure. Prior to annealing, the lens may have a power that differs from the desired final resting power. The anneal treatment is believed to reduce stress in the lens, thus altering the power of the lens to the desired final resting power. Preferably, the anneal treatment involves heating the lens at a temperature between about 200° F. to 225° F. for a period of up to about 10 minutes. The heating may be performed in the presence or absence of activating light.

The use of a lens forming composition which includes an aromatic containing polyether polyethylenic functional monomer, a co-initiator composition and a photoinitiator (e.g., the OMB-99 and Phases II compositions) allows much simpler curing conditions than other lens forming compositions. While pulsed activated light curing sequences may be used to cure the lenses, continuous activating light sequences may also be used, as described in Table 11. The use of continuous activating light sequences allows the lens curing equipment to be simplified. For example, if continuous activating light is used, rather than pulsed light, equipment for generating light pulses is no longer required. Thus, the cost of the lens curing apparatus may be reduced. Also the use of such a lens forming composition allows more general curing processes to be used. As shown in Table 11, seven different processes may be used to cure a wide variety of lenses. This greatly simplifies the programming and operation of the lens curing unit.

Furthermore, the use a lens forming composition which includes an aromatic containing polyether polyethylenic functional monomer, a co-initiator composition and a photoinitiator (e.g., the OMB-99 and Phases II compositions) may alleviate the need for cooling of the lens forming composition during curing. This may further simplify the procedure since cooling fans, or other cooling systems, may no longer be required. Thus, the lens curing apparatus may be further simplified by removing the mold apparatus cooling systems.

Table 11 shows the preferable curing conditions for a variety of lenses. The sphere column refers to the sphere power of the lens. The monomer type is either clear (i.e., non-photochromic) or photochromic. Note that the lens type (e.g., spheric single vision, aspheric single vision lens, flat-top bifocal lens or progressive multifocal lens) does not significantly alter the lens curing conditions. Tinted refers to whether the formed eyeglass lens will be soaked in a dye bath or not.

Based on the prescription information the lens curing conditions may be determined. There are four curing variables to be set The type of light filter refers to the filter placed between the lamps and the mold assembly in the curing unit and the post cure unit The initial does refers to the time that activating light is applied to the lens forming composition in the curing unit The irradiation pattern (e.g., irradiation of the front mold only, the back mold only, or both molds) is also dependent on the lens being formed. After the initial dose is applied the mold assembly is transferred to the post cure unit where it is treated with activating light and heat. The chart lists the preferred time spent in the post cure chamber. After treatment in the post cure chamber the formed eyeglass lens is removed from the mold assembly. The lens may undergo an annealing process, for the time listed, in which the lens is heated either in the presence or absence of activating light. It should be noted that all of the lens curing processes recited are preferably performed without any cooling of the mold apparatus.

To further illustrate this procedure, the method will be described in detail for the production of a clear, non-tinted lens having sphere power of +3.00. A mold assembly is filled with a non-photochromic monomer solution (e.g., the OMB-99 composition). The mold assembly is placed in a lens curing unit to apply the initial dose to the lens forming composition. The curing of the lens forming composition is preferably controlled by controller 50. As shown in FIG. 40, the controller 50 includes a number of input devices which allow an operator to initiate use of the various components of the plastic lens curing apparatus 10. In an embodiment, buttons 640 may be used to control operation of the coating process (640*a*), the curing process (640*b*), the postcure process (640*c*), and the anneal process (640*d*). After the mold assembly is placed in the lens curing unit, the curing process button 640*b* may be pressed to set the curing conditions. In one embodiment, an operator has preloaded the prescription information and saved the information as described above. Pressing the cure button may cause the controller to prompt the user to enter a reference code corresponding to the saved prescription information. The controller is preferably configured to analyze the prescription information and set up the appropriate initial dose conditions.

After determining the appropriate lens forming conditions, the controller may inform the user of the type of filters to be used. The controller may pause to allow the proper filters to be installed within the lens curing unit. Typically, two types of filters may be used for the initial cure process. The filters are preferably configured to distribute the light so that the activating light which is imparted to the lens molds is properly distributed with respect to the prescription of the lens. A clear plate filter refers to a plate that is substantially transparent to activating light The clear plate may be composed of polycarbonate or glass. A 50 mm filter refers to filter which includes a 50 mm aperture positioned in a central portion of the filter. The 50 mm aperture is preferably aligned with the mold assembly when the filter is placed in the curing unit Preferably, two filters are used, the first being placed between the top lamps and the mold assembly, the second being placed between the bottom lamps and the mold assembly.

After the filters have been placed, the user may indicate to the controller that the filters are in place. Alternatively, the controller may include a sensor disposed within the lens curing unit which informs the controller when a filter is placed within the curing unit. After the filters are placed in the curing unit, the controller may prompt the user to ensure that the mold assembly is in the curing unit prior to commencing the curing process. When the filters and mold are in place, the initial dose may be started by the controller. For a clear, non-tinted lens having sphere power of +3.00 the initial dose will be 90 seconds of activating light applied to both the front and back molds. A 50 mm filter is preferably positioned between the top and bottom lamps.

After the initial cure process is completed, the mold assembly is transferred to the post cure unit The completion of the initial cure process may cause the controller to alert the operator that the process is completed. An alarm may go off to indicate that the process is completed. To initiate the post cure process, the post cure button 640*c* may be pressed. Pressing the post cure button may cause the controller to prompt the user to enter a reference code corresponding to the saved prescription information. The controller is preferably configured to analyze the prescription information and set up the appropriate post cure conditions. For a clear, non-tinted lens having sphere power of +3.00 the post cure conditions will include directing activating light toward the mold assembly in a heated post cure unit for 13 minutes. The post cure unit is preferably heated to a temperature of about 200° F. to about 225° F. during the post cure process.

After the post cure process is completed, the mold assembly is disassembled and the formed lens is removed from the mold members. The completion of the post cure process may cause the controller to alert the operator that the process is completed. An alarm may go off to indicate that the process is completed. After the molds are removed from the post cure unit, the gasket is removed and the molds placed in a demolding solution. A demolding solution is commercially available as "Q-Soak Solution" commercially available from Optical Dynamics Corporation. The demolding solution causes the lens to separate from the molds. The demolding solution also aids in the subsequent cleaning of the molds. After the lens has been demolded, the lens is preferably cleaned of dust particles using a solution of isopropyl alcohol and water.

In some instances it is desirable that the formed lens undergoes an anneal process. To initiate the anneal process the anneal button 640*d* may be pressed. Pressing the anneal button will set the conditions for the anneal process. For a clear, non-tinted lens having sphere power of +3.00 the anneal conditions will include heating the lens in the post cure unit, in the absence of activating light, for about 7 minutes. The post cure unit is preferably heated to a temperature of about 200° F. to about 225° F. during the anneal process.

In one embodiment, the drawer of the post cure unit includes a front row of mold assembly holders and a back row of lens holders. For the post cure process, the mold assemblies are preferably placed in the front row. The front row is preferably oriented under the post cure lamps when the post cure drawer is closed. For the anneal process the lenses are preferably placed in the back row of the post-cure drawer. The back row may be misaligned with the lamps such that little or no activating light reaches the back row.

After the anneal process, the lens may be coated in the coating unit with a scratch resistant hard coat. The lens may also be tinted by placing in a tinting bath. It is believed that tinting of the lens is influenced by the crosslink density of the lens. Typically, a lens having a relatively high crosslink density exhibits more homogenous absorption of the dye. Problems such as blotching and streaking of the dye are typically minimized by highly crosslinked lenses. The crosslink density of a lens is typically controlled by the temperature of curing of the lens. A lens which is cured at relatively high temperatures typically exhibits a crosslink density that is substantially greater than a low temperature cured lens. The curing time may also influence the hardness of a lens. Treating a lens for a long period of time in a post cure unit will typically produce a lens having a greater crosslink density than lenses treated for a shorter amount of time. Thus, to produce lenses which will be subsequently treated in a tinting bath, the lens forming composition is treated with heat and activating light in the post cure unit for a longer period of time than for the production of non-tinted lenses. As shown in table 11, non-tinted clear lenses are treated in the postcure unit for about 13 minutes. For clear lenses which will be subsequently tinted, the post cure time is extended to about 15 minutes, to produce a lens having a relatively high crosslink density.

Figure 53:
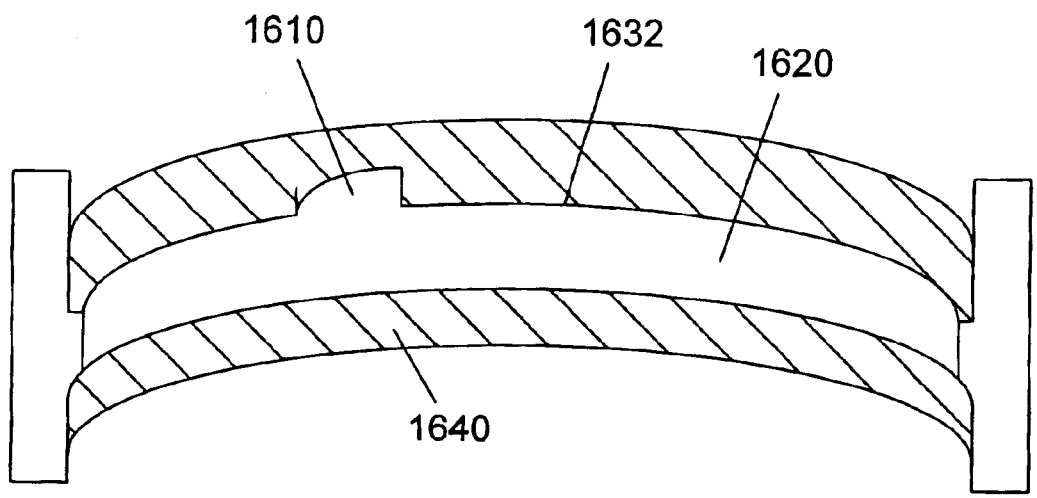
FIG. 53 depicts a mold assembly for making flat-top bifocal lenses.

The formation of flat-top bifocal lenses may also be accomplished using the above described procedure. One problem typical of curing flat-top bifocal eyeglass lenses with activating light is premature release. Flat-top bifocals include a far vision correction zone and a near vision correction region. The far vision correction zone is the portion of the lens which allows the user to see far away objects more clearly. The near vision correction zone is the region that allows the user to see nearby objects clearer. The near vision correction zone is characterized by a semicircular protrusion which extends out from the outer surface of an eyeglass lens. As seen in FIG. 53, the portion of the mold cavity which defines the near vision correction zone 1610 is substantially thicker than the portion of the mold cavity defining the far vision correction zone 1620. Directing activating light toward the mold members causes the polymerization of the lens forming composition to occur. It is believed that the polymerization of the lens forming composition begins at the casting face of the irradiated mold and progresses through the mold cavity toward the opposite mold. For example, irradiation of the front mold 1630 causes the polymerization to begin at the casting surface of the front mold 1632 and progress toward the back mold 1640. As the polymerization reaction progresses, the lens forming composition is transformed from a liquid state to a gel state. Thus, shortly after the front mold 1632 is irradiated with activating light, the portion of the lens forming composition proximate the casting face of the front mold member 1632 will become gelled while the portion of the lens forming composition proximate the back mold member 1640 will remain substantially liquid. If the polymerization is initiated from the back mold 1640, the lens forming composition throughout the far vision correction zone 1620 may become substantially gelled prior to gelation of the lens forming composition in the near vision correction zone proximate the casting surface of the front mold member 1610 (herein referred to as the "front portion of the near vision correction zone"). It is believed that when the gelation of the lens forming composition in the front portion of the near vision correction zone 1610 occurs after the far vision correction zone 1620 has substantially gelled, the resulting strain may cause premature release of the lens.

To reduce the incidence of premature release in flat-top bifocal lenses, it is preferred that polymerization of the lens forming composition in the front portion of the near vision correction zone 1610 is initiated before the portion of the lens forming composition in the far vision correction zone proximate the back mold member 1640 is substantially gelled. Preferably, this may be achieved by irradiating the front mold 1630 with activating light prior to irradiating the back mold 1640 with activating light This causes the polymerization reaction to begin proximate the front mold 1630 and progress toward the back mold 1640. It is believed that irradiation in this manner causes the lens forming composition in the front portion of the near vision correction zone 1610 to become gelled before the lens forming composition proximate the back mold 1640 becomes gelled. After the polymerization is initiated, activating light may be directed at either mold or both molds to complete the polymerization of the lens forming composition. The subsequent post cure and anneal steps for the production of flat-top bifocal lenses are substantially the same as described above.

Alternatively, the incidence of premature release may also be reduced if the front portion of the near vision correction zone 1610 is gelled before gelation of the lens forming composition extends from the back mold member 1640 to the front mold member 1630. In this embodiment, the polymerization of the lens forming composition may be initiated by irradiation of the back mold 1640. This will cause the gelation to begin proximate the back mold 1640 and progress toward the front mold 1630. To reduce the incidence of premature release, the front mold 1630 is irradiated with activating light before the gelation of the lens forming composition in the far vision correction zone 1620 reaches the front mold. After the polymerization is initiated in the front portion of the near vision correction zone 1610, activating light may be directed at either mold or both molds to complete the polymerization of the lens forming composition. The subsequent post cure and anneal steps for the production of flat-top bifocal lenses are substantially the same as described above.

Figure 51:
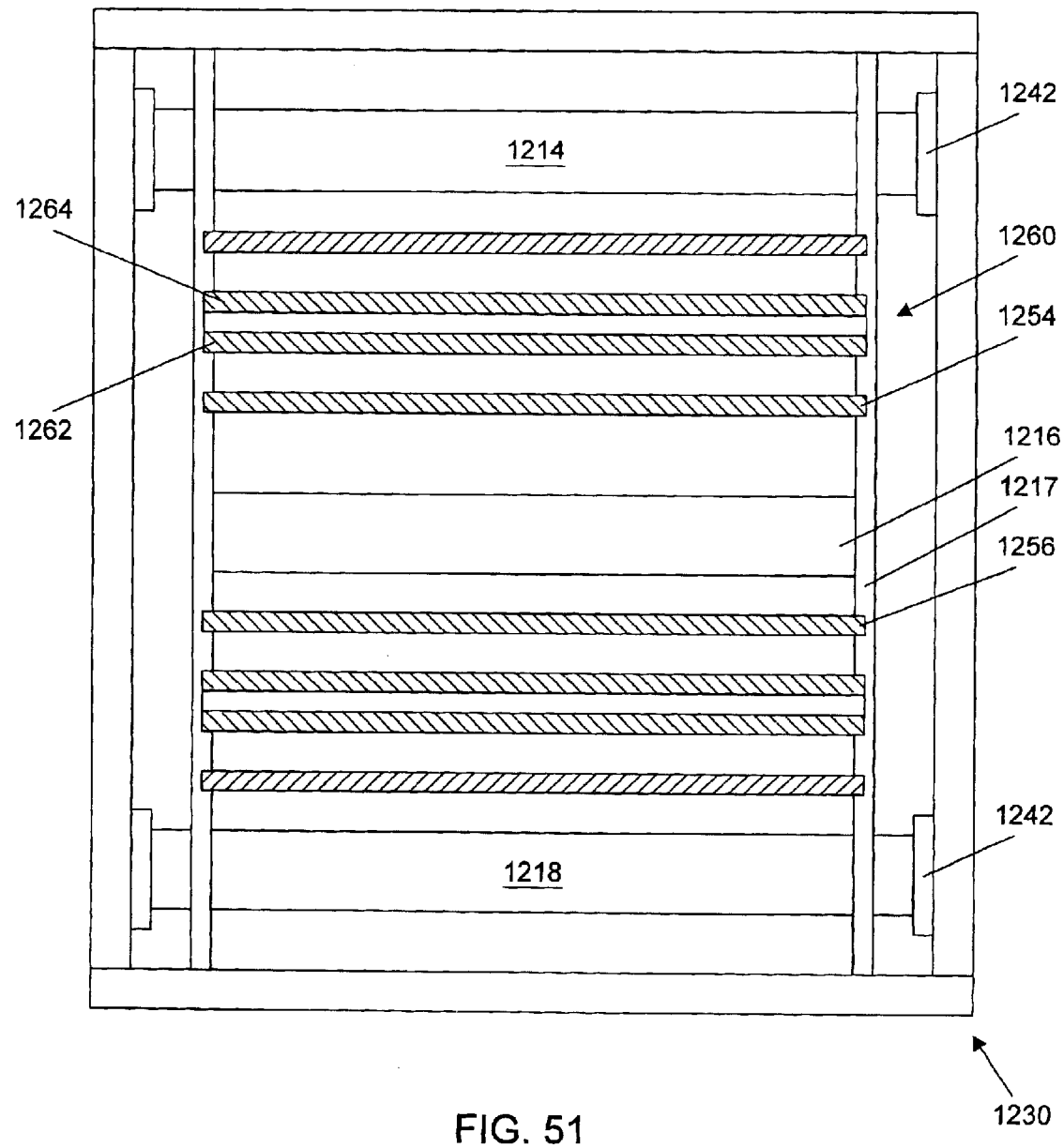
FIG. 51 depicts a front view of a lens curing unit.
Figure 52:
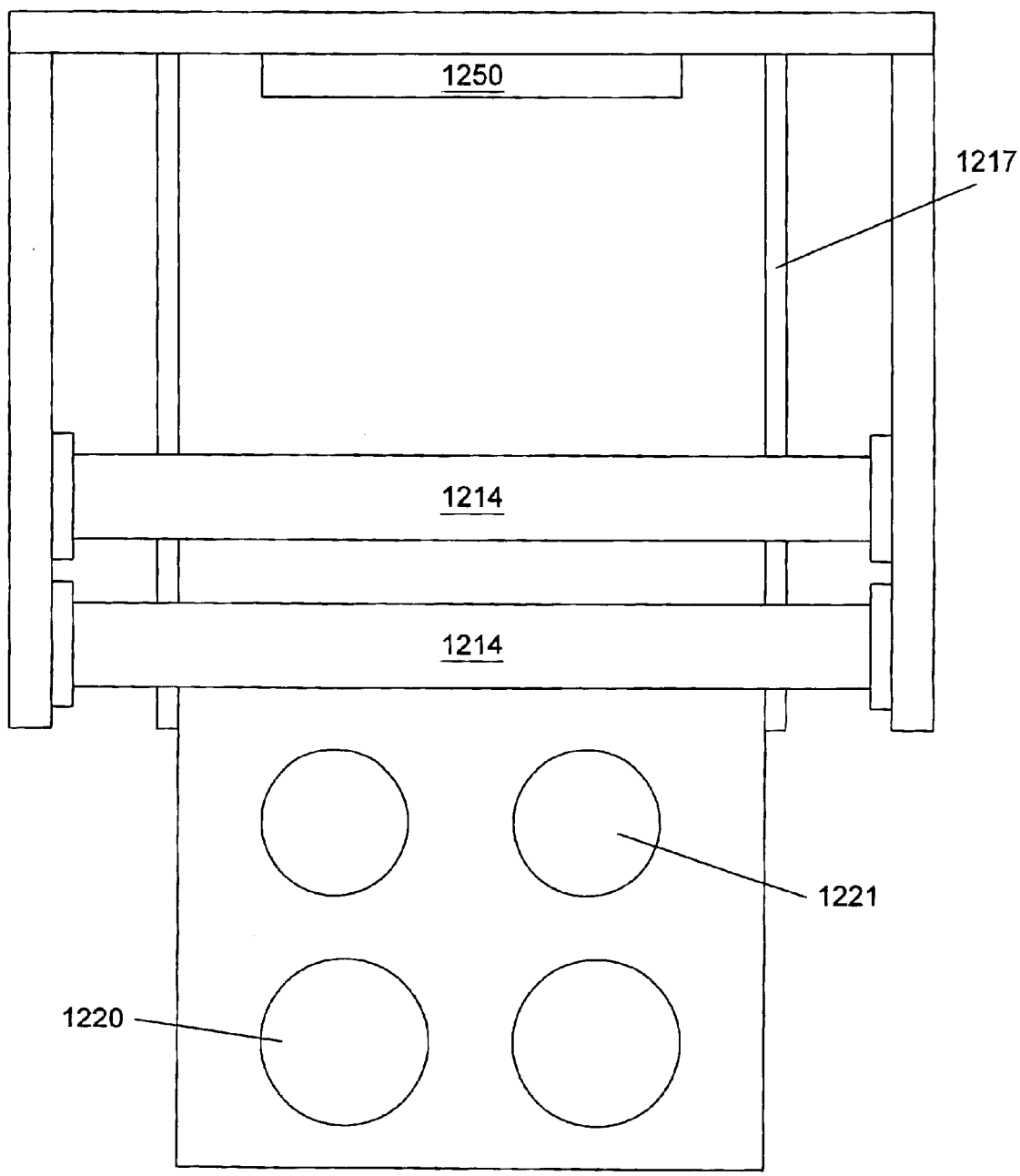
FIG. 52 depicts a top view of a lens curing unit.

In another embodiment, a single curing unit may be used to perform the initial curing process, the post cure process, and the anneal process. A lens curing unit is depicted in FIG. 51 and FIG. 52. The curing unit 1230 may include an upper light source 1214, a lens drawer assembly 1216, and a lower light source 1218. Lens drawer assembly 1216 preferably includes a mold assembly holder 1220 (see FIG. 52), more preferably at least two mold assembly holders 1220. Each of the mold assembly holders 1220 is preferably configured to hold a pair of mold members that together with a gasket form a mold assembly. Preferably, the lens drawer assembly may also include a lens holder 1221 (see FIG. 52), more preferably at least two lens holders 1221. The lens holders 1221 are preferably configured to hold a formed eyeglass lens. The lens drawer assembly 1216 is preferably slidingly mounted on a guide 1217. During use, mold assemblies and/or lenses may be placed in the mold assembly holders 1220 or lens holders 1221, respectively, while the lens drawer assembly is in the open position (i.e., when the door extends from the front of the lens curing unit). After the holders have been loaded, the door may be slid into a closed position, with the mold assemblies directly under the upper light source 1214 and above the lower light source 1218. The lens holders and lenses disposed upon the lens holders may not be oriented directly under the upper and lower light sources. As depicted in FIG. 52, the light sources 1214 and 1218 preferably extend across a front portion of the curing unit, while no lamps are placed in the rear portion of the curing unit When the lens drawer assembly is slid back into the curing unit, the mold assembly holders 1220 are oriented under the lamps, while the lens holders 1221 are oriented in the back portion where no lamps are present. By orienting the holders in this manner curing process which involve light and heat (e.g., post cure processes) and annealing processes, which may involve either application of heat and light or the application of heat only, may be performed in the same unit.

The light sources 1214 and 1218, preferably generate activating light. Light sources 1214 and 1218 may be supported by and electrically connected to suitable fixtures 1242. Lamps 1214 may generate either ultraviolet light, actinic light, visible light, and/or infrared light. The choice of lamps is preferably based on the monomers and photo-initiator system used in the lens forming composition. In one embodiment, the activating light may be generated from a fluorescent lamp. The fluorescent lamp preferably has a strong emission spectra in the 380 to 490 nm region. A fluorescent lamp emitting activating light with the described wavelengths is commercially available from Philips as model TTD-15W/03. In another embodiment, the lamps may be ultraviolet lights.

In one embodiment, an upper light filter 1254 may be positioned between upper light source 1214 and lens drawer assembly 1216, as depicted in FIG. 51. A lower light filter 1256 may be positioned between lower light source 1218 and lens drawer assembly 1216. Examples of suitable light filters have been previously described. The light filters are used to create a proper distribution of light with regard to the prescription of the eyeglass lens. The light filters may also insulate the lamps from the curing chamber. During post cure and annealing process it is preferred that the chamber is heated to temperatures between about 200 and 225° F. Such temperatures may have a detrimental effects on the lamps such as shortening the lifetime of the lamps and altering the intensity of the light being produced. The light filters 1254 and 1256, when mounted into the guide 1217, will form an inner chamber which partially insulates the lamps from the heated portion of the chamber. In this manner, the temperatures of the lamps may be maintained within the usual operating temperatures.

Alternatively, a heat barrier 1260 may be disposed within the curing chamber. The heat barrier preferably insulates the lamps from the curing chamber, while allowing the activated light generated by the lamps to pass into the chamber. In one embodiment, the heat barrier may include a borosilicate plate of glass (e.g., PYREX glass) disposed between the light sources and the mold assembly. Preferably, a pair of borosilicate glass plates 1264 and 1262 with an intervening air gap between the plates 1263 serves as the heat barrier. The use of borosilicate glass allows the activating radiation to pass from the light sources to the lamps without any significant reduction intensity.

Along with the heat barrier 1260 and filter 1254, an opaque plate 1270, may be placed between the light sources and the mold assembly. The opaque plate is substantially opaque toward the activating light Apertures are preferably disposed in the opaque plate to allow light to pass through the plate onto the mold assemblies.

In order to allow post cure and annealing procedures to be performed, a heating system 1250 is preferably disposed within the curing unit, as depicted in FIG. 52. The heating system 1250 may be a resistive heating system, a hot air system, or an infrared heating system. The heating system 1250 may be oriented along the back side of the curing chamber. The heating system 1250 is preferably disposed at a position between the two filters, such that the heating system is partially insulated from the lamps 1214 and 1218.

Preferably, the heating system is configured to heat the curing chamber to a temperature of about 200° F. to about 225° F.

The incorporation of a heating system into a system which allows irradiation of a mold assembly from both sides will allow many of the above described operations to be performed in a single curing unit. The use of lamps in the front portion of the curing unit, while leaving the back portion of the curing chamber substantially free of lamps, allows both activating light curing steps and annealing steps to performed in the same unit at the same time. Thus the curing conditions described in Table 11 may be performed in a single unit, rather than the two units as described above.

In another embodiment, the method of producing the lenses may be modified such that all of the initial curing process is performed while heat is applied to the lens forming composition. Table 12 shows alternate curing conditions which may be used to cure the lens forming compositions.

TABLE 12

| LENS INFORMATION | | | CURING INFORMATION | | |
|---|---|---|---|---|---|
| Sphere | Lens Type | Tinted | Filter | Curing Conditions | Anneal Time |
| +4.00 to +2.25 | Clear | No | 50 mm | 90 Seconds Front and Back 13 Minutes Back Temperature 225° F. | 7 Min. |
| +4.00 to +2.25 | Clear | Yes | 50 mm | 90 Seconds Front and Back 15 Minutes Front Temperature 225° F. | 7 Min. |
| +4.00 to +2.25 | Photo | | 50 mm | 90 Seconds Front and Back 13 Minutes Front Temperature 225° F. | 7 Min. |
| +2.00 to −4.00 | Clear | No | Clear Plate | 7 Seconds Front 13 Minutes Back Temperature 225° F. | 7 Min. |
| +2.00 to −4.00 | Clear | Yes | Clear Plate | 7 Seconds Front 15 Minutes Back Temperature 225° F. | 7 Min. |
| +2.00 to plano | Photo | | Clear Plate | 15 Seconds Front 13 Minutes Back Temperature 225° F. | 7 Min. |
| −0.25 to −4.00 | Photo | | Clear Plate | 20 Seconds Back w/7 Sec. Front starting @ 13 Sec. elapsed time 13 Minutes Back Temperature 225° F. | 7 Min. |

After the mold assembly is filled with the appropriate monomer solution the mold assemblies are placed in the mold assembly holders of the drawer of the curing unit The drawer is slid back into the curing unit. The curing unit may be preheated to a temperature of about 225° F. prior to placing the mold assemblies in the curing unit. The curing conditions include applying activating light to one or both of the mold members while substantially simultaneously applying heat to the mold assemblies. As shown in Table 12, the light curing conditions are similar to the previously described conditions. However, the initial dose and the post-cure processes have been combined into a single process. Thus, for the formation of a photochromic lens having a sphere power of +1.50, the mold assemblies are placed in the lens curing unit and irradiated with activating light from the bottom of the unit for about 15 seconds. The curing unit is preferably at a temperature of about 225° F. while the activating light is applied. After 15 seconds, the bottom light is turned off and the mold assemblies are treated with activating light from the top lamps for about 13 minutes.

This subsequent treatment with activating light is also performed at a curing chamber temperature of about 225° F. After the 13 minutes have elapsed, the lights may be turned off, the lens removed from the molds and an anneal process begun.

The anneal process may be performed in the same unit that the cure process is performed. The demolded lens is preferably placed in the lens holders of the curing unit drawer. The curing unit is preferably at a temperature of about 225° F., when the lens are placed in the curing unit. Preferably, the lens holders are positioned away from the lamps, such that little activating light reaches the lenses when the lamps are on. This allows anneal processed to be performed at the same time that curing processes are performed and within the same curing unit. Lenses that have been formed with a mixture of heating and light typically exhibit crosslink density that are greater than lenses which are cured using combinations of light only curing with light and heat curing.

It should be understood, that the above-described improvements may be used in combination with any of the features of the previously described embodiments.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized dependently, all as would be apparent to one skilled in the art after having the benefit of this description of the invention. Changes may be made in the elements described herein without depart from the spirit and scope of the invention as described in the following claims.

What is claimed is:

1. An apparatus for preparing an eyeglass lens, comprising:
    a front mold member having a casting face, a non-casting face and a front mold identification marking;
    a back mold member having a casting face, a non-casting face and a back mold identification mark, the back mold member being spaced apart from the front mold member by a gasket during use, the gasket comprising a gasket identification marking, wherein the casting faces of the front mold member and the back mold member and an inner surface of the gasket at least partially define a mold cavity which defines a shape corresponding to an eyeglass lens prescription;
    a coating unit for applying a coating to the eyeglass lens or mold members during use;
    a lens curing unit configured to direct activating light toward the mold members during use; and
    a controller comprising an input device for obtaining information from a user and an output device for transmitting information to the user, wherein the controller is configured to determine the front mold identification marking, the back mold identification marking and the gasket identification marking in response to the eyeglass lens prescription being entered through the input device, and wherein the controller is configured to transmit via the output device the front mold identification marking, the back mold identification marking and the gasket identification marking, and wherein the controller is configured to control the operation of the lens curing unit during use, and wherein the controller is configured to adjust lens curing conditions based on the eyeglass prescription.

2. The apparatus of claim 1, wherein the apparatus is configured to form non-photochromic lenses and photochromic lenses.

3. The apparatus of claim 1, wherein the apparatus is configured to form an aspheric single vision lens, a flat-top bifocal lens or a progressive multifocal lens.

4. The apparatus of claim 1, wherein the apparatus is configured to substantially simultaneously apply a coating to an eyeglass lens disposed within the coating unit and direct activating light and heat toward mold members disposed within the lens curing unit.

5. The apparatus of claim 1, wherein the coating unit is a spin coating unit.

6. The apparatus of claim 1, wherein the coating unit comprises:
    a holder for holding the eyeglass lens or at least one of the mold members, wherein the holder is configured to revolve during use; and a coating unit activating light source configured to direct activating light towards the coating unit during use.

7. The apparatus of claim 6, wherein the coating unit activating light source is an ultraviolet light source.

8. The apparatus of claim 6, wherein the coating unit activating light source has a peak light intensity at a range of about 200 nm to about 300 nm.

9. The apparatus of claim 6, further comprising a cover for covering the coating unit, wherein the coating unit activating light source is positioned on an inner surface of the cover.

10. The apparatus of claim 1, wherein the lens curing unit comprises a first light source configured to generate and direct activating light toward the front mold member, and wherein the lens curing unit further comprises a second light source configured to generate and direct activating light toward the back mold member.

11. The apparatus of claim 10, further comprising a first filter disposed between the first light source and the front mold member, and a second filter disposed between the second light source and the back mold member, the first and second filters being configured to diffuse the activating light directed toward the mold members during use.

12. The apparatus of claim 11, wherein the first and second filters are configured to thermally isolate the first and second light sources from the lens curing chamber.

13. The apparatus of claim 10, further comprising a first thermal barrier disposed between the first light source and the first mold member, and a second thermal barrier disposed between the second light source and the second mold member.

14. The apparatus of claim 10, wherein the first and second light sources comprise fluorescent light sources configured to emit light at a wavelength of about 385 nanometers to about 490 nanometers.

15. The apparatus of claim 1, wherein the lens curing unit comprises a lens drawer for positioning the mold members within the lens curing unit, the lens drawer being configurable to be inserted within and removed from an irradiation chamber of the lens curing unit.

16. The apparatus of claim 1, wherein the lens curing unit comprises a heater, the heater configured to heat the interior of the lens curing unit to a temperature of up to about 250° F.

17. The apparatus of claim 1, wherein the lens curing unit comprises a conductive heating apparatus, the conductive heating apparatus being adapted to conductively apply heat to a face of at least one of the mold members during use.

18. The apparatus of claim 1, wherein the output device comprises a display screen.

19. The apparatus of claim 1, wherein the output device comprises a display screen, and wherein the input device comprises scrolling buttons and a selection knob.

20. The apparatus of claim 1, wherein the output device comprises a display screen, and wherein the input device comprises scrolling buttons and a selection knob, and wherein the selection knob is configured to be movable in a first direction such that data on the display screen is altered, and wherein the selection knob is configured to be movable in a second direction to select the data.

21. The apparatus of claim 1, wherein the apparatus further comprises a light sensor configured to measure the dose of light transmitted to the mold cavity, and wherein the light sensor is configured to communicate with the controller, and wherein the controller varies the intensity or duration of light such that a predetermined dose is transmitted to the mold cavity.

22. The apparatus of claim 1, wherein the lens curing unit comprises a first light source and a second light source, and wherein the controller is configured to individually control the first and second light sources.

23. The apparatus of claim 1, wherein the controller is configured to perform system diagnostic checks.

24. The apparatus of claim 1, wherein the controller is configured to notify the user when the system requires maintenance.

25. The apparatus of claim 1, wherein the controller is configured to transmit instructions to an operator during use.

26. The apparatus of claim 1, wherein the controller is configured to run a computer software program for determining the front mold identification marking, the back mold identification marking and the gasket identification marking, wherein the software program comprises a plurality of instructions configured to perform operations comprising:
  to collecting prescription information which defines the eyeglass prescription; and analyzing the prescription information to determine the front mold identification marking, the back mold identification marking, and the gasket identification marking of the appropriate front mold, back mold and gasket for producing the eyeglass lens.

27. The apparatus of claim 26, wherein the prescription information comprises a sphere power, a cylinder power and a lens location, and wherein the prescription information is analyzed by correlating the sphere power, cylinder power and the lens location to an record in an information database.

28. The apparatus of claim 26, wherein the prescription information comprises a sphere power, a cylinder power, an add power, and a lens location and wherein the prescription information is analyzed by correlating the sphere power, the cylinder power, the add power, and the lens location to a record in an information database.

29. The apparatus of claim 26, wherein the prescription information further comprises monomer type and lens type.

30. The apparatus of claim 26, wherein the front mold identification marking comprises an alphanumeric sequence, and wherein the back mold identification marking comprises an alphanumeric sequence, and wherein the gasket identification marking comprises an alphanumeric sequence.

31. The apparatus of claim 26, wherein the output device is a display screen, and wherein the operations further comprise producing a visual display of the front mold identification number, the back mold identification number, and the gasket to identification number on the output device subsequent to analyzing the prescription data.

32. The apparatus of claim 26, wherein the operations further comprise determining curing conditions for a lens based on the eyeglass prescription.

33. The apparatus of claim 26, wherein the operations further comprise determining curing conditions for a lens based on the eyeglass prescription, wherein the controller is configured to control the curing unit such that the curing conditions are produced.

34. The apparatus of claim 1, wherein the gasket comprises at least four discrete projections for spacing mold members of a mold set, and wherein the projections are arranged on an interior surface of the gasket.

35. The apparatus of claim 1, wherein the gasket comprises at least four discrete projections for spacing mold members of a mold set, and wherein the projections are arranged on an interior surface of the gasket and wherein the at least four discrete projections are evenly spaced around the interior surface of the gasket.

36. The apparatus of claim 1, wherein the gasket comprises at least four discrete projections for spacing mold members of a mold set, and wherein the projections are arranged on an interior surface of the gasket and wherein the at least four discrete projections are spaced at about 90 degree increments around the interior surface of the gasket.

37. The apparatus of claim 1, wherein the gasket is configured to engage a second mold set for forming a second lens of a power.

38. The apparatus of claim 1, wherein the gasket comprises a fill port for receiving a lens forming composition while the gasket is fully engaged to a mold set.

39. The apparatus of claim 1, wherein the gasket comprises an interior surface, an exterior surface and a fill port for receiving a lens forming composition while the gasket is fully engaged to a mold set and wherein the fill port extends from the interior surface of the gasket to the exterior surface.

40. The apparatus of claim 1, wherein the controller is configured to simultaneously control operation of the coating unit and the lens curing unit during use.

41. An apparatus for preparing an eyeglass lens, comprising:
  a mold assembly comprising a first mold member and a second mold member, wherein at least one of the first and second mold members comprise an identification mark;
  a coating unit for applying a coating to an eyeglass lens or mold member during use;
  a lens curing unit configured to direct activating light toward the mold assembly during use; and
  a controller, wherein the controller is configured to determine the identification marking of the first or second mold member based on a prescription for the eyeglass lens, and wherein the controller is configured to control the operation of the lens curing unit during use, and wherein the controller is configured to adjust lens curing conditions based on the eyeglass prescription.

42. The apparatus of claim 41, wherein each of the first and second mold members have an identification mark.

43. The apparatus of claim 41, wherein the apparatus is configured to form non-photochromic lenses and photochromic lenses.

44. The apparatus of claim 41, wherein the apparatus is configured to form an aspheric single vision lens, a flat-top bifocal lens or a progressive multifocal lens.

45. The apparatus of claim 41, wherein the apparatus is configured to substantially simultaneously apply a coating to an eyeglass lens disposed within the coating unit and direct activating light and heat toward mold members disposed within the lens curing unit.

46. The apparatus of claim 41, wherein the coating unit is a spin coating unit.

47. The apparatus of claim 41, wherein the coating unit comprises:
   a holder for holding the eyeglass lens or at least one of the mold members, wherein the holder is configured to revolve during use; and
   a coating unit activating light source configured to direct activating light towards the coating unit during use.

48. The apparatus of claim 41, wherein the coating unit comprises:
   a holder for holding the eyeglass lens or at least one of the mold members, wherein the holder is configured to revolve during use; and
   a coating unit activating light source configured to produce and direct activating light towards the coating unit during use, and wherein the coating unit activating light source is an ultraviolet light source.

49. The apparatus of claim 41, wherein the coating unit comprises:
   a holder for holding the eyeglass lens or at least one of the mold members, wherein the holder is configured to revolve during use; and
   a coating unit activating light source configured to produce and direct activating light towards the coating unit during use; and wherein the coating unit activating light source has a peak light intensity at a range of about 200 nm to about 300 nm.

50. The apparatus of claim 41, wherein the coating unit comprises:
   a holder for holding the eyeglass lens or at least one of the mold members, wherein the holder is configured to revolve during use; and
   a coating unit activating light source configured to produce and direct activating light towards the coating unit during use; and
   a cover for covering the coating unit, and wherein the coating unit activating light source is positioned on an inner surface of the cover.

51. The apparatus of claim 41, wherein the lens curing unit comprises a first light source configured to generate and direct activating light toward the first mold member, and wherein the lens curing unit further comprises a second light source configured to generate and direct activating light toward the second mold member.

52. The apparatus of claim 41, wherein the lens curing unit comprises:
   a first activating light source, wherein the first activating light source is configured to produce activating light directed toward a mold assembly during use;
   a second activating light source, wherein the first activating light source is configured to produce activating light directed toward a mold assembly during use;
   a first filter disposed between the first light source and the first mold member; wherein first filter is configured to manipulate the intensity of the activating light emanating from the first activating light source; and
   a second filter disposed between the second light source and the second mold member, wherein second filter is configured to manipulate the intensity of the activating light emanating from the second activating light source.

53. The apparatus of claim 41, wherein the lens curing unit comprises:
   a first activating light source, wherein the first activating light source is configured to produce activating light directed toward a mold assembly during use;
   a second activating light source, wherein the first activating light source is configured to produce activating light directed toward a mold assembly during use;
   a first filter disposed between the first light source and the first mold member; wherein first filter is configured to manipulate the intensity of the activating light emanating from the first activating light source;
   a second filter disposed between the second light source and the second mold member, wherein second filter is configured to manipulate the intensity of the activating light emanating from the second activating light source; and
   wherein the first and second filters are configured to thermally isolate the first and second activating light sources from the lens curing chamber.

54. The apparatus of claim 41, wherein the lens curing unit comprises:
   a first activating light source, wherein the first activating light source is configured to produce activating light directed toward a mold assembly during use;
   a second activating light source, wherein the first activating light source is configured to produce activating light directed toward a mold assembly during use;
   a first thermal barrier disposed between the first activating light source and the first mold member, and a second thermal barrier disposed between the second activating light source and the second mold member.

55. The apparatus of claim 41, wherein the lens curing unit comprises:
   a first activating light source, wherein the first activating light source is configured to produce activating light directed toward a mold assembly during use;
   a second activating light source, wherein the first activating light source is configured to produce activating light directed toward a mold assembly during use; and
   wherein the first and second light sources comprise fluorescent light sources configured to emit light at a wavelength of about 385 nanometers to about 490 nanometers.

56. The apparatus of claim 41, wherein the lens curing unit comprises a lens drawer for positioning the mold members within the lens curing unit, the lens drawer being configurable to be inserted within and removed from an irradiation chamber of the lens curing unit.

57. The apparatus of claim 41, wherein the lens curing unit comprises a heater, the heater configured to heat the interior of the lens curing unit to a temperature of up to about 250° F.

58. The apparatus of claim 41, wherein the lens curing unit comprises a conductive heating apparatus, the conductive heating apparatus being adapted to conductively apply heat to a face of at least one of the mold members during use.

59. The apparatus of claim 41, wherein the apparatus further comprises a light sensor configured to measure the dose of light transmitted to the mold cavity, and wherein the light sensor is configured to communicate with the controller, and wherein the controller varies the intensity or duration of light such that a predetermined dose is transmitted to the mold cavity.

60. The apparatus of claim 41, wherein the lens curing unit comprises a first light source and a second light source, and wherein the control unit is configured to individually control the first and second light sources.

61. The apparatus of claim 41, wherein the controller is configured to perform system diagnostic checks.

62. The apparatus of claim 41, wherein the controller is configured to notify the user when the system requires maintenance.

63. The apparatus of claim 41, wherein the controller is configured to transmit instructions to an operator during use.

64. The apparatus of claim 41, wherein the controller is configured to run a computer software program for determining the identification marking, and wherein the software program comprises a plurality of instructions configured to perform operations comprising:

collecting prescription information, which defines the eyeglass prescription; and analyzing the prescription information to determine identification marking for producing the eyeglass lens.

65. The apparatus of claim 41, wherein the controller is configured to run a computer software program for determining the identification marking, and wherein the software program comprises a plurality of instructions configured to perform operations comprising:

collecting prescription information, which defines the eyeglass prescription; and analyzing the prescription information to determine identification marking for producing the eyeglass lens, wherein the prescription information comprises a sphere power, a cylinder power and a lens location, and wherein the prescription information is analyzed by correlating the sphere power, cylinder power and the lens location to an record in an information database.

66. The apparatus of claim 41, wherein the controller is configured to run a computer software program for determining the identification marking, and wherein the software program comprises a plurality of instructions configured to perform operations comprising:

collecting prescription information, which defines the eyeglass prescription; and analyzing the prescription information to determine identification marking for producing the eyeglass lens, and wherein the prescription information comprises a sphere power, a cylinder power, an add power, and a lens location and wherein the prescription information is analyzed by correlating the sphere power, the cylinder power, the add power, and the lens location to a record in an information database.

67. The apparatus of claim 41, wherein the controller is configured to run a computer software program for determining the identification marking, and wherein the software program comprises a plurality of instructions configured to perform operations comprising:

collecting prescription information, which defines the eyeglass prescription; and analyzing the prescription information to determine identification marking for producing the eyeglass lens, and wherein the prescription information further comprises monomer type and lens type.

68. The apparatus of claim 41, wherein the controller is configured to run a computer software program for determining the identification marking, and wherein the software program comprises a plurality of instructions configured to perform operations comprising:

collecting prescription information, which defines the eyeglass prescription; and analyzing the prescription information to determine identification marking for producing the eyeglass lens, and wherein the mold identification marking comprises an alphanumeric sequence.

69. The apparatus of claim 41, wherein the controller is configured to run a computer software program for determining the identification marking, and wherein the software program comprises a plurality of instructions configured to perform operations comprising:

collecting prescription information, which defines the eyeglass prescription; and analyzing the prescription information to determine identification marking for producing the eyeglass lens, and wherein the operations further comprise determining curing conditions for a lens based on the eyeglass prescription.

70. The apparatus of claim 41, wherein the controller is configured to run a computer software program for determining the identification marking, and wherein the software program comprises a plurality of instructions configured to perform operations comprising:

collecting prescription information, which defines the eyeglass prescription; and analyzing the prescription information to determine identification marking for producing the eyeglass lens, and wherein the operations further comprise determining curing conditions for a lens based on the eyeglass prescription, wherein the controller is configured to control the curing unit such that the curing conditions are produced.

* * * * *